US011968367B2

(12) United States Patent
Fan et al.

(10) Patent No.: US 11,968,367 B2
(45) **Date of Patent: *Apr. 23, 2024**

(54) CONTEXT MODELING OF SIDE INFORMATION FOR REDUCED SECONDARY TRANSFORMS IN VIDEO

(71) Applicants: Beijing Bytedance Network Technology Co., Ltd., Beijing (CN); Bytedance Inc., Los Angeles, CA (US)

(72) Inventors: Kui Fan, San Diego, CA (US); Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,672

(22) Filed: Dec. 28, 2022

(65) Prior Publication Data

US 2023/0145133 A1 May 11, 2023

Related U.S. Application Data

(63) Continuation of application No. 17/585,788, filed on Jan. 27, 2022, now Pat. No. 11,575,901, which is a (Continued)

(30) Foreign Application Priority Data

Aug. 17, 2019 (WO) ................ PCT/CN2019/101230
Sep. 25, 2019 (WO) ................ PCT/CN2019/107904
Dec. 24, 2019 (WO) ................ PCT/CN2019/127829

(51) Int. Cl.
*H04N 19/13* (2014.01)
*H04N 19/176* (2014.01)

(Continued)

(52) U.S. Cl.
CPC ........... *H04N 19/13* (2014.11); *H04N 19/176* (2014.11); *H04N 19/60* (2014.11); *H04N 19/70* (2014.11); *H04N 19/96* (2014.11)

(58) Field of Classification Search
CPC ...... H04N 19/13; H04N 19/176; H04N 19/60; H04N 19/70; H04N 19/96; H04N 19/132;

(Continued)

(56) References Cited

U.S. PATENT DOCUMENTS 10,666,976 B2 5/2020 Huang et al.
11,039,139 B2 6/2021 Zhao et al.

(Continued)

FOREIGN PATENT DOCUMENTS

AU 2015249109 A1 11/2015
CA 3063559 A1 12/2018

(Continued)

OTHER PUBLICATIONS

Nalci et al. ("Non-CE6: An Improved Context Modeling for LFNST", JVET-O0373, Jul. 3-12, 2019. This reference was also provided by the Applicant in parent U.S. Appl. No. 17/585,788. (Year: 2019).*

(Continued)

*Primary Examiner* — Matthew K Kwan
(74) *Attorney, Agent, or Firm* — Conley Rose, P.C.

(57) ABSTRACT

A video processing method is described. The method includes performing a conversion between a video region of a video and a coded representation of the video. The performing of the conversion includes configuring, based on a partition type of the video region, a context model for coding a first bin. The first bin and a second bin are included in a bin string corresponding to an index of a secondary transform tool. The index indicates an applicability of the secondary transform tool and/or a kernel information of the secondary transform tool. The secondary transform tool includes applying, during encoding, a forward secondary transform to an output of a forward primary transform (Continued)

applied to a residual of a video block prior to quantization, or applying, during decoding, an inverse secondary transform to an output of dequantization to the video block before applying an inverse primary transform.

20 Claims, 39 Drawing Sheets

Related U.S. Application Data continuation of application No. PCT/CN2020/109476, filed on Aug. 17, 2020.

(51) Int. Cl.
*H04N 19/60* (2014.01)
*H04N 19/70* (2014.01)
*H04N 19/96* (2014.01)

(58) Field of Classification Search
CPC .. H04N 19/463; H04N 19/159; H04N 19/593; H04N 19/91; H04N 19/12; H04N 19/186
USPC .................................................... 375/240.02
See application file for complete search history.

(56) References Cited

U.S. PATENT DOCUMENTS

| | | | |
|---|---|---|---|
| 11,252,420 | B2 | 2/2022 | Salehifar et al. |
| 2011/0235705 | A1 | 9/2011 | Hanna |
| 2012/0008683 | A1 | 1/2012 | Karczewicz et al. |
| 2012/0082391 | A1 | 4/2012 | Fernandes |
| 2012/0320972 | A1 | 12/2012 | Ma et al. |
| 2013/0259128 | A1 | 10/2013 | Song et al. |
| 2014/0098861 | A1 | 4/2014 | Yu et al. |
| 2014/0178040 | A1 | 6/2014 | Shimada et al. |
| 2014/0254661 | A1 | 9/2014 | Saxena et al. |
| 2014/0376626 | A1 | 12/2014 | Lee |
| 2015/0249828 | A1 | 9/2015 | Rosewarne et al. |
| 2015/0264354 | A1 | 9/2015 | Zhang |
| 2015/0358621 | A1 | 12/2015 | He |
| 2016/0088310 | A1 | 3/2016 | Lin |
| 2016/0205404 | A1 | 7/2016 | Zhu et al. |
| 2016/0234525 | A1 | 8/2016 | Lee et al. |
| 2017/0034530 | A1 | 2/2017 | Cherepanov et al. |
| 2017/0094313 | A1 | 3/2017 | Zhao et al. |
| 2017/0295380 | A1 | 10/2017 | Huang et al. |
| 2017/0324643 | A1 | 11/2017 | Seregin et al. |
| 2018/0020218 | A1 | 1/2018 | Zhao et al. |
| 2018/0103252 | A1 | 4/2018 | Hsieh et al. |
| 2018/0288439 | A1 | 10/2018 | Hsu et al. |
| 2018/0302631 | A1 | 10/2018 | Chiang et al. |
| 2018/0324417 | A1 | 11/2018 | Karczewicz et al. |
| 2018/0332284 | A1 | 11/2018 | Liu et al. |
| 2018/0332289 | A1 | 11/2018 | Huang |
| 2018/0367814 | A1 | 12/2018 | Seregin et al. |
| 2019/0149822 | A1 | 5/2019 | Kim et al. |
| 2019/0149823 | A1 | 5/2019 | Lim et al. |
| 2019/0149829 | A1 | 5/2019 | Maaninen |
| 2019/0166370 | A1 | 5/2019 | Xiu et al. |
| 2019/0306526 | A1 | 10/2019 | Cho et al. |
| 2019/0356915 | A1 | 11/2019 | Jang et al. |
| 2019/0387241 | A1 | 12/2019 | Kim et al. |
| 2020/0045339 | A1 | 2/2020 | Zhao et al. |
| 2020/0084447 | A1 | 3/2020 | Zhao et al. |
| 2020/0092555 | A1 | 3/2020 | Zhao et al. |
| 2020/0244995 | A1 | 3/2020 | Hsiang |
| 2020/0260096 | A1 | 8/2020 | Ikai et al. |
| 2020/0288172 | A1 | 9/2020 | Huang et al. |
| 2020/0322617 | A1 | 10/2020 | Zhao et al. |
| 2020/0322620 | A1 | 10/2020 | Zhao et al. |
| 2020/0322623 | A1* | 10/2020 | Chiang ................ H04N 19/159 |
| 2020/0359019 | A1 | 11/2020 | Koo et al. |
| 2020/0413049 | A1 | 12/2020 | Biatek et al. |
| 2021/0014534 | A1 | 1/2021 | Koo et al. |
| 2021/0021818 | A1 | 1/2021 | Lee et al. |
| 2021/0051328 | A1 | 2/2021 | Sharman et al. |
| 2021/0076043 | A1 | 3/2021 | Zhang et al. |
| 2021/0084314 | A1 | 3/2021 | Salehifar et al. |
| 2021/0120240 | A1 | 4/2021 | Bross et al. |
| 2021/0289221 | A1 | 9/2021 | Misra et al. |
| 2021/0297672 | A1 | 9/2021 | Deng et al. |
| 2021/0314618 | A1 | 10/2021 | Pfaff et al. |
| 2021/0314619 | A1 | 10/2021 | Jung et al. |
| 2021/0337235 | A1 | 10/2021 | Choi et al. |
| 2021/0360240 | A1 | 11/2021 | Lee |
| 2021/0360247 | A1 | 11/2021 | Koo et al. |
| 2021/0385499 | A1 | 12/2021 | Zhang et al. |
| 2021/0385500 | A1 | 12/2021 | Zhang et al. |
| 2021/0392327 | A1 | 12/2021 | Zhang et al. |
| 2022/0007034 | A1 | 1/2022 | Wang et al. |
| 2022/0038741 | A1 | 2/2022 | Nam |
| 2022/0086449 | A1* | 3/2022 | Koo .................... H04N 19/132 |
| 2022/0094986 | A1 | 3/2022 | Zhang et al. |
| 2022/0109846 | A1 | 4/2022 | Lim et al. |
| 2022/0132146 | A1 | 4/2022 | Salehifar et al. |
| 2022/0141495 | A1 | 5/2022 | Kim et al. |
| 2022/0150498 | A1 | 5/2022 | Zhang et al. |
| 2022/0150502 | A1 | 5/2022 | Zhang et al. |
| 2022/0174274 | A1 | 6/2022 | Jang |

FOREIGN PATENT DOCUMENTS

| | | | |
|---|---|---|---|
| CN | 102474270 | A | 5/2012 |
| CN | 103139565 | A | 6/2013 |
| CN | 103636205 | A | 3/2014 |
| CN | 104067622 | A | 9/2014 |
| CN | 104412591 | A | 3/2015 |
| CN | 104488266 | A | 4/2015 |
| CN | 105791867 | A | 7/2016 |
| CN | 107211144 | A | 9/2017 |
| CN | 108028919 | A | 5/2018 |
| CN | 108141585 | A | 6/2018 |
| CN | 108141596 | A | 6/2018 |
| CN | 108141597 | A | 6/2018 |
| CN | 108322745 | A | 7/2018 |
| CN | 108322756 | A | 7/2018 |
| CN | 108632611 | A | 10/2018 |
| CN | 109076221 | A | 12/2018 |
| CN | 109076222 | A | 12/2018 |
| CN | 109076223 | A | 12/2018 |
| CN | 109076225 | A | 12/2018 |
| CN | 109076230 | A | 12/2018 |
| CN | 109076242 | A | 12/2018 |
| CN | 109076243 | A | 12/2018 |
| CN | 109196869 | A | 1/2019 |
| CN | 109417636 | A | 3/2019 |
| CN | 109644269 | A | 4/2019 |
| CN | 109644276 | A | 4/2019 |
| CN | 109716772 | A | 5/2019 |
| JP | 2022532114 | A | 7/2022 |
| WO | 2012122278 | A1 | 9/2012 |
| WO | 2017191782 | A1 | 11/2017 |
| WO | 2017195555 | A1 | 11/2017 |
| WO | 2017195666 | A1 | 11/2017 |
| WO | 2018128323 | A1 | 7/2018 |
| WO | 2018132710 | A1 | 7/2018 |
| WO | 2018166429 | A1 | 9/2018 |
| WO | 2019117634 | A1 | 6/2019 |
| WO | 2020160401 | A1 | 8/2020 |
| WO | 2020226424 | A1 | 11/2020 |
| WO | 2021110018 | A1 | 6/2021 |

OTHER PUBLICATIONS

Koo et al. (CE6: Reduced Secondary Transform (RST) (CE6-3.1), JVET-N0193, Mar. 19-27, 2019. This reference was also provided by the Applicant in parent U.S. Appl. No. 17/585,788. (Year: 2019).*

Document: JVET-N0217, Pfaff, J., et al., "CE3: Affine linear weighted intra prediction (CE3-4.1, CE3-4.2)," Joint Video Experts Team (JVET) of ITU-T SG 16 WP 3 and ISO/IEC JTC 1/SC 29/WG 11 14th Meeting: Geneva, CH, Mar. 19-27, 2019, 16 pages.

(56) References Cited

OTHER PUBLICATIONS

Document: JVET-M0102-v5, De-Luxan-Hernandez, S., et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11 13th Meeting: Marrakech, MA, Jan. 9-18, 2019, 8 pages.
Document: JVET-N0193, Koo, M., et al., "CE6: Reduced Secondary Transform (RST) (CE6-3.1)," Joint Video Experts Team (JVET) of ITU-T SG 16 WP 3 and ISO/IEC JTC 1/SC 29/WG 11 14th Meeting: Geneva, CH, Mar. 19-27, 2019, 18 pages.
Document: JVET-K0099, Salehifar, M., et al., "CE 6.2.6: Reduced Secondary Transform (RST)," Joint Video Experts Team (JVET) of ITU-T SG 16 WP 3 and ISO/IEC JTC 1/SC 29/WG 11 11th Meeting: Ljubljana, SI, Jul. 10-18, 2018, 11 pages.
Document: JVET-L0133, Koo, M., et al., "CE 6-2.1: Reduced Secondary Transform (RST)," Joint Video Experts Team (JVET) of ITU-T SG 16 WP 3 and ISO/IEC JTC 1/SC 29/WG 11 12th Meeting: Macao, CN, Oct. 3-12, 2018, 7 pages.
Document: JVET-N0413, Karczewicz, M., et al., "CE8-related: Quantized residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, pages.
ITU-T and ISO/IEC, "Information Technology—High Efficiency Coding and Media Delivery in Heterogeneous Environments—Part 2: High efficiency video coding", Rec. ITU-T H.265 |ISO/IEC 23008, 4th Edition, Apr. 20, 2018, 8 pages.
Document: JVET-G1001-v1, Chen, J., et al., "Algorithm description of Joint Exploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 45 pages.
Document: JVET-O0219-v1, Zhang, Z., et al., "Non-CE6: On LFNST transform set selection for a CCLM coded block," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JVET-O2001-vE, Bross, B., et al., "Versatile Video Coding (Draft 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 438 pages.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 466 p.
Document: JVET-N0555-v3, Siekmann, M., et al., "CE6-related: Simplification of the Reduced Secondary Transform," Joint Video Experts Team (JVET) of ITU-T SG 16 WP 3 and ISO/IEC JTC 1/SC 29/WG 11 14th Meeting: Geneva, CH, Mar. 19-27, 2019, 9 pages.
Document: JVET-M0292, Koo, M., et al., "CE6: Reduced Secondary Transform (RST) (test 6.5.1)," Joint Video Experts Team (JVET) of ITU-T SG 16 WP 3 and ISO/IEC JTC 1/SC 29/WG 11 13th Meeting: Marrakech, MA, Jan. 9-18, 2019, 13 pages.
Document: JVET-M0100, Rath, G., et al., "CE3-related: DM-dependent chroma intra prediction modes," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Document: JVET-N0230-v3 Choi, J., et al., "Non-CE3: Simplified intra mode candidates for ISP," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-B0059, Zhao, X., et al., "TU-level non-separable secondary transform," Joint Video Exploration Team (JVET) of ITU-T SG 16 WP 3 and ISO/IEC JTC 1/SC 29/WG 11 2nd Meeting: San Diego, USA, Feb. 20-26, 2016, 5 pages.
Document: JVET-O0373-v1, Nalci, A., et al., "Non-CE6: An Improved Context Modeling for LFNST," Joint Video Experts Team (JVET) of ITU-T SG 16 WP 3 and ISO/IEC JTC 1/SC 29/WG 11 15th Meeting: Gothenburg, SE, Jul. 3-12, 2019, 2 pages.
Document: JVET-J0014-v4, Albrecht, M., et al., "Description of SDR, HDR and 360° video coding technology proposal by Fraunhofer HHI," Joint Video Experts Team (JVET) of ITU-T SG 16 WP 3 and ISO/IEC JTC 1/SC 29/WG 11 10th Meeting: San Diego, US, Apr. 10-20, 2018, 117 pages.
Document: JVET-J0017-v1, Koo, M., et al., "Description of SDR video coding technology proposal by LG Electronics," Joint Video Experts Team (JVET) of ITU-T SG 16 WP 3 and ISO/IEC JTC 1/SC 29/WG 11 10th Meeting: San Diego, CA, Apr. 10-20, 2018, 67 pages.
Document: JVET-N0105-v2, Rosewarne, C., et al., "CE6-related: RST binarizsation," Joint Video Experts Team (JVET) of ITU-T SG 16 WP 3 and ISO/IEC JTC 1/SC 29/WG 11 14th Meeting: Geneva, CH, Mar. 19-27, 2019, 4 pages.
Document: JVET-H0084, Wieckowski, A., "NextSoftware: An alternative implementation the Joint Exploration Model (JEM)" Joint Video Exploration Team (JVET) of ITU-T SG 16 WP 3 and ISO/IEC JTC 1/SC 29/WG 11 8th Meeting: Macao, CN, Oct. 18-25, 2017, 12 pages.
Document: JVET-L0288, Zhao, X., et al., "CE6: Coupled primary and secondary transform (Test 6.3.2)" Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JVET-K0405-v3, Egilmex, H., et al., "CE6-related: Secondary Transforms Coupled with a Simplified Primary Transformation," oint Video Experts Team (JVET) of ITU-T SG 16 WP 3 and ISO/IEC JTC 1/SC 29/WG 11 11th Meeting: Ljubljana, SI, Jul. 10-18, 2018, 5 pages.
Document: JVET-L0199, Helle, et al., "CE3: Non-linear weighted intra prediction (tests 2.2.1 and 2.2.2)," Joint Video Experts Team (JVET) of ITU-T SG 16 WP 3 and ISO/IEC JTC 1/SC 29/WG 11, 12th Meeting, Macao, CN, Oct. 3-12, 2018.
Document: JVET-N1002 Chen, J., et al., "Algorithm description for Versatile Video Coding and Test Model 5 (VTM 5)," Joint Video Experts Team (JVET) of ITU-T SG 16 WP 3 and ISO/IEC JTC 1/SC 29/WG 11, 14th Meeting: Geneva, CH Mar. 19-27, 2019.
Foreign Communication From a Counterpart Application, European Application No. 20851000.8, Extended European Search Report dated Aug. 30, 2022, 12 pages.
Non-Final Office Action dated Oct. 6, 2022, 23 pages, U.S. Appl. No. 17/411,170, filed Aug. 25, 2021.
Notice of Allowance dated Oct. 14, 2022, 28 pages, U.S. Appl. No. 17/400,397, filed Aug. 12, 2021.
Foreign Communication From a Counterpart Application, European Application No. 20805202.7, Partial Supplementary Search Report dated Aug. 18, 2022, 15 pages.
Foreign Communication From a Counterpart Application, European Application No. 20818775.7, Extended European Search Report dated Jun. 23, 2022, 16 pages.
Foreign Communication From a Counterpart Application, European Application No. 20804851.2, Extended European Search Report dated Apr. 7, 2022, 10 pages.
Non-Final Office Action dated May 24, 2022, 27 pages, U.S. Appl. No. 17/585,788, filed Jan. 27, 2022.
Non-Final Office Action dated Jun. 9, 2022, 24 pages, U.S. Appl. No. 17/585,741, filed Jan. 27, 2022.
Foreign Communication From a Counterpart Application, PCT Application No. PCT/CN2020/089579, English Translation of International Search Report dated Aug. 11, 2020, 10 pages.
Foreign Communication From a Counterpart Application, PCT Application No. PCT/CN2020/089580, English Translation of International Search Report dated Aug. 14, 2020, 9 pages.
Foreign Communication From a Counterpart Application, PCT Application No. PCT/CN2020/089581, English Translation of International Search Report dated Aug. 10, 2020, 10 pages.
Foreign Communication From a Counterpart Application, PCT Application No. PCT/CN2020/089582, English Translation of International Search Report dated Jun. 30, 2020, 9 pages.
Foreign Communication From a Counterpart Application, PCT Application No. PCT/CN2020/089583, English Translation of International Search Report dated Jul. 29, 2020, 10 pages.
Foreign Communication From a Counterpart Application, PCT Application No. PCT/CN2020/094854, English Translation of International Search Report dated Sep. 23, 2020, 12 pages.

(56) References Cited

OTHER PUBLICATIONS

Foreign Communication From a Counterpart Application, PCT Application No. PCT/CN2020/106551, English Translation of International Search Report dated Oct. 10, 2020, 9 pages.
Foreign Communication From a Counterpart Application, PCT Application No. PCT/CN2020/106561, English Translation of International Search Report dated Oct. 26, 2020, 11 pages.
Foreign Communication From a Counterpart Application, PCT Application No. PCT/CN2020/109476, English Translation of International Search Report dated Nov. 20, 2020, 12 pages.
Non-Final Office Action dated Nov. 29, 2021, 24 pages, U.S. Appl. No. 17/400,464, filed Aug. 12, 2021.
Non-Final Office Action dated Dec. 2, 2021, 18 pages, U.S. Appl. No. 17/400,397, filed Aug. 12, 2021.
Non-Final Office Action dated Jan. 12, 2022, 22 pages, U.S. Appl. No. 17/411,170, filed Aug. 25, 2021.
Final Office Action dated Apr. 6, 2022, 17 pages, U.S. Appl. No. 17/400,512, filed Aug. 12, 2021.
Final Office Action dated Apr. 11, 2022, 16 pages, U.S. Appl. No. 17/400,397, filed Aug. 12, 2021.
Ex Parte Quayle Office Action dated Apr. 20, 2022, 17 pages, U.S. Appl. No. 17/585,718, filed Jan. 27, 2022.
Non-Final Office Action dated Feb. 1, 2022, 15 pages, U.S. Appl. No. 17/540,089, filed Feb. 1, 2022.
Foreign Communication From a Counterpart Application, Indian Application No. 202127049597, English Translation of Indian Office Action dated Jul. 11, 2022, 7 pages.
Document: JVET-O0213, Koo, M., et al., "Non-CE6: Block size restriction of LFNST," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.
Document: JVET-J0054-v1, Zhao, X., et al., "Coupled primary and secondary transform," Joint Video Experts Team (JVET) of ITU-T SG 16 WP 3 and ISO/IEC JTC 1/SC 29/WG 11 10th Meeting: San Diego, US, Apr. 10-20, 2018, 4 pages.
Foreign Communication From a Related Counterpart Application, European Application No. 20805202.7, Extended uropean Search Report dated Dec. 5, 2022, 17 pages.
Non-Final Office Action dated Jan. 18, 2023, 31 pages, U.S. Appl. No. 17/540,089, filed Dec. 1, 2023.
Non-Final Office Action dated Mar. 9, 2023, 21 pages, U.S. Appl. No. 17/585,741, filed Jan. 27, 2023.
Final Office Action dated May 17, 2023, 23 pages, U.S. Appl. No. 17/950,460, filed Sep. 22, 2022.

* cited by examiner

| current state | next state for ... | |
|---|---|---|
| | (k & 1) == 0 | (k & 1) == 1 |
| 0 | 0 | 2 |
| 1 | 2 | 0 |
| 2 | 1 | 3 |
| 3 | 3 | 1 |

CONTEXT MODELING OF SIDE INFORMATION FOR REDUCED SECONDARY TRANSFORMS IN VIDEO

CROSS-REFERENCE TO RELATED APPLICATIONS

This application is a continuation of U.S. patent application Ser. No. 17/585,788 filed on Jan. 27, 2022, which is a continuation of International Patent Application No. PCT/CN2020/109476 filed on Aug. 17, 2020, which claims the priority to and benefits of International Patent Application Nos. PCT/CN2019/101230 filed on Aug. 17, 2019, PCT/CN2019/107904 filed on Sep. 25, 2019, and PCT/CN2019/127829 filed on Dec. 24, 2019. All the aforementioned patent applications are hereby incorporated by reference in their entireties.

TECHNICAL FIELD

The present disclosure relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and specifically, to context modeling for residual coding in video coding. The described methods may be applied to both the existing video coding standards (e.g., High Efficiency Video Coding (HEVC)) and future video coding standards or video codecs.

In one representative aspect, the disclosed technology may be used to provide a method for video processing. This method includes performing a conversion between a video region of a video and a coded representation of the video, wherein the performing of the conversion includes configuring, based on a partition type of the video region, a context model for coding a first bin, the first bin and a second bin included in a bin string corresponding to an index of a secondary transform tool applied to the video region, wherein the index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

In another representative aspect, the disclosed technology may be used to provide a method for video processing. This method includes determining, for a current video block of a video comprising sub-blocks, based on a coding condition of the current video block, a zero-out region in which coefficients are zeroed out; and performing a conversion between the current video block and a coded representation of the video based on the determining, wherein the conversion includes applying a secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

In yet another representative aspect, the disclosed technology may be used to provide a method for video processing. This method includes determining, for a conversion between a current video block having a dimension N×N of a video and a coded representation of the video, to use a transform matrix and/or an inverse transform matrix with a reduced size that is smaller than N×N in an application of a secondary transform tool to the current video block of a video; and performing a conversion between the video and a coded representation of the video, wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

In yet another representative aspect, the disclosed technology may be used to provide a method for video processing. This method includes determining, for a conversion between a current video block of a video and a coded representation of the video, based on a rule, to use a residual pattern among one or more residual patterns, wherein each of the one or more residual patterns corresponds to a mask that provides information about positions of zeroed out samples; and performing a conversion between the video and a coded representation of the video based on the determining.

In yet another representative aspect, the disclosed technology may be used to provide a method for video processing. This method includes determining, based on a type of a primary transform, a secondary transform tool associated with a current video block of a video; and performing a conversion between the video and a coded representation of the video, wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

In yet another representative aspect, the disclosed technology may be used to provide a method for video processing. This method includes determining to use multiple sets of transform matrices to be used to process a video region of a video; and performing a conversion between the video and a coded representation of the video, and wherein the coded representation includes an indication of which set among the multiple sets is used for the video region.

In yet another example aspect, a method of video processing is disclosed. The method includes determining, based on a rule, a transform matrix or an inverse transform matrix to be used in an application of a secondary transform tool to a current video block of a video; and performing a conversion between the video and a coded representation of the video, wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform, wherein the rule specifies to determine coefficients of the transform matrix or the inverse transform matrix based on a variable specifying a transform output length.

In yet another example aspect, a method of video processing is disclosed. The method includes determining a transform matrix or an inverse transform matrix to be used in an application of a secondary transform tool to a current video block of a video based on a rule; and performing a conversion between the video and a coded representation of the video, wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform, wherein the rule specifies to determine the transform matrix or the inverse transform matrix by using a retraining process.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Embodiments of the disclosed technology may be applied to existing video coding standards (e.g., HEVC, H.265) and future standards to improve compression performance. Section headings are used in the present disclosure to improve readability of the description and do not in any way limit the discussion or the embodiments (and/or implementations) to the respective sections only.

2 Video Coding Introduction

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM) [3][4]. In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Coding Flow of a Typical Video Codec

Figure 1:
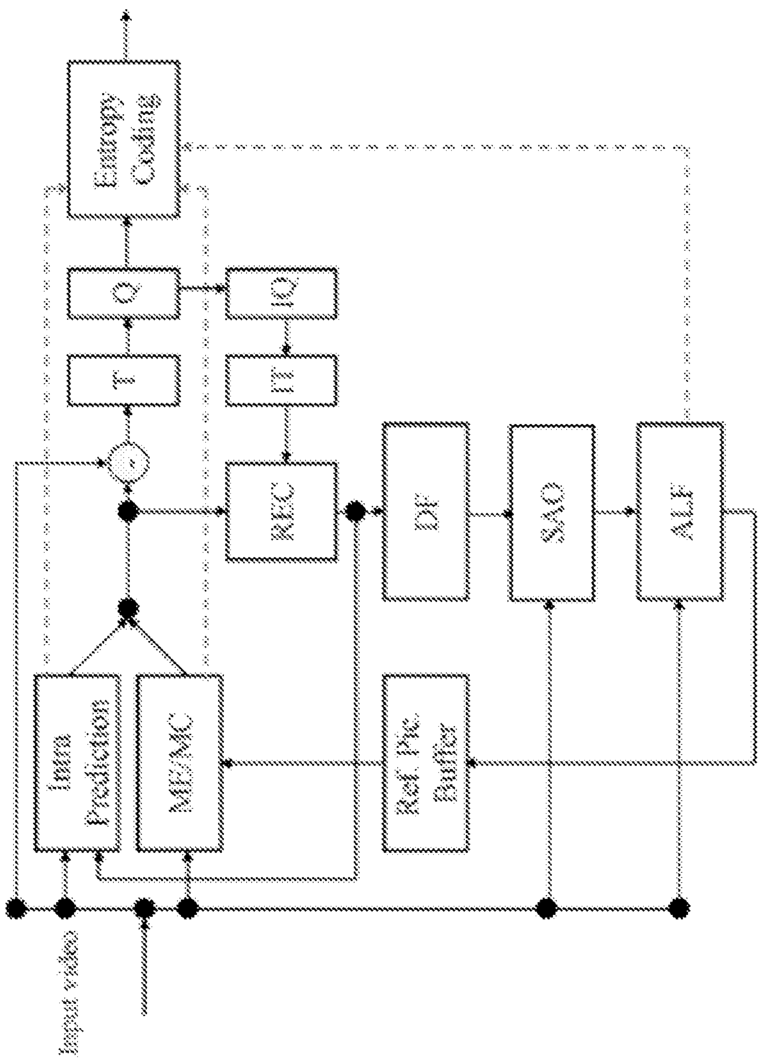
FIG. 1 shows a block diagram of an example encoder.

FIG. 1 shows an example of encoder block diagram of VVC, which contains three in-loop filtering blocks: deblocking filter (DF), sample adaptive offset (SAO) and adaptive loop filter (ALF). Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.2 Intra Coding in VVC 2.2.1 Intra Mode Coding with 67 Intra Prediction Modes

To capture the arbitrary edge directions presented in natural video, the number of directional intra modes is extended from 33, as used in HEVC, to 65. The additional directional modes are depicted as dotted arrows in FIG. 2, and the planar and direct current (DC) modes remain the same. These denser directional intra prediction modes apply for all block sizes and for both luma and chroma intra predictions.

Figure 2:
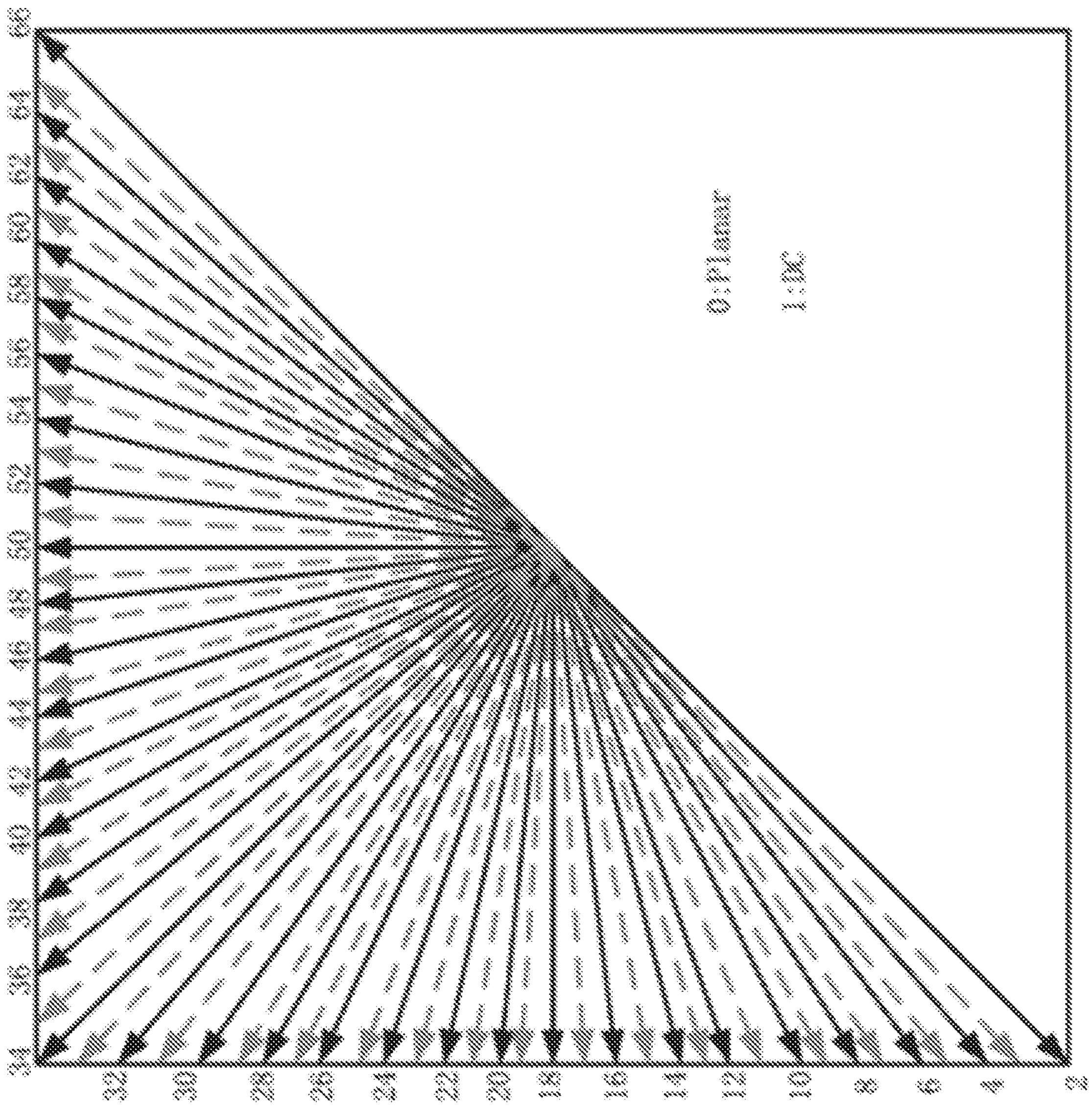
FIG. 2 shows an example of 67 intra prediction modes.
Figure 3:
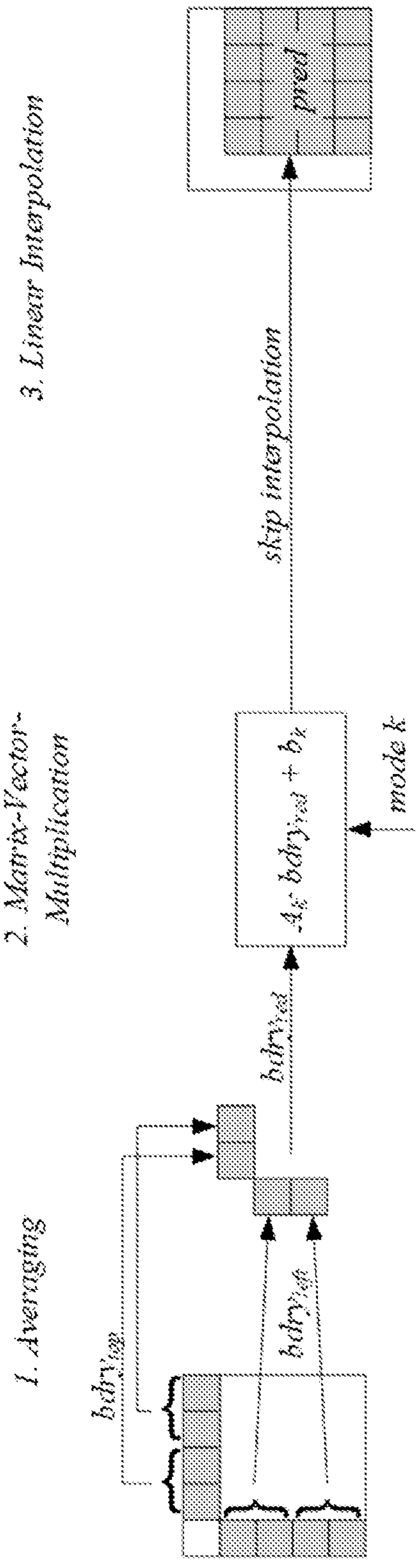
FIG. 3 shows an example of affine linear weighted intra prediction (ALWIP) for 4×4 blocks.
Figure 4:
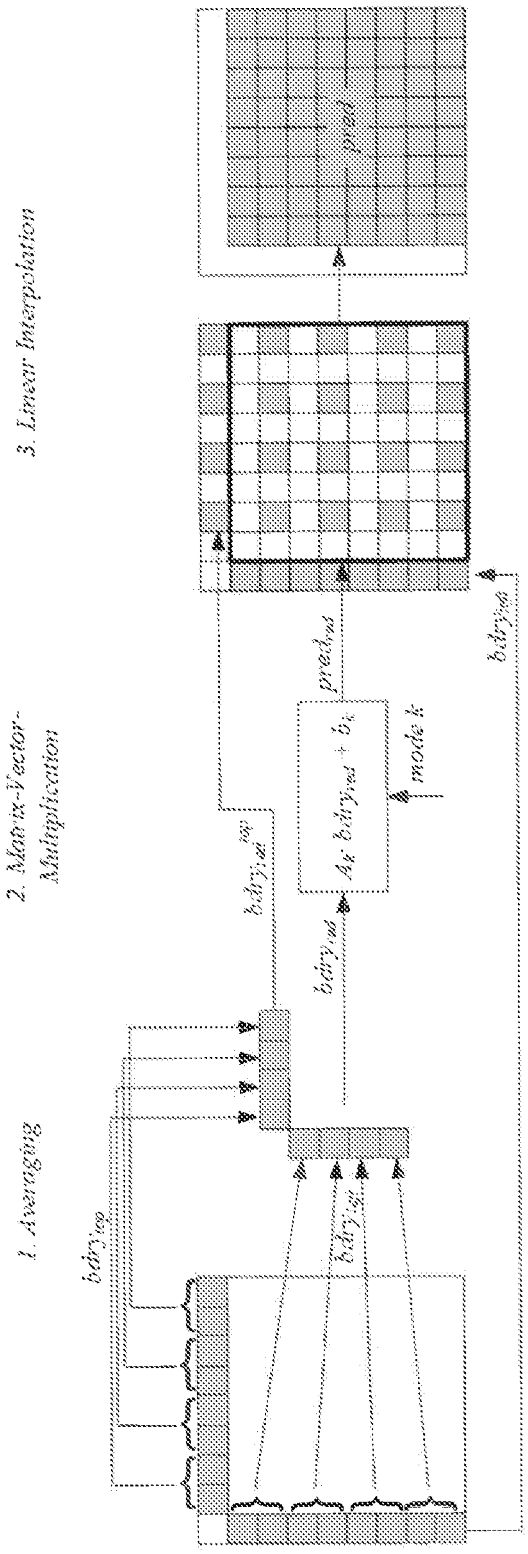
FIG. 4 shows an example of ALWIP for 8×8 blocks.
Figure 5:
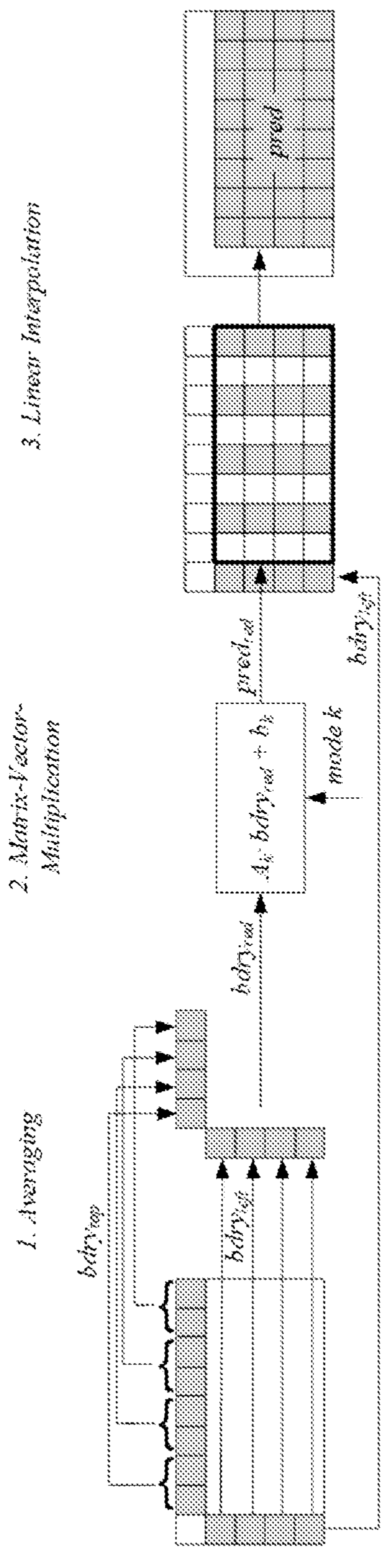
FIG. 5 shows an example of ALWIP for 8×4 blocks.
Figure 6:
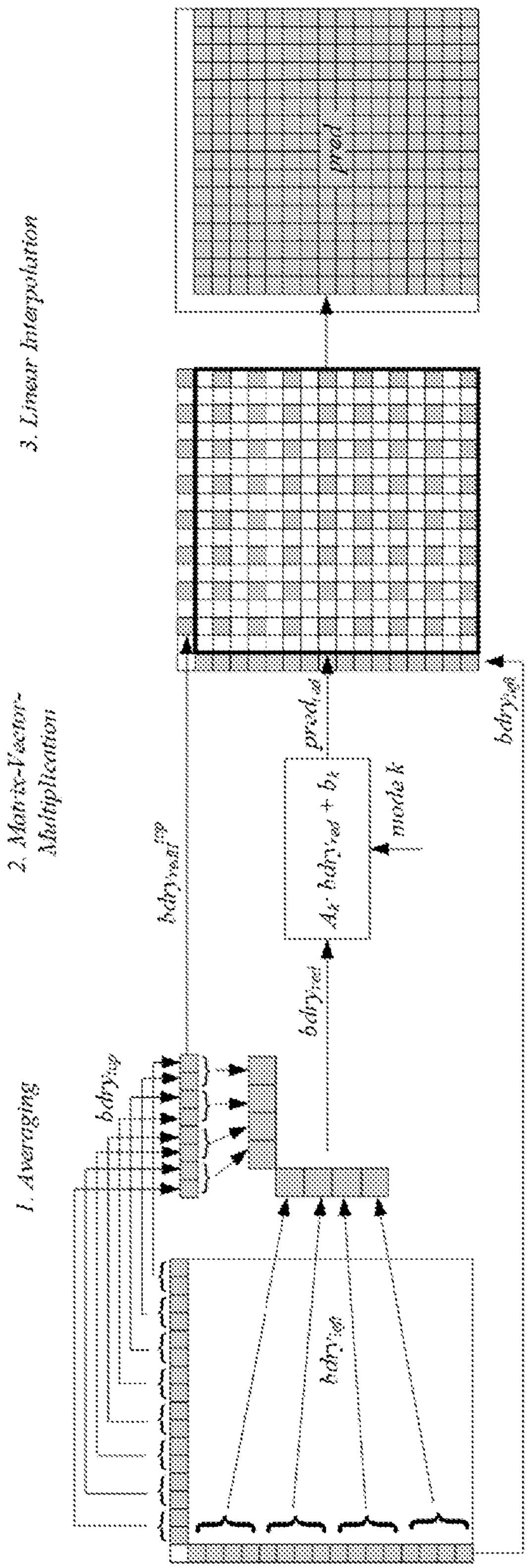
FIG. 6 shows an example of ALWIP for 16×16 blocks.

Conventional angular intra prediction directions are defined from 45 degrees to −135 degrees in clockwise direction as shown in FIG. 2. In VVC test model (VTM)2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VTM2, blocks can have a rectangular shape that necessitates the use of a division operation per block in the general case. To avoid division operations for DC prediction, only the longer side is used to compute the average for non-square blocks.

In addition to the 67 intra prediction modes, wide-angle intra prediction for non-square blocks (WAIP) and position dependent intra prediction combination (PDPC) methods are further enabled for certain blocks. PDPC is applied to the following intra modes without signalling: planar, DC, horizontal, vertical, bottom-left angular mode and its eight adjacent angular modes, and top-right angular mode and its eight adjacent angular modes.

2.2.2 Affine Linear Weighted Intra Prediction (ALWIP or Matrix-Based Intra Prediction)

Affine linear weighted intra prediction (ALWIP, a.k.a., Matrix based intra prediction (MIP)) is proposed in JVET-N0217.

2.2.2.1 Generation of the Reduced Prediction Signal by Matrix Vector Multiplication The neighboring reference samples are firstly down-sampled via averaging to generate the reduced reference signal $bdry_{red}$. Then, the reduced prediction signal $pred_{red}$ is computed by calculating a matrix vector product and adding an offset:

$$pred_{red}=A\cdot bdry_{red}+b$$

Here, A is a matrix that has $W_{red}\cdot H_{red}$ rows and 4 columns if W=H=4 and 8 columns in all other cases. b is a vector of size $W_{red}\cdot H_{red}$.

2.2.2.2 Illustration of the Entire ALWIP Process

The entire process of averaging, matrix vector multiplication and linear interpolation is illustrated for different shapes in FIGS. 3-6. Note, that the remaining shapes are treated as in one of the depicted cases.

1. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of (4·16)/(4·4)=4 multiplications per sample are performed.
2. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary.
3. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary.
4. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

For larger shapes, the procedure is essentially the same and it is easy to check that the number of multiplications per sample is less than four.

For W×8 blocks with W>8, only horizontal interpolation is necessary as the samples are given at the odd horizontal and each vertical positions.

Finally for W×4 blocks with W>8, let A_kbe the matrix that arises by leaving out every row that corresponds to an odd entry along the horizontal axis of the downsampled block. Thus, the output size is 32 and again, only horizontal interpolation remains to be performed.

The transposed cases are treated accordingly.

When constructing the most probable mode (MPM) list for an intra predicted block, if a neighboring block is coded in MIP mode, the MIP mode will be mapped to the intra prediction mode by using the following table. Here, assuming the width and height of the neighboring luma block are widthNeig and heightNeig respectively, MipSizeId is derived as follows:

If both widthNeig and heightNeig are equal to 4, MipSizeId is set equal to 0.

Otherwise, if both widthNeig and heightNeig are less than or equal to 8, MipSizeId is set equal to 1.

Otherwise, MipSizeId is set equal to 2.

TABLE 8-4

Specification of mapping between MIP and intra prediction modes

| IntraPredModeY[xNbX][yNbX] | MipSizeId | | |
|---|---|---|---|
| | 0 | 1 | 2 |
| 0 | 0 | 0 | 1 |
| 1 | 18 | 1 | 1 |
| 2 | 18 | 0 | 1 |
| 3 | 0 | 1 | 1 |
| 4 | 18 | 0 | 18 |
| 5 | 0 | 22 | 0 |
| 6 | 12 | 18 | 1 |
| 7 | 0 | 18 | 0 |
| 8 | 18 | 1 | 1 |

TABLE 8-4-continued

Specification of mapping between MIP and intra prediction modes

| IntraPredModeY[xNbX][yNbX] | MipSizeId | | |
|---|---|---|---|
| | 0 | 1 | 2 |
| 9 | 2 | 0 | 50 |
| 10 | 18 | 1 | 0 |
| 11 | 12 | 0 | |
| 12 | 18 | 1 | |
| 13 | 18 | 0 | |
| 14 | 1 | 44 | |
| 15 | 18 | 0 | |
| 16 | 18 | 50 | |
| 17 | 0 | 1 | |
| 18 | 0 | 0 | |
| 19 | 50 | | |
| 20 | 0 | | |
| 21 | 50 | | |
| 22 | 0 | | |
| 23 | 56 | | |
| 24 | 0 | | |
| 25 | 50 | | |
| 26 | 66 | | |
| 27 | 50 | | |
| 28 | 56 | | |
| 29 | 50 | | |
| 30 | 50 | | |
| 31 | 1 | | |
| 32 | 50 | | |
| 33 | 50 | | |
| 34 | 50 | | |

2.2.2.3 Syntax and Semantics 7.3.6.5 Coding Unit Syntax

| | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile group type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|       pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|       if( abs( Log2( cbWidth ) − Log2( cbHeight ) ) <= 2 ) | |
|         intra_lwip_flag[ x0 ][ y0 ] | ae(v) |
|       if( intra_lwip_flag[ x0 ][ y0 ] ) { | |
|           intra_lwip_mpm_flag[ x0 ][ y0 ] | ae(v) |
|         if( intra_lwip_mpm_flag[ x0 ][ y0 ] ) | |
|           intra_lwip_mpm_idx[ x0 ][ y0 ] | ae(v) |
|         else | |
|           intra_lwip_mpm_remainder[ x0 ][ y0 ] | ae(v) |
|       } else { | |
|         if( ( y0 % CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY \|\| cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |

-continued

```
                                                                  Descriptor
          cbWidth <= MaxTbSizeY && cbHeight <= MaxTbSizeY )
          intra_subpartitions_split_flag[ x0 ][ y0 ]                ae(v)
        if( intra_luma_ref_idx[ x0 ][ y0 ] = = 0 &&
          intra_subpartitions_mode_flag[ x0 ][ y0 ] = = 0 )
          intra_luma_mpm_flag[ x0 ][ y0 ]                           ae(v)
        if( intra_luma_mpm_flag[ x0 ][ y0 ] )
          intra_luma_mpm_idx[ x0 ] [ y0 ]                           ae(v)
        else
          intra_luma_mpm_remainder[ x0 ][ y0 ]                      ae(v)
      }
    }
    if( treeType = = SINGLE_TREE || treeType = = DUAL_TREE_CHROMA )
      intra_chroma_pred_mode[ x0 ][ y0 ]                            ae(v)
    }
  } else if( treeType != DUAL_TREE_CHROMA ) { /* MODE_INTER or MODE_
  IBC */
...
  }
}
```

2.2.3 Multiple Reference Line (MRL)

Figure 7:
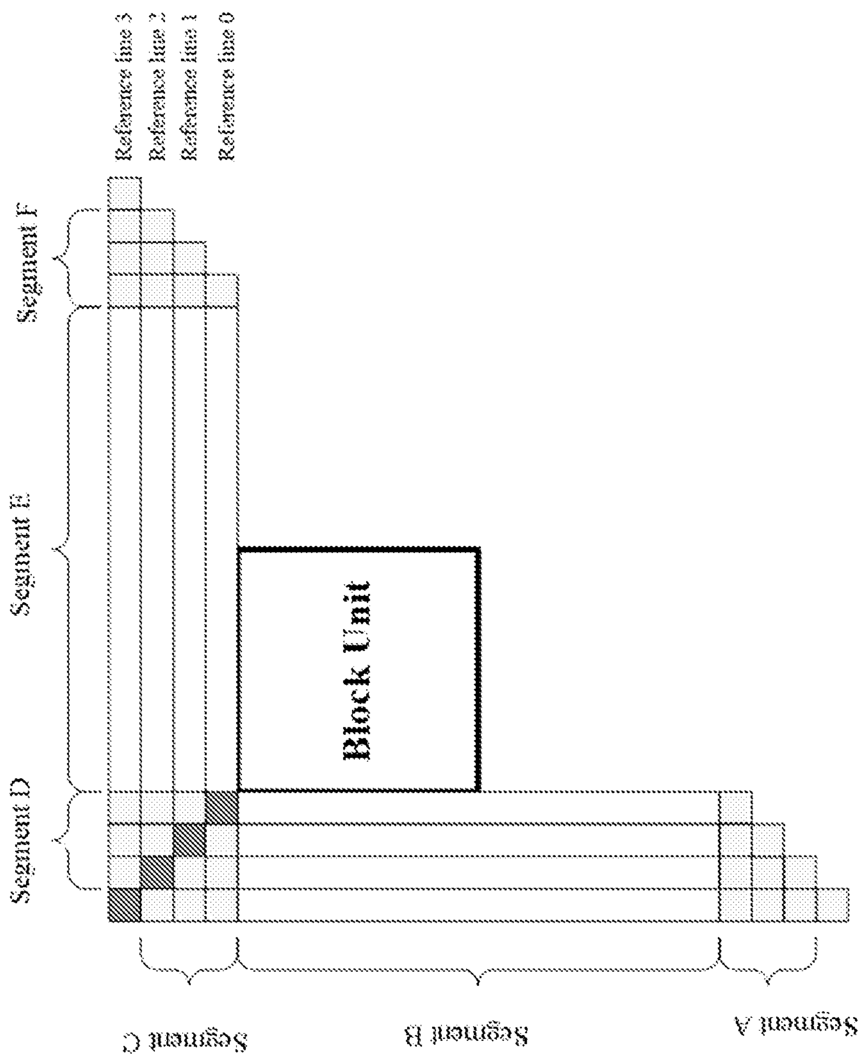
FIG. 7 shows an example of four reference lines neighboring a prediction block.

Multiple reference line (MRL) intra prediction uses more reference lines for intra prediction. In FIG. 7, an example of 4 reference lines is depicted, where the samples of segments A and F are not fetched from reconstructed neighbouring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line index, which is greater than 0, only include additional reference line modes in MPM list and only signal MPM index without remaining mode. The reference line index is signaled before intra prediction modes, and Planar and DC modes are excluded from intra prediction modes in case a nonzero reference line index is signaled.

MRL is disabled for the first line of blocks inside a coding tree unit (CTU) to prevent using extended reference samples outside the current CTU line. Also, PDPC is disabled when additional line is used.

2.2.4 Intra Sub-Block Partitioning (ISP)

Figure 8:
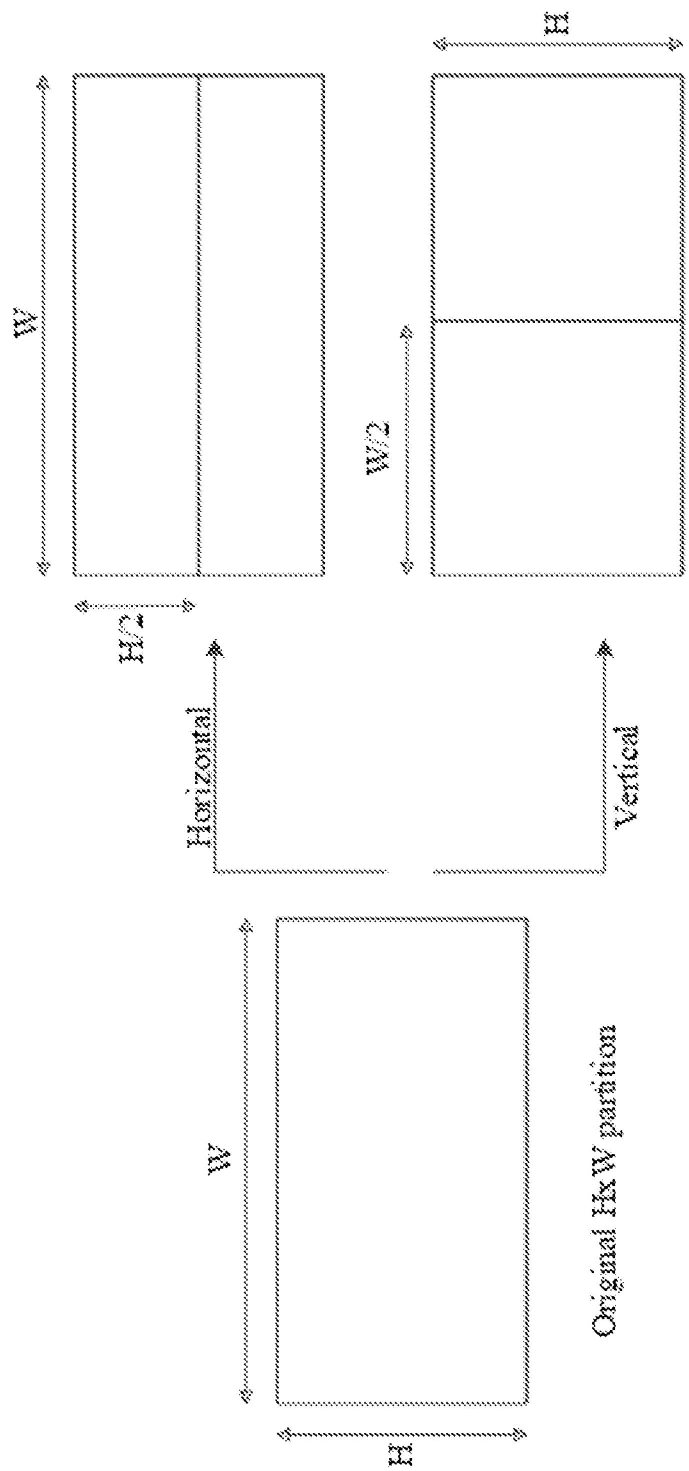
FIG. 8 shows an example of divisions of 4×8 and 8×4 blocks.
Figure 9:
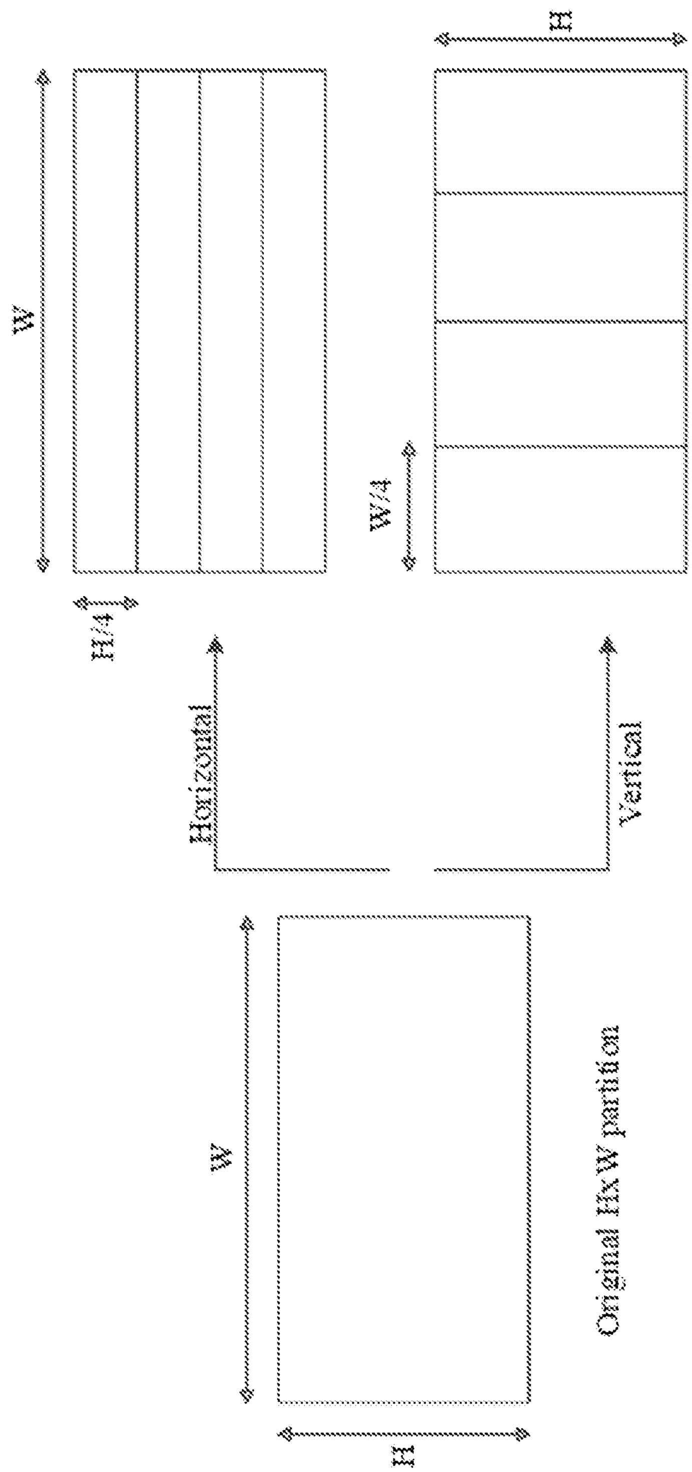
FIG. 9 shows an example of divisions all blocks except 4×8, 8×4 and 4×4.

In JVET-M0102, ISP is proposed, which divides luma intra-predicted blocks vertically or horizontally into 2 or 4 sub-partitions depending on the block size dimensions, as shown in Table 1. FIG. 8 and FIG. 9 show examples of the two possibilities. All sub-partitions fulfill the condition of having at least 16 samples. For block sizes, 4×N or N×4 (with N>8), if allowed, the 1×N or N×1 sub-partition may exist.

TABLE 1

Number of sub-partitions depending on the block size (denoted maximum transform size by maxTBSize)

| Splitting direction | Block Size | Number of Sub-Partitions |
|---|---|---|
| N/A | minimum transform size | Not divided |
| 4 × 8: horizontal 8 × 4: vertical | 4 × 8 and 8 × 4 | 2 |
| Signaled | If neither 4 × 8 nor 8 × 4, and W <= maxTBSize and H <= maxTBSize | 4 |

TABLE 1-continued

Number of sub-partitions depending on the block size (denoted maximum transform size by maxTBSize)

| Splitting direction | Block Size | Number of Sub-Partitions |
|---|---|---|
| Horizontal | If not above cases and H > maxTBSize | 4 |
| Vertical | If not above cases and H > maxTBSize | 4 |

For each of these sub-partitions, a residual signal is generated by entropy decoding the coefficients sent by the encoder and then invert quantizing and invert transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

TABLE 2

Specification of trTypeHor and trTypeVer depending on predModeIntra

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | (nTbW >= 4 && nTbW <= 16) ? DST-VII: DCT-II | (nTbH >= 4 && nTbH <= 16) ? DST-VII:DCT-II |
| INTRA_ANGULAR33, INTRA_ANGULAR35 | DCT-II | DCT-II |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | (nTbW >= 4 && nTbW <= 16) ? DST-VII: DCT-II | DCT-II |
| INTRA_ANGULAR3, INTRA_ANGULAR5, . . . , INTRA_ANGULAR27, INTRA_ANGULAR29, INTRA_ANGULAR38, INTRA_ANGULAR40, . . . , | DCT-II | (nTbH >= 4 && nTbH <= 16) ? DST-VII:DCT-II |

TABLE 2-continued

| Specification of trTypeHor and trTypeVer depending on predModeIntra | | |
|---|---|---|
| predModeIntra | trTypeHor | trTypeVer |
| INTRA_ANGULAR64, INTRA_ANGULAR66 | | |

2.2.4.1 Syntax and Semantics 7.3.7.5 Coding Unit Syntax

| | Descriptor |
|---|---|
| coding_unit( x0, y0, cbWidth, cbHeight, treeType ) { | |
| if( slice_type != I || sps_ibc_enabled_flag ) { | |
| if( treeType != DUAL_TREE_CHROMA ) | |
| cu_skip_flag[ x0 ][ y0 ] | ae(v) |
| if( cu_skip_flag[ x0 ][ y0 ] = = 0 && slice type != I ) | |
| pred_mode_flag | ae(v) |
| if( ( ( slice_type = = I && cu_skip_flag[ x0 ][ y0 ] = =0 ) || | |
| ( slice_type != I && CuPredMode[ x0 ][ y0 ] != MODE_INTRA ) ) && | |
| sps_ibc_enabled_flag ) | |
| pred_mode_ibc_flag | ae(v) |
| } | |
| if( CuPredMode[ x0 ][ y0 ] = = MODE_INTRA ) { | |
| if( sps_pcm_enabled_flag && | |
| cbWidth >= MinIpcmCbSizeY && cbWidth <= MaxIpcmCbSizeY && | |
| cbHeight >= MinIpcmCbSizeY && cbHeight <= MaxIpcmCbSizeY ) | |
| pcm_flag[ x0 ][ y0 ] | ae(v) |
| if( pcm_flag[ x0 ][ y0 ] ) { | |
| while( !byte_aligned( ) ) | |
| pcm_alignment_zero_bit | f(1) |
| pcm_sample( cbWidth, cbHeight, treeType) | |
| } else { | |
| if( treeType = = SINGLE_TREE || treeType = = DUAL_TREE_LUMA ) { | |
| if( ( y0 % CtbSizeY ) > 0 ) | |
| intra_luma_ref_idx[ x0 ][ y0 ] | ae(v) |
| if (intra_luma_ref_idx[ x0 ][ y0 ] = = 0 && | |
| ( cbWidth <= MaxTbSizeY || cbHeight <= MaxTbSizeY ) && | |
| ( cbWidth * cbHeight > MinTbSizeY * MinTbSizeY )) | |
| intra_subpartitions_mode_flag[ x0 ][ y0 ] | ae(v) |
| if( intra_subpartitions_mode_flag[ x0 ][ y0 ] = = 1 && | |
| cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && | |
| intra_subpartitions_mode_flag[ x0 ][ y0 ] = = 0 ) | |
| intra_luma_mpm_flag[ x0 ][ y0 ] | ae(v) |
| if( intra_luma_mpm_flag[ x0 ][ y0 ] ) | |
| intra_luma_mpm_idx[ x0 ][ y0 ] | ae(v) |
| else | |
| intra_luma_mpm_remainder[ x0 ][ y0 ] | ae(v) |
| } | |
| if( treeType = = SINGLE_TREE || treeType = = DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER or MODE_IBC */ | |
| ... | |
| } | |
| ... | |
| } | |

intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_split_flag[x0][y0] specifies whether the intra subpartitions split type is horizontal or vertical. When intra_subpartitions_split_flag[x0][y0] is not present, it is inferred as follows:

If cbHeight is greater than MaxTbSizeY, intra_subpartitions_split_flag[x0][y0] is inferred to be equal to 0.

Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 7-9. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 7-9

Name association to IntraSubPartitionsSplitType

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:

If IntraSubPartitionsSplitType is equal to ISP_NO_SPLIT, NumIntraSubPartitions is set equal to 1.

Otherwise, if one of the following conditions is true, NumIntraSubPartitions is set equal to 2:

cbWidth is equal to 4 and cbHeight is equal to 8, cbWidth is equal to 8 and cbHeight is equal to 4.

Otherwise, NumIntraSubPartitions is set equal to 4.

2.3 Chroma Intra Mode Coding

For chroma intra mode coding, a total of 8 or 5 intra modes are allowed for chroma intra mode coding depending on whether cross-component linear model (CCLM) is enabled or not. Those modes include five traditional intra modes and three cross-component linear model modes. Chroma DM mode use the corresponding luma intra prediction mode. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 8-2

Specification of IntraPredModeC[xCb][yCb] depending on intra_chroma_pred_mode[xCb][yCb] and IntraPredModeY[xCb + cbWidth/2][yCb + cbHeight/2] when sps_cclm_enabled_flag is equal to 0

| intra_chroma_ | IntraPredModeY[xCb + cbWidth/2][yCb + cbHeight/2] | | | | |
|---|---|---|---|---|---|
| pred_mode[xCb][yCb] | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 (DM) | 0 | 50 | 18 | 1 | X |

TABLE 8-3

Specification of IntraPredModeC[xCb][yCb] depending on intra_chroma_pred_mode[xCb][yCb] and IntraPredModeY[xCb + cbWidth/2][yCb + cbHeight/2] when sps_cclm_enabled_flag is equal to 1

| intra_chroma_ | IntraPredModeY[xCb + cbWidth/2][yCb + cbHeight/2] | | | | |
|---|---|---|---|---|---|
| pred_mode[xCb][yCb] | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 (DM) | 0 | 50 | 18 | 1 | X |

2.4 Transform Coding in VVC 2.4.1 Multiple Transform Set (MTS) in VVC 2.4.1.1 Explicit Multiple Transform Set (MTS)

In VTM4, large block-size transforms, up to 64×64 in size, are enabled, which is primarily useful for higher resolution video, e.g., 1080p and 4K sequences. High frequency transform coefficients are zeroed out for the transform blocks with size (width or height, or both width and height) equal to 64, so that only the lower-frequency coefficients are retained. For example, for an M×N transform block, with M as the block width and N as the block height, when M is equal to 64, only the left 32 columns of transform coefficients are kept. Similarly, when N is equal to 64, only the top 32 rows of transform coefficients are kept. When transform skip mode is used for a large block, the entire block is used without zeroing out any values.

In addition to Discrete Cosine Transform (DCT)-II which has been employed in HEVC, a Multiple Transform Selection (MTS) scheme is used for residual coding both inter and intra coded blocks. It uses multiple selected transforms from the DCT8/Discrete Sine Transform (DST)7. The newly introduced transform matrices are DST-VII and DCT-VIII. The Table 4 below shows the basis functions of the selected DST/DCT.

TABLE 4

Basis functions of transform matrices used in VVC

| Transform Type | Basis function $T_i(j)$, i, j = 0, 1, . . . , N−1 |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ <br> where $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are to have 10-bit.

In order to control MTS scheme, separate enabling flags are specified at sequence parameter set (SPS) level for intra and inter, respectively. When MTS is enabled at SPS, a coding unit (CU) level flag is signalled to indicate whether MTS is applied or not. Here, MTS is applied only for luma. The MTS CU level flag is signalled when the following conditions are satisfied.

Both width and height smaller than or equal to 32

Coded block flag (CBF) is equal to one

If MTS CU flag is equal to zero, then DCT2 is applied in both directions. However, if MTS CU flag is equal to one, then two other flags are additionally signalled to indicate the transform type for the horizontal and vertical directions, respectively. Transform and signalling mapping table as shown in Table 5. When it comes to transform matrix precision, 8-bit primary transform cores are used. Therefore, all the transform cores used in HEVC are kept as the same, including 4-point DCT-2 and DST-7, 8-point, 16-point and 32-point DCT-2. Also, other transform cores including 64-point DCT-2, 4-point DCT-8, 8-point, 16-point, 32-point DST-7 and DCT-8, use 8-bit primary transform cores.

TABLE 5

Mapping of decoded value of tu_mts_idx and corresponding transform matrices for the horizontal and vertical directions.

| Bin string of tu_mts_idx | tu_mts_idx | Intra/inter Horizontal | Vertical |
|---|---|---|---|
| 0 | 0 | DCT2 | |
| 1 0 | 1 | DST7 | DST7 |
| 1 1 0 | 2 | DCT8 | DST7 |
| 1 1 1 0 | 3 | DST7 | DCT8 |
| 1 1 1 1 | 4 | DCT8 | DCT8 |

To reduce the complexity of large size DST-7 and DCT-8, High frequency transform coefficients are zeroed out for the DST-7 and DCT-8 blocks with size (width or height, or both width and height) equal to 32. Only the coefficients within the 16×16 lower-frequency region are retained.

In addition to the cases wherein different transforms are applied, VVC also supports a mode called transform skip (TS) which is like the concept of TS in the HEVC. TS is treated as a special case of MTS.

2.4.2 Reduced Secondary Transform (RST) Proposed in JVET-N0193

2.4.2.1 Non-Separable Secondary Transform (NSST) in JEM

Figure 10:
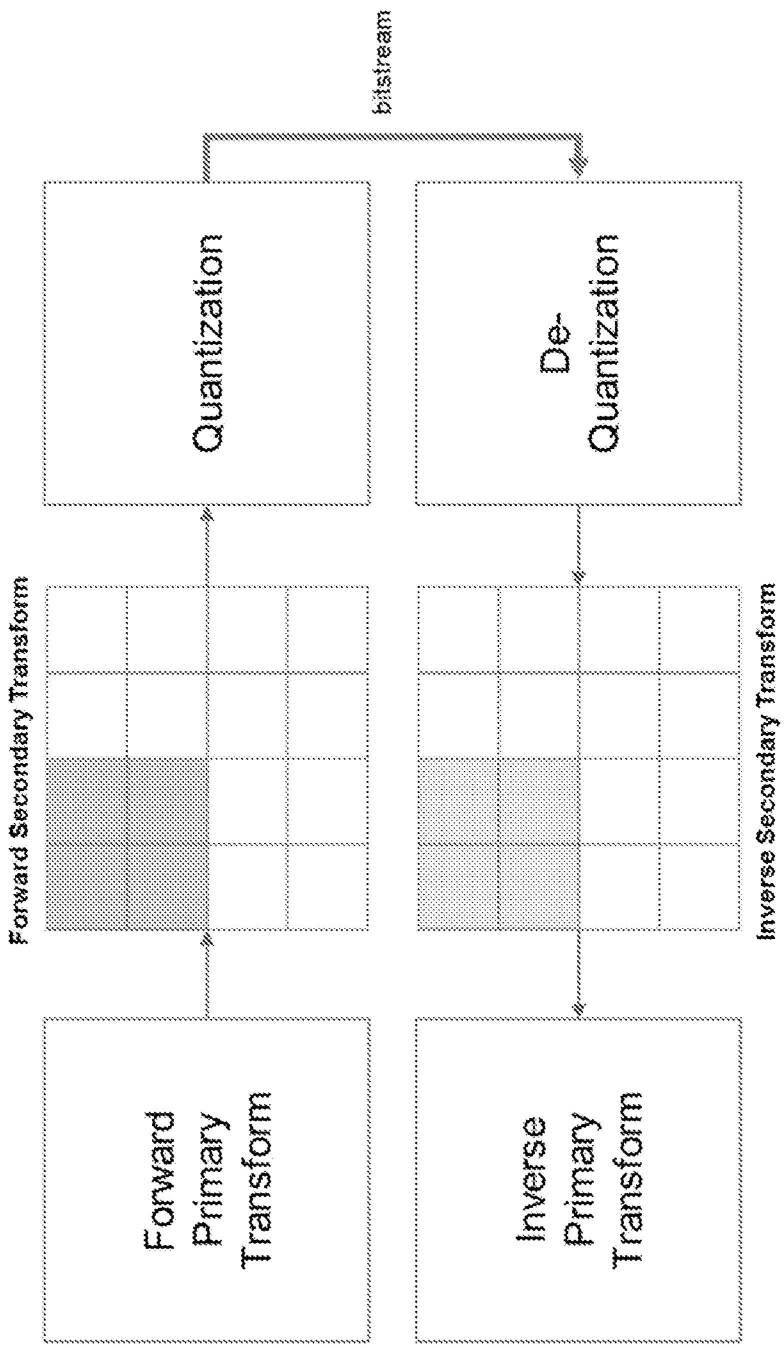
FIG. 10 shows an example of a secondary transform in Joint Exploration Model (JEM).

In Joint Exploration Model (JEM), secondary transform is applied between forward primary transform and quantization (at encoder) and between de-quantization and invert primary transform (at decoder side). As shown in FIG. 10, 4×4 (or 8×8) secondary transform is performed depends on block size. For example, 4×4 secondary transform is applied for small blocks (i.e., min (width, height)<8) and 8×8 secondary transform is applied for larger blocks (i.e., min (width, height)>4) per 8×8 block.

Application of a non-separable transform is described as follows using input as an example. To apply the non-separable transform, the 4×4 input block X $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}X_{01}X_{02}X_{03}X_{10}X_{11}X_{12}X_{13}X_{20}X_{21}X_{22}X_{23}X_{30}X_{31}X_{32}X_{33}]^T$$

The non-separable transform is calculated as $\vec{F}=T\cdot\vec{X}$, where $\vec{F}$ indicates the transform coefficient vector, and T is a 16×16 transform matrix. The 16×1 coefficient vector F is subsequently re-organized as 4×4 block using the scanning order for that block (horizontal, vertical or diagonal). The coefficients with smaller index will be placed with the smaller scanning index in the 4×4 coefficient block. There are totally 35 transform sets and 3 non-separable transform matrices (kernels) per transform set are used. The mapping from the intra prediction mode to the transform set is pre-defined. For each transform set, the selected non-separable secondary transform (NSST) candidate is further specified by the explicitly signalled secondary transform index. The index is signalled in a bit-stream once per Intra CU after transform coefficients.

2.4.2.2 Reduced Secondary Transform (RST) in JVET-N0193

Figure 11:
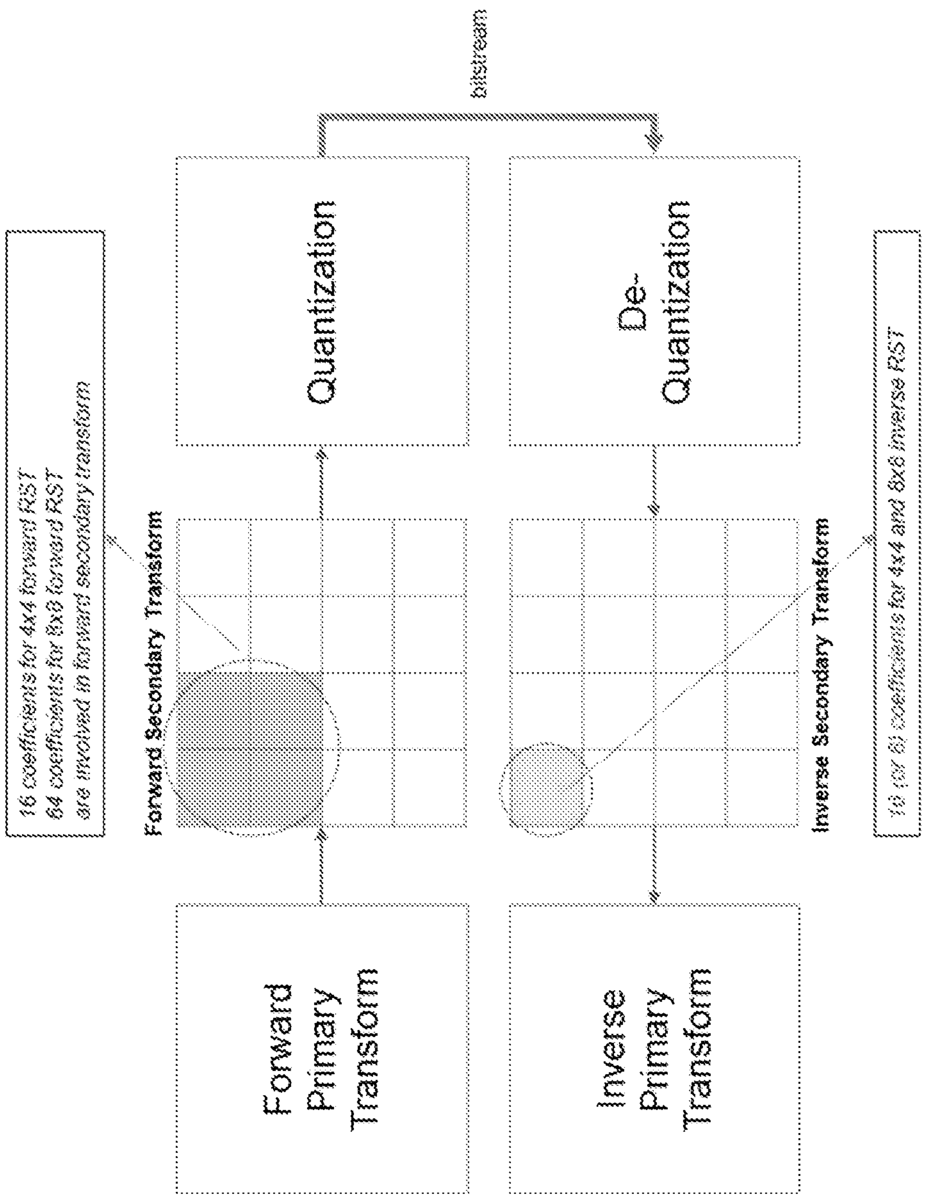
FIG. 11 shows an example of the proposed reduced secondary transform (RST).

The RST (a.k.a., Low Frequency Non-Separable Transform (LFNST)) was introduced in JVET-K0099 and 4 transform set (instead of 35 transform sets) mapping introduced in JVET-L0133. In this JVET-N0193, 16×64 (further reduced to 16×48) and 16×16 matrices are employed. For notational convenience, the 16×64 (reduced to 16×48) transform is denoted as RST8×8 and the 16×16 one as RST4×4. FIG. 11 shows an example of RST.

2.4.2.2.1 RST Computation

The main idea of a Reduced Transform (RT) is to map an N dimensional vector to an R dimensional vector in a different space, where R/N (R<N) is the reduction factor.

Figure 12:
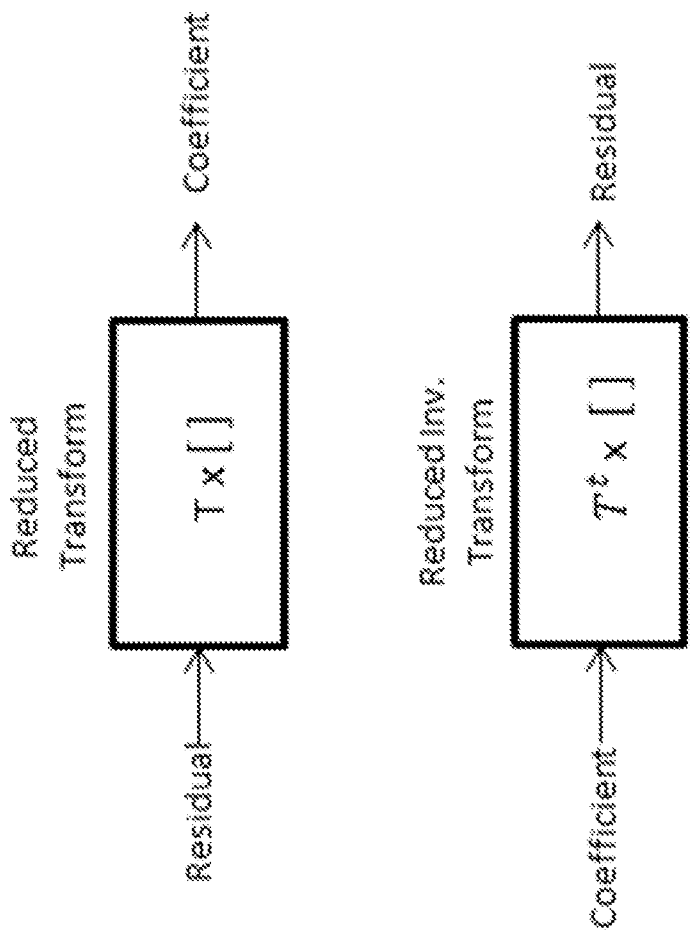
FIG. 12 shows examples of the forward and inverse reduced transforms.

The RT matrix is an R×N matrix as follows:

$$T_{R\times N} = \begin{bmatrix} t_{11} & t_{12} & t_{13} & \dots & t_{1N} \\ t_{21} & t_{22} & t_{23} & & t_{2N} \\ & \vdots & & \ddots & \vdots \\ t_{R1} & t_{R2} & t_{R3} & \dots & t_{RN} \end{bmatrix}$$

where the R rows of the transform are R bases of the N dimensional space. The invert transform matrix for RT is the transpose of its forward transform. The forward and invert RT are depicted in FIG. 12.

In this contribution, the RST8×8 with a reduction factor of 4 (¼ size) is applied. Hence, instead of 64×64, which is conventional 8×8 non-separable transform matrix size, 16×64 direct matrix is used. In other words, the 64×16 invert RST matrix is used at the decoder side to generate core (primary) transform coefficients in 8×8 top-left regions. The forward RST8×8 uses 16×64 (or 8×64 for 8×8 block) matrices so that it produces non-zero coefficients only in the top-left 4×4 region within the given 8×8 region. In other words, if RST is applied then the 8×8 region except the top-left 4×4 region will have only zero coefficients. For RST4×4, 16×16 (or 8×16 for 4×4 block) direct matrix multiplication is applied.

An invert RST is conditionally applied when the following two conditions are satisfied:

Block size is greater than or equal to the given threshold (W>=4 && H>=4)

Transform skip mode flag is equal to zero

If both width (W) and height (H) of a transform coefficient block is greater than 4, then the RST8×8 is applied to the top-left 8×8 region of the transform coefficient block. Otherwise, the RST4×4 is applied on the top-left min(8, W)×min(8, H) region of the transform coefficient block.

If RST index is equal to 0, RST is not applied. Otherwise, RST is applied, of which kernel is chosen with the RST index. The RST selection method and coding of the RST index are explained later.

Furthermore, RST is applied for intra CU in both intra and inter slices, and for both Luma and Chroma. If a dual tree is enabled, RST indices for Luma and Chroma are signaled separately. For inter slice (the dual tree is disabled), a single RST index is signaled and used for both Luma and Chroma.

2.4.2.2.2 Restriction of RST

When ISP mode is selected, RST is disabled, and RST index is not signaled, because performance improvement was marginal even if RST is applied to every feasible partition block. Furthermore, disabling RST for ISP-predicted residual could reduce encoding complexity.

2.4.2.2.3 RST Selection

A RST matrix is chosen from four transform sets, each of which consists of two transforms. Which transform set is applied is determined from intra prediction mode as the following:

(1) If one of three CCLM modes is indicated, transform set 0 is selected.

(2) Otherwise, transform set selection is performed according to the following table:

The transform set selection table

| IntraPredMode | Tr. set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <=55 | 2 |
| 56 <= IntraPredMode | 1 |

The index to access the above table, denoted as IntraPredMode, have a range of [−14, 83], which is a transformed mode index used for wide angle intra prediction.

Later, the Low Frequency Non-Separable Transform (LFNST, a.k.a., RST) set selection for chroma blocks coded in CCLM modes is modified to be based on a variable IntraPredMode_CCLM, wherein the IntraPredMode_CCLM has a range of [−14, 80]. The IntraPredMode_CCLM is determined by the co-located luma intra prediction mode and the dimension of the current chroma block.

Figure 13:
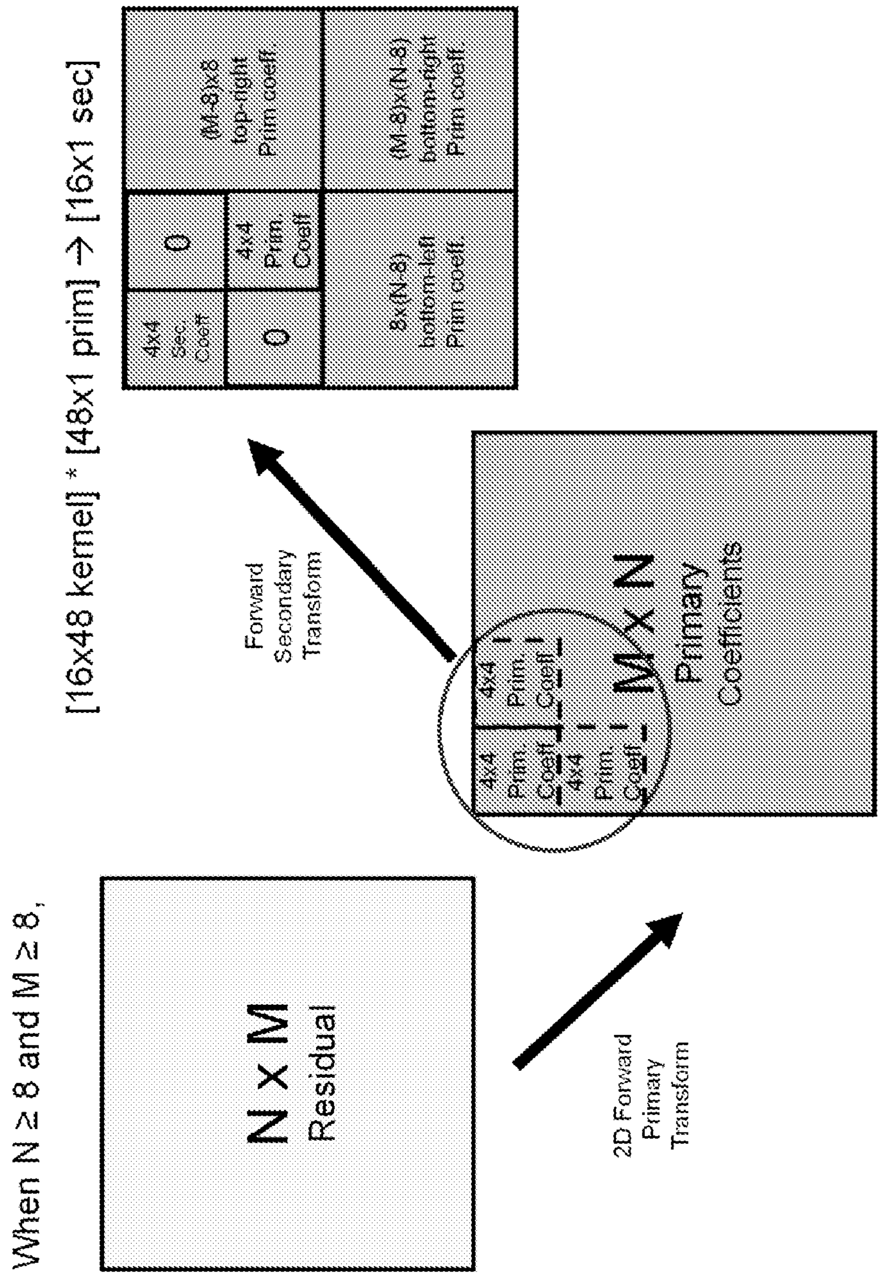
FIG. 13 shows an example of a forward RST 8×8 process with a 16×48 matrix.
Figure 24B:
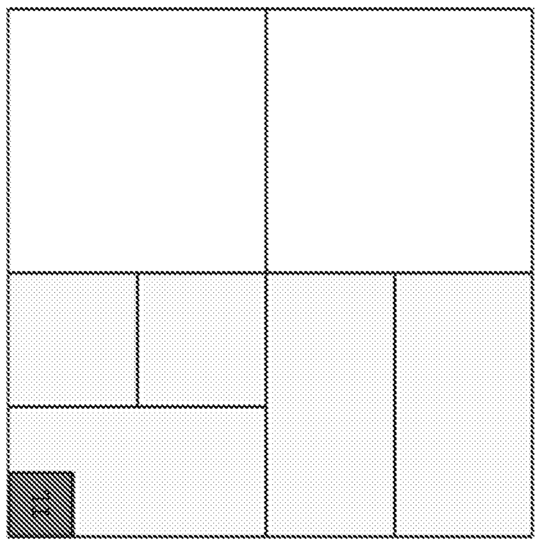
FIG. 24A shows an example of one chroma blocks and FIG. 24B shows its corresponding luma block under dual tree partition.
Figure 24A:
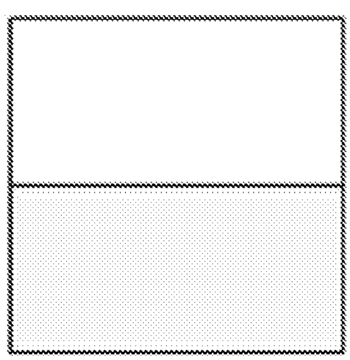

When dual tree is enabled, the block (e.g., picture unit (PU)) covering the corresponding luma sample of the top-left chroma sample in the current chroma block is defined as the co-located luma block. An example was shown in FIGS. 24A and 24B with the co-located position denoted by TL 2.4.2.2.4 RST Matrices of Reduced Dimension As a further simplification, 16×48 matrices are applied instead of 16×64 with the same transform set configuration, each of which takes 48 input data from three 4×4 blocks in a top-left 8×8 block excluding right-bottom 4×4 block (as shown in FIG. 13).

2.4.2.2.5 RST Signaling

The forward RST8×8 uses 16×48 matrices so that it produces non-zero coefficients only in the top-left 4×4 region within the first 3 4×4 region. In other words, if RST8×8 is applied, only the top-left 4×4 (due to RST8×8) and bottom right 4×4 region (due to primary transform) may have non-zero coefficients. As a result, RST index is not coded when any non-zero element is detected within the top-right 4×4 and bottom-left 4×4 block region (shown in FIG. 14, and referred to as "zero-out" regions) because it implies that RST was not applied. In such a case, RST index is inferred to be zero.

2.4.2.2.6 Zero-Out Region within One CG

Usually, before applying the invert RST on a 4×4 sub-block, any coefficient in the 4×4 sub-block may be non-zero. However, it is constrained that in some cases, some coefficients in the 4×4 sub-block must be zero before invert RST is applied on the sub-block.

Let nonZeroSize be a variable. It is required that any coefficient with the index no smaller than nonZeroSize when it is rearranged into a one dimensional (1-D) array before the invert RST must be zero.

When nonZeroSize is equal to 16, there is no zero-out constrain on the coefficients in the top-left 4×4 sub-block.

Figure 14:
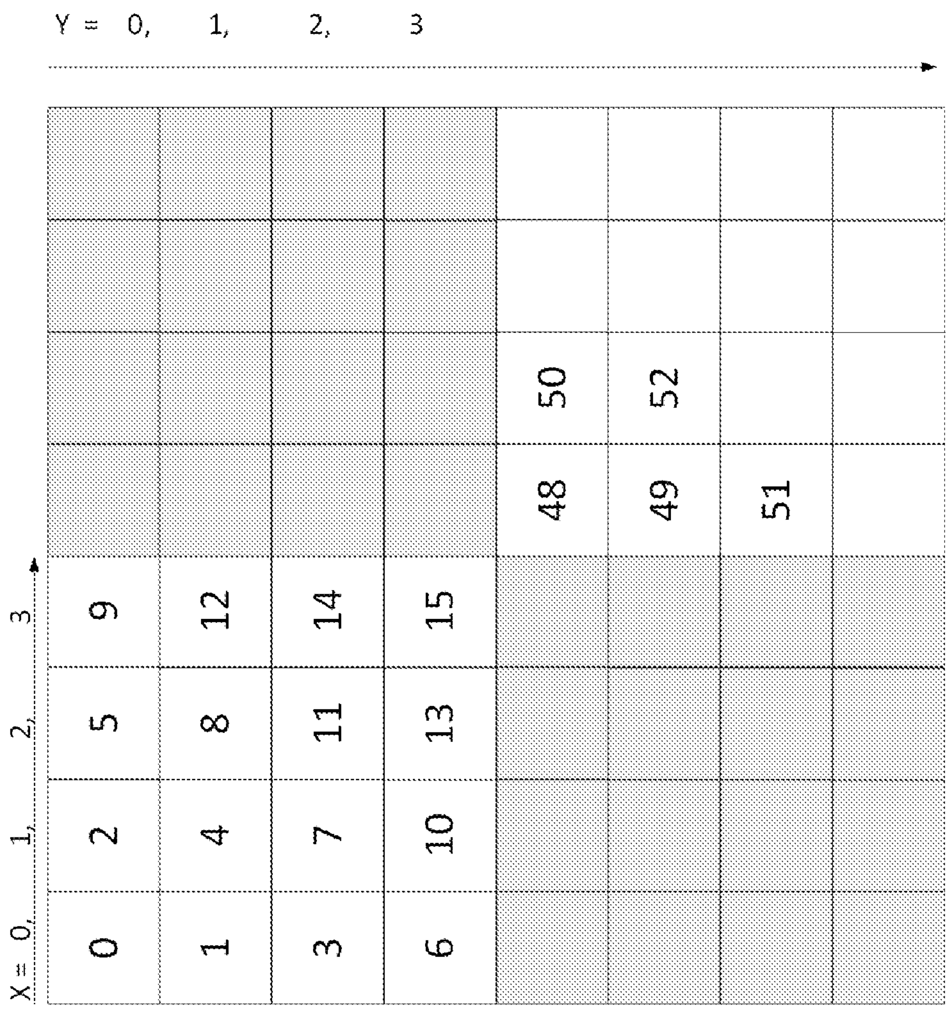
FIG. 14 shows an example of a zero-out region for an 8×8 matrix.
Figure 15:
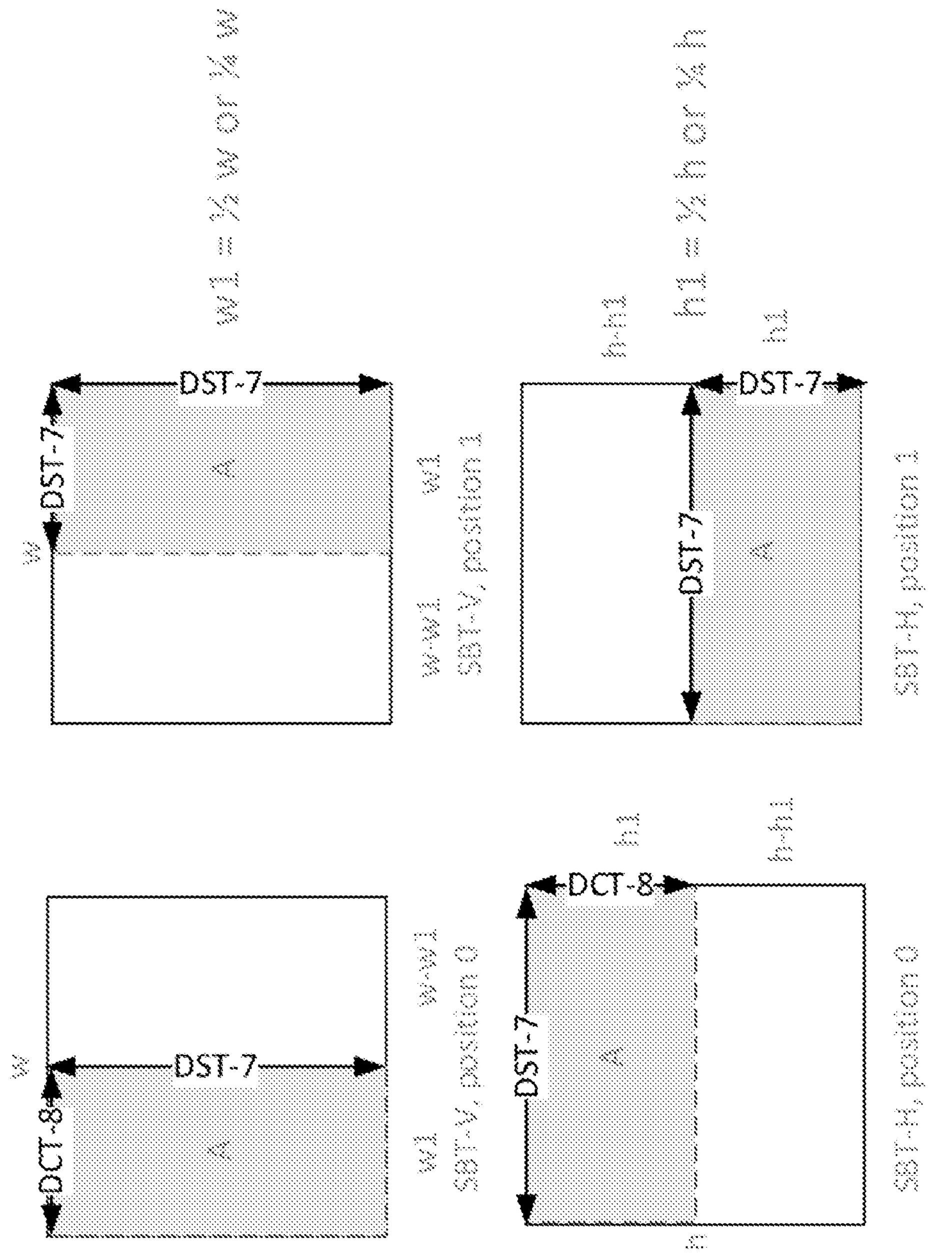
FIG. 15 shows an example of sub-block transform (SBT) vertical and horizontal modes SBT-V and SBT-H.

In JVET-N0193, when the current block size is 4×4 or 8×8, nonZeroSize is set equal to 8 (that is, coefficients with the scanning index in the range [8, 15] as show in FIG. 14, shall be 0). For other block dimensions, nonZeroSize is set equal to 16.

2.4.2.2.7 Description of RST in Working Draft 7.3.2.3 Sequence Parameter Set RBSP Syntax

| | Descriptor |
|---|---|
| seq_parameter_set_rbsp( ) { | |
| ...... | |
| sps_mts_enabled_flag | u(1) |
| if( sps_mts_enabled_flag ) { | |
| sps_explicit_mts_intra_enabled_flag | u(1) |
| sps_explicit_mts_inter_enabled_flag | u(1) |
| } | |
| ... | |
| sps_st_enabled_flag | u(1) |
| ... | |
| } | |

7.3.7.11 Residual Coding Syntax

| | Descriptor |
|---|---|
| residual_coding( x0, y0, log2TbWidth, log2TbHeight, cIdx ) { | |
| ... | |
| if( coded_sub_block_flag[ xS ][ yS ] && (n > 0 \|\| !inferSbDcSigCoeffFlag ) && ( xC != LastSignificantCoeffX \|\| yC != Last SignificantCoeffY ) ) { | |
| sig_coeff_flag[ xC ][ yC ] | ae(v) |
| remBinsPass1− − | |
| if( sig_coeff_flag[ xC ][ yC ] ) | |
| inferSbDcSigCoeffFlag = 0 | |
| } | |
| if( sig_coeff_flag[ xC ][ yC ] ) { | |
| if( !transform_skip_flag[ x0 ][ y0 ] ) { | |
| numSigCoeff++ | |
| if( ( ( ( log2TbWidth == 2 && log2TbHeight == 2 ) \|\| ( log2TbWidth == 3 && log2TbHeight == 3 ) ) && n >= 8 && i == 0 ) \|\| ( ( log2TbWidth >= 3 && log2TbHeight >= 3 &&( i = 1 \|\| i == 2 ) ) ) ) { | |
| numZeroOutSigCoeff++ | |
| } | |
| } | |

-continued

| | Descriptor |
|---|---|
| abs_level_gt1_flag[ n ] | ae(v) |
| ... | |

7.3.7.5 Coding Unit Syntax

```
                                                                          Descriptor
coding_unit( x0, y0, cbWidth, cbHeight, treeType ) {
...
  if( !pcm_flag[ x0 ][ y0 ] ) {
    if( CuPredMode[ x0 ][ y0 ] != MODE_INTRA && merge_flag [ x0 ][ y0 ] = = 0 )
      cu_cbf                                                              ae(v)
    if( cu_cbf ) {
      if( CuPredMode[ x0 ][ y0 ] = = MODE_INTER && sps_sbt_enabled_flag &&
        !ciip_flag[ x0 ][ y0 ] ) {
        if( cbWidth <= MaxSbtSize && cbHeight <= MaxSbtSize ) {
          allowSbtVerH = cbWidth >= 8
          allowSbtVerQ = cbWidth >= 16
          allowSbtHorH = cbHeight >= 8
          allowSbtHorQ = cbHeight >= 16
          if( allowSbtVerH || allowSbtHorH || allowSbtVerQ || allowSbtHorQ )
          cu_sbt_flag                                                     ae(v)
        }
        if( cu_sbt_flag ) {
          if( ( allowSbtVerH || allowSbtHorH ) && ( allowSbtVerQ || allowSbtHorQ) )
            cu_sbt_quad_flag                                              ae(v)
          if( ( cu_sbt_quad_flag && allowSbtVerQ && allowSbtHorQ ) ||
            ( !cu_sbt_quad_flag && allowSbtVerH && allowSbtHorH ) )
            cu_sbt_horizontal_flag                                        ae(v)
          cu_sbt_pos_flag                                                 ae(v)
        }
      }
      numZeroOutSigCoeff = 0
      transform_tree( x0, y0, cbWidth, cbHeight, treeType )
      if( Min( cbWidth, cbHeight ) >= 4 && sps_st_enabled_flag == 1 &&
CuPredMode[ x0 ][ y0 ] = = MODE_INTRA
&& IntraSubPartitionsSplitType == ISP_NO_SPLIT ) {
        if( ( numSigCoeff > ( ( treeType == SINGLE_TREE ) ? 2 : 1 ) ) &&
numZeroOutSigCoeff == 0 ) {
          st_idx[ x0 ][ y0 ]                                              ae(v)
        }
      }
    }
  }
}
```

sps_st_enabled_flag equal to 1 specifies that st_idx may be present in the residual coding syntax for intra coding units. sps_st_enabled_flag equal to 0 specifies that st_idx is not present in the residual coding syntax for intra coding units. st_idx[x0][y0] specifies which secondary transform kernel is applied between two candidate kernels in a selected transform set. st_idx[x0][y0] equal to 0 specifies that the secondary transform is not applied. The array indices x0, y0 specify the location (x0, y0) of the top-left sample of the considered transform block relative to the top-left sample of the picture.

When st_idx[x0][y0] is not present, st_idx[x0][y0] is inferred to be equal to 0.

It is noted that whether to send the st_idx is dependent on number of non-zero coefficients in all TUs within a CU (e.g., for single tree, number of non-zero coefficients in 3 blocks (i.e., Y, Cb, Cr); for dual tree and luma is coded, number of non-zero coefficients in the luma block; for dual tree and chroma is coded, number of non-zero coefficients in the two chroma blocks). In addition, the threshold is dependent on the partitioning structure, (treeType==SINGLE_TREE)?2:1).

Bins of st_idx are context-coded. More specifically, the following applies:

TABLE 9-9

Syntax elements and associated binarizations

| Syntax structure | Syntax element | Binarization Process | Binarization Input parameters |
|---|---|---|---|
| | . . . | . . . | . . . |
| | st_idx[ ][ ] | TR | cMax = 2, cRiceParam = 0 |

TABLE 9-15

Assignment of ctxInc to syntax elements with context coded bins

| Syntax element | binIdx 0 | 1 | 2 | 3 | 4 | >=5 |
|---|---|---|---|---|---|---|
| . . . | . . . | . . . | . . . | . . . | . . . | . . . |
| st_idx[ ][ ] | 0, 1, 4, 5 (clause 9.5.4.2.8) | 2, 3, 6, 7 (clause 9.5.4.2.8) | na | na | na | na |
| . . . | . . . | . . . | . . . | . . . | . . . | . . . |

9.5.4.2.8 Derivation Process of ctxInc for the Syntax Element St_Idx

Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode[x0][y0] specifying the intra prediction mode for chroma samples as specified in clause 7.4.7.5, and the multiple transform selection index tu_mts_idx[x0][y0].

Output of this process is the variable ctxInc.

The variable intraModeCtx is derived as follows:

If cIdx is equal to 0, intraModeCtx is derived as follows:

intraModeCtx=(IntraPredModeY[x0][y0]<=1)?1:0

Otherwise (cIdx is greater than 0), intraModeCtx is derived as follows:

intraModeCtx=(intra_chroma_pred_mode[x0][y0]>=4)?1:0

The variable mtsCtx is derived as follows:

mtsCtx=(tu_mts_idx[x0][y0]=0&& treeType!=SINGLE_TREE)?1:0

The variable ctxInc is derived as follows:

ctxInc=(binIdx<<1)+intraModeCtx+(mtsCtx<<2)

2.4.2.2.8 Summary of RST Usage

RST may be enabled only when the number of non-zero coefficients in one block is greater than 2 and 1 for single and separate tree, respectively. In addition, the following restrictions of locations of non-zero coefficients for RST applied Coding Groups (CGs) is also required when RST is enabled.

TABLE 1

Usage of RST

Figure 16:
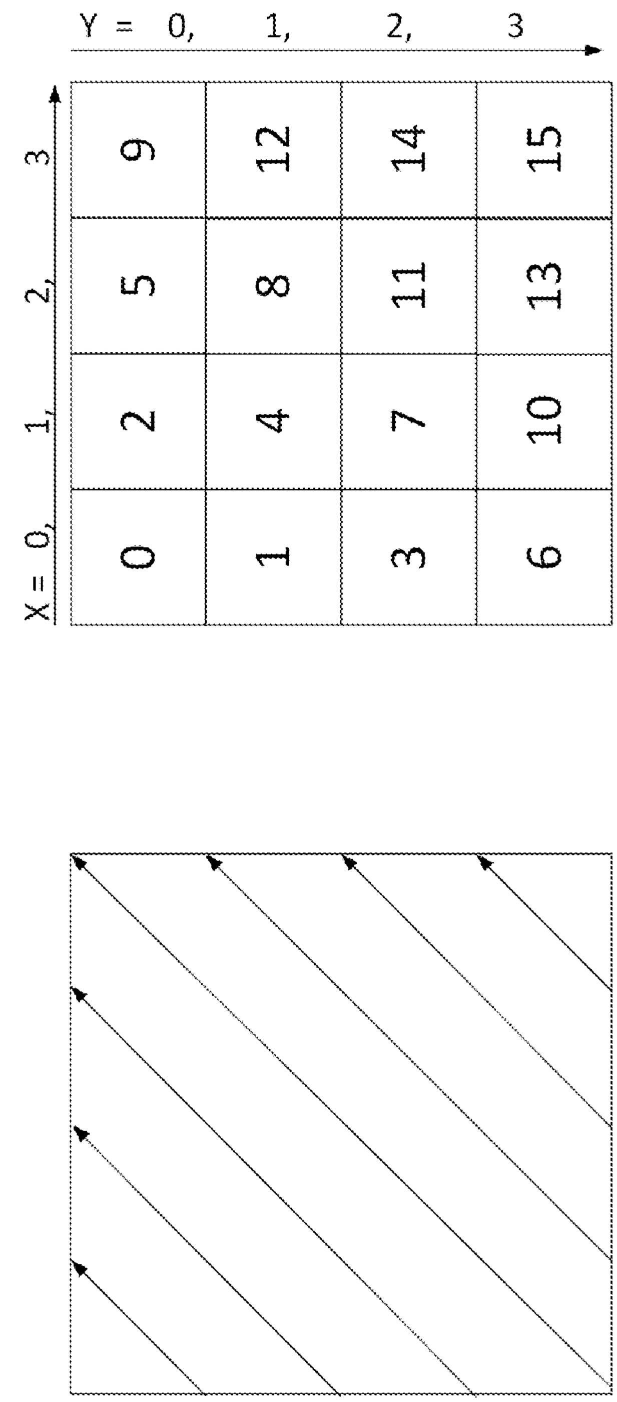
FIG. 16 shows an example of a diagonal up-right scan order for a 4×4 coding group.

| Block size | RST type | # of CGs that RST applied to | Which CG that RST applied to may have non-zero coeffs | Potential locations of non-zero coeffs in the CGs RST applied to (nonZeroSize relative to one CG) |
|---|---|---|---|---|
| 4x4 | RST4x4 (16x16) | 1 (Top-left 4x4) | Top-left 4x4 | First 8 in diagonal scan order (0 . . . 7 in FIG. 16: diagonal up-right scan order (4x4 as a CG for example), nonZeroSize = 8 |
| 4x8/8x4 | RST4x4 (16x16) | 1 (Top-left 4x4) | Top-left 4x4 | all, nonZeroSize = 16 |
| 4xN and Nx4 (N > 8) | RST4x4 (16x16) | 2 (4xN: up most 4x8; Nx4: left most 4x8) | 4xN: up most 4x8; Nx4: left most 4x8 | all, nonZeroSize = 16 |
| 8x8 | RST8x8 (16x48) | 3 (with only 1 CG may have non-zero coeffs after forward RST) | Top-left 4x4 | First 8 in diagonal scan order (0 . . . 7 in FIG. 16: diagonal up-right scan order (4x4 as a CG for example), nonZeroSize = 8 |
| Others (W*H, W > 8, H > 8) | RST8x8 (16x48) | 3 (with only 1 CG may have non-zero coeffs after forward RST) | Top-left 4x4 | all, nonZeroSize = 16 |

2.4.3 Sub-Block Transform

For an inter-predicted CU with cu_cbf equal to 1, cu_sbt_flag may be signaled to indicate whether the whole residual block or a sub-part of the residual block is decoded. In the former case, inter MITS information is further parsed to determine the transform type of the CU. In the latter case, a part of the residual block is coded with inferred adaptive transform and the other part of the residual block is zeroed out. The SBT is not applied to the combined inter-intra mode.

In sub-block transform, position-dependent transform is applied on luma transform blocks in SBT-V and SBT-H (chroma transform block (TB) always using DCT-2). The two positions of SBT-H and SBT-V are associated with different core transforms. More specifically, the horizontal and vertical transforms for each SBT position is specified in FIG. 3. For example, the horizontal and vertical transforms for SBT-V position 0 is DCT-8 and DST-7, respectively. When one side of the residual transform unit (TU) is greater than 32, the corresponding transform is set as DCT-2. Therefore, the sub-block transform jointly specifies the TU tiling, CBF, and horizontal and vertical transforms of a residual block, which may be considered a syntax shortcut for the cases that the major residual of a block is at one side of the block.

2.4.3.1 Syntax Elements 7.3.7.5 Coding Unit Syntax

| | Descriptor |
|---|---|
| coding_unit( x0, y0, cbWidth, cbHeight, treeType ) { | |
| if( slice type != I \|\| sps_ibc_enabled_flag ) { | |
| if( treeType != DUAL_TREE_CHROMA ) | |
| cu_skip_flag[ x0 ][ y0 ] | ae(v) |
| if( cu_skip_flag[ x0 ][ y0 ] = = 0 && slice_type != I ) | |
| pred_mode_flag | ae(v) |
| if( ( ( slice type = = I && cu_skip_flag[ x0 ][ y0 ] = =0 ) \|\| ( slice_type != I && CuPredMode[ x0 ][ y0 ] != MODE_INTRA ) ) && sps_ibc_enabled_flag ) | |
| pred_mode_ibc_flag | ae(v) |
| } | |
| if( CuPredMode[ x0 ][ y0 ] = = MODE_INTRA ) { | |
| ... | |
| } else if( treeType != DUAL_TREE_CHROMA ) { /* MODE_INTER or MODE_ IBC */ | |
| ... | |
| } | |
| if( !pcm_flag[ x0 ][ y0 ] ) { | |
| if( CuPredMode[ x0 ][ y0 ] != MODE_INTRA && merge_flag[ x0 ][ y0 ] = = 0 ) | |
| cu_cbf | ae(v) |
| if( cu_cbf ) { | |
| if( CuPredMode[ x0 ][y0 ] == MODE_INTER && sps_sbt_enabled_flag && !ciip_flag[ x0 ][ y0 ] ) { | |
| if( cbWidth <= MaxSbtSize && cbHeight <= MaxSbtSize ) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH \|\| allowSbtHorH \|\| allowSbtVerQ \|\| allowSbtHorQ ) | |
| cu_sbt_flag | ae(v) |
| } | |
| if( cu_sbt_flag ) { | |
| if( ( allowSbtVerH \|\| allowSbtHorH ) && ( allowSbtVerQ \|\| allowSbtHorQ) ) | |
| cu_sbt_quad_flag | ae(v) |
| if( ( cu_sbt_quad_flag && allowSbtVerQ && allowSbtHorQ ) \|\| ( !cu_sbt_quad_flag && allowSbtVerH && allowSbtHorH ) ) | |
| cu_sbt_horizontal_flag | ae(v) |
| cu_sbt_pos_flag | ae(v) |
| } | |
| } | |
| transform_tree( x0, y0, cbWidth, cbHeight, treeType ) | |
| } | |
| } | |
| } | |

cu_sbt_flag equal to 1 specifies that for the current coding unit, subblock transform is used. cu_sbt_flag equal to 0 specifies that for the current coding unit, subblock transform is not used.

When cu_sbt_flag is not present, its value is inferred to be equal to 0.

NOTE—: When subblock transform is used, a coding unit is split into two transform units; one transform unit has residual data, the other does not have residual data.

cu_sbt_quad_flag equal to 1 specifies that for the current coding unit, the subblock transform includes a transform unit of ¼ size of the current coding unit. cu_sbt_quad_flag equal to 0 specifies that for the current coding unit the subblock transform includes a transform unit of ½ size of the current coding unit.

When cu_sbt_quad_flag is not present, its value is inferred to be equal to 0.

cu_sbt_horizontal_flag equal to 1 specifies that the current coding unit is split horizontally into 2 transform units.

cu_sbt_horizontal_flag[x0][y0] equal to 0 specifies that the current coding unit is split vertically into 2 transform units.

When cu_sbt_horizontal_flag is not present, its value is derived as follows:

If cu_sbt_quad_flag is equal to 1, cu_sbt_horizontal_flag is set to be equal to allowSbtHorQ.

Otherwise (cu_sbt_quad_flag is equal to 0), cu_sbt_horizontal_flag is set to be equal to allowSbtHorH.

cu_sbt_pos_flag equal to 1 specifies that the tu_cbf_luma, tu_cbf_cb and tu_cbf_cr of the first transform unit in the current coding unit are not present in the bitstream. cu_sbt_pos_flag equal to 0 specifies that the tu_cbf_luma, tu_cbf_cb and tu_cbf_cr of the second transform unit in the current coding unit are not present in the bitstream.

The variable SbtNumFourthsTb0 is derived as follows:

sbtMinNumFourths=cu_sbt_quad_flag?1:2 (7-117)

SbtNumFourthsTb0=cu_sbt_pos_flag?(4−sbtMinNumFourths):sbtMinNumFourths (7-118)

sps_sbt_max_size_64_flag equal to 0 specifies that the maximum CU width and height for allowing subblock transform is 32 luma samples. sps_sbt_max_size_64_flag equal to 1 specifies that the maximum CU width and height for allowing subblock transform is 64 luma samples.

MaxSbtSize=sps_sbt_max_size_64_flag?64:32 (7-33)

2.4.4 Quantized Residual Domain Block Differential Pulse-Code Modulation Coding (QR-BDPCM)

In JVET-N0413, quantized residual domain BDPCM (denoted as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, 0≤i≤M−1, 0≤j≤N−1. be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, 0≤i≤M−1, 0≤j≤N−1 denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i = 0,\ 0 \le j \le (N-1) \\ Q(r_{i,j}) - Q(r_{(i-1),j}), & 1 \le i \le (M-1),\ 0 \le j \le (N-1) \end{cases}$$

For horizontal prediction, similar rules apply, and the residual quantized samples are obtained by $$\tilde{r}_{i,j} = \begin{cases} Q(r_{i,j}), & 0 \le i \le (M-1),\ j = 0 \\ Q(r_{i,j}) - Q(r_{i,(j-1)}), & 0 \le i \le (M-1),\ 1 \le j \le (N-1) \end{cases}$$

The residual quantized samples $\tilde{r}_{i,j}$ are sent to the decoder.

On the decoder side, the above calculations are reversed to produce $Q(r_{i,j})$, 0≤i≤M−1, 0≤j≤N−1. For vertical prediction case, $$Q(r_{i,j})=\Sigma_{k=0}^{i}\tilde{r}_{k,j}, 0\le i\le(M-1), 0\le j\le(N-1)$$

For horizontal case, $$Q(r_{i,j})=\Sigma_{k=0}^{j}\tilde{r}_{i,k}, 0\le i\le(M-1), 0\le j\le(N-1)$$

The invert quantized residuals, $Q^{-1}(Q(r_{i,j}))$, are added to the intra block prediction values to produce the reconstructed sample values.

When quantized residual BDPCM (QR-BDPCM) is selected, there is no transform applied.

2.5 Entropy Coding of Coefficients 2.5.1 Coefficients Coding of Transform-Applied Blocks In HEVC, transform coefficients of a coding block are coded using non-overlapped coefficient groups (or subblocks), and each coefficient group (CG) contains the coefficients of a 4×4 block of a coding block. The CGs inside a coding block, and the transform coefficients within a CG, are coded according to pre-defined scan orders.

Figure 17:
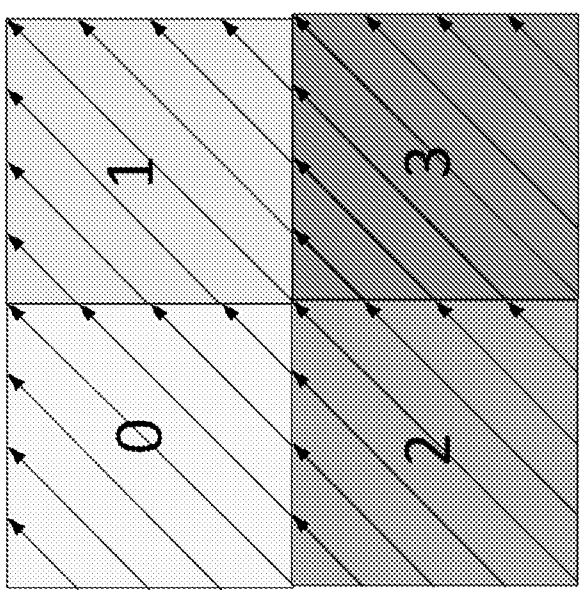
FIG. 17 shows an example of a diagonal up-right scan order for an 8×8 block with coding groups of size 4×4.

The CGs inside a coding block, and the transform coefficients within a CG, are coded according to pre-defined scan orders. Both CG and coefficients within a CG follows the diagonal up-right scan order. An example for 4×4 block and 8×8 scanning order is depicted in FIG. 16 and FIG. 17, respectively.

Note that the coding order is the reversed scanning order (i.e., decoding from CG3 to CG0 in FIG. 17), when decoding one block, the last non-zero coefficient's coordinate is firstly decoded.

The coding of transform coefficient levels of a CG with at least one non-zero transform coefficient may be separated into multiple scan passes. In the first pass, the first bin (denoted by bin0, also referred as significant_coeff_flag, which indicates the magnitude of the coefficient is larger than 0) is coded. Next, two scan passes for context coding the second/third bins (denoted by bin1 and bin2, respectively, also referred as coeff_abs_greater1_flag and coeff_abs_greater2_flag) may be applied. Finally, two more scan passes for coding the sign information and the remaining values (also referred as coeff_abs_level_remaining) of coefficient levels are invoked, ifnecessary. Note that only bins in the first three scan passes are coded in a regular mode and those bins are termed regular bins in the following descriptions.

In the VTM 3, for each CG, the regular coded bins and the bypass coded bins are separated in coding order; first all regular coded bins for a subblock are transmitted and, thereafter, the bypass coded bins are transmitted. The transform coefficient levels of a subblock are coded in five passes over the scan positions as follows:

Pass 1: coding of significance (sig_flag), greater 1 flag (gt1_flag), parity (par_level_flag) and greater 2 flags (gt2_flag) is processed in coding order. If sig_flag is equal to 1, first the gt1_flag is coded (which specifies whether the absolute level is greater than 1). If gt1_flag is equal to 1, the par_flag is additionally coded (it specifies the parity of the absolute level minus 2).

Pass 2: coding of remaining absolute level (remainder) is processed for all scan positions with gt2_flag equal to 1 or gt1_flag equal to 1. The non-binary syntax element is binarized with Golomb-Rice code and the resulting bins are coded in the bypass mode of the arithmetic coding engine.

Pass 3: absolute level (absLevel) of the coefficients for which no sig_flag is coded in the first pass (due to reaching the limit of regular-coded bins) are completely coded in the bypass mode of the arithmetic coding engine using a Golomb-Rice code.

Pass 4: coding of the signs (sign_flag) for all scan positions with sig_coeff_flag equal to 1

It is guaranteed that no more than 32 regular-coded bins (sig_flag, par_flag, gt1_flag and gt2_flag) are encoded or decoded for a 4×4 subblock. For 2×2 chroma subblocks, the number of regular-coded bins is limited to 8.

The Rice parameter (ricePar) for coding the non-binary syntax element remainder (in Pass 3) is derived similar to HEVC. At the start of each subblock, ricePar is set equal to 0. After coding a syntax element remainder, the Rice parameter is modified according to predefined equation. For coding the non-binary syntax element absLevel (in Pass 4), the sum of absolute values sumAbs in a local template is determined. The variables ricePar and posZero are determined based on dependent quantization and sumAbs by a table look-up. The intermediate variable codeValue is derived as follows:

If absLevel[k] is equal to 0, codeValue is set equal to posZero;

Otherwise, if absLevel[k] is less than or equal to posZero, codeValue is set equal to absLevel[k]−1;

Otherwise (absLevel[k] is greater than posZero), codeValue is set equal to absLevel[k].

The value of codeValue is coded using a Golomb-Rice code with Rice parameter ricePar.

2.5.1.1 Context Modeling for Coefficient Coding

Figure 18:
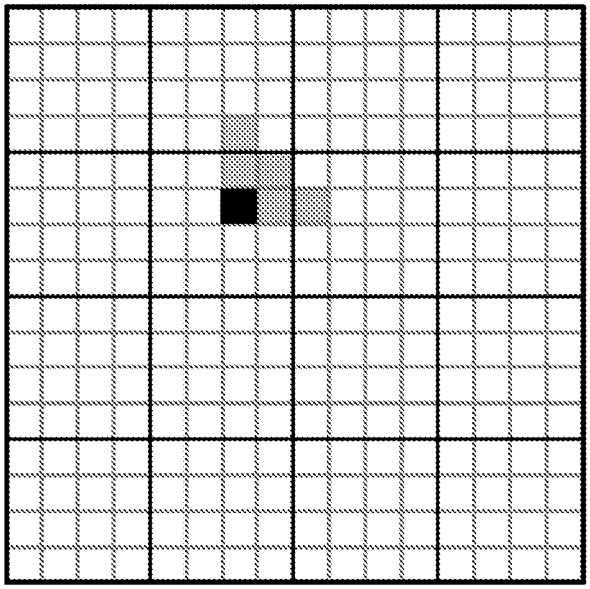
FIG. 18 shows an example of a template used to select probability models.

The selection of probability models for the syntax elements related to absolute values of transform coefficient levels depends on the values of the absolute levels or partially reconstructed absolute levels in a local neighbourhood. The template used is illustrated in FIG. 18.

The selected probability models depend on the sum of the absolute levels (or partially reconstructed absolute levels) in a local neighborhood and the number of absolute levels greater than 0 (given by the number of sig_coeff_flags equal to 1) in the local neighborhood. The context modelling and binarization depends on the following measures for the local neighborhood:

numSig: the number of non-zero levels in the local neighborhood;

sumAbs1: the sum of partially reconstructed absolute levels (absLevel1) after the first pass in the local neighborhood;

sumAbs: the sum of reconstructed absolute levels in the local neighborhood diagonal position (d): the sum of the horizontal and vertical coordinates of a current scan position inside the transform block Based on the values of numSig, sumAbs1, and d, the probability models for coding sig_flag, par_flag, gt1_flag, and gt2_flag are selected. The Rice parameter for binarizing abs_remainder is selected based on the values of sumAbs and numSig.

2.5.1.2 Dependent Quantization (DQ)

In addition, the same HEVC scalar quantization is used with a new concept called dependent scale quantization. Dependent scalar quantization refers to an approach in which the set of admissible reconstruction values for a transform coefficient depends on the values of the transform coefficient levels that precede the current transform coefficient level in reconstruction order. The main effect of this approach is that, in comparison to conventional independent scalar quantization as used in HEVC, the admissible reconstruction vectors are packed denser in the N-dimensional vector space (N represents the number of transform coefficients in a transform block). That means, for a given average number of admissible reconstruction vectors per N-dimensional unit volume, the average distortion between an input vector and the closest reconstruction vector is reduced. The approach of dependent scalar quantization is realized by: (a) defining two scalar quantizers with different reconstruction levels and (b) defining a process for switching between the two scalar quantizers.

Figure 19:
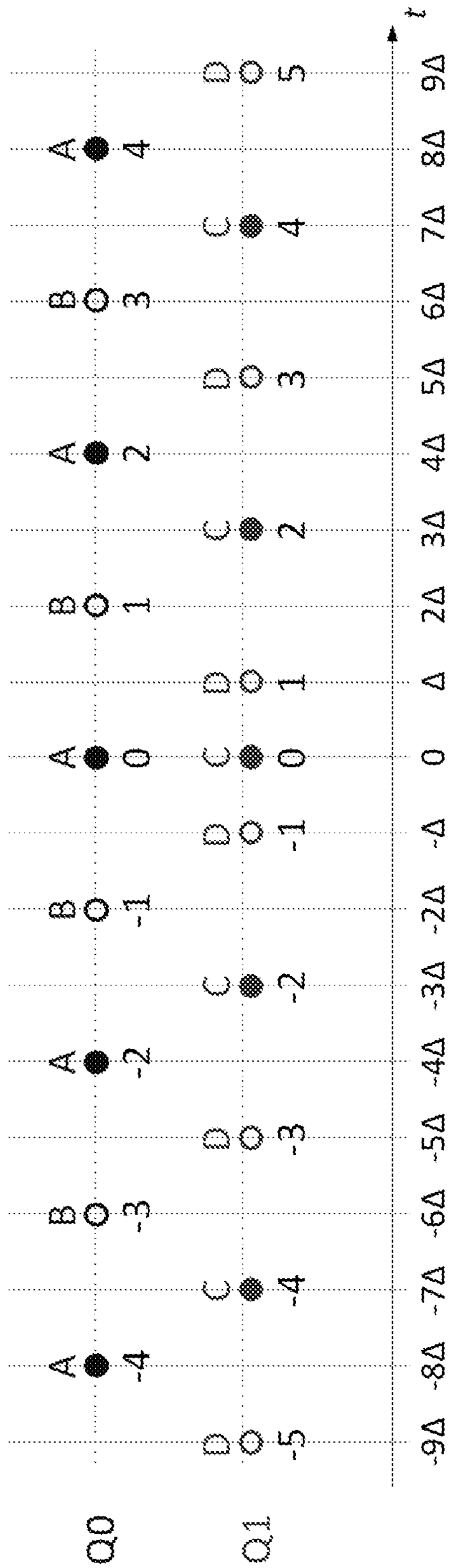
FIG. 19 shows an example of two scalar quantizers used for dependent quantization.

The two scalar quantizers used, denoted by Q0 and Q1, are illustrated in FIG. 19. The location of the available reconstruction levels is uniquely specified by a quantization step size A. The scalar quantizer used (Q0 or Q1) is not explicitly signalled in the bitstream. Instead, the quantizer used for a current transform coefficient is determined by the parities of the transform coefficient levels that precede the current transform coefficient in coding/reconstruction order.

Figure 20:
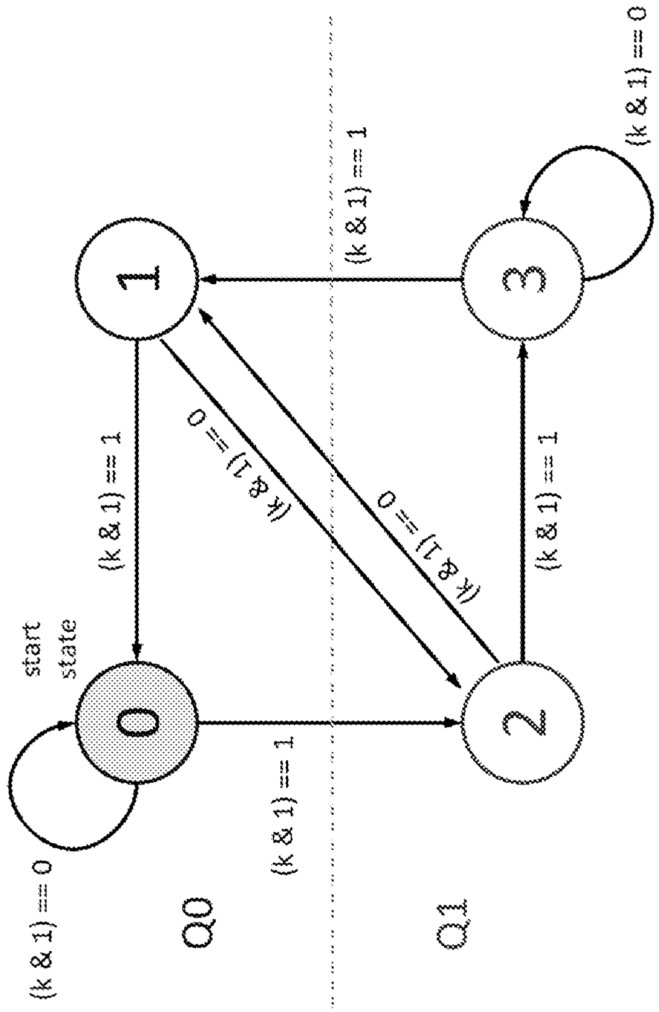
FIG. 20 shows an example of a state transition and quantizer selection for the proposed dependent quantization process.

As illustrated in FIG. 20, the switching between the two scalar quantizers (Q0 and Q1) is realized via a state machine with four states. The state can take four different values: 0, 1, 2, 3. It is uniquely determined by the parities of the transform coefficient levels preceding the current transform coefficient in coding/reconstruction order. At the start of the inverse quantization for a transform block, the state is set equal to 0. The transform coefficients are reconstructed in scanning order (i.e., in the same order they are entropy decoded). After a current transform coefficient is reconstructed, the state is updated as shown in FIG. 20, where k denotes the value of the transform coefficient level.

2.5.1.3 Syntax and Semantics 7.3.7.11 Residual Coding Syntax

| | Descriptor |
|---|---|
| residual_coding( x0, y0, log2TbWidth, log2TbHeight, cIdx ) { | |
| if( ( tu_mts_idx[ x0 ][ y0 ] > 0 \|\| | |
| ( cu_sbt_flag && log2TbWidth < 6 && log2TbHeight < 6 ) ) | |
| && cIdx = = 0 && log2TbWidth > 4 ) | |
| log2TbWidth = 4 | |
| else | |
| log2TbWidth = Min( log2TbWidth, 5 ) | |
| if( tu_mts_idx[ x0 ][ y0 ] > 0 \|\| | |
| ( cu_sbt_flag && log2TbWidth < 6 && log2TbHeight < 6 ) ) | |
| && cIdx = = 0 && log2TbHeight > 4 ) | |
| log2TbHeight = 4 | |
| else | |
| log2TbHeight = Min( log2TbHeight, 5 ) | |
| if( log2TbWidth > 0 ) | |
| last_sig_coeff_x_prefix | ae(v) |
| if( log2TbHeight > 0 ) | |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |

-continued

```
                                                                                Descriptor
log2SbW = ( Min( log2TbWidth, log2TbHeight ) < 2 ? 1 : 2 )
log2SbH = log2SbW
if ( log2TbWidth < 2 && cIdx = = 0 ) {
  log2SbW = log2TbWidth
  log2SbH = 4 − log2SbW
} else if ( log2TbHeight < 2 && cIdx = = 0 ) {
  log2SbH = log2TbHeight
  log2SbW = 4 − log2SbH
}
numSbCoeff = 1 << ( log2SbW + log2SbH )
lastScanPos = numSbCoeff
lastSubBlock = ( 1 << ( log2TbWidth + log2TbHeight − ( log2SbW + log2SbH ) ) ) − 1
do {
  if( lastScanPos = = 0 ) {
      lastScanPos = numSbCoeff
      lastSubBlock− −
  }
  lastScanPos− −
  xS = DiagScanOrder[ log2TbWidth − log2SbW ][ log2TbHeight − log2SbH ]
              [ lastSubBlock ][ 0 ]
  yS = DiagScanOrder[ log2TbWidth − log2SbW ][ log2TbHeight − log2SbH ]
              [ lastSubBlock ][ 1 ]
  xC = ( xS << log2SbW ) + DiagScanOrder[ log2SbW ][ log2SbH ][ lastScanPos ][ 0 ]
  yC = ( yS << log2SbH ) + DiagScanOrder[ log2SbW ][ log2SbH ][ lastScanPos ][ 1 ]
} while( ( xC != LastSignificantCoeffX ) || ( yC != LastSignificantCoeFfY ) )
QState = 0
for( i = lastSubBlock; i >= 0; i− − ) {
  startQStateSb = QState
  xS = DiagScanOrder[ log2TbWidth − log2SbW ][ log2TbHeight − log2SbH ]
              [ lastSubBlock ][ 0 ]
  yS = DiagScanOrder[ log2TbWidth − log2SbW ][ log2TbHeight − log2SbH ]
              [ lastSubBlock ][ 1 ]
  inferSbDcSigCoeffFlag = 0
  if( (i < lastSubBlock) && ( i > 0 ) ) {
    coded_sub_block_flag[ xS ][ yS ]                                            ae(v)
    inferSbDcSigCoeffFlag = 1
  }
  firstSigScanPosSb = numSbCoeff
  lastSigScanPosSb = −1
  remBinsPass1 = ( ( log2SbW + log2SbH ) < 4 ? 8 : 32 )
  firstPosMode0 = ( i = = lastSubBlock ? lastScanPos : numSbCoeff − 1 )
  firstPosMode1 = −1
  for( n = firstPosMode0; n >= 0 && remBinsPass1 >= 4; n− − ) {
    xC = ( xS << log2SbW ) + DiagScanOrder[ log2SbW ][ log2SbH ][ n ][ 0 ]
    yC = ( yS << log2SbH ) + DiagScanOrder[ log2SbW ][ log2SbH ][ n ][ 1 ]
    if( coded_sub_block_flag[ xS ][ yS ] && (n > 0 || !inferSbDcSigCoeffFlag ) &&
        ( xC != LastSignificantCoefX || yC != Last SignificantCoeffY ) ) {
        sig_coeff_flag[ xC ][ yC ]                                              ae(v)
        remBinsPass1− −
        if( sig_coeff_flag[ xC ][ yC ] )
          inferSbDcSigCoeffFlag = 0
      }
      if( sig_coeff_flag[ xC ][ yC ] ) {
        abs_level_gt1 _flag[ n ]                                                ae(v)
        remBinsPass1− −
        if( abs_level_gt1_flag[ n ] ) {
          par_level_flag[ n ]                                                   ae(v)
          remBinsPass1− −
          abs_level_gt3_flag[ n ]                                               ae(v)
          remBinsPass1− −
        }
        if( lastSigScanPosSb = = −1 )
          lastSigScanPosSb = n
        firstSigScanPosSb = n
      }
      AbsLevelPassl[ xC ][ yC ] = sig_coeff_flag[ xC ][ yC ] + par_level_flag[ n ] +
                    abs_level_gt1_flag[ n ] + 2 * abs_level_gt3_flag[ n ]
      if( dep_quant_enabled_flag )
        QState = QStateTransTable[ QState ][ AbsLevelPass1[ xC ][ yC ] & 1 ]
      if( remBinsPass1 < 4 )
        firstPosMode1 = n − 1
  }
  for( n = numSbCoeff − 1; n >= firstPosMode1; n− − ) {
      xC = ( xS << log2SbW ) + DiagScanOrder[ log2SbW ][ log2SbH ][ n ][ 0 ]
      yC = ( yS << log2SbH ) + DiagScanOrder[ log2SbW ][ log2SbH ][ n ][ 1 ]
      if( abs_level_gt3_flag[ n ] )
        abs_remainder[ n ]                                                      ae(v)
```

-continued

| | Descriptor |
|---|---|
| AbsLevel[ xC ][ yC ] = AbsLevelPass1[ xC ][ yC ] +2 * abs_remainder[ n ] | |
| } | |
| for( n = firstPosMode1; n >= 0; n− − ) { | |
| xC = ( xS << log2SbW) + DiagScanOrder[ log2SbW ][ log2SbH ][ n ][ 0 ] | |
| yC = ( yS << log2SbH) + DiagScanOrder[ log2SbW ][ log2SbH ][ n ][ 1 ] | |
| dec_abs_level[ n ] | ae(v) |
| if(AbsLevel[ xC ][ yC ] > 0 ) | |
| firstSigScanPosSb = n | |
| if( dep_quant_enabled_flag ) | |
| QState = QStateTransTable[ QState ][ AbsLevel[ xC ][ yC ] & 1 ] | |
| } | |
| if( dep_quant_enabled_flag \|\| !sign_data_hiding_enabled_flag ) | |
| signHidden = 0 | |
| else | |
| signHidden = ( lastSigScanPosSb − firstSigScanPosSb > 3 ? 1 : 0 ) | |
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( ( AbsLevel[ xC ][ yC ] > 0 ) && | |
| ( !signHidden \|\| ( n != firstSigScanPosSb ) ) ) | |
| coeff_sign_flag[ n ] | ae(v) |
| } | |
| if( dep_quant_enabled_flag ) { | |
| QState = startQStateSb | |
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( AbsLevel[ xC ][ yC ] > 0 ) | |
| TransCoeffLevel[ x0 ][ y0 ][ cIdx ][ xC ][ yC ] = | |
| ( 2 * AbsLevel[ xC ][ yC ] − ( QState > 1 ? 1 : 0 ) ) * | |
| ( 1 − 2 * coeff_sign_flag[ n ] ) | |
| QState = QStateTransTable[ QState ] [ par_level_flag[ n ] ] | |
| } else { | |
| sumAbsLevel = 0 | |
| for( n = numSbCoeff − 1; n >= 0; n− − ) { | |
| xC = ( xS << log2SbW ) + DiagScanOrder[ log2SbW ][ log2SbH ][ n ][ 0 ] | |
| yC = ( yS << log2SbH ) + DiagScanOrder[ log2SbW ][ log2SbH ][ n ][ 1 ] | |
| if( AbsLevel[ xC ][ yC ] > 0 ) { | |
| TransCoeffLevel[ x0 ][ y0 ][ cIdx ][ xC ][ yC ] = | |
| AbsLevel[ xC ][ yC ] * ( 1 − 2 * coeff_sign_flag[ n ] ) | |
| if( signHidden ) { | |
| sumAbsLevel += AbsLevel[ xC ][ yC ] | |
| if( (n = = firstSigScanPosSb ) && ( sumAbsLevel % 2 ) = = 1 ) ) | |
| TransCoeffLevel[ x0 ][ y0 ][ cIdx ][ xC ][ yC ] = | |
| −TransCoeffLevel[ x0 ][ y0 ][ cIdx ][ xC ][ yC ] | |
| } | |
| } | |
| } | |
| } | |
| } | |
| } | |

2.5.2 Coefficients coding of TS-coded blocks and QR-BDPCM coded blocks

QR-BDPCM follows the context modeling method for TS-coded blocks.

A modified transform coefficient level coding for the TS residual. Relative to the regular residual coding case, the residual coding for TS includes the following changes:

(1) no signalling of the last x/y position (2) coded_sub_block_flag coded for every subblock except for the last subblock when all previous flags are equal to 0;

(3) sig_coeff_flag context modelling with reduced template, (4) a single context model for abs_level_gt1_flag and par_level_flag, (5) context modeling for the sign flag, additional greater than 5, 7, 9 flags, (6) modified Rice parameter derivation for the remainder binarization (7) a limit for the number of context coded bins per sample, 2 bins per sample within one block.

2.5.2.1 Syntax and Semantics 7.3.6.10 Transform Unit Syntax

| transform_unit( x0, y0, tbWidth, tbHeight, treeType, subTuIndex ) { | Descriptor |
|---|---|
| ... | |
| if( tu_cbf_luma[ x0 ][ y0 ] && treeType != DUAL_TREE_CHROMA | |
| && ( tbWidth <= 32 ) && ( tbHeight <= 32 ) | |
| && ( IntraSubPartitionsSplit [ x0 ][ y0 ] = = ISP_NO_SPLIT ) | |
| && ( !cu_sbt_flag ) ) { | |
| if( transform_skip_enabled_flag && tbWidth <= MaxTsSize && tbHeight <= MaxTsSize ) | |
| transform_skip_flag [ x0 ][ y0 ] | ae(v) |

-continued

| transform_unit( x0, y0, tbWidth, tbHeight, treeType, subTuIndex ) { | Descriptor |
|---|---|
| if( (( CuPredMode[ x0 ][ y0 ] != MODE_INTRA && sps_explicit_mts_inter_enabled_flag ) \| \| ( CuPredMode[ x0 ][ y0 ] = = MODE_INTRA && sps_explicit_mts_intra_enabled_flag )) && ( tbWidth <= 32 ) && ( tbHeight <= 32 ) && ( !transform_skip_flag [ x0 ][ y0 ] ) ) | |
| tu_mts_idx[ x0 ][ y0 ] | ae(v) |
| } | |
| if( tu_cbf_luma[ x0 ][ y0 ] ) { | |
| if( !transform_skip_flag [ x0 ][ y0 ] ) | |
| residual_coding( x0, y0, Log2 ( tbWidth ), Log2( tbHeight ), 0 ) | |
| else | |
| residual_coding_ts( x0, y0, Log2 ( tbWidth ), Log2( tbHeight ), 0 ) | |
| } | |
| if( tu_cbf_cb[ x0 ][ y0 ] ) | |
| residual_coding( xC, yC, Log2 ( wC ), Log2( hC ), 1 ) | |
| if( tu_cbf_cr[ x0 ][ y0 ] ) | |
| residual_coding( xC, yC, Log2 ( wC ), Log2( hC ), 2 ) | |
| } | |

| | Descriptor |
|---|---|
| residual_ts_coding( x0, y0, log2TbWidth, log2TbHeight, cIdx ) { | |
| log2SbSize = ( Min( log2TbWidth, log2TbHeight ) < 2 ? 1 : 2) | |
| numSbCoeff = 1 << (log2SbSize << 1) | |
| lastSubBlock = (1 << ( log2TbWidth + log2TbHeight − 2 * log2SbSize ) ) − 1 | |
| /* Loop over subblocks from top-left (DC) subblock to the last one */ | |
| inferSbCbf = 1 | |
| MaxCcbs = 2 * (1 << log2TbWidth ) * (1 << log2TbHeight ) | |
| for( i =0; i <= lastSubBlock; i++ ) { | |
| xS = DiagScanOrder[ log2TbWidth - log2SbSize ][ log2TbHeight - log2SbSize ][ i ][ 0 ] | |
| yS = DiagScanOrder[ log2TbWidth - log2SbSize ][ log2TbHeight - log2SbSize ][ i ][ 1 ] | |
| if( ( i != lastSubBlock \| \| !inferSbCbf ) | |
| coded_sub_block_flag[ xS ][ yS ] | ae(v) |
| MaxCcbs−− | |
| if( coded_sub_block_flag[ xS ][ yS ] && i < lastSubBlock ) | |
| inferSbCbf = 0 | |
| } | |
| /* First scan pass */ | |
| inferSbSigCoeffFlag = 1 | |
| for( n = (i == 0; n <= numSbCoeff − 1; n++ ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| if( coded_sub_block_flag[ xS ][ yS ] && | |
| ( n == numSbCoeff − 1 \| \| !inferSbSigCoeffFlag ) ) { | |
| sig_coeff_flag[ xC ][ yC ] | ae(v) |
| MaxCcbs−− | |
| if( sig_coeff_flag[ xC ][ yC ] ) | |
| inferSbSigCoeffFlag = 0 | |
| } | |
| if( sig_coeff_flag[ xC ][ yC ] ) { | |
| coeff_sign_flag[ n ] | ae(v) |
| abs_level_gtx_flag[ n ][ 0 ] | ae(v) |
| MaxCcbs = MaxCcbs − 2 | |
| if( abs_level_gtx_flag[ n ][ 0 ] ) { | |
| par_level_flag[ n ] | ae(v) |
| MaxCcbs−− | |
| } | |
| } | |
| AbsLevelPassX[ xC ][ yC ] = | |
| sig_coeff_flag[ xC ][ yC ] + par_level_flag[ n ] + abs_level_gtx_flag[ n ][ 0 ] | |
| } | |
| /* Greater than X scan passes (numGtXFlags=5) */ | |
| for( i = 1; i <= 5 − 1 && abs_level_gtx_flag[ n ][ i − 1 ] ; i++ ) { | |
| for( n = 0; n <= numSbCoeff − 1; n++ ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| abs_level_gtx_flag[ n ][ i ] | ae(v) |
| MaxCcbs−− | |
| AbsLevelPassX[ xC ][ yC ] + = 2 * abs_level_gtx_flag[ n ][ i ] | |
| } | |
| } | |
| /* remainder scan pass */ | |
| for( n = 0; n <= numSbCoeff − 1; n++ ) { | |
| xC = (xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |

-continued

```
                                                                          Descriptor
      if( abs_level_gtx_flag[ n ][ numGtXFlags − 1] )
        abs_remainder[ n ]                                                ae(v)
      TransCoeffLevel[ x0 ][ y0 ][ cIdx ][ xC ][ yC ] = ( 1 − 2 * coeff_sign_flag[ n ] ) *
                       ( AbsLevelPassX[ xC ][ yC ] + abs_remainder[ n ] )
    }
  }
}
```

The number of context coded bins is restricted to be no larger than 2 bins per sample for each CG.

TABLE 9-15

Assignment of ctxInc to syntax elements with context coded bins

| Syntax element | binIdx 0 | 1 | 2 | 3 | 4 | >=5 |
|---|---|---|---|---|---|---|
| last_sig_coeff_x_prefix | 0..23 (clause 9.5.4.2.4) | | | | | |
| last_sig_coeff_y_prefix | 0..23 (clause 9.5.4.2.4) | | | | | |
| last_sig_coeff_x_suffix | bypass | bypass | bypass | bypass | bypass | bypass |
| last_sig_coeff_y_suffix | bypass | bypass | bypass | bypass | bypass | bypass |
| coded_sub_block_flag[ ][ ] | ( MaxCcbs > 0) ? ( 0..7 (clause 9.5.4.2.6) ) : bypass | na | na | na | na | na |
| sig_coeff_flag[ ][ ] | ( MaxCcbs > 0) ? ( 0..93 (clause 9.5.4.2.8) ) : bypass | na | na | na | na | na |
| par_level_flag[ ] | ( MaxCcbs > 0) ? ( 0..33 (clause 9.5.4.2.9) ) : bypass | na | na | na | na | na |
| abs_level_gtx_flag[ ][ i ] | 0..70 (clause 9.5.4.2.9) | na | na | na | na | na |
| abs_remainder[ ] | bypass | bypass | bypass | bypass | bypass | bypass |
| dec_abs_level[ ] | bypass | bypass | bypass | bypass | bypass | bypass |
| coeff_sign_flag[ ] transform_skip_flag[ x0 ][ y0 ] = = 0 | bypass | na | na | na | na | na |
| coeff_sign_flag[ ] transform_skip_flag[ x0 ][ y0 ] = = 1 | 0 | na | na | na | na | na |

TABLE 9-15

Assignment of ctxInc to syntax elements with context coded bins

| Syntax element | binIdx 0 | 1 | 2 | 3 | 4 | >=5 |
|---|---|---|---|---|---|---|
| sig_coeff_flag[ ][ ] | ( MaxCcbs > 0) ? ( 0..93 (clause 9.5.4.2.8) ) : bypass | na | na | na | na | na |
| par_level_flag[ ] | ( MaxCcbs > 0) ? ( 0..33 (clause 9.5.4.2.9) ) : bypass | na | na | na | na | na |
| abs_level_gtx_flag[ ][ i ] | 0..70 (clause 9.5.4.2.9) | na | na | na | na | na |
| abs_remainder[ ] | bypass | bypass | bypass | bypass | bypass | bypass |
| dec_abs_level[ ] | bypass | bypass | bypass | bypass | bypass | bypass |
| coeff_sign_flag[ ] transform_skip_flag[ x0 ][ y0 ] = = 0 | bypass | na | na | na | na | na |
| coeff_sign_flag[ ] transform_skip_flag[ x0 ][ y0 ] = = 1 | 0 | na | na | na | na | na |

2.5 Chroma Direct Mode

In Direct Mode (DM), prediction mode of co-located luma block is used for deriving the chroma intra prediction mode.

Figure 25:
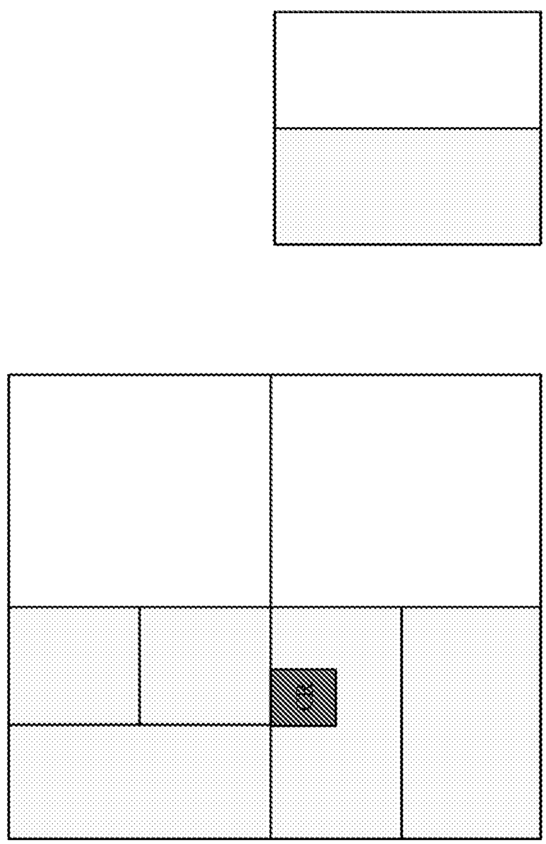
FIG. 25 shows an example of 'CR' position for derived mode (DM) derivation from the corresponding luma block.

Firstly, an intra prediction mode lumaIntraPredMode is derived:

- If the co-located luma block is coded in MIP mode, lumaIntraPredMode is set equal to Planar mode.
- Otherwise, if the co-located luma block is coded in intra block copy (IBC) mode or palette mode, lumaIntraPredMode is set equal to DC mode.
- Otherwise, lumaIntraPredMode is set equal to the intra prediction mode of the co-located luma block covering the corresponding luma sample of the center of chroma block. An example is depicted in FIG. 25.

Secondly, the intra chroma prediction mode (denoted as IntraPredModeC) is derived according to lumaIntraPredMode in the following table. Note that intra_chroma_pred_mode equal to 4 refers to the DM mode.

TABLE 8-2

| Specification of IntraPredModeC[ xCb ][ yCb ] depending on cclm_mode_flag, cclm_mode_idx, intra_chroma_pred_mode and lumaIntraPredMode | | | | | | | |
|---|---|---|---|---|---|---|---|
| | | | lumaIntraPredMode | | | | |
| cclm_mode_flag | cclm_mode_idx | intra_chroma_pred_mode | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

Finally, if the color format of the picture is 4:2:2, IntraPredModeC is further modified according to the following table for the DM mode.

Specification of the 4:2:2 mapping process from chroma intra prediction mode X to mode Y when chroma_format_idc is equal to 2.

| | | | | | | | | | | | | | | | | | |
|---|---|---|---|---|---|---|---|---|---|---|---|---|---|---|---|---|---|
| mode X | 0 | 1 | 2 | 3 | 4 | 5 | 6 | 7 | 8 | 9 | 10 | 11 | 12 | 13 | 14 | 15 | 16 |
| mode Y | 0 | 1 | 61 | 62 | 63 | 64 | 65 | 66 | 2 | 3 | 4 | 6 | 8 | 10 | 12 | 13 | 14 |
| mode X | 17 | 18 | 19 | 20 | 21 | 22 | 23 | 24 | 25 | 26 | 27 | 28 | 29 | 30 | 31 | 32 | 33 |
| mode Y | 16 | 18 | 20 | 22 | 23 | 24 | 26 | 28 | 30 | 32 | 33 | 34 | 35 | 36 | 37 | 38 | 39 |
| mode X | 34 | 35 | 36 | 37 | 38 | 39 | 40 | 41 | 42 | 43 | 44 | 45 | 46 | 47 | 48 | 49 | 50 |
| mode Y | 40 | 41 | 42 | 43 | 44 | 44 | 44 | 45 | 46 | 46 | 46 | 47 | 48 | 48 | 48 | 49 | 50 |
| mode X | 51 | 52 | 53 | 54 | 55 | 56 | 57 | 58 | 59 | 60 | 61 | 62 | 63 | 64 | 65 | 66 | |
| mode Y | 51 | 52 | 52 | 52 | 53 | 54 | 54 | 54 | 55 | 56 | 56 | 56 | 57 | 58 | 59 | 60 | |

The detailed draft is specified as follows.

8.4.3 Derivation Process for Chroma Intra Prediction Mode

Input to this Process are:

- a luma location (xCb, yCb) specifying the top-left sample of the current chroma coding block relative to the top-left luma sample of the current picture,
- a variable cbWidth specifying the width of the current coding block in luma samples,
- a variable cbHeight specifying the height of the current coding block in luma samples.

In this process, the chroma intra prediction mode IntraPredModeC[xCb][yCb] is derived.

The corresponding luma intra prediction mode lumaIntraPredMode is derived as follows:

- If intra_mip_flag[xCb][yCb] is equal to 1, lumaIntraPredMode is set equal to INTRA_PLANAR.
- Otherwise, if CuPredMode[0][xCb][yCb] is equal to MODE_IBC or MODE_PLT, lumaIntraPredMode is set equal to INTRA_DC.
- Otherwise, lumaIntraPredMode is set equal to IntraPredModeY[xCb+cbWidth/2][yCb+cbHeight/2].

The chroma intra prediction mode IntraPredModeC[xCb][yCb] is derived using cclm_mode_mode_flag, cclm_mode_idx, intra_chroma_pred_mode and lumaIntraPredMode as specified in Table 8-2.

TABLE 8-2

| Specification of IntraPredModeC[ xCb ][ yCb ] depending on cclm_mode_flag, cclm_mode_idx, intra_chroma_pred_mode and lumaIntraPredMode | | | | | | | |
|---|---|---|---|---|---|---|---|
| | | | lumaIntraPredMode | | | | |
| cclm_mode_flag | cclm_mode_idx | intra_chroma_pred_mode | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

When chroma_format_idc is equal to 2, the chroma intra prediction mode Y is derived using the chroma intra prediction mode X in Table 8-2 as specified in Table 8-3, and the chroma intra prediction mode X is set equal to the chroma intra prediction mode Y afterwards.

TABLE 8-3

Specification of the 4:2:2 mapping process from chroma intra prediction mode X to mode Y when chroma_format_idc is equal to 2

| | | | | | | | | | | | | | | | | | |
|---|---|---|---|---|---|---|---|---|---|---|---|---|---|---|---|---|---|
| mode X | 0 | 1 | 2 | 3 | 4 | 5 | 6 | 7 | 8 | 9 | 10 | 11 | 12 | 13 | 14 | 15 | 16 |
| mode Y | 0 | 1 | 61 | 62 | 63 | 64 | 65 | 66 | 2 | 3 | 4 | 6 | 8 | 10 | 12 | 13 | 14 |
| mode X | 17 | 18 | 19 | 20 | 21 | 22 | 23 | 24 | 25 | 26 | 27 | 28 | 29 | 30 | 31 | 32 | 33 |
| mode Y | 16 | 18 | 20 | 22 | 23 | 24 | 26 | 28 | 30 | 32 | 33 | 34 | 35 | 36 | 37 | 38 | 39 |
| mode X | 34 | 35 | 36 | 37 | 38 | 39 | 40 | 41 | 42 | 43 | 44 | 45 | 46 | 47 | 48 | 49 | 50 |
| mode Y | 40 | 41 | 42 | 43 | 44 | 44 | 44 | 45 | 46 | 46 | 46 | 47 | 48 | 48 | 48 | 49 | 50 |
| mode X | 51 | 52 | 53 | 54 | 55 | 56 | 57 | 58 | 59 | 60 | 61 | 62 | 63 | 64 | 65 | 66 | |
| mode Y | 51 | 52 | 52 | 52 | 53 | 54 | 54 | 54 | 55 | 56 | 56 | 56 | 57 | 58 | 59 | 60 | |

3 Drawbacks of Existing Implementations

The current design has the following problems:

(1) The four pre-defined transform sets for chroma components is the same as that for luma component. In addition, luma and chroma blocks with the same intra prediction mode use the same transform set. However, the chroma signal is typically smoother compared to the luma component. Using the same set may be sub-optimal.

(2) RST is only applied to certain CGs instead of all CGs. However, the decision on signaling RST index is dependent on the number of non-zero coefficients in the whole block. When all coefficients in the RST-applied CGs are zeros, there is no need to signal the RST index. However, the current design may still signal the index which wastes unnecessary bits.

(3) RST index is signaled after residual coding since it requires to record how many non-zero coefficients, whether there exists non-zero coefficient in certain locations (e.g., numZeroOutSigCoeff, numSigCoeff in section 2.3.2.2.7). Such design makes the parsing process more complex.

(4) RST index is context coded and context modeling is dependent on the coded luma/chroma intra prediction mode, and MTS index. Such design introduces parsing delay in terms of reconstruction of intra prediction modes. And 8 contexts are introduced which may be a burden for hardware implementation.

(a) DM and CCLM share the same context index offset which doesn't make sense since they are two different chroma intra prediction methods.

(5) The current design of non-TS residual coding firstly codes the coefficients information, followed by the indices of RST (i.e., use RST or not, if used, which matrix is selected). With such design, the information of RST on/off couldn't be taken into consideration in the entropy coding of residuals.

(6) RST is always applied to the top-left region of a transform block with primary transform applied. However, for different primary transform basis, it is not always true that the energy is concentrated in the top-left region of a transform block.

(7) The determination of whether to signal RST related information are conducted in different ways for dual-tree and single-tree coding structure.

(8) When there are more than one TU in a CU (e.g., the CU size is 128×128), whether to parse the RST related information can only be determined after decoding all the TUs. For example, for a 128×128 CU, the first prediction block (PB) could not be processed without waiting for the LFNST index that comes after the last PB. Although this does not necessarily break the overall 64×64 based decoder pipeline (if the context-adaptive binary arithmetic coding (CABAC) could be decoupled), it increases the data buffering by 4× for a certain number of decoder pipeline stages. It is costly.

(9) In JVET-O0219, intra prediction mode of co-located luma block is used for determining the LFNST transform set of CCLM mode coded chroma blocks. However, the co-located luma block may be coded with non-intra prediction modes (i.e., not the conventional intra prediction method such as using DC/Planar/Angular prediction direction). For example, in dual-tree case, the co-located luma block may be coded in palette mode, IBC mode etc. In this case, the intra prediction mode of the co-located luma block is undefined. Therefore, how to derive the secondary transform set for a chroma block is unknown.

(10) The derivation of chroma intra prediction block defined in sub-clause 8.4.4 checks whether the luma block covering the corresponding top-left luma sample is coded with MIP/IBC/Palette mode. If it is true, a default mode is given. Otherwise, the intra prediction mode of the center luma sample is used. It will cause two issues:

a. When the coding block covering the top-left luma sample (e.g., TL in FIGS. 24 (*a*) and 24 (*b*), the corresponding luma sample of the top-left chroma sample in the current chroma block) is coded with MIP mode, and the coding block covering the center luma sample (e.g., CR in FIG. 25) is coded with normal intra mode, in this case, a default mode is used and set to the chroma intra prediction mode which breaks the correlation between current chroma block and the luma block covering the CR. Lower coding performance will be caused.

b. When the coding block covering the top-left luma sample (e.g., TL in FIGS. 24 (*a*) and 24 (*b*), the corresponding luma sample of the top-left chroma sample in the current chroma block) is coded with intra mode, and the coding block covering the center luma sample (e.g., CR in FIG. 25) is coded with IBC/Palette/MIP, in this case, the intra prediction mode from the coding block covering CR is used to derive the chroma DM mode. However, there is no definition of such intra prediction modes associated with MIP/IBC/Palette mode.

(11) In the last VVC working draft (which could be downloaded from http://phenix.it-sudparis.eu/jvet/doc_end_user/documents/15_Gothenburg/wg11/JVET-O2001-v14.zip), the zero-out region size (i.e., nonZeroSize) is non-uniform for RST4×4 and RST8×8. RST4×4 is applied when the block size is 4×N or N×4 (N>=4). When N is 4 (i.e. the block size is 4×4), the zero-out region size is equal to 8. When N is larger than 4, nonZeroSize is set equal to 16. For RST8×8, when the block size is 8×8, the zero-out region size is equal to 8. Otherwise (i.e., the block width is larger than 8 and the block height is no smaller than 8, or the block height is larger than 8 and the block width is no smaller than 8), the zero-out region size is equal to 16. The larger value of zero-out range brings higher computational complexity at both encoder and decoder side.

(12) The memory usage for storing RST matrices is high.

4 Example Methods for Context Modeling for Residual Coding

Embodiments of the presently disclosed technology overcome the drawbacks of existing implementations, thereby providing video coding with higher coding efficiencies. The methods for context modeling for residual coding, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In the following description, a "block" may refer to coding unit (CU) or a transform unit (TU) or any rectangle region of video data. a "current block" may refer to a current being decoded/coded coding unit (CU) or a current being decoded/coded transform unit (TU) or any being decoded/coded coding rectangle region of video data. "CU" or "TU" may be also known as "coding block" and"transform block".

In these examples, the RST may be any variation of the design in JVET-N0193. RST could be any technology that may apply a secondary transform to one block or apply a transform to the transform skip (TS)-coded block (e.g., the RST proposed in JVET-N0193 applied to the TS-coded block).

Hereinafter, "normal intra prediction mode" is used to refer to the conventional intra prediction method wherein the prediction signal is generated by extrapolating neighbouring pixels from a certain direction. such as DC mode, Planar mode and Angular intra prediction modes (e.g., may further include wide angle intra prediction modes). For a block coded without using normal intra prediction mode, the block may be coded with at least one of the coding methods, e.g., IBC, MIP, palette, BDPCM intra-prediction modes.

In addition, the 'zero-out region' or 'zero-out CG' may indicate those regions/CGs which always have zero coefficients due the reduced transform size used in the secondary transform process. For example, if the secondary transform size is 16×32, and CG size is 4×4, it will be applied to the first two CGs, but only the first CG may have non-zero coefficients, the second 4×4 CG is also called zero-out CG.

Selection of Transform Matrices in RST

1. The sub-region that RST is applied to may be a sub-region which is not the top-left part of a block.
   a. In one example, RST may be applied to the top-right or bottom-right or bottom-left or center sub-region of a block.
   b. Which sub-region that RST is applied to may depend on the intra prediction mode and/or primary transform matrix (e.g., DCT-II, DST-VII, Identity transform).
2. Selection of transform set and/or transform matrix used in RST may depend on the color component.
   a. In one example, one set of transform matrix may be used for luma (or G) component, and one set for chroma components (or B/R).
   b. In one example, each color component may correspond to one set.
   c. In one example, at least one matrix is different in any of the two or multiple sets for different color components.
3. Selection of transform set and/or transform matrix used in RST may depend on intra prediction method (e.g., CCLM, multiple reference line based intra prediction method, matrix-based intra prediction method).
   a. In one example, one set of transform matrix may be used for CCLM coded blocks, and the other for non-CCLM coded blocks.
   b. In one example, one set of transform matrix may be used for normal intra prediction coded blocks, and the other for multiple reference line enabled blocks (i.e., which doesn't use the adjacent line for intra prediction).
   c. In one example, one set of transform matrix may be used for blocks with joint chroma residual coding, and the other for blocks which joint chroma residual coding is not applied.
   d. In one example, at least one matrix is different in any of the two or multiple sets for different intra prediction methods.
   e. Alternatively, RST may be disabled for blocks coded with certain intra prediction directions and/or certain coding tools, e.g., CCLM, and/or joint chroma residual coding, and/or certain color component (e.g., chroma).
4. A default intra prediction mode may be assigned for blocks (e.g., CU/PU/CB/PB) which are not coded with normal intra prediction mode, such as MIP, IBC, Palette.
   a. The default mode may be dependent on the coding method (MIP/IBC/Palette).
   b. The default mode may be signaled or derived on-the-fly.
   c. The default mode may be utilized in the derivation of chroma derived mode (DM).
   d. The default mode may be used to predict the intra-prediction modes of other blocks. For example, it may be utilized in the derivation of most-probable-mode (MPM) list for coding subsequent blocks of current block.
   e. The default mode assigned to a block of one color component (e.g., luma) may be utilized in the derivation of transform set or transform index of another color component (e.g., chroma).
   f. Alternatively, furthermore, the default modes may be stored together with the prediction modes (e.g., intra/inter/IBC).
   g. The default mode may NOT be assigned to inter coded blocks.
5. It is proposed to use the information of one luma coding block (which may also be known as the corresponding luma block) covering the same pre-defined position of the chroma coding block in all operations of the chroma intra prediction mode derivation process. For example, the same luma coding block covering the same pre-defined position of the chroma coding block is used to check the prediction modes (or coding methods, like IBC/MIP/Palette) of the luma coding block and used to fetch the intra prediction mode of the luma coding block.

a. In one example, the same pre-defined position is defined to be associated with the corresponding luma sample of the center chroma sample of current chroma block (e.g., CR in FIG. 25).

b. In one example, the same pre-defined position is defined to be associated with the corresponding luma sample of the top-left chroma sample of current chroma block (e.g., TL in FIG. 24B)).

c. Alternatively, furthermore, if the coding block covering the same pre-defined position is coded with IBC/Palette/MIP mode/any other non-normal intra-prediction mode, a default intra prediction mode may be utilized to derive chroma intra prediction mode. Otherwise, the decoded intra prediction mode of the coding block covering the same pre-defined position may be utilized to derive chroma intra prediction mode.

6. For a chroma block coded with a non-normal intra prediction mode (e.g., CCLM), when a corresponding luma block is coded with non-normal intra prediction mode (e.g., IBC/Palette/MIP), the transform set/transform matrix used in RST or other coding tools may be derived from one or multiple default modes or default transform set.

a. Whether to use default transform set/transform matrix or derive the transform set/transform matrix from intra luma prediction modes of the corresponding luma block may depend on the coded mode of the corresponding luma block.

i. In one example, if the corresponding luma block is coded with normal intra prediction mode and/or BDPCM, the transform set/transform matrix may be derived according to the luma intra prediction mode associated with the corresponding luma block (e.g., co-located luma block or the luma block defined in invention bullet 5).

ii. In one example, if the corresponding luma block is coded with non-normal intra prediction mode (e.g., IBC/Palette and/or BDPCM), a default transform set (e.g., with set index equal to K (e.g., K=0)) may be used.

b. Whether to enable RST for blocks of one color component may be dependent on the coding methods of one or multiple corresponding blocks in another color component and/or the coding method of current block.

i. Whether to enable RST for chroma blocks may be dependent on the coding methods of one or multiple corresponding luma blocks and/or the coding method of current chroma block.

ii. In one example, if the corresponding luma block is coded with normal intra prediction mode and/or BDPCM, RST may be enabled for a chroma block.

iii. In one example, if the corresponding luma block is coded with non-normal intra prediction mode (e.g., IBC/Palette and/or BDPCM), RST may be disabled for a chroma block.

1) Alternatively, furthermore, if the corresponding luma block is coded with non-normal intra prediction mode (e.g., IBC/Palette and/or BDPCM), RST may be disabled for a chroma block coded with non-normal intra prediction mode (e.g., CCLM).

c. When the co-located luma block is not coded in a normal intra prediction mode, a pre-defined intra prediction mode may be assigned, which is then used for selection of the transform set and/or transform matrix used in RST (e.g., according to the transform set selection table shown in section 2.4.2.2.3).

i. In one example, if the co-located luma block is coded in IBC (intra block copy) mode, a first pre-defined intra prediction mode (e.g., DC or planar mode) may be assigned.

ii. In one example, if the co-located luma block is coded in palette mode, a second pre-defined intra prediction mode (e.g., DC or planar mode) may be assigned.

iii. In one example, if the co-located luma block is coded in MIP mode, a third pre-defined intra prediction mode (e.g., Planar or DC mode) may assigned.

iv. In one example, if the co-located luma block is coded in BDPCM (Block-based Delta Pulse Code Modulation) mode, a fourth pre-defined intra prediction mode (e.g., Planar or DC mode) may be assigned.

v. In one example, for each of the pre-defined intra prediction modes, it may be DC mode or Planar mode or Vertical mode or Horizontal mode or 45-degree Mode or 135-degree mode.

vi. Alternatively, if the co-located luma block is coded in MIP mode, the MIP mode may be mapped to an intra prediction mode according to the MIP mode and the dimension of the co-located luma block, e.g., by using the table “Specification of mapping between MIP and intra prediction modes” in section 2.2.2.2.

vii. The predefined mode may be adaptively selected from several candidates, such as DC mode and Planar mode.

1) The predefined mode may be signaled from the encoder to the decoder.

2) The predefined mode may be derived from the encoder to the decoder.

a. For example, the predefined mode may be DC mode if the decoder determines that the current picture is a screen content picture, otherwise, the predefined mode is the Planar mode.

viii. The predefined mode may be defined in the same way as those utilized for the chroma DM derivation process (e.g., lumaIntraPredMode in sub-clause 8.4.3).

d. When the co-located luma block is coded in a normal intra prediction mode or/and BDPCM mode, a chroma intra prediction mode may be derived dependent on the intra prediction mode of the co-located luma block, in the same way as the DM mode (such as specified in section 2.7). The derived chroma intra prediction mode is then used for selection of the transform set and/or transform matrix used in RST (e.g., according to the transform set selection table shown in section 2.6).

e. In above bullets, the co-located luma block may be the coding block covering a specific luma position, such as TL in FIG. 24B or CR in FIG. 25.

7. Selection of transform set and/or transform matrices used in RST may depend on the primary transform.

a. In one example, the primary transform may include but not limited to variances of DCT-II, DST-VII, DCT-VIII, Transform skip mode, Identity transform, or transform from training (like Karhunen-Loeve transform (KLT)-based transform).
b. In one example, if the primary transform applied to one block is the identity transform (e.g., TS mode is applied to one block), the transform set and/or transform matrices used in RST may be different from other kinds of primary transform.
   i. In one example, one set of transform matrices may be used to transform skip mode.
      1) Alternatively, furthermore, one syntax element may be signaled to indicate whether RST is used or not for transform skip mode or which matrix among the set of transform matrices is used for a block.
c. In one example, if the horizontal and vertical 1-D primary transform applied to one block is the same basis (e.g., both DCT-II), the transform set and/or transform matrices used in RST may be different from that primary transforms from different basis for different directions (vertical or horizontal).
d. In one example, one set of transform matrices may be used for DCT-II (or the first primary transform), and one or multiple sets of transform matrices may be used for other primary transform modes.
e. In one example, each primary transform mode may correspond to one RST matrix set.
f. In one example, at least one matrix in one set is different in any of the two or multiple sets for different primary transform modes.

8. Selection of transform set and/or transform matrices used in RST may depend on block dimension (width/height, or ratio)/block shape (square or non-square).
   a. In one example, multiple sets of transform matrices may be used, and each set may be corresponding to one category of blocks wherein the category is determined by block dimension/block shape.
9. Multiple sets of transform matrices may be enabled for encoding/decoding a video processing unit (e.g., sequence/video/picture/slice/tile/brick/subpicture), and indication of which set(s) among those multiple sets may be utilized may be signaled in picture/slice/tile/brick/subpicture level.

Signaling of RST Side Information and Residual Coding

10. Whether to and/how to signal the side information of RST (e.g., st_idx) may depend on the last non-zero coefficient (in scanning order) in the block.
   a. In one example, only if the last non-zero coefficient is located in the CGs that RST applied to, RST may be enabled, and the index of RST may be signaled.
   b. In one example, if the last non-zero coefficient is not located in the CGs that RST applied to, RST is disabled and signaling of RST is skipped.
11. Whether to and/how to signal the side information of RST (e.g., st_idx) may depend on coefficients of certain color component instead of all available color components in a CU.
   a. In one example, only the luma information may be utilized to determine whether to and/how to signal the side information of RST.
      i. Alternatively, furthermore, the above method is applied only when a block's dimension satisfied certain conditions.
         1) The conditions are W<T1 or H<T2.
         2) For example, T1=T2=4. Therefore, for 4×4 CU, the luma block size is 4×4, two chroma blocks in 4:2:0 format is 2×2, in this case, only luma information may be utilized.
      ii. Alternatively, furthermore, the above method is applied only when current partition type tree is single tree.
   b. Whether to use one color component's information or all color components' information may depend on the block dimension/coded information.
12. Whether to and/how to signal the side information of RST (e.g., st_idx) may depend on coefficients within a partial region of one block instead of the whole block.
   a. In one example, partial region may be defined as the CGs that RST is applied to.
   b. In one example, partial region may be defined as the first or last M (e.g., M=1, or 2) CGs in scanning order or reverse scanning order of the block.
      i. In one example, M may depend on block dimension.
      ii. In one example, M is set to 2 if block size is 4×N and/or N×4 (N>8).
      iii. In one example, M is set to 1 if block size is 4×8 and/or 8×4 and/or W×H (W>=8, H>=8).
   c. In one example, information of a block (e.g., the number of non-zero coefficients of a block) with dimensions W×H may be disallowed to be taken into consideration to determine the usage of RST and/or signaling of RST related information.
      i. For example, the number of non-zero coefficients of a block may not be counted if W<T1 or H<T2. For example, T1=T2=4.
   d. In one example, the partial region may be defined as the top-left M×N region of the current block with dimensions W×H.
      i. In one example, M may be smaller than W and/or N may be smaller than H.
      ii. In one example, M and N may be fixed numbers. E.g., M=N=4.
      iii. In one example, M and/or N may depend on W and/or H.
      iv. In one example, M and/or N may depend on the maximum allowed transform size.
         1) For example, M=8 and N=4 if W is greater than 8 and H is equal to 4.
         2) For example, M=4 and N=8 if H is greater than 8 and W is equal to 4.
         3) For example, M=4 and N=4 if the none of the above two conditions is satisfied.
      v. Alternatively, furthermore, these methods may be applied only for certain block dimensions, such as the conditions in 7.c is not satisfied.
   e. In one example, the partial region may be the same to all blocks.
      i. Alternatively, it may be changed based on the block dimension, and/or coded information.
   f. In one example, the partial region may depend on the given range of scanning order index.
      i. In one example, the partial region may be that covering coefficients located in a specific range with their scanning order index within [dxS, IdxE], inclusively, based on the coefficient scanning order (e.g., the inversed decoding order) of the current block with dimensions W×H.

1) In one example, IdxS is equal to 0.
2) In one example, IdxE may be smaller than W×H−1.
3) In one example, IdxE may be fixed numbers. E.g., IdxE=15.
4) In one example, IdxE may depend on W and/or H.
a. For example, IdxE=31 if W is greater than 8 and H is equal to 4.
b. For example, IdxE=31 if H is greater than 8 and W is equal to 4.
c. For example, IdxE=7 if W is equal to 8 and H is equal to 8.
d. For example, IdxE=7 if W is equal to 4 and H is equal to 4.
e. For example, IdxE=15 if the none of the above two conditions a) and b) is satisfied.
f. For example, IdxE=15 if the none of the above two conditions a), b), c) and d) is satisfied.
g. For example, IdxE=15 if the none of the above two conditions c) and d) is satisfied.

ii. Alternatively, furthermore, these methods may be applied only for certain block dimensions, such as the conditions in 7.c is not satisfied.

g. In one example, it may depend on the position of non-zero coefficients within a partial region.
h. In one example, it may depend on the energy (such as sum of squares or sum of absolute values) of non-zero coefficients within a partial region.
i. In one example, it may depend on the number of non-zero coefficients within a partial region of one block instead of the whole block.
i. Alternatively, it may depend on the number of non-zero coefficients within a partial region of one or multiple blocks in the CU.
ii. When the number of non-zero coefficients within partial region of one block is less than a threshold, signaling of the side information of RST may be skipped.
iii. In one example, the threshold is fixed to be N (e.g., N=1 or 2).
iv. In one example, the threshold may depend on the slice type/picture type/partition tree type (dual or single)/video content (screen content or camera captured content).
v. In one example, the threshold may depend on color formats such as 4:2:0 or 4:4:4, and/or color components such as luminance (Y) or blue difference chroma (Cb)/red difference chroma (Cr).

13. When there are no non-zero coefficients in the CGs that RST may be applied to, RST shall be disabled.
a. In one example, when RST is applied to one block, at least one CG that RST is applied to must contain at least one non-zero coefficient.
b. In one example, for 4×N and/or N×4 (N>8), if RST is applied, the first two 4×4 CGs must contain at least one non-zero coefficient.
c. In one example, for 4×8 and/or 8×4, if RST is applied, the top-left 4×4 must contain at least one non-zero coefficient.
d. In one example, for W×H (W>=8 and H>=8), if RST is applied, the top-left 4×4 must contain at least one non-zero coefficient.
e. A conformance bitstream must satisfy one or multiple of above conditions.

Figure 21:
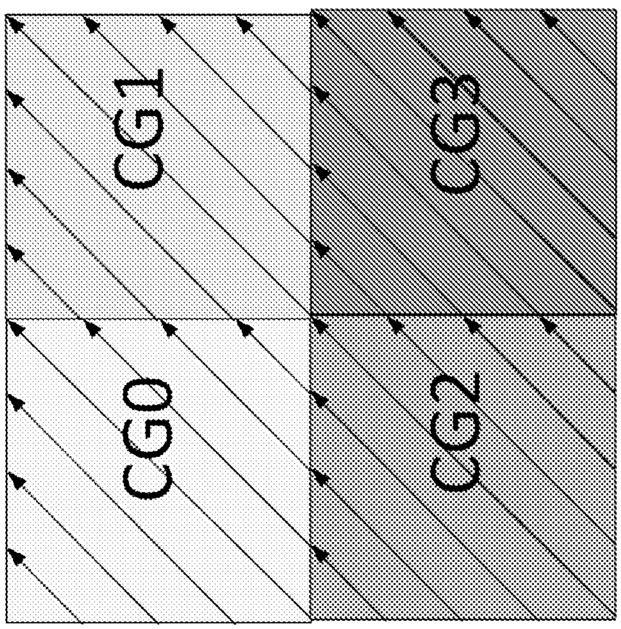
FIG. 21 an example of an 8×8 block with 4 coding groups.

14. RST related syntax elements may be signaled before coding residuals (e.g., transform coefficients/directly quantized).
a. In one example, the counting of number of non-zero coefficients in the Zero-out region (e.g., numZeroOutSigCoeff) and number of non-zero coefficients in the whole block (e.g., numSigCoeff) is removed in the parsing process of coefficients.
b. In one example, the RST related syntax elements (e.g, st_idx) may be coded before residual coding.
c. RST related syntax elements may be conditionally signaled (e.g., according to coded block flags, TS mode usage).
vi. In one example, the RST related syntax elements (e.g, st_idx) may be coded after the signaling of coded block flags or after the signaling of TS/MTS related syntax elements.
vii. In one example, when TS mode is enabled (e.g., the decoded transform_skip_flag is equal to 1), the signaling of RST related syntax elements is skipped.
d. Residual related syntax may not be signaled for zero-out CGs.
e. How to code residuals (e.g., scanning order, binarization, syntax to be decoded, context modeling) may depend on the RST.
i. In one example, raster scanning order instead of diagonal up-right scanning order may be applied.
1) The raster scanning order is from left to right and top to below, or in the reverse order.
2) Alternatively, vertical scanning order (from top to below and from left to right, or in the reverse order) instead of diagonal up-right scanning order may be applied.
3) Alternatively, furthermore, context modeling may be modified.
a. In one example, the context modeling may depend on the previously coded information in a template which are the most recent N neighbors in the scan order, instead of using right, bottom, bottom-right neighbors.
b. In one example, the context modeling may depend on the previously coded information in a template according to the scanned index (e.g., −1, −2, . . . assuming current index equal to 0).
ii. In one example, different binarization methods (e.g., rice parameter derivation) may be applied to code the residuals associated with RST-coded and non-RST-coded blocks.
iii. In one example, signaling of certain syntax elements may be skipped for RST coded blocks.
1) Signaling of the CG coded block flags (coded_sub_block_flag) for the CGs that RST is applied to may be skipped.
a. In one example, when RST8×8 applied to the first three CGs in diagonal scan order, signaling of CG coded block flags is skipped for the second and third CGs, e.g., the top-right 4×4 CG and left-below 4×4 CG in the top-left 8×8 region of the block.
i. Alternatively, furthermore, the corresponding CG coded block flag is inferred to be 0, i.e., all coefficients are zero.
b. In one example, when RST is applied to one block, signaling of CG coded block flag is skipped for the first CG in the scanning order (or the last CG in the reverse scanning order).

ii. Alternatively, furthermore, the CG coded block flag for the top-left CG in the block is inferred to be 1, i.e., it contains at least one non-zero coefficient.

c. An example of 8×8 block is depicted in FIG. 21. When RST8×8 or RST4×4 is applied to the 8×8 block, coded_sub_block_flag of CG0 is inferred to be 1, coded_sub_block_flag of CG1 and CG2 are inferred to be 0.

2) Signaling of the magnitudes of coefficients and/or the sign flags for certain coordinates may be skipped.

a. In one example, if the index relative to one CG in a scan order is no less than the maximum allowed index that non-zero coefficient may exist (e.g., nonZeroSize in section 0), the signaling of coefficients may be skipped.

b. In one example, signaling of the syntax elements, such as sig_coeff_flag, abs_level_gtX_flag, par_level_flag, abs_remainder, coeff_sign_flag, dec_abs_level may be skipped.

3) Alternatively, signaling of residuals (e.g., CG coded block flags, the magnitudes of coefficients and/or the sign flags for certain coordinates) may be kept, however, the context modeling may be modified to be different from other CGs.

iv. In one example, the coding of residuals in RST-applied CGs and other CGs may be different.

1) For above sub-bullets, they may be applied only to the CGs which RST are applied.

15. RST related syntax elements may be signaled before other transform indications, such as transform skip and/or MTS index.

a. In one example, the signaling of transform skip may depend on RST information.

i. In one example, transform skip indication is not signaled and inferred to be 0 for a block if RST is applied in the block.

b. In one example, the signaling of MTS index may depend on RST information.

i. In one example, one or multiple MTS transform indication is not signaled and inferred to be not used for a block if RST is applied in the block.

16. It is proposed to use different context modeling methods in arithmetic coding for different parts within one block.

a. In one example, the block is treated to be two parts, the first M CGs in the scanning order, and remaining CGs.

i. In one example, M is set to 1.

ii. In one example, M is set to 2 for 4×N and N×4 (N>8) blocks; and set to 1 for all the other cases.

b. In one example, the block is treated to be two parts, sub-regions where RST is applied, and sub-regions where RST is not applied.

i. If RST4×4 is applied, the RST applied sub-region is the first one or two CGs of the current block.

ii. If RST4×4 is applied, the RST applied sub-region is the first three CGs of the current block.

c. In one example, it is proposed to disable the usage of previously coded information in the context modeling process for the first part within one block but enable it for the second part.

d. In one example, when decoding the first CG, the information of the remaining one or multiple CGs may be disallowed to be used.

i. In one example, when coding the CG coded block flag for the first CG, the value of the second CG (e.g., right or below) is not taken into consideration.

ii. In one example, when coding the CG coded block flag for the first CG, the value of the second and third CG (e.g., right and below CGs for W×H (W>=8 and H>=8)) is not taken into consideration.

iii. In one example, when coding the current coefficient, if its neighbor in the context template is in a different CG, the information from this neighbor is disallowed to be used.

e. In one example, when decoding coefficients in the RST applied region, the information of the rest region that RST is not applied to may be disallowed to be used.

f. Alternatively, furthermore, the above methods may be applied under certain conditions.

i. The condition may include whether RST is enabled or not.

ii. The condition may include the block dimension.

Context Modeling in Arithmetic Coding of RST Side Information

17. When coding the RST index, the context modeling may depend on whether explicit or implicit multiple transform selection (MTS) is enabled.

a. In one example, when implicit MTS is enabled, different contexts may be selected for blocks coded with same intra prediction modes.

i. In one example, the block dimensions such as shape (square or non-square) is used to select the context.

b. In one example, instead of checking the transform index (e.g, tu_mts_idx) coded for the explicit MTS, the transform matrix basis may be used instead.

i. In one example, for transform matrix basis with DCT-II for both horizontal and vertical 1-D transforms, the corresponding context may be different from other kinds of transform matrices.

18. When coding the RST index, the context modeling may depend on whether CCLM is enabled or not (e.g., sps_cclm_enabled_flag).

a. Alternatively, whether to enable or how to select the context for RST index coding may depend on whether CCLM is applied to one block.

b. In one example, the context modeling may depend on whether CCLM is enabled for current block.

i. In one example, the intraModeCtx=sps_cclm_enabled_flag?(intra_chroma_pred_mode[x0][y0] is CCLM: intra_chroma_pred_mode[x0][y0] is DM)?1:0.

c. Alternatively, whether to enable or how to select the context for RST index coding may depend on whether the current chroma block is coded with the DM mode.

i. In one example, the intraModeCtx=(intra_chroma_pred_mode[x0][y0]==(sps_cclm_enabled_flag?7:4))?1:0.

19. When coding the RST index, the context modeling may depend on the block dimension/splitting depth (e.g., quadtree depth and/or BT/TT depth).

20. When coding the RST index, the context modeling may depend on the color formats and/or color components.

21. When coding the RST index, the context modeling may be independent from the intra prediction modes, and/or the MTS index.
22. When coding the RST index, the first and/or second bin may be context coded with only one context; or bypass coded.
    a. In one example, the first bin may be context coded and context modeling is purely dependent on the partitioning tree type (i.e., single tree or dual tree), and the second bin is bypass coded.
        i. Alternatively, furthermore, the above method is invoked for a given slice type. For different slice types, different contexts may be utilized.

Invoking RST Process Under Conditions

23. Whether to invoke the inverse RST process may depend on the CG coded block flags.
    a. In one example, if the top-left CG coded block flag is zero, there is no need invoke the process.
        i. In one example, if the top-left CG coded block flag is zero and the block size is unequal to 4×N/N×4 (N>8), there is no need invoke the process.
    b. In one example, if the first two CG coded block flags in the scanning order are both equal to zero, there is no need invoke the process.
        i. In one example, if the first two CG coded block flags in the scanning order are both equal to zero and the block size is equal to 4×N/N×4 (N>8), there is no need invoke the process.
24. Whether to invoke the inverse RST process may depend on block dimension.
    a. In one example, for certain block dimensions, such as 4×8/8×4, RST may be disabled. Alternatively, furthermore, signaling of RST related syntax elements may be skipped.

Unification for Dual-Tree and Single Tree Coding

25. The usage of RST and/or signaling of RST related information may be determined in the same way in the dual-tree and single tree coding.
    a. For example, when the number of counted non-zero coefficients (e.g., numSigCoeff specified in JVET-N0193) is not larger than T1 in the dual-tree coding case or not larger than T2 in the single-tree coding, RST should not be applied, and the related information is not signaled, wherein T1 is equal to T2.
    b. In one example, T1 and T2 are both set to N, e.g., N=1 or 2.

Considering Multiple TUs in a CU.

26. Whether to and/or how to apply RST may depend on the block dimensions W×H.
    a. In one example, when RST may not be applied if the W>T1 or H>T2.
    b. In one example, when RST may not be applied if the W>T1 and H>T2.
    c. In one example, when RST may not be applied if the W*H>=T.
    d. For above examples, the following apply:
        i. In one example, the block is a CU.
        ii. In one example, T1=T2=64.
        iii. In one example, T1 and/or T2 may depend on the allowed maximum transform size. E.g., T1=T2=the allowed maximum transform size.
        iv. In one example, T is set to 4096.
    e. Alternatively, furthermore, if RST is determined not to be applied, related information may not be signaled.
27. When there are N (N>1) TUs in a CU, coded information of only one of the N TUs is used to determine the usage of RST and/or signaling of RST related information.
    a. In one example, the first TU of the CU in decoding order may be used to make the determination.
    b. In one example, the top-left TU of the CU in decoding order may be used to make the determination.
    c. In one example, the determination with the specific TU may be made in the same way to the case when there is only one TU in the CU.
28. Usage of RST and/or signaling of RST related information may be performed in the TU-level or PU-level instead of CU-level.
    a. Alternatively, furthermore, different TUs/PUs within a CU may choose different secondary transform matrices or enabling/disabling control flags.
    b. Alternatively, furthermore, for the dual tree case and chroma blocks are coded, different color components may choose different secondary transform matrices or enabling/disabling control flags.
    c. Alternatively, whether to signal RST related information in which video unit level may depend on the partition tree type (dual or single).
    d. Alternatively, whether to signal RST related information in which video unit level may depend on the relationship between a CU/PU/TU and maximum allowed transform block sizes, such as larger or smaller.

Unification of Zero-Out Range.

29. The zero-out region may depend on the dimensions (e.g., size) of the sub-block that RST is applied to.
    a. In one example, suppose nonZeroSize is equal to nonZeroSizeA when the size of the current sub-block is M×N and nonZeroSize (i.e., number of samples in the Zero-out region) is equal to nonZeroSizeB when the size of the current sub-block is K×L. When Min(M, N) is no smaller than Min(K, L), then nonZeroSizeA is no smaller than nonZeroSizeB. For example, M=8, N=8, K=4, L=4, and nonZeroSizeA=16, nonZeroSizeB=8.
    b. In one example, if the sub-block size is 4×4, (e.g., either width or height of a block is equal to 4), the nonZeroSize may be set to a fixed value L (e.g., L is equal to 8).
        i. In one example, for 4×N or N×4 blocks, the nonZeroSize may be set to a fixed value L.
    c. In one example, if the sub-block size is 8×8, (e.g., either width or height of a block is equal to 8), the nonZeroSize may be set to a fixed value L (e.g., L is equal to 8).
        i. In one example, for 8×N or N×8 blocks, the nonZeroSize may be set to a fixed value L.
    d. Alternatively, the nonZeroSize may be set to a fixed value L (e.g., L is equal to 8) regardless of the block sizes.
30. The zero-out region may depend on the secondary transform size.
    e. In one example, it may depend on whether RST4×4 or RST8×8 is applied.
    f. In one example, suppose nonZeroSize (i.e., number of samples in the Zero-out region) is equal to nonZeroSizeA when RST8×8 is applied and nonZeroSize is equal to nonZeroSizeB when RST4×4 is applied. Then nonZeroSizeA is no smaller than nonZeroSizeB. For example, nonZeroSizeA=16 and nonZeroSizeB=8.

Reduction of the Dimension of the Transform Matrices.

Figure 26:
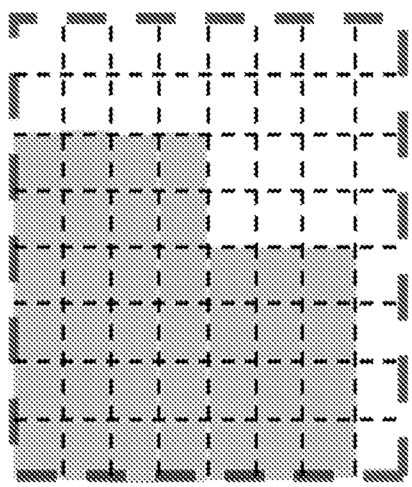
FIG. 26 shows an example of partial region allowed to have coefficients.

31. The dimension(s) of the transform and/or inverse-transform matrices for RST may be reduced.
   g. In one example, the dimensions of the transform matrices of RST4×4 can be reduced to ½, ¼, or ⅛ of its original dimension(s). For example, the original dimension(s) of the transform matrices of RST4×4 is 16×16. The dimensions can be reduced to 16×8, 16×4 or 16×2.
   h. In one example, the dimension(s) of the transform and/or inverse-transform matrices of RST8×8 can be reduced to ½, ¼, or ⅛ of its original dimension(s). For example, the dimension of the transform matrices of RST8×8 may be reduced to 48×8, 48×4 or 48×2 from 48×16.
      i. Alternatively, furthermore, the zero-out region may be dependent on the dimension of reduced dimension.
32. One or multiple residual patterns may be defined. A residual pattern may be a block with masks to define wherein the coefficients after inverse transform may be assigned to. For example, for a region with dimensions M*N, only partial of them are allowed to have coefficients.
   a. In one example, the pattern is defined in FIG. 26, wherein the highlighted part may be associated with transform coefficients and the remaining parts are associated with zero coefficients.
      i. In one example, the pattern may be not consecutive, that is, one position may be associated with coefficient, and four of its neighboring positions are not associated with coefficient.
   b. In one example, the above pattern may be applied to certain blocks such as 8×8 and/or M×N (M>8, N>8) regardless the signaled transform index.
   c. In one example, whether and/or how to apply the above pattern may depend on the which transform(s) is (are) used in the current block (e.g., whether RST is applied, or certain primary transform (e.g., DCT2) is applied).
      i. For example, the pattern is applied only when RST is applied.
         1) For example, the pattern is applied when and only when RST is applied on a M×N (M>=8, N>=8) block regardless the signaled transform index.
            a. Alternatively, furthermore, bullet 27-29 may be applied.
      ii. For example, the pattern is applied when a certain transform is used.
   d. In one example, there may be multiple residual patterns defined or derived from a larger residual pattern with more coefficients allowed.
      iii. In one example, for each residual pattern, multiple transform matrices may be defined.
         1) Alternatively, furthermore, the indication of selected residual pattern as well as the transform among the multiple ones associated with the selected pattern may be further signaled.
      iv. In one example, a residual pattern may be derived by excluding positions which are associated with smaller transform coefficients in a K*L transform matrix.
         1) In one example, a first residual pattern may be derived by excluding positions which are associated with the first K0 smallest transform coefficients. Therefore, (K*L−K0) positions may be assigned with residuals.
         2) In one example, a second residual pattern may be derived by excluding positions which are associated with the first K1 smallest transform coefficients wherein K1 is unequal to K0. Therefore, (K*L−K1) positions may be assigned with residuals.
   e. In one example, the above examples may be applied to blocks smaller than maximum transform blocks.
   f. In one example, how to select the pattern may depend on color component/coded information of current block and/or its neighboring blocks.
   g. In one example, 'RST is applied to a block' means that secondary transform is applied to that block (e.g., LFNST index unequal to 0 (e.g., equal to 1 or 2)).

Retrained LFNST Matrices and Signaling

33. The RST matrices may be modified.
   a. In one example, the 16×16 RST matrices may be modified to be lowFreqTransMatrix shown in 0 with nTrS equal to 16.
   b. In one example, the 16×48 RST matrices may be modified to be lowFreqTransMatrix shown in 0 with nTrS equal to 48.
34. The RST matrices may be modified by online retraining.
   a. In one example, the RST matrices may be retrained from the reconstructed transform coefficient blocks, and eigen decomposition (or spectral decomposition) may be applied to calculate the eigenvalues and eigenvectors. The eigenvectors or the sorted eigenvectors may constitute the retrained RST matrices.
      i. In one example, the RST retraining may be applied at both the encoder and the decoder.
      ii. In one example, the RST retraining may be only applied at the encoder.
   b. In one example, the RST matrices may be modified only after encoding or decoding an intra slice (or intra picture).
   c. In one example, the retrained RST matrices may be used to replace the original RST matrices.
      i. Alternatively, the retrained RST matrices may be used to replace part of the original RST matrices.
   d. In one example, the retrained RST matrices may be used as additional set of RST matrices.
   e. In one example, the retrained RST matrices may be signaled from the encoder to the decoder.
      i. In one example, the retrained RST matrices may be signaled in Slice header, Picture header (or Picture Parameter Set (PPS)), or Adaption Parameter Set (APS).
      ii. In one example, the difference values between the original RST matrix and the retrained RST matrix may be signaled.
         1) Alternatively, the difference values between the RST matrix previously signaled and the retrained RST matrix may be signaled.
      iii. In one example, only part of the retrained RST matrix may be signaled.
         1) In one example, only N sets of the retrained M sets of RST matrices (N<M) are signaled.
         2) In one example, only top-left W*H sub-matrix in an RST matrix is signaled.

The examples described above may be incorporated in the context of the methods described below, e.g., methods 2200, 2210, 2220, 2230, 2240 and 2250, which may be implemented at a video decoder or a video encoder.

Figure 22A:
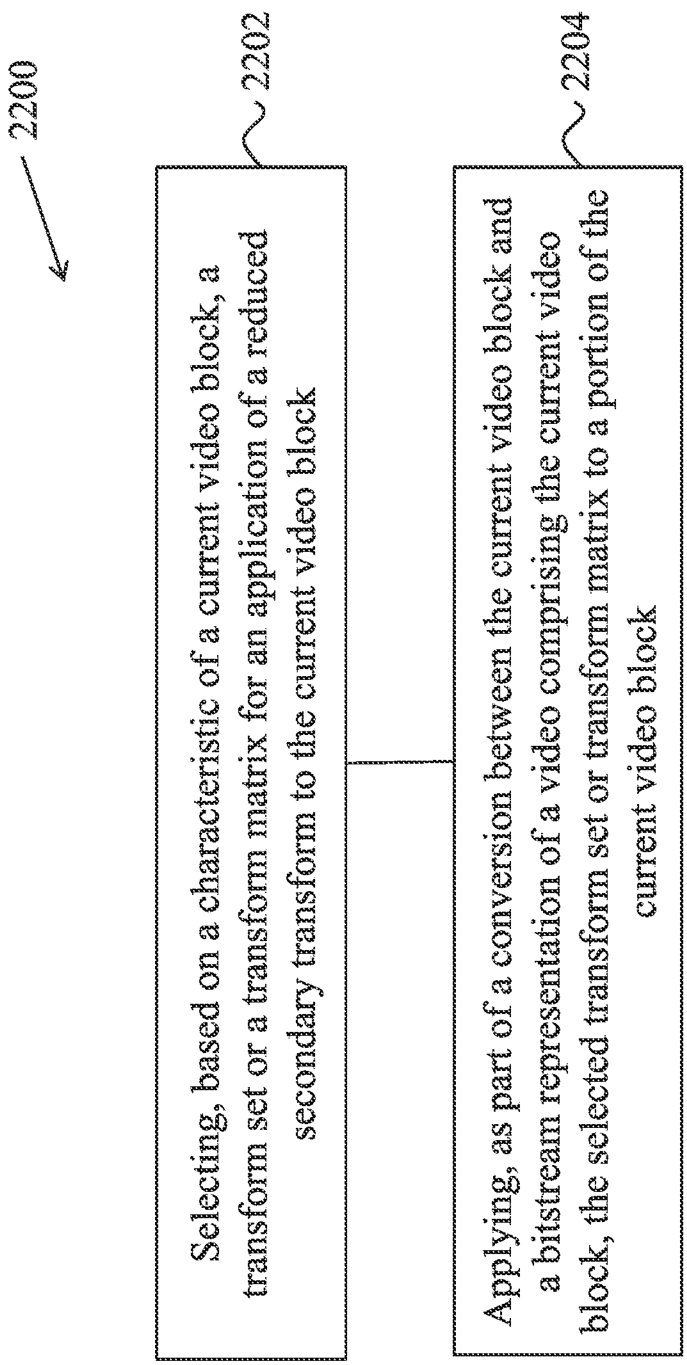
FIGS. 22A to 22F show flowcharts of example methods for video processing.

FIG. 22A shows a flowchart of an exemplary method for video processing. The method 2200 includes, at step 2202, selecting, based on a characteristic of a current video block, a transform set or a transform matrix for an application of a reduced secondary transform to the current video block.

The method 2200 includes, at step 2204, applying, as part of a conversion between the current video block and a bitstream representation of a video comprising the current video block, the selected transform set or transform matrix to a portion of the current video block.

In some embodiments, the portion of the current video block is a top-right sub-region, bottom-right sub-region, bottom-left sub-region or center sub-region of the current video block.

In some embodiments, the characteristic of the current video block is an intra prediction mode or a primary transform matrix of the current video block.

In some embodiments, the characteristic is a color component of the current video block. In an example, a first transform set is selected for a luma component of the current video block, and wherein a second transform set different from the first transform set is selected for one or more chroma components of the current video block.

In some embodiments, the characteristic is an intra prediction mode or an intra coding method of the current video block. In an example, the intra prediction method comprises a multiple reference line (MRL)-based prediction method or a matrix-based intra prediction method. In another example, a first transform set is selected when the current video block is a cross-component linear model (CCLM) coded block, and wherein a second transform set different from the first transform set is selected when the current video block is a non-CCLM coded block. In yet another example, a first transform set is selected when the current video block is coded with a joint chroma residual coding method, and wherein a second transform set different from the first transform set is selected when the current video block is not coded with the joint chroma residual coding method.

In some embodiments, the characteristic is a primary transform of the current video block.

Figure 22B:
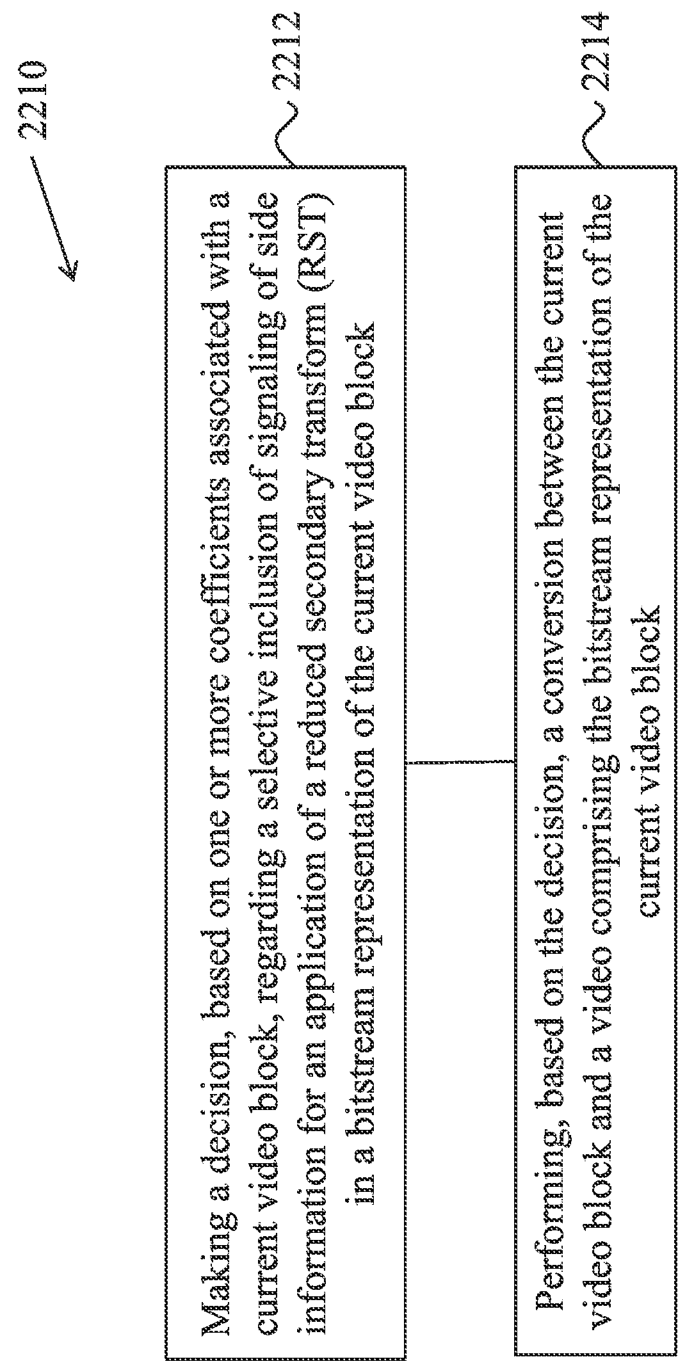

FIG. 22B shows a flowchart of an exemplary method for video processing. The method 2210 includes, at step 2212, making a decision, based on one or more coefficients associated with a current video block, regarding a selective inclusion of signaling of side information for an application of a reduced secondary transform (RST) in a bitstream representation of the current video block.

The method 2210 includes, at step 2214, performing, based on the decision, a conversion between the current video block and a video comprising the bitstream representation of the current video block.

In some embodiments, the one or more coefficients comprises a last non-zero coefficient in a scanning order of the current video block.

In some embodiments, the one or more coefficients comprises a plurality of coefficients within a partial region of the current video block. In an example, the partial region comprises one or more coding groups that the RST could be applied to. In another example, the partial region comprises a first M coding groups or a last M coding groups in a scanning order of the current video block. In yet another example, the partial region comprises a first M coding groups or a last M coding groups in a reverse scanning order of the current video block. In yet another example, making the decision is further based on an energy of one or more non-zero coefficients of the plurality of coefficients.

Figure 22C:
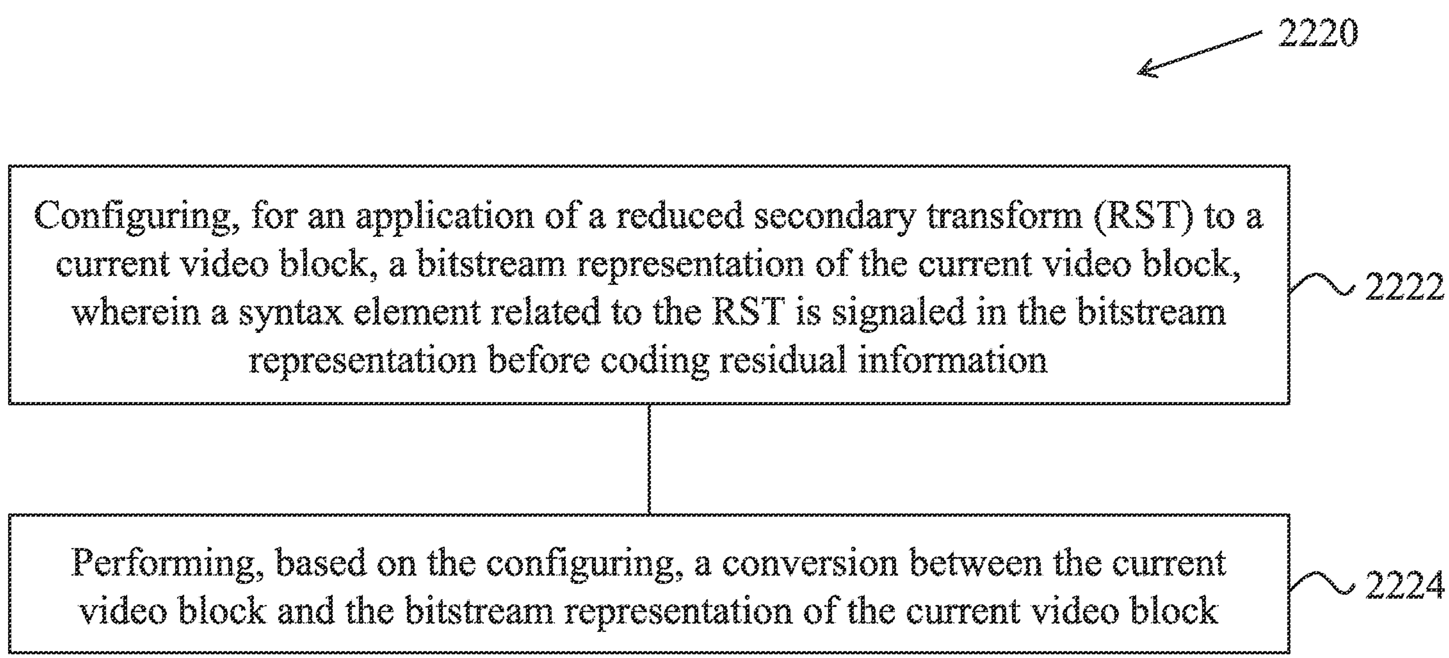

FIG. 22C shows a flowchart of an exemplary method for video processing. The method 2220 includes, at step 2222, configuring, for an application of a reduced secondary transform (RST) to a current video block, a bitstream representation of the current video block, wherein a syntax element related to the RST is signaled in the bitstream representation before coding residual information.

The method 2220 includes, at step 2224, performing, based on the configuring, a conversion between the current video block and the bitstream representation of the current video block.

In some embodiments, signaling the syntax element related to the RST is based on at least one coded block flag or a usage of a transform selection mode.

In some embodiments, the bitstream representation excludes the coding residual information corresponding to coding groups with all zero coefficients.

In some embodiments, the coding residual information is based on the application of the RST.

Figure 22D:
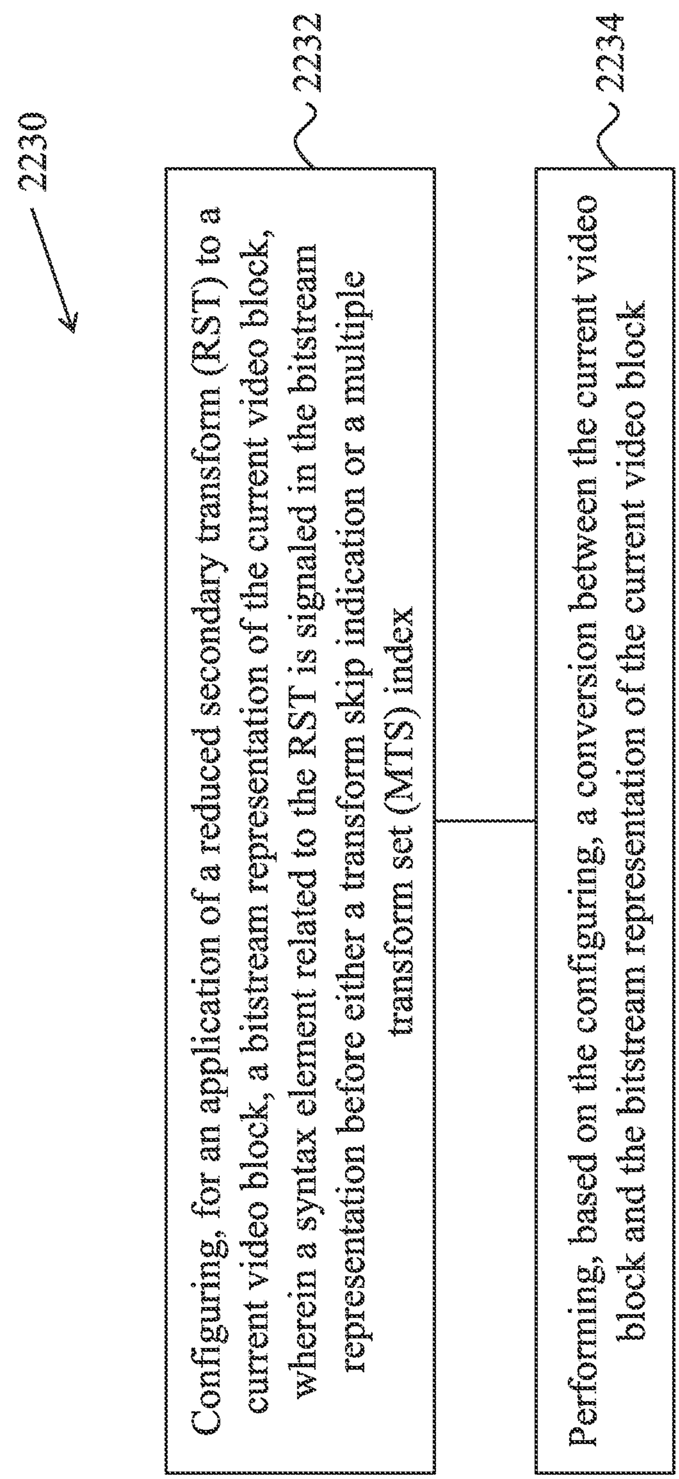

FIG. 22D shows a flowchart of an exemplary method for video processing. The method 2230 includes, at step 2232, configuring, for an application of a reduced secondary transform (RST) to a current video block, a bitstream representation of the current video block, wherein a syntax element related to the RST is signaled in the bitstream representation before either a transform skip indication or a multiple transform set (MTS) index.

The method 2230 includes, at step 2234, performing, based on the configuring, a conversion between the current video block and the bitstream representation of the current video block.

In some embodiments, the transform skip indication or the MTS index is based on the syntax element related to the RST.

Figure 22E:
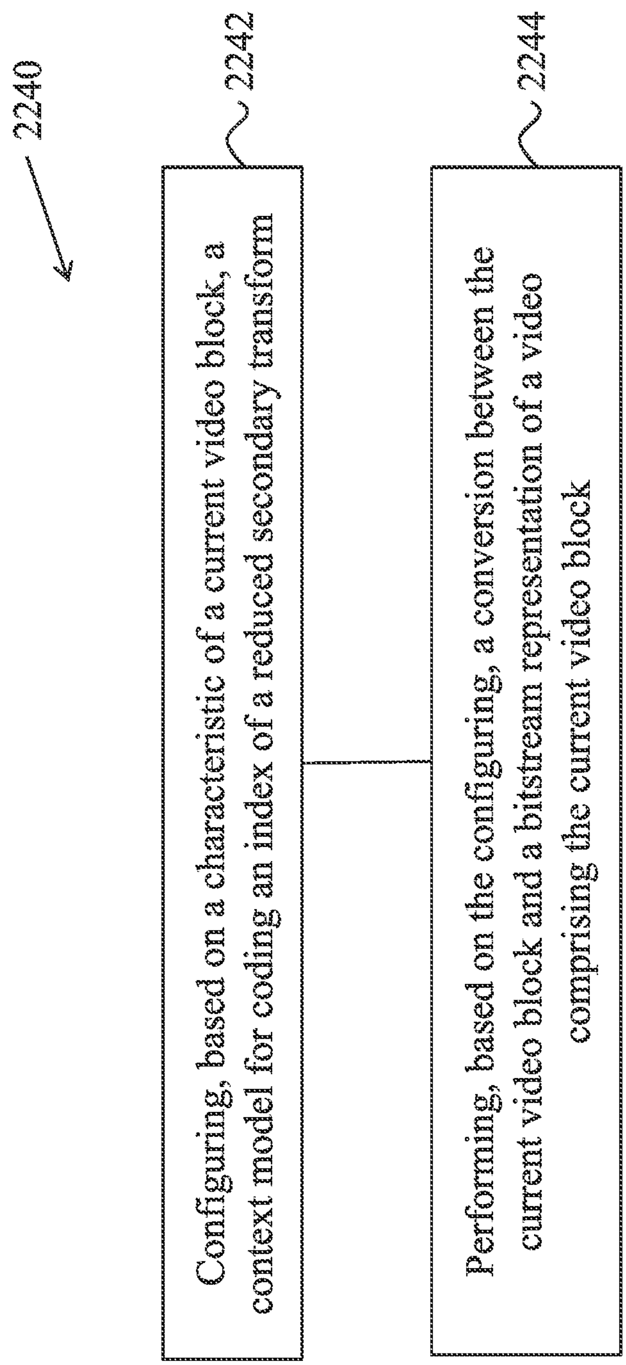

FIG. 22E shows a flowchart of an exemplary method for video processing. The method 2240 includes, at step 2242, configuring, based on a characteristic of a current video block, a context model for coding an index of a reduced secondary transform (RST).

The method 2240 includes, at step 2244, performing, based on the configuring, a conversion between the current video block and a bitstream representation of a video comprising the current video block.

In some embodiments, the characteristic is an explicit or implicit enablement of a multiple transform selection (MTS) process.

In some embodiments, the characteristic is an enablement of a cross-component linear model (CCLM) coding mode in the current video block.

In some embodiments, the characteristic is a size of the current video block.

In some embodiments, the characteristic is a splitting depth of a partitioning process applied to the current video block. In an example, the partitioning process is a quadtree (QT) partitioning process, a binary tree (BT) partitioning process or a ternary tree (TT) partitioning process.

In some embodiments, the characteristic is a color format or a color component of the current video block.

In some embodiments, the characteristic excludes an intra prediction mode of the current video block and an index of a multiple transform selection (MTS) process.

Figure 22F:
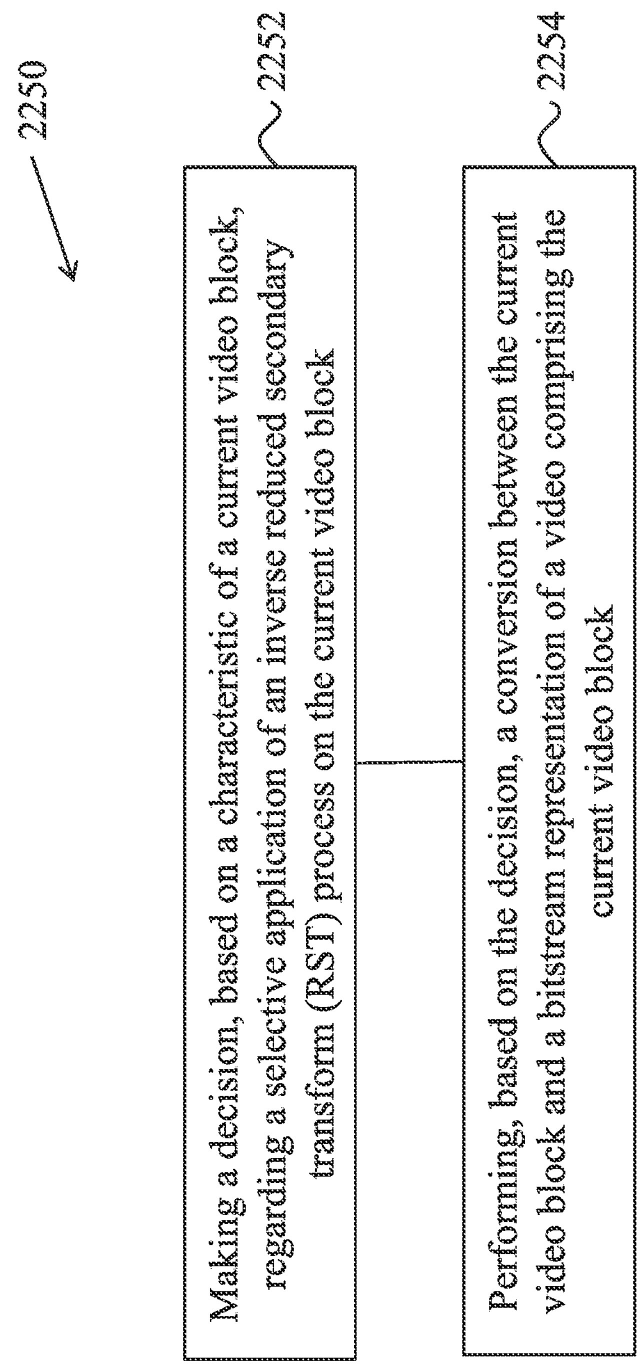

FIG. 22F shows a flowchart of an exemplary method for video processing. The method 2250 includes, at step 2252, making a decision, based on a characteristic of a current video block, regarding a selective application of an inverse reduced secondary transform (RST) process on the current video block.

The method 2250 includes, at step 2254, performing, based on the decision, a conversion between the current video block and a bitstream representation of a video comprising the current video block.

In some embodiments, the characteristic is a coded block flag of a coding group of the current video block. In an example, the inverse RST process is not applied, and wherein the coded block flag of a top-left coding group is zero. In another example, the inverse RST process is not applied, and wherein coded block flags for a first and a second coding group in a scanning order of the current video block are zero.

In some embodiments, the characteristic is a height (M) or a width (N) of the current video block. In an example, the inverse RST process is not applied, and wherein (i) M=8 and N=4, or (ii) M=4 and N=8.

As further described in the listing in the previous section (e.g., items 27 to 29), in some embodiments, a method of video processing includes determining, for a conversion between a coded representation of a current video block comprising sub-blocks and the current video block, a zero-out region applied for the conversion of the sub-blocks based on a coding condition; and performing the conversion based on the determining.

In this method, the coding condition comprises a size of the sub-blocks (see, e.g., item 27).

In this method, the coding condition includes a size of a secondary transform used during the conversion (see, e.g., item 28).

In some embodiments, the conversion may be performed using reduced size transform matrices (see, e.g., item 29).

5 Example Implementations of the Disclosed Technology

In the following exemplary embodiments, the changes are on top of JVET-N0193. Deleted texts are marked with double brackets (e.g., [[a]] denotes the deletion of the character "a").

5.1 Embodiment #1

Signaling of RST index is dependent on number of non-zero coefficients within a sub-region of the block, instead of the whole block.

7.3.6.11 Residual Coding Syntax

| residual_coding( x0, y0, log2TbWidth, log2TbHeight, cIdx ) { | Descriptor |
|---|---|
| if( ( tu_mts_idx[ x0 ][ y0 ] > 0 \| \| ( cu_sbt_flag && log2TbWidth < 6 && log2TbHeight < 6 ) ) && cIdx = = 0 && log2TbWidth > 4 ) | |
| log2TbWidth = 4 | |
| else | |
| log2TbWidth = Min ( log2TbWidth, 5 ) | |
| if( tu_mts_idx[ x0 ][ y0 ] > 0 \| \| ( cu_sbt_flag && log2TbWidth < 6 && log2TbHeight < 6 ) ) && cIdx = = 0 && log2TbHeight > 4 ) | |
| log2TbHeight = 4 | |
| else | |
| log2TbHeight = Min ( log2TbHeight, 5 ) | |
| if( log2TbWidth > 0 ) | |
| last_sig_coeff_x_prefix | ae(v) |

-continued

| residual_coding( x0, y0, log2TbWidth, log2TbHeight, cIdx ) { | Descriptor |
|---|---|
| if( log2TbHeight > 0 ) | |
| last_sig_coeff_y_prefix | ae(v) |
| if( last_sig_coeff_x_prefix > 3 ) | |
| last_sig_coeff_x_suffix | ae(v) |
| if( last_sig_coeff_y_prefix > 3 ) | |
| last_sig_coeff_y_suffix | ae(v) |
| log2SbW = ( Min( log2TbWidth, log2TbHeight ) < 2 ? 1 : 2 ) | |
| log2SbH = log2SbW | |
| if ( log2TbWidth < 2 && cIdx = = 0 ) { | |
| log2SbW = log2TbWidth | |
| log2SbH = 4 − log2SbW | |
| } else if ( log2TbHeight < 2 && cIdx = = 0 ) { | |
| log2SbH = log2TbHeight | |
| log2SbW = 4 − log2SbH | |
| } | |
| numSbCoeff = 1 << ( log2SbW + log2SbH ) | |
| lastScanPos = numSbCoeff | |
| lastSubBlock = ( 1 << ( log2TbWidth + log2TbHeight − ( log2SbW + log2SbH ) ) ) − 1 | |
| do { | |
| if( lastScanPos = = 0 ) { | |
| lastScanPos = numSbCoeff | |
| lastSubBlock− − | |
| } | |
| lastScanPos− − | |
| xS = DiagScanOrder [ log2TbWidth − log2SbW ] [ log2TbHeight − log2SbH ] [ lastSubBlock ][ 0 ] | |
| yS = DiagScanOrder [ log2TbWidth − log2SbW ] [ log2TbHeight − log2SbH ] [ lastSubBlock ][ 1 ] | |
| xC = ( xS << log2SbW ) + DiagScanOrder[ log2SbW ] [ log2SbH ][ lastScanPos ][ 0 ] | |
| yC = ( yS << log2SbH ) + DiagScanOrder[ log2SbW ] [ log2SbH ][ lastScanPos ][ 1 ] | |
| } while( ( xC != LastSignificantCoeffX ) \| \| ( yC != LastSignificantCoeffY ) ) | |
| QState = 0 | |
| for( i = lastSubBlock; i >= 0; i− − ) { | |
| startQStateSb = QState | |
| xS = DiagScanOrder [ log2TbWidth − log2SbW ] [ log2TbHeight − log2SbH ] [ lastSubBlock ][ 0 ] | |
| yS = DiagScanOrder [ log2TbWidth − log2SbW ] [ log2TbHeight − log2SbH ] [ lastSubBlock ][ 1 ] | |
| inferSbDcSigCoeffFlag = 0 | |
| if( ( i < lastSubBlock ) && ( i > 0 ) ) { | |
| coded_sub_block_flag [ xS ][ yS ] | ae(v) |
| inferSbDcSigCoeffFlag = 1 | |
| } | |
| firstSigScanPosSb = numSbCoeff | |
| lastSigScanPosSb = −1 | |
| remBinsPass1 = ( ( log2SbW + log2SbH ) < 4 ? 8 : 32 ) | |
| firstPosMode0 = ( i = = lastSubBlock ? lastScanPos : numSbCoeff − 1 ) | |
| firstPosMode1 = −1 | |

-continued

```
residual_coding( x0, y0,
log2TbWidth, log2TbHeight,
cIdx ) {                                                Descriptor

  for( n = firstPosMode0; n >= 0
  && remBinsPass1 >= 4;
  n− − ) {
    xC = ( xS << log2SbW ) +
    DiagScanOrder[ log2SbW ]
    [ log2SbH ][ n ][ 0 ]
    yC = ( yS << log2SbH ) +
    DiagScanOrder[ log2SbW ]
    [ log2SbH ][ n ][ 1 ]
    if( coded_sub_block_flag
    [ xS ][ yS ] && ( n > 0 | |
    !inferSbDcSigCoeffFlag ) &&
      ( xC !=
      LastSignificantCoeff | |
      yC != Last
      SignificantCoeffY ) ) {
      sig_coeff_flag[ xC ][ yC ]                        ae(v)
      remBinsPass1
      if( sig_coeff_flag
      [ xC ][ yC ] )
        inferSbDcSigCoeffFlag = 0
    }
    if( sig_coeff_flag
    [ xC ][ yC ] ) {
      if( !transform_skip_
      flag[ x0 ][ y0 ] ) {
            if ( i == 0 | |
( i == 1 &&
      (log2TbWidth & log2TbHeight = 5)))
              numSigCoeff++
        if( ( ( ( log2TbWidth == 2
        && log2TbHeight == 2 ) | |
        ( log2TbWidth == 3 &&
            log2TbHeight == 3 ) ) &&
            n >= 8 && i == 0 ) | |
( (
            log2TbWidth >= 3 &&
            log2TbHeight >= 3 &&
( i == 1 | | i == 2 ) ) ) ) ) {
          numZeroOutSigCoeff++
        }
      }
      abs_level_gt1_flag[ n ]                           ae(v)
      remBinsPass1− −
      if( abs_level_gt1_
      flag[ n ] ) {
        par_level_flag[ n ]                             ae(v)
        remBinsPass1− −
        abs_level_gt3_flag[ n ]                         ae(v)
        remBinsPass1− −
      }
      if( lastSigScanPosSb = =
      −1 )
        lastSigScanPosSb = n
      firstSigScanPosSb = n
    }
...
  }
}
```

Alternatively, the condition may be replaced by:

```
if (i = 0 [[|| (i == 1 &&
(log2TbWidth +
log2TbHeight ==5))]])
```

5.2 Embodiment #2

RST may not be invoked according to coded block flags of certain CGs.

8.7.4. Transformation Process for Scaled Transform Coefficients 8.7.4.1 General

Inputs to this Process are:

- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

A variable bInvokeST is set to 0, and further modified to be 1 if one of the following conditions is true:

- if coded_sub_block_flag[0][0] is equal to 1 and nTbW×nTbH !=32
- if coded_sub_block_flag[0][0] and coded_sub_block_flag[0][1] is equal to 1 and nTbW is equal to 4 and nTbH is greater than 8
- if coded_sub_block_flag[0][0] and coded_sub_block_flag[1][0] is equal to 1 and nTbW is greater than 8 and nTbH is equal to 4

If bInvokeST is equal to 1 and st_idx[xTbY][yTbY] is not equal to 0, the following applies:

1. The variables nStSize, log 2StSize, numStX, numStY, and nonZeroSize are derived as follows:
   - If both nTbW and nTbH are greater than or equal to 8, log 2StSize is set to 3 and nStOutSize is set to 48.
   - Otherwise, log 2StSize is set to 2 and nStOutSize is set to 16.
   - nStSize is set to (1<<log 2StSize).
   - If nTbH is equal to 4 and nTbW is greater than 8, numStX set equal to 2.
   - Otherwise, numStX set equal to 1.
   - If nTbW is equal to 4 and nTbH is greater than 8, numStY set equal to 2.
   - Otherwise, numStY set equal to 1.
   - If both nTbW and nTbH are equal to 4 or both nTbW and nTbH are equal to 8, nonZeroSize is set equal to 8.
   - Otherwise, nonZeroSize set equal to 16.
2. For xSbIdx=0 . . . numStX−1 and ySbIdx=0 . . . numStY−1, the following applies:
   - The variable array u[x] with x=0 . . . nonZeroSize−1 are derived as follows:

$$xC=(xSbIdx<<\log 2StSize)+DiagScanOrder[\log 2StSize][\log 2StSize][x][0]$$

$$yC=(ySbIdx<<\log 2StSize)+DiagScanOrder[\log 2StSize][\log 2StSize][x][1]$$

$$u[x]=d[xC][yC]$$

- u[x] with x=0 . . . nonZeroSize−1 is transformed to the variable array v[x] with x=0 . . . nStOutSize−1 by invoking the one-dimensional transformation process as specified in clause 8.7.4.4 with the transform input length of the scaled transform coefficients nonZeroSize, the transform output length nStOutSize the list u[x] with x=0 . . . nonZeroSize−1, the index for transform set selection stPredModeIntra, and the index for transform selection in a transform set st_idx[xTbY][yTbY] as inputs, and the output is the list v[x] with x=0 . . . nStOutSize−1. The variable stPredModeIntra is set to the predModeIntra specified in clause 8.4.4.2.1.

The array d[(xSbIdx<<log 2StSize)+x][(ySbIdx<<log 2StSize)+y] with x=0 . . . nStSize−1, y=0 . . . nStSize−1 are derived as follows:

If stPredModeIntra is less than or equal to 34, or equal to INTRA_LT_CCLM, INTRA_T_CCLM, or INTRA_L_CCLM, the following applies:

d[(xSbIdx<<log 2StSize)+x][(ySbIdx<<log 2StSize)+y]=(y<4)?v[x+(y<<log 2StSize)]:((x<4)?v[32+x+((y−4) <<2)]: d[(xSbIdx<<log 2StSize)+x][(ySbIdx<<log 2StSize)+y])

Otherwise, the following applies:

d[(xSbIdx<<log 2StSize)+x][(ySbIdx<<log 2StSize)+y=(y<4)?v[y+(x<<log 2StSize)]:((x<4)?v[32+(y−4)+(x<<2)]: d[(xSbIdx<<log 2StSize)+x][(ySbIdx<<log 2StSize)+y])

The variable implicitMtsEnabled is derived as follows:

If sps_mts_enabled_flag is equal to 1 and one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32 sps_explicit_mts_intra_enabled_flag and sps_explicit_mts_inter_enabled_flag are both equal to 0 and CuPredMode[xTbY][yTbY] is equal to MODE_INTRA Otherwise, implicitMtsEnabled is set equal to 0.

The variable trTypeHor specifying the horizontal transform kernel and the variable trTypeVer specifying the vertical transform kernel are derived as follows:

If cIdx is greater than 0, trTypeHor and trTypeVer are set equal to 0.

Otherwise, if implicitMtsEnabled is equal to 1, the following applies:

If IntraSubPartitionsSplitType is not equal to ISP_NO_SPLIT, trTypeHor and trTypeVer are specified in Table 8-15 depending on intraPredMode.

Otherwise, if cu_sbt_flag is equal to 1, trTypeHor and trTypeVer are specified in Table 8-14 depending on cu_sbt_horizontal_flag and cu_sbt_pos_flag.

Otherwise (sps_explicit_mts_intra_enabled_flag and sps_explicit_mts_inter_enabled_flag are equal to 0), trTypeHor and trTypeVer are derived as follows:

trTypeHor=(nTbW>=4&& nTbW<=16&& nTbW<=nTbH)?1:0 (8-1029)

trTypeVer=(nTbH>=4&& nTbH<=16&& nTbH<=nTbW)?1:0 (8-1030)

Otherwise, trTypeHor and trTypeVer are specified in Table 8-13 depending on tu_mts_idx[xTbY][yTbY].

The variables nonZeroW and nonZeroH are derived as follows:

nonZeroW=Min(nTbW,(trTypeHor>0)?16:32) (8-1031)

nonZeroH=Min(nTbH,(trTypeVer>0)?16:32) (8-1032)

The (nTbW)×(nTbH) array r of residual samples is derived as follows:

1. When nTbH is greater than 1, each (vertical) column of scaled transform coefficients d[x][y] with x=0 . . . nonZeroW−1, y=0 . . . nonZeroH−1 is transformed to e[x][y] with x=0 . . . nonZeroW−1, y=0 . . . nTbH−1 by invoking the one-dimensional transformation process as specified in clause 8.7.4.2 for each column x=0 . . . nonZeroW−1 with the height of the transform block nTbH, the non-zero height of the scaled transform coefficients nonZeroH, the list d[x][y] with y=0 . . . nonZeroH−1 and the transform type variable trType set equal to trTypeVer as inputs, and the output is the list e[x][y] with y=0 . . . nTbH−1.
2. When nTbH and nTbW are both greater than 1, the intermediate sample values g[x][y] with x=0 . . . nonZeroW−1, y=0 . . . nTbH−1 are derived as follows:

g[x][y]=Clip3(CoeffMin,CoeffMax,(e[x][y]+64)>>7) (8-1033)

When nTbW is greater than 1, each (horizontal) row of the resulting array g[x][y] with x=0 . . . nonZeroW−1, y=0 . . . nTbH−1 is transformed to r[x][y] with x=0 . . . nTbW−1, y=0 . . . nTbH−1 by invoking the one-dimensional transformation process as specified in clause 8.7.4.2 for each row y=0 . . . nTbH−1 with the width of the transform block nTbW, the non-zero width of the resulting array g[x][y] nonZeroW, the list g[x][y] with x=0 . . . nonZeroW−1 and the transform type variable trType set equal to trTypeHor as inputs, and the output is the list r[x][y] with x=0 . . . nTbW−1.

5.3 Embodiment #3

Context modeling of RST index is revised.

5.3.1 Alternative #1

9.5.4.2.8 Derivation Process of ctxInc for the Syntax Element St_Idx

Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode[x0][y0] specifying the intra prediction mode for chroma samples as specified in clause 7.4.7.5, the block width nTbW and height nTbH, and the multiple transform selection index tu_mts_idx[x0][y0].

Output of this process is the variable ctxInc.

The variable intraModeCtx is derived as follows:

If cIdx is equal to 0, intraModeCtx is derived as follows:

intraModeCtx=(IntraPredModeY[x0][y0]<=1)?1:0

Otherwise(cIdx is greater than 0),intraModeCtx is derived as follows:

intraModeCtx=(intra_chroma_pred_mode[x0][y0]>=4)?1:0

The variable mtsCtx is derived as follows:

mtsCtx=((sps_explicit_mts_intra_enabled_flag?tu_mts_idx[x0][y0]==0:nTbW==nTbH) && treeType!=SINGLE_TREE)?1:0

The variable ctxInc is derived as follows:

ctxInc=(binIdx<<1)+intraModeCtx+(mtsCtx<<2)

5.3.2 Alternative #2

| Syntax structure | Syntax element | Binarization Process | Binarization Input parameters |
|---|---|---|---|
| | . . . . . . | . . . . . . | . . . . . . |
| | st_idx [ ][ ] | TR | cMax = 2, cRiceParam = 0 |

TABLE 9-15

Assignment of ctxInc to syntax elements with context coded bins

| Syntax | binIdx | | | | | |
|---|---|---|---|---|---|---|
| element | 0 | 1 | 2 | 3 | 4 | >=5 |
| . . . | . . . | . . . | . . . | . . . | . . . | . . . |
| st_idx[ ][ ] | 0[[,1,4,5]] (clause 9.5.4.2.8) | 2[[,3,6,7]] (clause 9.5.4.2.8) | na | na | na | na |
| . . . | . . . | . . . | . . . | . . . | . . . | . . . |

[[9.5.4.2.8 Derivation Process of ctxInc for the Syntax Element St_Idx

Inputs to this process are the colour component index cIdx, the luma or chroma location (x0, y0) specifying the top-left sample of the current luma or chroma coding block relative to the top-left sample of the current picture depending on cIdx, the tree type treeType, the luma intra prediction mode IntraPredModeY[x0][y0] as specified in clause 8.4.2, the syntax element intra_chroma_pred_mode[x0][y0] specifying the intra prediction mode for chroma samples as specified in clause 7.4.7.5, and the multiple transform selection index tu_mts_idx[x0][y0].

Output of this process is the variable ctxInc.

The variable intraModeCtx is derived as follows:

If cIdx is equal to 0, intraModeCtx is derived as follows:

intraModeCtx=(IntraPredModeY[x0][y0]<=1)?1:0

Otherwise (cdx is greater than 0), intraModeCtx is derived as follows:

intraModeCtx=(intra_chroma_pred_mode[x][y0]>4) ?1:0

The variable mtsCtx is derived as follows:

mtsCtx=(tu_mts_idx[x0][y0]==0&& treeType!=SINGLE_TREE)?1:0

The variable ctxInc is derived as follows:

ctxInc=(binIdx<<1)+intraModeCtx+(mtsCtx<<2)]]

5.4 Embodiment #4

Corresponding to bullets 7.c and 7.d.

7.3.7.11 Residual Coding Syntax

| residual_coding( x0, y0, log2TbWidth, log2TbHeight, cIdx ) { | Descriptor |
|---|---|
| ... | |
| if( coded_sub_block_flag [ xS ][ yS ] && ( n > 0 \| \| !inferSbDcSigCoeffFlag ) && | |
| ( xC != LastSignificantCoeffX \| \| yC != Last SignificantCoeffY ) ) { | |
| sig_coeff_flag[ xC ][ yC ] | ae(v) |
| remBinsPass1− − | |
| if( sig_coeff_flag[ xC ][ yC ] ) | |
| inferSbDcSigCoeffFlag = 0 | |
| } | |
| if( sig_coeff_flag[ xC ][ yC ] ) { | |
| if( !transform_skip_flag [ x0 ][ y0 ] ) { | |
| if(xC<4 && yC<4) | |
| numSigCoeff++ | |
| if( ( ( ( log2TbWidth == 2 && log2TbHeight == 2 ) \| \| ( log2TbWidth == 3 && log2TbHeight == 3 ) ) && | |

-continued

| residual_coding( x0, y0, log2TbWidth, log2TbHeight, cIdx ) { | Descriptor |
|---|---|
| n >= 8 && i == 0 ) \| \| ( ( log2TbWidth >= 3 && log2TbHeight >= 3 &&( i == 1 \| \| i == 2 ) ) ) ) { | |
| numZeroOutSigCoeff++ | |
| } | |
| } | |
| abs_level_gt1_flag[ n ] | ae(v) |
| ... | |

In an alternative example, the following may apply:

| residual_coding( x0, y0, log2TbWidth, log2TbHeight, cIdx ) { | Descriptor |
|---|---|
| . . . | |
| if( coded_sub_block_flag [ xS ][ yS ] && ( n > 0 \| \| !inferSbDcSigCoeffFlag ) && | |
| ( xC != LastSignificantCoeffX \| \| yC != Last SignificantCoeffY ) ) { | |
| sig_coeff_flag[ xC ][ yC ] | ae(v) |
| remBinsPass1− − | |
| if( sig_coeff_flag[ xC ][ yC ] ) | |
| inferSbDcSigCoeffFlag = 0 | |
| } | |
| if( sig_coeff_flag[ xC ][ yC ] ) { | |
| if( !transform_skip_flag [ x0 ][ y0 ] ) { | |
| if(xC<SigRangeX && yC<SigRangeY) | |
| numSigCoeff++ | |
| if( ( ( ( log2TbWidth == 2 && log2TbHeight == 2 ) \| \| ( log2TbWidth == 3 && log2TbHeight == 3 ) ) && n >= 8 && i == 0 ) \| \| ( ( log2TbWidth >= 3 && log2TbHeight >= 3 && ( i == 1 \| \| i == 2 ) ) ) ) { | |
| numZeroOutSigCoeff++ e | |
| } | |
| abs_level_gt1_flag[ n ] | ae(v) |
| . . . | |

In one example, the following may apply:

SigRangeX is equal to 8 if log 2TbWidth>3 && log 2TbHeight==2. Otherwise, it is equal to 4.

SigRangeY is equal to 8 if log 2TbHeight>3 && log 2TbWidth==2. Otherwise, it is equal to 4.

5.5 Embodiment #5

Corresponding to bullet 19.

7.3.6.5 Coding Unit Syntax

| coding_unit( x0, y0, cbWidth, cbHeight, treeType ) { | Descriptor |
|---|---|
| . . . | |
| if( !pcm_flag[ x0 ][ y0 ] ) { | |
| if( CuPredMode[ x0 ][ y0 ] != MODE_INTRA && merge_ flag[ x0 ][ y0 ] = = 0 ) | |
| cu_cbf | ae(v) |
| if( cu_cbf ) { | |
| if( CuPredMode[ x0 ][ y0 ] = = MODE_INTER && sps_ sbt_enabled_flag && | |
| !ciip_flag[ x0 ][ y0 ] ){ | |

-continued

| coding_unit( x0, y0, cbWidth, cbHeight, treeType ) { | Descriptor |
|---|---|
| if( cbWidth <= MaxSbtSize && cbHeight <= MaxSbtSize ) { | |
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH \| \| allowSbtHorH \| \| allowSbtVerQ \| \| allowSbtHorQ ) | |
| cu_sbt_flag | ae(v) |
| } | |
| if( cu_sbt_flag ) { | |
| if( ( allowSbtVerH \| \| allowSbtHorH ) && ( allowSbtVerQ \| \| allowSbtHorQ) ) | |
| cu_sbt_quad_flag | ae(v) |
| if( ( cu_sbt_quad_flag && allowSbtVerQ && allowSbtHorQ ) \| \| ( !cu_sbt_quad_flag && allowSbtVerH && allowSbtHorH ) ) | |
| cu_sbt_horizontal_flag | ae(v) |
| cu_sbt_pos_flag | ae(v) |
| } | |
| } | |
| numZeroOutSigCoeff = 0 | |
| transform_tree( x0, y0, cbWidth, cbHeight, treeType ) | |
| if( Min( cbWidth, cbHeight ) >= 4 && sps_st_enabled_flag == 1 && CuPredMode[ x0 ][ y0 ] = = MODE_INTRA && IntraSubPartitionsSplitType == ISP_NO_SPLIT ) { | |
| if( ( numSigCoeff > [[( ( treeType == SINGLE_TREE ) ? 2 : ]]1 [[ )]] ) && numZeroOutSigCoeff == 0 ) { | |
| st_idx[ x0 ][ y0 ] | ae(v) |
| } | |
| } | |
| } | |
| } | |
| } | |

-continued

| coding_unit( x0, y0, cbWidth, cbHeight, treeType ) { | Descriptor |
|---|---|
| allowSbtVerH = cbWidth >= 8 | |
| allowSbtVerQ = cbWidth >= 16 | |
| allowSbtHorH = cbHeight >= 8 | |
| allowSbtHorQ = cbHeight >= 16 | |
| if( allowSbtVerH \| \| allowSbtHorH \| \| allowSbtVerQ \| \| allowSbtHorQ ) | |
| cu_sbt_flag | ae(v) |
| } | |
| if( cu_sbt_flag ) { | |
| if( ( allowSbtVerH \| \| allowSbtHorH ) && ( allowSbtVerQ \| \| allowSbtHorQ) ) | |
| cu_sbt_quad_flag | ae(v) |
| if( ( cu_sbt_quad_flag && allowSbtVerQ && allowSbtHorQ ) \| \| ( !cu_sbt_quad_flag && allowSbtVerH && allowSbtHorH ) ) | |
| cu_sbt_horizontal_flag | ae(v) |
| cu_sbt_pos_flag | ae(v) |
| } | |
| } | |
| numZeroOutSigCoeff = 0 | |
| transform_tree( x0, y0, cbWidth, cbHeight, treeType ) | |
| if( Min( cbWidth, cbHeight ) >= 4 && sps_st_enabled_flag == 1 && CuPredMode[ x0 ][ y0 ] = = MODE_INTRA && IntraSubPartitionsSplitType == ISP_NO_SPLIT ) { | |
| if( ( numSigCoeff > ( ( treeType == SINGLE_TREE ) ? 2 : 1 ) ) && numZeroOutSigCoeff == 0 && cBWidth <= MaxTbSizeY && cbHeight <= MaxTbSizeY ) { | |
| st_idx[ x0 ][ y0 ] | ae(v) |
| } | |
| } | |
| } | |
| } | |
| } | |

5.6 Embodiment #6

Corresponding to bullet 20.

7.3.6.5 Coding Unit Syntax

| coding_unit( x0, y0, cbWidth, cbHeight, treeType ) { | Descriptor |
|---|---|
| ... | |
| if( !pcm_flag[ x0 ][ y0 ] ) { | |
| if( CuPredMode[ x0 ][ y0 ] != MODE_INTRA && merge_flag[ x0 ][ y0 ] = = 0 ) | |
| cu_cbf | ae(v) |
| if( cu_cbf ) { | |
| if( CuPredMode[ x0 ][ y0 ] = = MODE_INTER && sps_sbt_enabled_flag && !ciip_flag[ x0 ][ y0 ] ) { | |
| if( cbWidth <= MaxSbtSize && cbHeight <= MaxSbtSize ) { | |

5.7 Embodiment #17

Corresponding to bullet 21.

7.3.7.11 Residual Coding Syntax

| residual_coding( x0, y0, log2TbWidth, log2TbHeight, cIdx ) { | Descriptor |
|---|---|
| ... | |
| if( coded_sub_block_flag [ xS ][ yS ] && ( n > 0 \| \| !inferSbDcSigCoeffFlag ) && ( xC != LastSignificantCoeffX \| \| yC != Last SignificantCoeffY ) ) { | |
| sig_coeff_flag[ xC ][ yC ] | ae(v) |
| remBinsPass1-- | |
| if( sig_coeff_flag[ xC ][ yC ] ) | |
| inferSbDcSigCoeffFlag = 0 | |
| } | |
| if( sig_coeff_flag | |

-continued

| residual_coding( x0, y0, log2TbWidth, log2TbHeight, cIdx ) { | Descriptor |
|---|---|
| [ xC ][ yC ] && x0 == CbX[x0][y0] && y0 == CbU[x0][y0]) { | |
| if( !transform_skip_flag [ x0 ][ y0 ] ) { | |
| numSigCoeff++ | |
| if( ( ( ( log2TbWidth == 2 && log2TbHeight == 2 ) \| \| ( log2TbWidth == 3 && log2TbHeight == 3 ) ) && n >= 8 && i == 0 ) \| \| ( ( log2TbWidth >= 3 && log2TbHeight >= 3 && ( i == 1 \| \| i == 2 ) ) ) ) ) { | |
| numZeroOutSigCoeff++ | |
| } | |
| } | |
| abs_level_gt1_flag[ n ] | ae(v) |
| . . . | |

(CbX[x0][y0], CbY[x0][y0]) specifies the top-left position of the coding unit covering the position (x0, y0).

5.8 Embodiment #8

The RST transform set index is derived from default modes assigned to non-normal intra prediction modes. The deleted parts are marked with double brackets (e.g., [[a]] denotes the deletion of the character "a").

8.7.4.1 General

Inputs to this Process are:

- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2LfnstSize, nLfnstSize, and nonZeroSize are derived as follows:

predModeIntra=(cIdx==0)?IntraPredModeY[xTbY][yTbY]:IntraPredModeC[xTbY][yTbY] (8-965)

nLfnstOutSize=(nTbW>=8&& nTbH>=8)?48:16 (8-966)

log 2LfnstSize=(nTbW>=8&& nTbH>=8)?3:2 (8-967)

nLfnstSize=1<<log 2LfnstSize (8-968)

nonZeroSize=((nTbW==4&& nTbH==4)||(nTbW==8&& nTbH==8))?8:16 (8-969)

When intra_mip_flag[xTbComp][yTbComp] is equal to 1 and cIdx is equal to 0, predModeIntra is set equal to INTRA_PLANAR.

When predModeIntra is equal to either INTRA_LT_CCLM, INTRA_L_CCLM, or INTRA_T_CCLM, predModeIntra is derived as follows: [[is set equal to IntraPredModeY[xTbY+nTbW/2][yTbY+nTbH/2].]]

If intra_mip_flag[xTbY][yTbY] is equal to 1, predModeIntra is set equal to INTRA_PLANAR.

Otherwise, if CuPredMode[0][xTbY][yTbY] is equal to MODE_IBC or MODE_PLT, predModeIntra is set equal to INTRA_DC.

Otherwise, predModeIntra is set equal to IntraPredModeY[xTbY+nTbW/2][yTbY+nTbH/2].

The wide angle intra prediction mode mapping process as specified in clause 8.4.5.2.6 is invoked with predModeIntra, nTbW, nTbH and cIdx as inputs, and the modified predModeIntra as output.

Alternatively, the followings may apply:

When predModeIntra is equal to either INTRA_LT_CCLM, INTRA_L_CCLM, or INTRA_T_CCLM, predModeIntra is derived as follows: [[is set equal to IntraPredModeY[xTbY+nTbW/2][yTbY+nTbH/2].]]

If intra_mip_flag[xTbY+nTbW/2][yTbY+nTbH/2] is equal to 1, predModeIntra is set equal to INTRA_PLANAR.

Otherwise, if CuPredMode[0][xTbY+nTbW/2][yTbY+nTbH/2] is equal to MODE_IBC or MODE_PLT, predModeIntra is set equal to INTRA_DC.

Otherwise, predModeIntra is set equal to IntraPredModeY[xTbY+nTbW/2][yTbY+nTbH/2].

5.9 Embodiment #9

The RST transform set index is derived from default modes assigned to non-normal intra prediction modes, and dependent on color format. The deleted parts are marked with double brackets (e.g., [[a]] denotes the deletion of the character "a").

8.7.4.2 General

Inputs to this Process are:

- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2LfnstSize, nLfnstSize, and nonZeroSize are derived as follows:

predModeIntra=(cIdx==0)?IntraPredModeY[xTbY][yTbY]:IntraPredModeC[xTbY][yTbY] (8-965)

nLfnstOutSize=(nTbW>=8&& nTbH>=8)?48:16 (8-966)

log 2LfnstSize=(nTbW>=8&& nTbH>=8)?3:2 (8-967)

nLfnstSize=1<<log 2LfnstSize (8-968)

nonZeroSize=((nTbW==4&& nTbH==4)||(nTbW==8&& nTbH==8))?8:16 (8-969)

When intra_mip_flag[xTbComp][yTbComp] is equal to 1 and cIdx is equal to 0, predModeIntra is set equal to INTRA_PLANAR.

When predModeIntra is equal to either INTRA_LT_CCLM, INTRA_L_CCLM, or INTRA_T_CCLM, pred- ModeIntra is derived as follows: [[is set equal to IntraPredModeY[xTbY+nTbW/2][yTbY+nTbH/2].]]

If intra_mip_flag[xTbY][yTbY] is equal to 1, predModeIntra is set equal to INTRA_PLANAR.

Otherwise, if CuPredMode[0][xTbY][yTbY] is equal to MODE_IBC or MODE_PLT, predModeIntra is set equal to INTRA_DC.

Otherwise, predModeIntra is set equal to IntraPredModeY[xTbY+nTbW/2][yTbY+nTbH/2].

When chroma_format_idc is equal to 2, predModeIntra is further modified according to Table 8-3. The chroma intra prediction mode X is set equal to predModeIntra to derive the chroma intra prediction mode Y. Afterwards, predModeIntra is set equal to Y.

The wide angle intra prediction mode mapping process as specified in clause 8.4.5.2.6 is invoked with predModeIntra, nTbW, nTbH and cIdx as inputs, and the modified predModeIntra as output.

TABLE 8-3

Specification of the 4:2:2 mapping process from chroma intra prediction mode X to mode Y when chroma_format_idc is equal to 2

| | | | | | | | | | | | | | | | | | | |
|---|---|---|---|---|---|---|---|---|---|---|---|---|---|---|---|---|---|---|
| **mode X** | 0 | 1 | 2 | 3 | 4 | 5 | 6 | 7 | 8 | 9 | 10 | 11 | 12 | 13 | 14 | 15 | 16 | 17 |
| **mode Y** | 0 | 1 | 61 | 62 | 63 | 64 | 65 | 66 | 2 | 3 | 4 | 6 | 8 | 10 | 12 | 13 | 14 | 16 |
| **mode X** | 18 | 19 | 20 | 21 | 22 | 23 | 24 | 25 | 26 | 27 | 28 | 29 | 30 | 31 | 32 | 33 | 34 | 35 |
| **mode Y** | 18 | 20 | 22 | 23 | 24 | 26 | 28 | 30 | 32 | 33 | 34 | 35 | 36 | 37 | 38 | 39 | 40 | 41 |
| **mode X** | 36 | 37 | 38 | 39 | 40 | 41 | 42 | 43 | 44 | 45 | 46 | 47 | 48 | 49 | 50 | 51 | 52 | 53 |
| **mode Y** | 42 | 43 | 44 | 44 | 44 | 45 | 46 | 46 | 46 | 47 | 48 | 48 | 48 | 49 | 50 | 51 | 52 | 52 |
| **mode X** | 54 | 55 | 56 | 57 | 58 | 59 | 60 | 61 | 62 | 63 | 64 | 65 | 66 | | | | | |
| **mode Y** | 52 | 53 | 54 | 54 | 54 | 55 | 56 | 56 | 56 | 57 | 58 | 59 | 60 | | | | | |

Alternatively, the followings may apply:

When predModeIntra is equal to either INTRA_LT_CCLM, INTRA_L_CCLM, or INTRA_T_CCLM, predModeIntra is derived as follows: [[is set equal to IntraPredModeY[xTbY+nTbW/2][yTbY+nTbH/2].]]

If intra_mip_flag[xTbY+nTbW/2][yTbY+nTbH/2] is equal to 1, predModeIntra is set equal to INTRA_PLANAR.

Otherwise, if CuPredMode[0][xTbY+nTbW/2][yTbY+nTbH/2] is equal to MODE_IBC or MODE_PLT, predModeIntra is set equal to INTRA_DC.

Otherwise, predModeIntra is set equal to IntraPredModeY[xTbY+nTbW/2][yTbY+nTbH/2].

When chroma_format_idc is equal to 2, predModeIntra is further modified according to Table 8-3. The chroma intra prediction mode X is set equal to predModeIntra to derive the chroma intra prediction mode Y. Afterwards, predModeIntra is set equal to Y.

5.10 Embodiment #10

In this embodiment, the center luma sample of corresponding luma region of current chroma block is checked whether it is coded with MIP or IBC or palette mode; and the setting of DM is also based on the center luma sample.

The deleted parts are marked with double brackets (e.g., [[a]] denotes the deletion of the character "a").

8.4.3 Derivation Process for Chroma Intra Prediction Mode

Input to this Process are:

a luma location (xCb, yCb) specifying the top-left sample of the current chroma coding block relative to the top-left luma sample of the current picture, a variable cbWidth specifying the width of the current coding block in luma samples, a variable cbHeight specifying the height of the current coding block in luma samples.

In this process, the chroma intra prediction mode IntraPredModeC[xCb][yCb] is derived.

The corresponding luma intra prediction mode lumaIntraPredMode is derived as follows:

If intra_mip_flag[xCb+cbWidth/2][yCb+cbHeight/2] is equal to 1, lumaIntraPredMode is set equal to INTRA_PLANAR.

Otherwise, if CuPredMode[0][xCb+cbWidth/2][yCb+cbHeight/2] is equal to MODE_IBC or MODE_PLT, lumaIntraPredMode is set equal to INTRA_DC.

Otherwise, lumaIntraPredMode is set equal to IntraPredModeY[xCb+cbWidth/2][yCb+cbHeight/2].

The chroma intra prediction mode IntraPredModeC[xCb][yCb] is derived using cclm_mode_mode_flag, cclm_mode_idx, intra_chroma_pred_mode and lumaIntraPredMode as specified in Table 8-2.

TABLE 8-2

Specification of IntraPredModeC[xCb][yCb] depending on cclm_mode_flag, cclm_mode_idx, intra_chroma_pred_mode and lumaIntraPredMode

| | | | lumaIntraPredMode | | | | |
|---|---|---|---|---|---|---|---|
| cclm_mode_flag | cclm_mode_idx | intra_chroma_pred_mode | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

When chroma_format_idc is equal to 2, the chroma intra prediction mode Y is derived using the chroma intra prediction mode X in Table 8-2 as specified in Table 8-3, and the chroma intra prediction mode X is is set equal to the chroma intra prediction mode Y afterwards.

5.11 Embodiment #11

In this embodiment, the top-left luma sample of corresponding luma region of current chroma block is checked whether it also based on the center luma sample.

The deleted parts are marked with double brackets (e.g., [[a]] denotes the deletion of the character "a").

8.4.3 Derivation Process for Chroma Intra Prediction Mode

Input to this Process are:

- a luma location (xCb, yCb) specifying the top-left sample of the current chroma coding block relative to the top-left luma sample of the current picture,
- a variable cbWidth specifying the width of the current coding block in luma samples,
- a variable cbHeight specifying the height of the current coding block in luma samples.

In this process, the chroma intra prediction mode IntraPredModeC[xCb][yCb] is derived.

The corresponding luma intra prediction mode lumaIntraPredMode is derived as follows:

- If intra_mip_flag[xCb][yCb] is equal to 1, lumaIntraPredMode is set equal to INTRA_PLANAR.
- Otherwise, if CuPredMode[0][xCb][yCb] is equal to MODE_IBC or MODE_PLT, lumaIntraPredMode is set equal to INTRA_DC.
- Otherwise, lumaIntraPredMode is set equal to IntraPredModeY[xCb[[+cbWidth/2]]][yCb[[+cbHeight/2]]].

The chroma intra prediction mode IntraPredModeC[xCb][yCb] is derived using cclm_mode_mode_flag, cclm_mode_idx, intra_chroma_pred_mode and lumaIntraPredMode as specified in Table 8-2.

TABLE 8-2

Specification of IntraPredModeC[xCb][yCb] depending on cclm_mode_flag, cclm_mode_idx, intra_chroma_pred_mode and lumaIntraPredMode

| | | | lumaIntraPredMode | | | | |
|---|---|---|---|---|---|---|---|
| cclm_mode_flag | cclm_mode_idx | intra_chroma_pred_mode | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

When chroma_format_idc is equal to 2, the chroma intra prediction mode Y is derived using the chroma intra prediction mode X in Table 8-2 as specified in Table 8-3, and the chroma intra prediction mode X is is set equal to the chroma intra prediction mode Y afterwards.

Embodiment #12

This embodiment shows an example on the context modeling of RST (a.k.a., LFNST) index. The deleted parts are highlighted and are marked with double brackets (e.g., [[a]] denotes the deletion of the character "a").

TABLE 9-82

| Assignment of ctxInc to syntax elements with context coded bins | | | | | | |
|---|---|---|---|---|---|---|
| lfnst_idx[ ][ ] | [[(tu_mts_idx[x0][y0] = = 0 && )] treeType != SINGLE_TREE [[)]] ? 1 : 0 | bypass | na | na | na | na |

Alternatively, the Following May Apply:

| | | | | | | |
|---|---|---|---|---|---|---|
| lfnst_idx[ ][ ] | 0 | bypass | na | na | na | na |

Embodiment #13

The zero-out range is revised for RST4×4. The newly added parts are on top of JVET-O2001 and the deleted parts are marked with double brackets (e.g., [[a]] denotes the deletion of the character "a").

7.3.8.11 Residual Coding Syntax

```
residual_coding( x0, y0,
log2TbWidth, log2TbHeight,
cIdx ) {                                    Descriptor
...
 if( lastSubBlock = = 0 &&
 log2TbWidth >= 2 &&
 log2TbHeight >= 2 &&
  !transform_skip_flag
  [ x0 ][ y0 ]
  && lastScanPos > 0 )
  LfnstDcOnly = 0
 if( ( lastSubBlock > 0 &&
 log2TbWidth >= 2 &&
 log2TbHeight >= 2 ) | |
  ( lastScanPos > 7
&& (( log2TbWidth = = 2 | |
log2TbHeight = = 2)
 | |( log2TbWidth = =
3 [[ ) ]] &&
  log2TbWidth = =
  log2TbHeight ) ) ))
  LfnstZeroOutSigCoeffFlag = 0
 QState = 0
...
```

Alternatively, the Following May Apply:

```
residual_coding( x0, y0,
log2TbWidth, log2TbHeight,
cIdx ) {                                    Descriptor
...
 if( lastSubBlock = = 0 &&
 log2TbWidth >= 2 &&
 log2TbHeight >= 2 &&
  !transform_skip_flag
  [ x0 ][ y0 ]
  && lastScanPos > 0 )
  LfnstDcOnly = 0
 if( [[( ]] lastSubBlock >
 0 [[&&
 log2TbWidth >= 2 &&
 log2TbHeight >= 2 ) ]] | |
  ( lastScanPos > 7
&&  !( log2TbWidth > 3 &&
 log2TbHeight >3)
[[ ( log2TbWidth = = 2 | |
log2TbWidth = = 3 ) &&
  log2TbWidth = =
  log2TbHeight ]]) )
  LfnstZeroOutSig-
  CoeffFlag = 0
 QState = 0
...
```

8.7.4.1 General

Inputs to this Process are:

- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2LfnstSize, nLfnstSize, and nonZeroSize are derived as follows:

predModeIntra=(cIdx==0)?IntraPredModeY[xTbY][yTbY]:IntraPredModeC[xTbY][yTbY] (8-965)

nLfnstOutSize=(nTbW>=8&& nTbH>=8)?48:16 (8-966)

log 2LfnstSize=(nTbW>=8&& nTbH>=8)?3:2 (8-967)

nLfnstSize=1<<log 2LfnstSize (8-968)

nonZeroSize=((nTbW==4[[&&]]1|nTbH==4)||(nTbW==8&& nTbH==8))?8:16 (8-969)

When intra_mip_flag[xTbComp][yTbComp] is equal to 1 and cIdx is equal to 0, predModeIntra is set equal to INTRA_PLANAR.

Embodiment #14

The dimension of the transform matrices of RST4×4 is reduced by half. The newly added parts are on top of JVET-O2001 and the deleted parts are marked with double brackets (e.g., [[a]] denotes the deletion of the character "a").

8.7.4.3 Low Frequency Non-Separable Transformation Matrix Derivation Process

Inputs to this Process are:

- a variable nTrS specifying the transform output length,
- a variable predModeIntra specifying the intra prediction mode for LFNST set selection,
- a variable lfnstIdx specifying the LFNST index for transform selection in the selected LFNST set.

Output of this process is the transformation matrix lowFreqTransMatrix.

The variable lfnstTrSetIdx is specified in Table 8-16 depending on predModeIntra.

TABLE 8-16

| Specification of lfnstTrSetIdx | |
|---|---|
| predModeIntra | lfnstTrSetIdx |
| predModeIntra < 0 | 1 |
| 0 <= predModeIntra <= 1 | 0 |
| 2 <= predModeIntra <=12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

The transformation matrix lowFreqTransMatrix is derived based on nTrS, lfnstTrSetIdx, and lfnstIdx as follows:

If nTrS is equal to 16, lfnstTrSetIdx is equal to 0, and lfnstIdx is equal to 1, the following applies:

| lowFreqTransMatrix[m][n] = | | | | | | | | | | | | | | | | | |
|---|---|---|---|---|---|---|---|---|---|---|---|---|---|---|---|---|---|
| { | | | | | | | | | | | | | | | | | |
| { | 108 | −44 | −15 | 1 | −44 | 19 | 7 | −1 | −11 | 6 | 2 | −1 | 0 | −1 | −1 | 0 | } |
| { | −40 | −97 | 56 | 12 | −11 | 29 | −12 | −3 | 18 | 18 | −15 | −3 | −1 | −3 | 2 | 1 | } |
| { | 25 | −31 | −1 | 7 | 100 | −16 | −29 | 1 | −54 | 21 | 14 | −4 | −7 | 2 | 4 | 0 | } |
| { | −32 | −39 | −92 | 51 | −6 | −16 | 36 | −8 | 3 | 22 | 18 | −15 | 4 | 1 | −5 | 2 | } |
| { | 8 | −9 | 33 | −8 | −16 | −102 | 36 | 23 | −4 | 38 | −27 | −5 | 5 | 16 | −8 | −6 | } |
| { | −25 | 5 | 16 | −3 | −38 | 14 | 11 | −3 | −97 | 7 | 26 | 1 | 55 | −10 | −19 | 3 | } |
| { | 8 | 9 | 16 | 1 | 37 | 36 | 94 | −38 | −7 | 3 | −47 | 11 | −6 | −13 | −17 | 10 | } |
| { | 2 | 34 | −5 | 1 | −7 | 24 | −25 | −3 | 8 | 99 | −28 | −29 | 6 | −43 | 21 | 11 | } |
| [ [ | | | | | | | | | | | | | | | | | |
| { | −16 | −27 | −39 | −109 | 6 | 10 | 16 | 24 | 3 | 19 | 10 | 24 | −4 | −7 | −2 | −3 | } |
| { | −9 | −10 | −34 | 4 | −9 | −5 | −29 | 5 | −33 | −26 | −96 | 33 | 14 | 4 | 39 | −14 | } |
| { | −13 | 1 | 4 | −9 | −30 | −17 | −3 | −64 | −35 | 11 | 17 | 19 | −86 | 6 | 36 | 14 | } |
| { | 8 | −7 | −5 | −15 | 7 | −30 | −28 | −87 | 31 | 4 | 4 | 33 | 61 | −5 | −17 | 22 | } |
| { | −2 | 13 | −6 | −4 | −2 | 28 | −13 | −14 | −3 | 37 | −15 | −3 | −2 | 107 | −36 | −24 | } |
| { | 4 | 9 | 11 | 31 | 4 | 9 | 16 | 19 | 12 | 33 | 32 | 94 | 12 | 0 | 34 | −45 | } |
| { | 2 | −2 | 8 | −16 | 8 | 5 | 28 | −17 | 6 | −7 | 18 | −45 | 40 | 36 | 97 | −8 | } |
| { | 0 | −2 | 0 | −10 | −1 | −7 | −3 | −35 | −1 | −7 | −2 | −32 | −6 | −33 | −16 | −112 | } |
| ] ] | | | | | | | | | | | | | | | | | |
| }, | | | | | | | | | | | | | | | | | |

Otherwise, if nTrS is equal to 16, lfnstTrSetIdx is equal to 0, and lfnstIdx is equal to 2, the following applies:

| lowFreqTransMatrix[m][n] = | | | | | | | | | | | | | | | | | |
|---|---|---|---|---|---|---|---|---|---|---|---|---|---|---|---|---|---|
| { | | | | | | | | | | | | | | | | | |
| { | 119 | −30 | −22 | −3 | −23 | −2 | 3 | 2 | −16 | 3 | 6 | 0 | −3 | 2 | 1 | 0 | } |
| { | −27 | −101 | 31 | 17 | −47 | 2 | 22 | 3 | 19 | 30 | −7 | −9 | 5 | 3 | −5 | −1 | } |
| { | 0 | 58 | 22 | −15 | −102 | 2 | 38 | 2 | 10 | −13 | −5 | 4 | 14 | −1 | −9 | 0 | } |
| { | 23 | 4 | 66 | −11 | 22 | 89 | −2 | −26 | 13 | −8 | −38 | −1 | −9 | −20 | −2 | 8 | } |
| { | −19 | −5 | −89 | 2 | −26 | 76 | −11 | −17 | 20 | 13 | 18 | −4 | 1 | −15 | 3 | 5 | } |
| { | −10 | −1 | −1 | 6 | 23 | 25 | 87 | −7 | −74 | 4 | 39 | −5 | 0 | −1 | −20 | −1 | } |
| { | | −17 | −28 | 12 | −8 | −32 | 14 | −53 | −6 | −68 | −67 | 17 | 29 | 2 | 6 | 25 | } |
| { | 1 | −24 | −23 | 1 | 17 | −7 | 52 | 9 | 50 | −92 | −15 | 27 | −15 | −10 | −6 | 3 | } |
| [ [ | | | | | | | | | | | | | | | | | |
| { | −6 | −17 | −2 | −111 | 7 | −17 | 8 | −42 | 9 | 18 | 16 | 25 | −4 | 2 | −1 | 11 | } |
| { | 9 | 5 | 35 | 0 | 6 | 21 | −9 | 34 | 44 | −3 | 102 | 11 | −7 | 13 | 11 | −20 | } |
| { | 4 | −5 | −5 | −10 | 15 | 19 | −2 | 6 | 6 | −12 | −13 | 6 | 95 | 69 | −29 | −24 | } |
| { | −6 | −4 | −9 | −39 | 1 | 22 | 0 | 102 | −19 | 19 | −32 | 30 | −16 | −14 | −8 | −23 | } |
| { | 4 | −4 | 7 | 8 | 4 | −13 | −18 | 5 | 0 | 0 | 21 | 22 | 58 | −88 | −54 | 28 | } |
| { | −4 | −7 | 0 | −24 | −7 | 0 | −25 | 3 | −3 | −30 | 8 | −76 | −34 | 4 | −80 | −26 | } |
| { | 0 | 6 | 0 | 30 | −6 | 1 | −13 | −23 | 1 | 20 | −2 | 80 | −44 | 37 | −68 | 1 | } |
| { | 0 | 0 | −1 | 5 | −1 | −7 | 1 | −34 | −2 | 3 | −6 | 19 | 5 | −38 | 11 | −115 | } |
| ] ] | | | | | | | | | | | | | | | | | |
| }, | | | | | | | | | | | | | | | | | |

Otherwise, if nTrS is equal to 16, lfnstTrSetIdx is equal to 1, and lfnstIdx is equal to 1, the following applies:

| lowFreqTransMatrix[m][n] = | | | | | | | | | | | | | | | | | |
|---|---|---|---|---|---|---|---|---|---|---|---|---|---|---|---|---|---|
| { | | | | | | | | | | | | | | | | | |
| { | −111 | 39 | 4 | 3 | 44 | 11 | −12 | −1 | 7 | −16 | −5 | 2 | 3 | −1 | 4 | 2 | } |
| { | −47 | −27 | 15 | −1 | −92 | 43 | 20 | −2 | 20 | 39 | −16 | −5 | 10 | −5 | −13 | 2 | } |
| { | −35 | −23 | 4 | 4 | −17 | −72 | 32 | 6 | −59 | 18 | 50 | −6 | 0 | 40 | 0 | −13 | } |
| { | 13 | 93 | −27 | −4 | −48 | 13 | −34 | 4 | −52 | 11 | 1 | 10 | 3 | 16 | −3 | 1 | } |
| { | −11 | −27 | 1 | 2 | −47 | −4 | −36 | 10 | −2 | −85 | 14 | 29 | −20 | −2 | 57 | 4 | } |
| { | 0 | −35 | 32 | −2 | 26 | 60 | −3 | −17 | −82 | 1 | −30 | 0 | −37 | 21 | 3 | 12 | } |
| { | −17 | −46 | −92 | 14 | 7 | −10 | −39 | 29 | −17 | 27 | −28 | 17 | 1 | −15 | −13 | 17 | } |
| { | 4 | −10 | −23 | 4 | 16 | 58 | −17 | 26 | 30 | 21 | 67 | 2 | −13 | 59 | 13 | −40 | } |
| [ [ | | | | | | | | | | | | | | | | | |
| { | 5 | −20 | 32 | −5 | 8 | −3 | −46 | −7 | −4 | 2 | −15 | 24 | 100 | 44 | 0 | 5 | } |
| { | −4 | −1 | 38 | −18 | −7 | −42 | −63 | −6 | 33 | 34 | −23 | 15 | −65 | 33 | −20 | 2 | } |
| { | −2 | −10 | 35 | −19 | 5 | 8 | −44 | 14 | −25 | 25 | 58 | 17 | 7 | −84 | −16 | −18 | } |
| { | 5 | 13 | 18 | 34 | 11 | −4 | 18 | 18 | 5 | 58 | −3 | 42 | −2 | −10 | 85 | 38 | } |
| { | −5 | −7 | −34 | −83 | 2 | −1 | −4 | −73 | 4 | 20 | 15 | −12 | 4 | −3 | 44 | 12 | } |
| { | 0 | 4 | −2 | −60 | 5 | 9 | 42 | 34 | 5 | −14 | 9 | 80 | −5 | 13 | −38 | 37 | } |
| { | −1 | 2 | 7 | −57 | 3 | −7 | 9 | 68 | −9 | 6 | −49 | −20 | 6 | −4 | 36 | −64 | } |

-continued

| lowFreqTransMatrix[m][n] = | | | | | | | | | | | | | | | | | |
|---|---|---|---|---|---|---|---|---|---|---|---|---|---|---|---|---|---|
| { | −1 | 0 | −12 | 23 | 1 | −4 | 17 | −53 | −3 | 4 | −21 | 72 | −4 | −8 | −3 | −83 | } |
| ] ] | | | | | | | | | | | | | | | | | |
| }, | | | | | | | | | | | | | | | | | |

Otherwise, if nTrS is equal to 16, lfnstTrSetIdx is equal to 1, and lfnstIdx is equal to 2, the following applies:

| lowFreqTransMatrix[m][n] = | | | | | | | | | | | | | | | | | |
|---|---|---|---|---|---|---|---|---|---|---|---|---|---|---|---|---|---|
| { | | | | | | | | | | | | | | | | | |
| { | 88 | −55 | 6 | −3 | −66 | 27 | 9 | −2 | 11 | 11 | −13 | 1 | −2 | −7 | 1 | 2 | } |
| { | −58 | −20 | 27 | −2 | −27 | 75 | −29 | 0 | 47 | −42 | −11 | 11 | −9 | −3 | 19 | −4 | } |
| { | −51 | 23 | −22 | 5 | −63 | 3 | 37 | −5 | 1 | 64 | −35 | −4 | 29 | −31 | −11 | 13 | } |
| { | −27 | −76 | 49 | −2 | 40 | 14 | 9 | −17 | −56 | 36 | −25 | 6 | 14 | 3 | −6 | 8 | } |
| { | 19 | −4 | −36 | 22 | 52 | 7 | 36 | −23 | 28 | −17 | −64 | 15 | −5 | −44 | 48 | 9 | } |
| { | 29 | 50 | 13 | −10 | 1 | 34 | −59 | 1 | −51 | 4 | −16 | 30 | 52 | −33 | 24 | −5 | } |
| { | −12 | −21 | −74 | 43 | −13 | 39 | 18 | −5 | −58 | −35 | 27 | −5 | 19 | 26 | 6 | −5 | } |
| { | 19 | 38 | −10 | −5 | 28 | 66 | 0 | −5 | −4 | 19 | −30 | −26 | −40 | 28 | −60 | 37 | } |
| [ [ | | | | | | | | | | | | | | | | | |
| { | −6 | 27 | 18 | −5 | −37 | −18 | 12 | −25 | −44 | −10 | −38 | 37 | −66 | 45 | 40 | −7 | } |
| { | −13 | −28 | −45 | −39 | 0 | −5 | −39 | 69 | −23 | 16 | −12 | −18 | −50 | −31 | 24 | 13 | } |
| { | −1 | 8 | 24 | −51 | −15 | −9 | 44 | 10 | −28 | −70 | −12 | −39 | 24 | −18 | −4 | 51 | } |
| { | −8 | −22 | −17 | 33 | −18 | −45 | −57 | −27 | 0 | −31 | −30 | 29 | −2 | −13 | −53 | 49 | } |
| { | 1 | 12 | 32 | 51 | −8 | 8 | −2 | −31 | −22 | 4 | 46 | −39 | −49 | −67 | 14 | 17 | } |
| { | 4 | 5 | 24 | 60 | −5 | −14 | −23 | 38 | 9 | 8 | −34 | −59 | 24 | 47 | 42 | 28 | } |
| { | −1 | −5 | −20 | −34 | 4 | 4 | −15 | −46 | 18 | 31 | 42 | 10 | 10 | 27 | 49 | 78 | } |
| { | −3 | −7 | −22 | −34 | −5 | −11 | −36 | −69 | −1 | −3 | −25 | −73 | 5 | 4 | 4 | −49 | } |
| ] ] | | | | | | | | | | | | | | | | | |
| }, | | | | | | | | | | | | | | | | | |

Otherwise, if nTrS is equal to 16, lfnstTrSetIdx is equal to 2, and lfnstIdx is equal to 1, the following applies:

| lowFreqTransMatrix[m][n] = | | | | | | | | | | | | | | | | | |
|---|---|---|---|---|---|---|---|---|---|---|---|---|---|---|---|---|---|
| { | | | | | | | | | | | | | | | | | |
| { | −112 | 47 | −2 | 2 | −34 | 13 | 2 | 0 | 15 | −7 | 1 | 0 | 8 | −3 | −1 | 0 | } |
| { | 29 | −7 | 1 | −1 | −108 | 40 | 2 | 0 | −45 | 13 | 4 | −1 | 8 | −5 | 1 | 0 | } |
| { | −36 | −87 | 69 | −10 | −17 | −33 | 26 | −2 | 7 | 14 | −11 | 2 | 6 | 8 | −7 | 0 | } |
| { | 28 | −5 | 2 | −2 | −29 | 13 | −2 | 0 | 103 | −36 | −4 | 1 | 48 | −16 | −4 | 1 | } |
| { | −12 | −24 | 15 | −3 | 26 | 80 | −61 | 9 | 15 | 54 | −36 | 2 | 0 | −4 | 6 | −2 | } |
| { | 18 | 53 | 69 | −74 | 14 | 24 | 28 | −30 | −6 | −7 | −11 | 12 | −5 | −7 | −6 | 8 | } |
| { | 5 | −1 | 2 | 0 | −26 | 6 | 0 | 1 | 45 | −9 | −1 | 0 | −113 | 28 | 8 | −1 | } |
| { | −13 | −32 | 18 | −2 | 15 | 34 | −27 | 7 | −25 | −80 | 47 | −1 | −16 | −50 | 28 | 2 | } |
| [ [ | | | | | | | | | | | | | | | | | |
| { | −4 | −13 | −10 | 19 | 18 | 46 | 60 | −48 | 16 | 33 | 60 | −48 | 1 | 0 | 5 | −2 | } |
| { | 15 | 33 | 63 | 89 | 8 | 15 | 25 | 40 | −4 | −8 | −15 | −8 | −2 | −6 | −9 | −7 | } |
| { | −8 | −24 | −27 | 15 | 12 | 41 | 26 | −29 | −17 | −50 | −39 | 27 | 0 | 35 | −67 | 26 | } |
| { | −2 | −6 | −24 | 13 | −1 | −8 | 37 | −22 | 3 | 18 | −51 | 22 | −23 | −95 | 17 | 17 | } |
| { | −3 | −7 | −16 | −21 | 10 | 24 | 46 | 75 | 8 | 20 | 38 | 72 | 1 | 2 | 1 | 7 | } |
| { | 2 | 6 | 10 | −3 | −5 | −16 | −31 | 12 | 7 | 24 | 41 | −16 | −16 | −41 | −89 | 49 | } |
| { | 4 | 8 | 21 | 40 | −4 | −11 | −28 | −57 | 5 | 14 | 31 | 70 | 7 | 18 | 32 | 52 | } |
| { | 0 | 1 | 4 | 11 | −2 | −4 | −13 | −34 | 3 | 7 | 20 | 47 | −6 | −19 | −42 | −101 | } |
| ] ] | | | | | | | | | | | | | | | | | |
| }, | | | | | | | | | | | | | | | | | |

Otherwise, if nTrS is equal to 16, lfnstTrSetIdx is equal to 2, and lfnstIdx is equal to 2, the following applies:

| lowFreqTransMatrix[m][n] = | | | | | | | | | | | | | | | | | |
|---|---|---|---|---|---|---|---|---|---|---|---|---|---|---|---|---|---|
| { | | | | | | | | | | | | | | | | | |
| { | −99 | 39 | −1 | 2 | 65 | −20 | −5 | 0 | −15 | −2 | 5 | −1 | 0 | 3 | −1 | 0 | } |
| { | 58 | 42 | −33 | 3 | 33 | −63 | 23 | −1 | −55 | 32 | 3 | −5 | 21 | −2 | −8 | 3 | } |
| { | −15 | 71 | −44 | 5 | −58 | −29 | 25 | 3 | 62 | −7 | −4 | −4 | −19 | 4 | 0 | 1 | } |
| { | 46 | 5 | 4 | −6 | 71 | −12 | −15 | 5 | 52 | −38 | 13 | −2 | −63 | 23 | 3 | −3 | } |
| { | −14 | −54 | −29 | 29 | 25 | −9 | 61 | −29 | 27 | 44 | −48 | 5 | −27 | −21 | 12 | 7 | } |

-continued

| lowFreqTransMatrix[m][n] = | | | | | | | | | | | | | | | | | |
|---|---|---|---|---|---|---|---|---|---|---|---|---|---|---|---|---|---|
| { | −3 | 3 | 69 | −42 | −11 | −50 | −26 | 26 | 24 | 63 | −19 | −5 | −18 | −22 | 12 | 0 | } |
| { | 17 | 16 | −2 | 1 | 38 | 18 | −12 | 0 | 62 | 1 | −14 | 5 | 89 | −42 | 8 | −2 | } |
| { | 15 | 54 | −8 | 6 | 6 | 60 | −26 | −8 | −30 | 17 | −38 | 22 | −43 | −45 | 42 | −7 | } |
| [ [ | | | | | | | | | | | | | | | | | |
| { | −6 | −17 | −55 | −28 | 9 | 30 | −8 | 58 | 4 | 34 | 41 | −52 | −16 | −36 | −20 | 16 | } |
| { | −2 | −1 | −9 | −79 | 7 | 11 | 48 | 44 | −13 | −34 | −55 | 6 | 12 | 23 | 20 | −11 | } |
| { | 7 | 29 | 14 | −6 | 12 | 53 | 10 | −11 | 14 | 59 | −15 | −3 | 5 | 71 | −54 | 13 | } |
| { | −5 | −24 | −53 | 15 | −3 | −15 | −61 | 26 | 6 | 30 | −16 | 23 | 13 | 56 | 44 | −35 | } |
| { | 4 | 8 | 21 | 52 | −1 | −1 | −5 | 29 | −7 | −17 | −44 | −84 | 8 | 20 | 31 | 39 | } |
| { | −2 | −11 | −25 | −4 | −4 | −21 | −53 | 2 | −5 | −26 | −64 | 19 | −8 | −19 | −73 | 39 | } |
| { | −3 | −5 | −23 | −57 | −2 | −4 | −24 | −75 | 1 | 3 | 9 | −25 | 6 | 15 | 41 | 61 | } |
| { | 1 | 1 | 7 | 18 | 1 | 2 | 16 | 47 | 2 | 5 | 24 | 67 | 3 | 9 | 25 | 88 | } |
| ] ] | | | | | | | | | | | | | | | | | |
| }, | | | | | | | | | | | | | | | | | |

Otherwise, if nTrS is equal to 16, lfnstTrSetIdx is equal to 3, and lfnstIdx is equal to 1, the following applies:

| lowFreqTransMatrix[m][n] = | | | | | | | | | | | | | | | | | |
|---|---|---|---|---|---|---|---|---|---|---|---|---|---|---|---|---|---|
| { | | | | | | | | | | | | | | | | | |
| { | −114 | 37 | 3 | 2 | −22 | −23 | 14 | 0 | 21 | −17 | −5 | 2 | 5 | 2 | −4 | −1 | } |
| { | −19 | −41 | 19 | −2 | 85 | −60 | −11 | 7 | 17 | 31 | −34 | 2 | −11 | 19 | 2 | −8 | } |
| { | 36 | −25 | 18 | −2 | −42 | −53 | 35 | 5 | 46 | −60 | −25 | 19 | 8 | 21 | −33 | −1 | } |
| { | −27 | −80 | 44 | −3 | −58 | 1 | −29 | 19 | −41 | 18 | −12 | −7 | 12 | −17 | 7 | −6 | } |
| { | −11 | −21 | 37 | −10 | 44 | −4 | 47 | −12 | −37 | −41 | 58 | 18 | 10 | −46 | −16 | 31 | } |
| { | 15 | 47 | 10 | −6 | −16 | −44 | 42 | 10 | −80 | 25 | −40 | 21 | −23 | −2 | 3 | −14 | } |
| { | 13 | 25 | 79 | −39 | −13 | 10 | 31 | −4 | 49 | 45 | 12 | −8 | 3 | −1 | 43 | 7 | } |
| { | 16 | 11 | −26 | 13 | −13 | −74 | −20 | −1 | 5 | −6 | 29 | −47 | 26 | −49 | 54 | 2 | } |
| [ [ | | | | | | | | | | | | | | | | | |
| { | −8 | −34 | −26 | 7 | −26 | −19 | 29 | −37 | 1 | 22 | 46 | −9 | −81 | 37 | 14 | 20 | } |
| { | −6 | −30 | −42 | −12 | −3 | 5 | 57 | −52 | −2 | 37 | −12 | 6 | 74 | 10 | 6 | −15 | } |
| { | 5 | 9 | −6 | 42 | −15 | −18 | −9 | 26 | 15 | 58 | 14 | 43 | 23 | −10 | −37 | 75 | } |
| { | −5 | −23 | −23 | 36 | 3 | 22 | 36 | 40 | 27 | −4 | −16 | 56 | −25 | −46 | 56 | −24 | } |
| { | 1 | 3 | 23 | 73 | 8 | 5 | 34 | 46 | −12 | 2 | 35 | −38 | 26 | 52 | 2 | −31 | } |
| { | −3 | −2 | −21 | −52 | 1 | −10 | −17 | 44 | −19 | −20 | 30 | 45 | 27 | 61 | 49 | 21 | } |
| { | −2 | −7 | −33 | −56 | −4 | −6 | 21 | 63 | 15 | 31 | 32 | −22 | −10 | −26 | −52 | −38 | } |
| { | −5 | −12 | −18 | −12 | 8 | 22 | 38 | 36 | −5 | −15 | −51 | −63 | −5 | 0 | 15 | 73 | } |
| ] ] | | | | | | | | | | | | | | | | | |
| }, | | | | | | | | | | | | | | | | | |

Otherwise, if nTrS is equal to 16, lfnstTrSetIdx is equal to 3, and lfnstIdx is equal to 2, the following applies:

| lowFreqTransMatrix[m][n] = | | | | | | | | | | | | | | | | | |
|---|---|---|---|---|---|---|---|---|---|---|---|---|---|---|---|---|---|
| { | | | | | | | | | | | | | | | | | |
| { | −102 | 22 | 7 | 2 | 66 | −25 | −6 | −1 | −15 | 14 | 1 | −1 | 2 | −2 | 1 | 0 | } |
| { | 12 | 93 | −27 | −6 | −27 | −64 | 36 | 6 | 13 | 5 | −23 | 0 | −2 | 6 | 5 | −3 | } |
| { | −59 | −24 | 17 | 1 | −62 | −2 | −3 | 2 | 83 | −12 | −17 | −2 | −24 | 14 | 7 | −2 | } |
| { | −33 | 23 | −36 | 11 | −21 | 50 | 35 | −16 | −23 | −78 | 16 | 19 | 22 | 15 | −30 | −5 | } |
| { | 0 | −38 | −81 | 30 | 27 | 5 | 51 | −32 | 24 | 36 | −16 | 12 | −24 | −8 | 9 | 1 | } |
| { | 28 | 38 | 8 | −9 | 62 | 32 | −13 | 2 | 51 | −32 | 15 | 5 | −66 | 28 | 0 | −1 | } |
| { | 11 | −35 | 21 | −17 | 30 | −18 | 31 | 18 | −11 | −36 | −80 | 12 | 16 | 49 | 13 | −32 | } |
| { | −13 | 23 | 22 | −36 | −12 | 64 | 39 | 25 | −19 | 23 | −36 | 9 | −30 | −58 | 33 | −7 | } |
| [ [ | | | | | | | | | | | | | | | | | |
| { | −9 | −20 | −55 | −83 | 3 | −2 | 1 | 62 | 8 | 2 | 27 | −28 | 7 | 15 | −11 | 5 | } |
| { | −6 | 24 | −38 | 23 | −8 | 40 | −49 | 0 | −7 | 9 | −25 | −44 | 23 | 39 | 70 | −3 | } |
| { | 12 | 17 | 17 | 0 | 32 | 27 | 21 | 2 | 67 | 11 | −6 | −10 | 89 | −22 | −12 | 16 | } |
| { | 2 | −9 | 8 | 45 | 7 | −8 | 27 | 35 | −9 | −31 | −17 | −87 | −23 | −22 | −19 | 44 | } |
| { | −1 | −9 | 28 | −24 | −1 | −10 | 49 | −30 | −8 | −7 | 40 | 1 | 4 | 33 | 65 | 67 | } |
| { | 5 | −12 | −24 | −17 | 13 | −34 | −32 | −16 | 14 | −67 | −7 | 9 | 7 | −74 | 49 | 1 | } |
| { | 2 | −6 | 11 | 45 | 3 | −10 | 33 | 55 | 8 | −5 | 59 | 4 | 7 | −4 | 44 | −66 | } |
| { | −1 | 1 | −14 | 36 | −1 | 2 | −20 | 69 | 0 | 0 | −15 | 72 | 3 | 4 | 5 | 65 | } |
| ] ] | | | | | | | | | | | | | | | | | |
| }, | | | | | | | | | | | | | | | | | |

Otherwise, if nTrS is equal to 48, lfnstTrSetIdx is equal to 0, and lfnstIdx is equal to 1 the following applies:

Embodiment #13

The zero-out range is unified for all blocks. The newly added parts are on top of JVET-O2001 and the deleted parts are marked with double brackets (e.g., [[a]] denotes the deletion of the character 7.3.8.12 Residual Coding Syntax

| residual_coding( x0, y0, log2TbWidth, log2TbHeight, cIdx ) { | Descriptor |
|---|---|

```
...
 if( lastSubBlock = = 0 &&
 log2TbWidth >=
 2 && log2TbHeight >= 2 &&
  !transform_skip_flag[ x0 ][ y0 ]
  && lastScanPos > 0 )
  LfnstDcOnly = 0
 if([[ ( ]] lastSubBlock > 0
 [[&& log2TbWidth >=
 2 && log2TbHeight >= 2 ) ]] | |
  [[ (]] lastScanPos > 7 [[&&
  ( log2TbWidth = =
  2 | | log2TbWidth = = 3 ) &&
  log2TbWidth = = log2TbHeight )]] )
  LfnstZeroOutSigCoeffFlag = 0
 QState = 0
...
```

8.7.4.2 General

Inputs to this Process are:

- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2LfnstSize, nLfnstSize, and nonZeroSize are derived as follows:

predModeIntra=(cIdx==0)?IntraPredModeY[xTbY][yTbY]:IntraPredModeC[xTbY][yTbY] (8-965)

nLfnstOutSize=(nTbW>=8&& nTbH>=8)?48:16 (8-966)

log 2LfnstSize=(nTbW>=8 && nTbH>=8)?3:2 (8-967)

nLfnstSize=1<<log 2LfnstSize (8-968)

nonZeroSize[[=((nTbW==4&& nTbH==4)||(nTbW==8&& nTbH==8))?]]8[[:16]] (8-969)

When intra_mip_flag[xTbComp][yTbComp] is equal to 1 and cIdx is equal to 0, predModeIntra is set equal to INTRA_PLANAR.

Embodiment #14

This embodiment gives an example for 16×32 residual pattern applied to M×N (M>=8, N>=8) blocks coded with RST (a.k.a., LFNST). Alternatively, this embodiment gives an example for blocks coded with RST (a.k.a., LFNST) and nLfnstSize is equal to 8.

The newly added parts are on top of JVET-O2001 and the deleted parts are marked with double brackets (e.g., [[a]] denotes the deletion of the character "a").

Transformation Process for Scaled Transform Coefficients 8.7.4.1 General

Inputs to this Process are:

- a luma location (xTbY, yTbY) specifying the top-left sample of the current luma transform block relative to the top-left luma sample of the current picture,
- a variable nTbW specifying the width of the current transform block,
- a variable nTbH specifying the height of the current transform block,
- a variable cIdx specifying the colour component of the current block,
- an (nTbW)×(nTbH) array d[x][y] of scaled transform coefficients with x=0 . . . nTbW−1, y=0 . . . nTbH−1.

Output of this process is the (nTbW)×(nTbH) array r[x][y] of residual samples with x=0 . . . nTbW−1, y=0 . . . nTbH−1.

When lfnst_idx[xTbY][yTbY] is not equal to 0 and both nTbW and nTbH are greater than or equal to 4, the following applies:

The variables predModeIntra, nLfnstOutSize, log 2LfnstSize, nLfnstSize, and nonZeroSize are derived as follows:

predModeIntra=(cIdx==0)?IntraPredModeY[xTbY][yTbY]:IntraPredModeC[xTbY][yTbY] (8-965)

nLfnstOutSize=(nTbW>=8&& nTbH>=8)?[[48]]36:16 (8-966)

log 2LfnstSize=(nTbW>=8&& nTbH>=8)?3:2 (8-967)

nLfnstSize=1<<log 2LfnstSize (8-968)

nonZeroSize=((nTbW==4&& nTbH==4)||(nTbW==8&& nTbH==8))?8:16(8-969)

When intra_mip_flag[xTbComp][yTbComp] is equal to 1 and cIdx is equal to 0, predModeIntra is set equal to INTRA_PLANAR.

When predModeIntra is equal to either INTRA_LT_CCLM, INTRA_L_CCLM, or INTRA_T_CCLM, predModeIntra is set equal to IntraPredModeY[xTbY+nTbW/2][yTbY+nTbH/2].

The wide angle intra prediction mode mapping process as specified in clause 8.4.5.2.6 is invoked with predModeIntra, nTbW, nTbH and cIdx as inputs, and the modified predModeIntra as output.

The values of the list u[x] with x=0 . . . nonZeroSize−1 are derived as follows:

xC=DiagScanOrder[2][2][*x*][0] (8-970)

yC=DiagScanOrder[2][2][*x*][1] (8-971)

*u*[*x*]=*d*[xC][yC] (8-972)

The one-dimensional low frequency non-separable transformation process as specified in clause 8.7.4.2 is invoked with the input length of the scaled transform coefficients nonZeroSize, the transform output length nTrS set equal to nLfnstOutSize, the list of scaled non-zero transform coefficients u[x] with x=0 . . . nonZeroSize−1, the intra prediction mode for LFNST set selection predModeIntra, and the LFNST index for transform selection in the selected LFNST set lfnst_idx

[xTbY][yTbY] as inputs, and the list v[x] with x=0 . . . nLfnstOutSize−1 as output.

The array d[x][y] with x=0 . . . nLfnstSize−1, y=0 . . . nLfnstSize−1 is derived as follows:

If nLfnstSize is equal to 4, the following applies:

If predModeIntra is less than or equal to 34, the following applies:

$$d[x][y]=(y<4)?v[x+(y<<\log 2\text{LfnstSize})]:((x<4)?v[32+x+((y-4)<<2)]:d[x][y]) \quad (8\text{-}973)$$

Otherwise, the following applies:

$$d[x][y]=(x<4)?v[y+(x<<\log 2\text{LfnstSize})]:((y<4)?v[32+y+((x-4)<<2)]:d[x][y]) \quad (8\text{-}974)$$

Otherwise (if nLfnstSize is equal to 8), the following applies:

The valid area elementNum is defined with two tables as elementNum[8]={6,6,6,6,4,4,4,0} elementNumAccu[8]={0,6,12,18,24,28,32,36}

If predModeIntra is less than or equal to 34, the following applies:

$$d[x][y]=(x<\text{elementNum}[y])?v[x+\text{elementNumAccu}[y]]:d[x][y]$$

Otherwise, the following applies:

$$d[x][y]=(y<\text{elementNum}[x])?v[y+\text{elementNumAccu}[x]]:d[x][y]$$

The variable implicitMtsEnabled is derived as follows:

If sps_mts_enabled_flag is equal to 1 and one of the following conditions is true, implicitMtsEnabled is set equal to 1:

IntraSubPartitionsSplitType is not equal to ISP_NO_SPLIT cu_sbt_flag is equal to 1 and Max(nTbW, nTbH) is less than or equal to 32 sps_explicit_mts_intra_enabled_flag is equal to 0 and CuPredMode[0][xTbY][yTbY] is equal to MODE_INTRA and lfnst_idx[x0][y0] is equal to 0 and intra_mip_flag[x0][y0] is equal to 0

Otherwise, implicitMtsEnabled is set equal to 0.

8.7.4.3 Low Frequency Non-Separable Transformation Matrix Derivation Process

Inputs to this Process are:

a variable nTrS specifying the transform output length, a variable predModeIntra specifying the intra prediction mode for LFNST set selection, a variable lfnstIdx specifying the LFNST index for transform selection in the selected LFNST set.

Output of this process is the transformation matrix lowFreqTransMatrix.

The variable lfnstTrSetIdx is specified in Table 8-16 depending on predModeIntra.

TABLE 8-16

Specification of lfnstTrSetIdx

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

The transformation matrix lowFreqTransMatrix is derived based on nTrS, lfnstTrSetIdx, and lfnstIdx as follows:

If nTrS is equal to 16, lfnstTrSetIdx is equal to 0, and lfnstIdx is equal to 1, the following applies:

lowFreqTransMatrix[m][n] =

```
{
{  108  -44  -15    1  -44   19    7   -1  -11    6    2   -1    0   -1   -1    0 }
{  -40  -97   56   12  -11   29  -12   -3   18   18  -15   -3   -1   -3    2    1 }
{   25  -31   -1    7  100  -16  -29    1  -54   21   14   -4   -7    2    4    0 }
{  -32  -39  -92   51   -6  -16   36   -8    3   22   18  -15    4    1   -5    2 }
{    8   -9   33   -8  -16 -102   36   23   -4   38  -27   -5    5   16   -8   -6 }
{  -25    5   16   -3  -38   14   11   -3  -97    7   26    1   55  -10  -19    3 }
{    8    9   16    1   37   36   94  -38   -7    3  -47   11   -6  -13  -17   10 }
{    2   34   -5    1   -7   24  -25   -3    8   99  -28  -29    6  -43   21   11 }
{  -16  -27  -39 -109    6   10   16   24    3   19   10   24   -4   -7   -2   -3 }
{   -9  -10  -34    4   -9   -5  -29    5  -33  -26  -96   33   14    4   39  -14 }
{  -13    1    4   -9  -30  -17   -3  -64  -35   11   17   19  -86    6   36   14 }
{    8   -7   -5  -15    7  -30  -28  -87   31    4    4   33   61   -5  -17   22 }
{   -2   13   -6   -4   -2   28  -13  -14   -3   37  -15   -3   -2  107  -36  -24 }
{    4    9   11   31    4    9   16   19   12   33   32   94   12    0   34  -45 }
{    2   -2    8  -16    8    5   28  -17    6   -7   18  -45   40   36   97   -8 }
{    0   -2    0  -10   -1   -7   -3  -35   -1   -7   -2  -32   -6  -33  -16 -112 }
},
```

Otherwise, if nTrS is equal to 16, lfnstTrSetIdx is equal to 0, and lfnstIdx is equal to 2, the following applies:

lowFreqTransMatrix[m][n] =

```
{
{  119  -30  -22   -3  -23   -2    3    2  -16    3    6    0   -3    2    1    0 }
{  -27 -101   31   17  -47    2   22    3   19   30   -7   -9    5    3   -5   -1 }
```

-continued lowFreqTransMatrix[m][n] =

```
{    0   58   22  -15 -102    2   38    2   10  -13   -5    4   14   -1   -9    0 }
{   23    4   66  -11   22   89   -2  -26   13   -8  -38   -1   -9  -20   -2    8 }
{  -19   -5  -89    2  -26   76  -11  -17   20   13   18   -4    1  -15    3    5 }
{  -10   -1   -1    6   23   25   87   -7  -74    4   39   -5    0   -1  -20   -1 }
{  -17  -28   12   -8  -32   14  -53   -6  -68  -67   17   29    2    6   25    4 }
{    1  -24  -23    1   17   -7   52    9   50  -92  -15   27  -15  -10   -6    3 }
{   -6  -17   -2 -111    7  -17    8  -42    9   18   16   25   -4    2   -1   11 }
{    9    5   35    0    6   21   -9   34   44   -3  102   11   -7   13   11  -20 }
{    4   -5   -5  -10   15   19   -2    6    6  -12  -13    6   95   69  -29  -24 }
{   -6   -4   -9  -39    1   22    0  102  -19   19  -32   30  -16  -14   -8  -23 }
{    4   -4    7    8    4  -13  -18    5    0    0   21   22   58  -88  -54   28 }
{   -4   -7    0  -24   -7    0  -25    3   -3  -30    8  -76  -34    4  -80  -26 }
{    0    6    0   30   -6    1  -13  -23    1   20   -2   80  -44   37  -68    1 }
{    0    0   -1    5   -1   -7    1  -34   -2    3   -6   19    5  -38   11 -115 }
},
```

Otherwise, if nTrS is equal to 16, lfnstTrSetIdx is equal to 1, and lfnstIdx is equal to 1, the following applies:

lowFreqTransMatrix[ m ][ n ] =

```
{
{ -111   39    4    3   44   11  -12   -1    7  -16   -5    2    3   -1    4    2 }
{  -47  -27   15   -1  -92   43   20   -2   20   39  -16   -5   10   -5  -13    2 }
{  -35  -23    4    4  -17  -72   32    6  -59   18   50   -6    0   40    0  -13 }
{   13   93  -27   -4  -48   13  -34    4  -52   11    1   10    3   16   -3    1 }
{  -11  -27    1    2  -47   -4  -36   10   -2  -85   14   29  -20   -2   57    4 }
{    0  -35   32   -2   26   60   -3  -17  -82    1  -30    0  -37   21    3   12 }
{  -17  -46  -92   14    7  -10  -39   29  -17   27  -28   17    1  -15  -13   17 }
{    4  -10  -23    4   16   58  -17   26   30   21   67    2  -13   59   13  -40 }
{    5  -20   32   -5    8   -3  -46   -7   -4    2  -15   24  100   44    0    5 }
{   -4   -1   38  -18   -7  -42  -63   -6   33   34  -23   15  -65   33  -20    2 }
{   -2  -10   35  -19    5    8  -44   14  -25   25   58   17    7  -84  -16  -18 }
{    5   13   18   34   11   -4   18   18    5   58   -3   42   -2  -10   85   38 }
{   -5   -7  -34  -83    2   -1   -4  -73    4   20   15  -12    4   -3   44   12 }
{    0    4   -2  -60    5    9   42   34    5  -14    9   80   -5   13  -38   37 }
{   -1    2    7  -57    3   -7    9   68   -9    6  -49  -20    6   -4   36  -64 }
{   -1    0  -12   23    1   -4   17  -53   -3    4  -21   72   -4   -8   -3  -83 }
},
```

Otherwise, if nTrS is equal to 16, lfnstTrSetIdx is equal to 1, and lfnstIdx is equal to 2, the following applies:

lowFreqTransMatrix[ m ][ n ] =

```
{
{   88  -55    6   -3  -66   27    9   -2   11   11  -13    1   -2   -7    1    2 }
{  -58  -20   27   -2  -27   75  -29    0   47  -42  -11   11   -9   -3   19   -4 }
{  -51   23  -22    5  -63    3   37   -5    1   64  -35   -4   29  -31  -11   13 }
{  -27  -76   49   -2   40   14    9  -17  -56   36  -25    6   14    3   -6    8 }
{   19   -4  -36   22   52    7   36  -23   28  -17  -64   15   -5  -44   48    9 }
{   29   50   13  -10    1   34  -59    1  -51    4  -16   30   52  -33   24   -5 }
{  -12  -21  -74   43  -13   39   18   -5  -58  -35   27   -5   19   26    6   -5 }
{   19   38  -10   -5   28   66    0   -5   -4   19  -30  -26  -40   28  -60   37 }
{   -6   27   18   -5  -37  -18   12  -25  -44  -10  -38   37  -66   45   40   -7 }
{  -13  -28  -45  -39    0   -5  -39   69  -23   16  -12  -18  -50  -31   24   13 }
{   -1    8   24  -51  -15   -9   44   10  -28  -70  -12  -39   24  -18   -4   51 }
{   -8  -22  -17   33  -18  -45  -57  -27    0  -31  -30   29   -2  -13  -53   49 }
{    1   12   32   51   -8    8   -2  -31  -22    4   46  -39  -49  -67   14   17 }
{    4    5   24   60   -5  -14  -23   38    9    8  -34  -59   24   47   42   28 }
{   -1   -5  -20  -34    4    4  -15  -46   18   31   42   10   10   27   49   78 }
{   -3   -7  -22  -34   -5  -11  -36  -69   -1   -3  -25  -73    5    4    4  -49 }
},
```

Otherwise, if nTrS is equal to 16, lfnstTrSetIdx is equal to 2, and lfnstIdx is equal to 1, the following applies:

lowFreqTransMatrix[ m ][ n ] =

{

| | | | | | | | | | | | | | | | |
|---|---|---|---|---|---|---|---|---|---|---|---|---|---|---|---|
| { -112 | 47 | -2 | 2 | -34 | 13 | 2 | 0 | 15 | -7 | 1 | 0 | 8 | -3 | -1 | 0 } |
| { 29 | -7 | 1 | -1 | -108 | 40 | 2 | 0 | -45 | 13 | 4 | -1 | 8 | -5 | 1 | 0 } |
| { -36 | -87 | 69 | -10 | -17 | -33 | 26 | -2 | 7 | 14 | -11 | 2 | 6 | 8 | -7 | 0 } |
| { 28 | -5 | 2 | -2 | -29 | 13 | -2 | 0 | 103 | -36 | -4 | 1 | 48 | -16 | -4 | 1 } |
| { -12 | -24 | 15 | -3 | 26 | 80 | -61 | 9 | 15 | 54 | -36 | 2 | 0 | -4 | 6 | -2 } |
| { 18 | 53 | 69 | -74 | 14 | 24 | 28 | -30 | -6 | -7 | -11 | 12 | -5 | -7 | -6 | 8 } |
| { 5 | -1 | 2 | 0 | -26 | 6 | 0 | 1 | 45 | -9 | -1 | 0 | -113 | 28 | 8 | -1 } |
| { -13 | -32 | 18 | -2 | 15 | 34 | -27 | 7 | -25 | -80 | 47 | -1 | -16 | -50 | 28 | 2 } |
| { -4 | -13 | -10 | 19 | 18 | 46 | 60 | -48 | 16 | 33 | 60 | -48 | 1 | 0 | 5 | -2 } |
| { 15 | 33 | 63 | 89 | 8 | 15 | 25 | 40 | -4 | -8 | -15 | -8 | -2 | -6 | -9 | -7 } |
| { -8 | -24 | -27 | 15 | 12 | 41 | 26 | -29 | -17 | -50 | -39 | 27 | 0 | 35 | -67 | 26 } |
| { -2 | -6 | -24 | 13 | -1 | -8 | 37 | -22 | 3 | 18 | -51 | 22 | -23 | -95 | 17 | 17 } |
| { -3 | -7 | -16 | -21 | 10 | 24 | 46 | 75 | 8 | 20 | 38 | 72 | 1 | 2 | 1 | 7 } |
| { 2 | 6 | 10 | -3 | -5 | -16 | -31 | 12 | 7 | 24 | 41 | -16 | -16 | -41 | -89 | 49 } |
| { 4 | 8 | 21 | 40 | -4 | -11 | -28 | -57 | 5 | 14 | 31 | 70 | 7 | 18 | 32 | 52 } |
| { 0 | 1 | 4 | 11 | -2 | -4 | -13 | -34 | 3 | 7 | 20 | 47 | -6 | -19 | -42 | -101 } |

},

Otherwise, if nTrS is equal to 16, lfnstTrSetIdx is equal to 2, and lfnstIdx is equal to 2, the following applies:

lowFreqTransMatrix[ m ][ n ] =

{

| | | | | | | | | | | | | | | | |
|---|---|---|---|---|---|---|---|---|---|---|---|---|---|---|---|
| { -99 | 39 | -1 | 2 | 65 | -20 | -5 | 0 | -15 | -2 | 5 | -1 | 0 | 3 | -1 | 0 } |
| { 58 | 42 | -33 | 3 | 33 | -63 | 23 | -1 | -55 | 32 | 3 | -5 | 21 | -2 | -8 | 3 } |
| { -15 | 71 | -44 | 5 | -58 | -29 | 25 | 3 | 62 | -7 | -4 | -4 | -19 | 4 | 0 | 1 } |
| { 46 | 5 | 4 | -6 | 71 | -12 | -15 | 5 | 52 | -38 | 13 | -2 | -63 | 23 | 3 | -3 } |
| { -14 | -54 | -29 | 29 | 25 | -9 | 61 | -29 | 27 | 44 | -48 | 5 | -27 | -21 | 12 | 7 } |
| { -3 | 3 | 69 | -42 | -11 | -50 | -26 | 26 | 24 | 63 | -19 | -5 | -18 | -22 | 12 | 0 } |
| { 17 | 16 | -2 | 1 | 38 | 18 | -12 | 0 | 62 | 1 | -14 | 5 | 89 | -42 | 8 | -2 } |
| { 15 | 54 | -8 | 6 | 6 | 60 | -26 | -8 | -30 | 17 | -38 | 22 | -43 | -45 | 42 | -7 } |
| { -6 | -17 | -55 | -28 | 9 | 30 | -8 | 58 | 4 | 34 | 41 | -52 | -16 | -36 | -20 | 16 } |
| { -2 | -1 | -9 | -79 | 7 | 11 | 48 | 44 | -13 | -34 | -55 | 6 | 12 | 23 | 20 | -11 } |
| { 7 | 29 | 14 | -6 | 12 | 53 | 10 | -11 | 14 | 59 | -15 | -3 | 5 | 71 | -54 | 13 } |
| { -5 | -24 | -53 | 15 | -3 | -15 | -61 | 26 | 6 | 30 | -16 | 23 | 13 | 56 | 44 | -35 } |
| { 4 | 8 | 21 | 52 | -1 | -1 | -5 | 29 | -7 | -17 | -44 | -84 | 8 | 20 | 31 | 39 } |
| { -2 | -11 | -25 | -4 | -4 | -21 | -53 | 2 | -5 | -26 | -64 | 19 | -8 | -19 | -73 | 39 } |
| { -3 | -5 | -23 | -57 | -2 | -4 | -24 | -75 | 1 | 3 | 9 | -25 | 6 | 15 | 41 | 61 } |
| { 1 | 1 | 7 | 18 | 1 | 2 | 16 | 47 | 2 | 5 | 24 | 67 | 3 | 9 | 25 | 88 } |

},

Otherwise, if nTrS is equal to 16, lfnstTrSetIdx is equal to 3, and lfnstIdx is equal to 1, the following applies:

lowFreqTransMatrix[ m ][ n ] =

{

| | | | | | | | | | | | | | | | |
|---|---|---|---|---|---|---|---|---|---|---|---|---|---|---|---|
| { -114 | 37 | 3 | 2 | -22 | -23 | 14 | 0 | 21 | -17 | -5 | 2 | 5 | 2 | -4 | -1 } |
| { -19 | -41 | 19 | -2 | 85 | -60 | -11 | 7 | 17 | 31 | -34 | 2 | -11 | 19 | 2 | -8 } |
| { 36 | -25 | 18 | -2 | -42 | -53 | 35 | 5 | 46 | -60 | -25 | 19 | 8 | 21 | -33 | -1 } |
| { -27 | -80 | 44 | -3 | -58 | 1 | -29 | 19 | -41 | 18 | -12 | -7 | 12 | -17 | 7 | -6 } |
| { -11 | -21 | 37 | -10 | 44 | -4 | 47 | -12 | -37 | -41 | 58 | 18 | 10 | -46 | -16 | 31 } |
| { 15 | 47 | 10 | -6 | -16 | -44 | 42 | 10 | -80 | 25 | -40 | 21 | -23 | -2 | 3 | -14 } |
| { 13 | 25 | 79 | -39 | -13 | 10 | 31 | -4 | 49 | 45 | 12 | -8 | 3 | -1 | 43 | 7 } |
| { 16 | 11 | -26 | 13 | -13 | -74 | -20 | -1 | 5 | -6 | 29 | -47 | 26 | -49 | 54 | 2 } |
| { -8 | -34 | -26 | 7 | -26 | -19 | 29 | -37 | 1 | 22 | 46 | -9 | -81 | 37 | 14 | 20 } |
| { -6 | -30 | -42 | -12 | -3 | 5 | 57 | -52 | -2 | 37 | -12 | 6 | 74 | 10 | 6 | -15 } |
| { 5 | 9 | -6 | 42 | -15 | -18 | -9 | 26 | 15 | 58 | 14 | 43 | 23 | -10 | -37 | 75 } |
| { -5 | -23 | -23 | 36 | 3 | 22 | 36 | 40 | 27 | -4 | -16 | 56 | -25 | -46 | 56 | -24 } |
| { 1 | 3 | 23 | 73 | 8 | 5 | 34 | 46 | -12 | 2 | 35 | -38 | 26 | 52 | 2 | -31 } |
| { -3 | -2 | -21 | -52 | 1 | -10 | -17 | 44 | -19 | -20 | 30 | 45 | 27 | 61 | 49 | 21 } |
| { -2 | -7 | -33 | -56 | -4 | -6 | 21 | 63 | 15 | 31 | 32 | -22 | -10 | -26 | -52 | -38 } |
| { -5 | -12 | -18 | -12 | 8 | 22 | 38 | 36 | -5 | -15 | -51 | -63 | -5 | 0 | 15 | 73 } |

},

Otherwise, if nTrS is equal to 16, lfnstTrSetIdx is equal to 3, and lfnstIdx is equal to 2, the following applies:

| lowFreqTransMatrix[ m ][ n ] = | | | | | | | | | | | | | | | | | |
|---|---|---|---|---|---|---|---|---|---|---|---|---|---|---|---|---|---|
| { | | | | | | | | | | | | | | | | | |
| { | −102 | 22 | 7 | 2 | 66 | −25 | −6 | −1 | −15 | 14 | 1 | −1 | 2 | −2 | 1 | 0 | } |
| { | 12 | 93 | −27 | −6 | −27 | −64 | 36 | 6 | 13 | 5 | −23 | 0 | −2 | 6 | 5 | −3 | } |
| { | −59 | −24 | 17 | 1 | −62 | −2 | −3 | 2 | 83 | −12 | −17 | −2 | −24 | 14 | 7 | −2 | } |
| { | −33 | 23 | −36 | 11 | −21 | 50 | 35 | −16 | −23 | −78 | 16 | 19 | 22 | 15 | −30 | −5 | } |
| { | 0 | −38 | −81 | 30 | 27 | 5 | 51 | −32 | 24 | 36 | −16 | 12 | −24 | −8 | 9 | 1 | } |
| { | 28 | 38 | 8 | −9 | 62 | 32 | −13 | 2 | 51 | −32 | 15 | 5 | −66 | 28 | 0 | −1 | } |
| { | 11 | −35 | 21 | −17 | 30 | −18 | 31 | 18 | −11 | −36 | −80 | 12 | 16 | 49 | 13 | −32 | } |
| { | −13 | 23 | 22 | −36 | −12 | 64 | 39 | 25 | −19 | 23 | −36 | 9 | −30 | −58 | 33 | −7 | } |
| { | −9 | −20 | −55 | −83 | 3 | −2 | 1 | 62 | 8 | 2 | 27 | −28 | 7 | 15 | −11 | 5 | } |
| { | −6 | 24 | −38 | 23 | −8 | 40 | −49 | 0 | −7 | 9 | −25 | −44 | 23 | 39 | 70 | −3 | } |
| { | 12 | 17 | 17 | 0 | 32 | 27 | 21 | 2 | 67 | 11 | −6 | −10 | 89 | −22 | −12 | 16 | } |
| { | 2 | −9 | 8 | 45 | 7 | −8 | 27 | 35 | −9 | −31 | −17 | −87 | −23 | −22 | −19 | 44 | } |
| { | −1 | −9 | 28 | −24 | −1 | −10 | 49 | −30 | −8 | −7 | 40 | 1 | 4 | 33 | 65 | 67 | } |
| { | 5 | −12 | −24 | −17 | 13 | −34 | −32 | −16 | 14 | −67 | −7 | 9 | 7 | −74 | 49 | 1 | } |
| { | 2 | −6 | 11 | 45 | 3 | −10 | 33 | 55 | 8 | −5 | 59 | 4 | 7 | −4 | 44 | −66 | } |
| { | −1 | 1 | −14 | 36 | −1 | 2 | −20 | 69 | 0 | 0 | −15 | 72 | 3 | 4 | 5 | 65 | } |
| }, | | | | | | | | | | | | | | | | | |

Otherwise, if nTrS is equal to [[48]]36, lfnstTrSetIdx is equal to 0, and lfnstIdx is equal to 1 the following applies:

lowFreqTransMatrix[m][n]=lowFreqTransMatrixCol0to15[m][n] with m=0 . . . [15]]11, n=0 . . . 15

| lowFreqTransMatrixCol0to15 = | | | | | | | | | | | | | | | | | |
|---|---|---|---|---|---|---|---|---|---|---|---|---|---|---|---|---|---|
| { | | | | | | | | | | | | | | | | | |
| { | −117 | 28 | 18 | 2 | 4 | 1 | [[ 2 | 1 ]] | 32 | −18 | −2 | 0 | −1 | 0 | [[ 0 | 0 ]] | } |
| { | −29 | −91 | 47 | 1 | 9 | 0 | [[ 3 | 0 ]] | −54 | 26 | −8 | 3 | 0 | 1 | [[ 0 | 0 ]] | } |
| { | −10 | 62 | −11 | −8 | −2 | −2 | [[ −1 | −1 ]] | −95 | 3 | 32 | 0 | 4 | 0 | [[ 2 | 0 ]] | } |
| { | −15 | 15 | −10 | −2 | 1 | 0 | [[ 1 | 0 ]] | 10 | 112 | −20 | −17 | −4 | −4 | [[ −1 | −2 ]] | } |
| { | 32 | 39 | 92 | −44 | 4 | −10 | [[ 1 | −4 ]] | 26 | 12 | −15 | 13 | −5 | 2 | [[ −2 | 0 ]] | } |
| { | −10 | 1 | 50 | −15 | 2 | −3 | [[ 1 | −1 ]] | −28 | −15 | 14 | 6 | 1 | 1 | [[ 1 | 0 ]] | } |
| { | 1 | −33 | −11 | −14 | 7 | −2 | [[ 2 | 0 ]] | 29 | −12 | 37 | −7 | −4 | 0 | [[ −1 | 0 ]] | } |
| { | 0 | 6 | −6 | 21 | −4 | 2 | [[ 0 | 0 ]] | −20 | −24 | −104 | 30 | 5 | 5 | [[ 1 | 2 ]] | } |
| { | −13 | −13 | −37 | −101 | 29 | −11 | [[ 8 | −3 ]] | −12 | −15 | −20 | 2 | −11 | 5 | [[ −2 | 1 ]] | } |
| { | 6 | 1 | −14 | −36 | 9 | −3 | [[ 2 | 0 ]] | 10 | 9 | −18 | −1 | −3 | 1 | [[ 0 | 0 ]] | } |
| { | −12 | −2 | −26 | −12 | −9 | 2 | [[ −1 | 1 ]] | −3 | 30 | 4 | 34 | −4 | 0 | [[ −1 | 0 ]] | } |
| { | 0 | −3 | 0 | −4 | −15 | 6 | [[ −3 | 1 ]] | −7 | −15 | −28 | −86 | 19 | −5 | [[ 4 | −1 ]] | } |
| { | −1 | 9 | 13 | 5 | 14 | −2 | [[ 2 | −1 ]] | −8 | 3 | −4 | −62 | 4 | 1 | [[ 1 | 0 ]] | } |
| { | 6 | 2 | −3 | 2 | 10 | −1 | [[ 2 | 0 ]] | 8 | 3 | −1 | −20 | 0 | 1 | [[ 0 | 0 ]] | } |
| { | 6 | 9 | −2 | 35 | 110 | −22 | [[ 11 | −4 ]] | −2 | 0 | −3 | 1 | −18 | 12 | [[ −3 | 2 ]] | } |
| { | −1 | 7 | −2 | 9 | −11 | 5 | [[ −1 | 1 ]] | −7 | 2 | −22 | 4 | −13 | 0 | [[ −1 | 0 ]] | } |
| }, | | | | | | | | | | | | | | | | | |

lowFreqTransMatrix[m][n]=lowFreqTransMatrixCol16to31[m−[[16]]12][n] with m=[[16]]12 . . . [[31]]23, n=0 . . . 15

| lowFreqTransMatrixCol16to31 = | | | | | | | | | | | | | | | | | |
|---|---|---|---|---|---|---|---|---|---|---|---|---|---|---|---|---|---|
| { | | | | | | | | | | | | | | | | | |
| { | 14 | −1 | −3 | 0 | −1 | 0 | [[ 0 | 0 ]] | 2 | 0 | 0 | 0 | 0 | 0 | [[ 0 | 0 ]] | } |
| { | 33 | 5 | −9 | −1 | −2 | 0 | [[ −1 | 0 ]] | −3 | 3 | 0 | 0 | 0 | 0 | [[ 0 | 0 ]] | } |
| { | 32 | −30 | −4 | 4 | −1 | 1 | [[ 0 | 0 ]] | 6 | 2 | −5 | 0 | 0 | 0 | [[ 0 | 0 ]] | } |
| { | −20 | −26 | 31 | 1 | 0 | 0 | [[ 0 | 0 ]] | 2 | −16 | −1 | 6 | 0 | 1 | [[ 0 | 0 ]] | } |
| { | 29 | −16 | −22 | 8 | 0 | 1 | [[ 0 | 1 ]] | −20 | 6 | 4 | −3 | 1 | 0 | [[ 0 | 0 ]] | } |
| { | −99 | −4 | 9 | 5 | 5 | 2 | [[ 2 | 1 ]] | 44 | −10 | −11 | 1 | −2 | 0 | [[ −1 | 0 ]] | } |
| { | 6 | −99 | 3 | 26 | −1 | 5 | [[ 0 | 2 ]] | 14 | 30 | −27 | −2 | 1 | −1 | [[ 0 | −1 ]] | } |
| { | −7 | −46 | 10 | −14 | 7 | 0 | [[ 1 | 0 ]] | 9 | 21 | 7 | −6 | −2 | −1 | [[ 0 | −1 ]] | } |
| { | −12 | 10 | 26 | 12 | −6 | 0 | [[ −1 | 0 ]] | −32 | −2 | 11 | 3 | 3 | −1 | [[ 1 | 0 ]] | } |
| { | 38 | 26 | −13 | −1 | −5 | −1 | [[ −1 | 0 ]] | 102 | 3 | −14 | −1 | −5 | −1 | [[ −2 | 0 ]] | } |
| { | −30 | 3 | −92 | 14 | 19 | 0 | [[ 3 | 0 ]] | −11 | 34 | 21 | −33 | 1 | −2 | [[ 0 | −1 ]] | } |
| { | −5 | −17 | −41 | 42 | −6 | 2 | [[ −1 | 1 ]] | −1 | −40 | 37 | 13 | −4 | 2 | [[ −1 | 1 ]] | } |
| { | −12 | 23 | 16 | −11 | −17 | 0 | [[ −1 | 0 ]] | −11 | 97 | −3 | −3 | 0 | −6 | [[ 0 | −2 ]] | } |
| { | −4 | 4 | −16 | 0 | −2 | 0 | [[ 1 | 0 ]] | 34 | 23 | 6 | −7 | −4 | −2 | [[ −1 | 0 ]] | } |

-continued

| lowFreqTransMatrixCol16to31 = | | | | | | | | | | | | | | |
|---|---|---|---|---|---|---|---|---|---|---|---|---|---|---|
| { | −5 | −4 | −22 | 8 | −25 | 3 | [[ 0 0 ]] | −3 | −21 | 2 | −3 | 9 | −2 | [[ 1 0 ]] } |
| { | 0 | 28 | 0 | 76 | 4 | −6 | [[ 0 −2 ]] | −13 | 5 | −76 | −4 | 33 | −1 | [[ 3 0 ]] } |
| }, | | | | | | | | | | | | | | |

lowFreqTransMatrix[m][n]= lowFreqTransMatrixCol32to47[m−[[32]]24][n] with m=[[32]]24 . . . [[47]]35, n=0 . . . 15

| lowFreqTransMatrixCol32to47 = | | | | | | | | | | | | | |
|---|---|---|---|---|---|---|---|---|---|---|---|---|---|
| { | | | | | | | | | | | | | |
| { | 3 | 0 | −1 | 0 | 1 | 0 | 0 | 0 | 1 | 0 | 0 | 0 | [[ 1 0 0 0 ]] } |
| { | 7 | 2 | −2 | 0 | −1 | 1 | 0 | 0 | 2 | 1 | −1 | 0 | [[ 0 0 0 0 ]] } |
| { | 6 | −3 | 0 | 0 | 2 | 0 | −1 | 0 | 2 | −1 | 0 | 0 | [[ 1 0 0 0 ]] } |
| { | 1 | −4 | 0 | 0 | 0 | −3 | 0 | 1 | 0 | −1 | 0 | 0 | [[ 0 −2 0 0 ]] } |
| { | 1 | −4 | −3 | 2 | −4 | 1 | 0 | 0 | 1 | −1 | −2 | 1 | [[ −2 0 0 0 ]] } |
| { | −5 | 4 | −3 | 0 | 8 | −1 | −2 | 0 | −2 | 1 | −1 | 0 | [[ 4 0 −1 0 ]] } |
| { | −6 | 6 | 6 | −3 | 1 | 3 | −3 | 0 | −1 | 1 | 1 | 0 | [[ 0 1 −1 0 ]] } |
| { | 2 | 2 | 5 | −2 | 0 | 3 | 4 | −1 | 0 | 0 | 1 | 0 | [[ 0 1 2 −1 ]] } |
| { | 11 | −5 | −1 | 6 | −4 | 2 | 1 | 0 | 3 | −1 | 1 | 2 | [[ −1 0 0 0 ]] } |
| { | −29 | 10 | 10 | 0 | 10 | −4 | −1 | 1 | −7 | 1 | 2 | 1 | [[ 2 −1 0 0 ]] } |
| { | −9 | −4 | 18 | 3 | 2 | 0 | 0 | −2 | −1 | −1 | 3 | 0 | [[ 0 0 0 −1 ]] } |
| { | −10 | 13 | −1 | −4 | 4 | −4 | 3 | 4 | −2 | 2 | −1 | −1 | [[ 1 −1 1 2 ]] } |
| { | −21 | −5 | 23 | 0 | 2 | −2 | −1 | 6 | −3 | −3 | 1 | 0 | [[ 0 0 0 2 ]] } |
| { | 108 | −5 | −30 | 6 | −27 | 10 | 7 | −2 | 11 | −3 | −1 | 1 | [[ −4 1 0 1 ]] } |
| { | −7 | 1 | 3 | −5 | 3 | 0 | −1 | 0 | 0 | 1 | 0 | −1 | [[ 1 0 0 0 ]] } |
| { | 9 | 18 | −3 | −35 | −4 | −1 | 6 | 1 | 1 | 2 | 0 | −3 | [[ −1 0 2 0 ]] } |
| }, | | | | | | | | | | | | | |

Otherwise, if nTrS is equal to [[48]]36, lfnstTrSetIdx is equal to 0, and lfnstIdx is equal to 2 the following applies:

lowFreqTransMatrix[m][n]= lowFreqTransMatrixCol0to15[m][n] with m=0 . . . [[15]]11, n=0 . . . 15

| lowFreqTransMatrixCol0to15 = | | | | | | | | | | | | | | |
|---|---|---|---|---|---|---|---|---|---|---|---|---|---|---|
| { | | | | | | | | | | | | | | |
| { | −108 | 48 | 9 | 1 | 1 | 1 | [[ 0 0 ]] | 44 | −6 | −9 | −1 | −1 | 0 | [[ −1 0 ]] } |
| { | 55 | 66 | −37 | −5 | −6 | −1 | [[ −2 0 ]] | 67 | −30 | −20 | 4 | −2 | 0 | [[ −1 0 ]] } |
| { | 2 | 86 | −21 | −13 | −4 | −2 | [[ −1 −1 ]] | −88 | 5 | 6 | 4 | 5 | 1 | [[ 1 0 ]] } |
| { | −24 | −21 | −38 | 19 | 0 | 4 | [[ −1 2 ]] | −23 | −89 | 31 | 20 | 2 | 3 | [[ 1 1 ]] } |
| { | 9 | 20 | 98 | −26 | −3 | −5 | [[ 0 −2 ]] | −9 | −26 | 15 | −16 | 2 | 0 | [[ 1 0 ]] } |
| { | −21 | −7 | −37 | 10 | 2 | 2 | [[ −1 1 ]] | −10 | 69 | −5 | −7 | −2 | −2 | [[ 0 −1 ]] } |
| { | −10 | −25 | 4 | −17 | 8 | −2 | [[ 2 −1 ]] | −27 | −17 | −71 | 25 | 8 | 2 | [[ 1 1 ]] } |
| { | 2 | 5 | 10 | 64 | −9 | 4 | [[ −3 1 ]] | −4 | 8 | 62 | 3 | −17 | 1 | [[ −2 0 ]] } |
| { | −11 | −15 | −28 | −97 | 6 | −1 | [[ 4 −1 ]] | 7 | 3 | 57 | −15 | 10 | −2 | [[ 0 −1 ]] } |
| { | 9 | 13 | 24 | −6 | 7 | −2 | [[ 1 −1 ]] | 16 | 39 | 20 | 47 | −2 | −2 | [[ −2 0 ]] } |
| { | −7 | 11 | 12 | 7 | 2 | −1 | [[ 0 −1 ]] | −14 | −1 | −24 | 11 | 2 | 0 | [[ 0 0 ]] } |
| { | 0 | 0 | 7 | −6 | 23 | −3 | [[ 3 −1 ]] | 5 | 1 | 18 | 96 | 13 | −9 | [[ −1 −1 ]] } |
| { | −2 | −6 | −1 | −10 | 0 | 1 | [[ 1 0 ]] | −7 | −2 | −28 | 20 | −15 | 4 | [[ −3 1 ]] } |
| { | −1 | 6 | −16 | 0 | 24 | −3 | [[ 1 −1 ]] | 2 | 6 | 6 | 16 | 18 | −7 | [[ 1 −1 ]] } |
| { | −5 | −6 | −3 | −19 | −104 | 18 | [[ −4 3 ]] | 0 | 6 | 0 | 35 | −41 | 20 | [[ −2 2 ]] } |
| { | −1 | −2 | 0 | 23 | −9 | 0 | [[ −2 0 ]] | 1 | 1 | 8 | −1 | 29 | 1 | [[ 1 0 ]] } |
| }, | | | | | | | | | | | | | | |

lowFreqTransMatrix[m][n]= lowFreqTransMatrixCol16to31[m−[[16]]12][n] with m=[[16]]12 . . . [[31]]23, n=0 . . . 15

| lowFreqTransMatrixCol16to31 = | | | | | | | | | | | | | | |
|---|---|---|---|---|---|---|---|---|---|---|---|---|---|---|
| { | | | | | | | | | | | | | | |
| { | 9 | −9 | −1 | 1 | 0 | 0 | [[ 0 0 ]] | 3 | −1 | 1 | 0 | 0 | 0 | [[ 0 0 ]] } |
| { | −31 | −19 | 14 | 4 | 1 | 1 | [[ 1 0 ]] | −6 | 3 | 5 | −2 | 0 | 0 | [[ 0 0 ]] } |
| { | 14 | −5 | 0 | 3 | 0 | 0 | [[ 0 0 ]] | 10 | −5 | −2 | 0 | −1 | 0 | [[ 0 0 ]] } |

-continued lowFreqTransMatrixCol16to31 =

```
{
{    9   -9   -1    1    0    0  [[  0   0 ]]     3   -1    1    0    0    0  [[  0   0 ]]  }
{  -31  -19   14    4    1    1  [[  1   0 ]]    -6    3    5   -2    0    0  [[  0   0 ]]  }
{  -30   26   36   -8   -2   -2  [[  0  -1 ]]    14   18   -7   -9   -1   -1  [[  0   0 ]]  }
{  -61   -3   -2    3    7    1  [[  1   0 ]]    12   16   -6   -1    0   -1  [[  0   0 ]]  }
{  -93    2   19    0    3    0  [[  2   0 ]]    17    4    0    0   -1    0  [[  0   0 ]]  }
{   -4  -66   28   36   -5    3  [[  0   1 ]]   -10   20   33  -13   -8    0  [[  0  -1 ]]  }
{   -3  -75    5  -14    1    4  [[  0   1 ]]   -36    3   18   -4    4    0  [[  1   0 ]]  }
{   -1  -27   13    6    1   -1  [[  0   0 ]]   -34   -6    0    3    4    1  [[  2   0 ]]  }
{   28   23   76   -5  -25   -3  [[ -3  -1 ]]     6   36   -7  -39   -4   -1  [[  0  -1 ]]  }
{  -20   48   11  -13   -5   -2  [[  0  -1 ]]  -105  -19   17    0    6    2  [[  3   0 ]]  }
{  -21   -7  -42   14  -24   -3  [[  0   0 ]]    11  -47   -7    3   -5    9  [[  1   2 ]]  }
{   -2  -32   -2  -66    3    7  [[  1   2 ]]   -11   13  -70    5   43   -2  [[  3   0 ]]  }
{   -3   11  -63    9    4   -5  [[  2  -1 ]]   -22   94   -4   -6   -4   -4  [[  1  -2 ]]  }
{   -2   10  -18   16   21    3  [[ -2   0 ]]    -2   11    6  -10    6   -3  [[ -1   0 ]]  }
{    3   -6   13   76   30  -11  [[ -1  -2 ]]   -26   -8  -69    7   -9   -7  [[  3  -1 ]]  }
},
```

lowFreqTransMatrix[m][n]= lowFreqTransMatrixCol32to47[m−[[32]]24][n] with m=[[32]]24 . . . [[47]]35, n=0 . . . 15 lowFreqTransMatrixCol32to47 =

```
{
{    1   -1    0    0    1    0    0    0    0   -1    0    0  [[  0   0   0   0 ]]  }
{   -7   -1    1    0   -1    1    1    0   -2   -1    1    0  [[  0   0   0   0 ]]  }
{    6   -5    0    1    2   -1    0    0    1   -1    0    0  [[  1   0   0   0 ]]  }
{    1    3   -2   -1    3    2   -2   -1    0    1    0    0  [[  1   1  -1   0 ]]  }
{    2    0   -8    1    3    1   -1    1    0   -1   -2    0  [[  1   0  -1   0 ]]  }
{    5   -4   -2    0    4   -2    0    1    0    0    0    0  [[  2  -1   0   0 ]]  }
{    3    6   -3   -7   -1    3    3   -1    1    0   -1    0  [[  0   1   1  -1 ]]  }
{    1   14   -2   -8   -2    1   -3    0    2    2   -1   -2  [[  0   1  -1   0 ]]  }
{   -2    8    1    5   -2    0   -3    1    1    1    0    2  [[ -1   0  -1   0 ]]  }
{    2   -4  -18   -3   -1   -1   -2   -2    1   -2   -2    0  [[  0   0  -1  -1 ]]  }
{  -14    8    8    2    1    2   -1   -2    3    0   -1    0  [[  0   0   0   0 ]]  }
{    0   -1   19   -1    1    0   -1   -6   -1    1    2    0  [[  1   0   0  -2 ]]  }
{    8  -14   -3   43   -1    2    7   -1    1   -2    1    3  [[ -1   1   1   0 ]]  }
{   10   23  -19   -5    0   -6   -4    6    3   -2    1    1  [[  0  -1   0   0 ]]  }
{   -1    5   -1   -6   -1   -1   -1   -1   -1    0    0    0  [[  0   0   0  -1 ]]  }
{  -10  -34  -25   13   -1    0   11    5    1   -1    1   -2  [[  0   0   2   0 ]]  }
},
```

Otherwise, if nTrS is equal to [[48]]36, lfnstTrSetIdx is equal to 1, and lfnstIdx is equal to 1 the following applies:

lowFreqTransMatrix[m][n]= lowFreqTransMatrixCol0to15[m][n] with m=0 . . . [[15]]11, n=0 . . . 15 lowFreqTransMatrixCol0to15 =

```
{
{  110  -49   -3   -4   -1   -1  [[  0  -1 ]]   -38   -1   10    0    2    0  [[  1   0 ]]  }
{  -43  -19   17   -1    3    0  [[  1   0 ]]   -98   46   14   -1    2    0  [[  1   0 ]]  }
{  -19   17   -7    3   -2    1  [[ -1   0 ]]   -32  -59   29    3    4    0  [[  2   0 ]]  }
{  -35 -103   39    1    7    0  [[  2   0 ]]    38  -13   25   -6    1   -1  [[  0   0 ]]  }
{    9    5   -6   -1   -1    0  [[ -1   0 ]]    42    4   21  -11    1   -3  [[  1  -1 ]]  }
{   -5   -5  -28    9   -3    2  [[ -1   1 ]]   -20  -78   22   16    1    3  [[  0   1 ]]  }
{   14   17   27  -12    1   -3  [[  1  -1 ]]     8   19  -13    4   -2    1  [[ -1   0 ]]  }
{    7   35   17   -4   -1    0  [[  0   0 ]]     3    8   54  -17    1   -2  [[  1  -1 ]]  }
{  -13  -27 -101   24   -8    6  [[ -3   2 ]]    11   43    6   28   -6    3  [[ -1   1 ]]  }
{  -11  -13   -3  -10    3   -1  [[  1   0 ]]   -19  -19  -37    8    4    2  [[  0   1 ]]  }
{   -4  -10  -24  -11    3   -2  [[  0  -1 ]]    -6  -37  -45  -17    8   -2  [[  2  -1 ]]  }
{   -2    1   13  -17    3   -5  [[  1  -2 ]]     3    0  -55   22    6    1  [[  1   0 ]]  }
{    3    1    5  -15    1   -2  [[  1  -1 ]]     7    4   -7   29   -1    2  [[ -1   1 ]]  }
{   -4   -8   -1  -50    6   -4  [[  2  -2 ]]    -1    5  -22   20    6    1  [[  0   0 ]]  }
{    5   -1   26  102  -13   12  [[ -4   4 ]]    -4   -2  -40   -7  -23    3  [[ -5   1 ]]  }
{   -5   -6  -27  -22  -12    0  [[ -3   0 ]]    -5    8  -20  -83    0    0  [[  0   0 ]]  }
},
```

lowFreqTransMatrix[m][n]= lowFreqTransMatrixCol16to31[m−[[16]]12][n] with m=[[16]]12 . . . [[31]]23, n=0 . . . 15

| lowFreqTransMatrixCol16to31 = | | | | | | | | | | | | | | | | | |
|---|---|---|---|---|---|---|---|---|---|---|---|---|---|---|---|---|---|
| { | | | | | | | | | | | | | | | | | |
| { | −9 | 13 | 1 | −2 | 0 | 0 | [[ 0 | 0 ]] | −4 | 2 | −3 | 0 | 0 | 0 | [[ 0 | 0 ]] | } |
| { | 26 | 26 | −15 | −3 | −2 | −1 | [[ −1 | 0 ]] | 11 | −7 | −9 | 2 | 0 | 0 | [[ 0 | 0 ]] | } |
| { | −72 | 43 | 34 | −9 | 3 | −2 | [[ 1 | −1 ]] | 13 | 36 | −18 | −10 | 0 | −2 | [[ 0 | −1 ]] | } |
| { | −1 | 7 | 6 | −7 | 1 | −1 | [[ 0 | 0 ]] | −13 | 14 | 2 | −4 | 2 | −1 | [[ 0 | 0 ]] | } |
| { | 21 | 70 | −32 | −21 | 0 | −4 | [[ −1 | −1 ]] | 34 | −26 | −57 | 11 | 4 | 2 | [[ 0 | 1 ]] | } |
| { | 80 | −6 | 25 | −5 | −4 | −1 | [[ −1 | 0 ]] | 6 | −24 | 7 | −9 | 0 | 0 | [[ 0 | 0 ]] | } |
| { | 48 | −1 | 48 | −15 | −4 | −2 | [[ −1 | −1 ]] | 1 | 60 | −28 | −42 | 5 | −6 | [[ 1 | −2 ]] | } |
| { | 10 | 14 | −11 | −34 | 4 | −4 | [[ 1 | −1 ]] | −80 | −7 | −6 | 2 | 15 | 0 | [[ 3 | 0 ]] | } |
| { | −3 | 14 | 21 | −12 | −7 | −2 | [[ −1 | −1 ]] | −23 | 10 | −4 | −12 | 3 | 0 | [[ 1 | 0 ]] | } |
| { | −12 | −30 | 3 | −9 | 5 | 0 | [[ 1 | 0 ]] | −56 | −9 | −47 | 8 | 21 | 1 | [[ 4 | 1 ]] | } |
| { | 17 | 14 | −58 | 14 | 15 | 0 | [[ 2 | 0 ]] | −10 | 34 | −7 | 28 | 4 | −1 | [[ 1 | 0 ]] | } |
| { | 8 | 74 | 21 | 40 | −14 | 0 | [[ −2 | 0 ]] | −36 | −8 | 11 | −13 | −23 | 1 | [[ −3 | 0 ]] | } |
| { | 8 | 3 | 12 | −14 | −9 | −1 | [[ −1 | 0 ]] | 4 | 29 | −15 | 31 | 10 | 4 | [[ 1 | 1 ]] | } |
| { | −16 | −15 | 18 | −29 | −11 | 2 | [[ −2 | 1 ]] | 40 | −45 | −19 | −22 | 31 | 2 | [[ 4 | 1 ]] | } |
| { | −1 | 5 | 8 | −23 | 7 | 2 | [[ 1 | 1 ]] | 10 | −11 | −13 | −3 | 12 | −3 | [[ 2 | 0 ]] | } |
| { | 9 | 7 | 24 | −20 | 41 | 3 | [[ 6 | 1 ]] | 15 | 20 | 12 | 11 | 17 | −9 | [[ 1 | −2 ]] | } |
| }, | | | | | | | | | | | | | | | | | |

lowFreqTransMatrix[m][n]= lowFreqTransMatrixCol32to47[m−[[32]]24][n] with m=[[32]]24 . . . [[47]]35, n=0 . . . 15

| lowFreqTransMatrixCol32to47 = | | | | | | | | | | | | | | | | | |
|---|---|---|---|---|---|---|---|---|---|---|---|---|---|---|---|---|---|
| { | | | | | | | | | | | | | | | | | |
| { | −2 | 2 | 0 | 1 | −1 | 1 | 0 | 0 | −1 | 1 | 0 | 0 | [[ −1 | 0 | 0 | 0 ]] | } |
| { | 9 | −3 | −1 | 2 | 3 | −3 | 0 | 0 | 4 | −1 | 0 | 0 | [[ 2 | −1 | 0 | 0 ]] | } |
| { | 3 | 0 | −12 | 3 | 6 | 1 | −3 | 2 | 1 | −1 | −2 | 0 | [[ 3 | 1 | −1 | 1 ]] | } |
| { | −2 | 11 | −6 | −2 | −2 | 4 | −3 | 0 | 0 | 3 | −2 | 0 | [[ −1 | 1 | −1 | 0 ]] | } |
| { | −4 | −32 | 5 | 24 | 1 | −6 | 12 | 4 | −3 | −2 | 4 | −2 | [[ 0 | −1 | 0 | 0 ]] | } |
| { | −7 | 3 | 13 | −4 | −3 | 5 | 1 | −5 | −2 | 3 | 1 | −2 | [[ −1 | 2 | −1 | −2 ]] | } |
| { | 11 | −11 | −51 | 11 | −2 | −10 | −2 | 13 | 2 | −6 | −4 | 4 | [[ −2 | −3 | 2 | 2 ]] | } |
| { | −16 | 46 | 1 | 3 | 2 | 7 | −24 | 0 | 2 | −2 | −5 | 8 | [[ 1 | −1 | −2 | 2 ]] | } |
| { | 2 | 9 | −10 | 0 | 1 | −5 | −4 | 4 | 2 | −2 | 2 | 2 | [[ 0 | −2 | 1 | 0 ]] | } |
| { | −11 | −30 | 10 | 59 | −2 | 8 | 41 | 8 | 2 | 5 | 6 | −7 | [[ −1 | 3 | 5 | −2 ]] | } |
| { | 23 | 34 | −31 | 4 | 10 | −22 | −30 | 22 | 4 | −15 | 9 | 20 | [[ 2 | −5 | 9 | 4 ]] | } |
| { | −36 | 6 | 16 | −14 | 2 | 19 | −4 | −12 | −1 | 0 | −7 | −3 | [[ 0 | 2 | −2 | −1 ]] | } |
| { | 61 | 22 | 55 | 14 | 13 | 3 | −9 | −65 | 1 | −11 | −21 | −7 | [[ 0 | 0 | −1 | 3 ]] | } |
| { | −25 | 41 | 0 | 12 | 9 | 7 | −42 | 12 | −3 | −14 | 2 | 28 | [[ 5 | 1 | 6 | 2 ]] | } |
| { | −9 | 23 | 4 | 9 | 14 | 9 | −14 | −4 | 0 | −12 | −7 | 6 | [[ 3 | 0 | 6 | 3 ]] | } |
| { | −26 | −1 | 18 | −1 | −12 | 32 | 3 | −18 | −5 | 10 | −25 | −5 | [[ −2 | 1 | −8 | 10 ]] | } |
| }, | | | | | | | | | | | | | | | | | |

Otherwise, if nTrS is equal to [[48]]36, lfnstTrSetIdx is equal to 1, an lfnstIdx is equal to 2 the following applies:

lowFreqTransMatrix[m][n]= lowFreqTransMatrixCol0to15[m][n] with m=0 . . . [[15]]11, n=0 . . . 15

| lowFreqTransMatrixCol0to15 = | | | | | | | | | | | | | | | | | |
|---|---|---|---|---|---|---|---|---|---|---|---|---|---|---|---|---|---|
| { | | | | | | | | | | | | | | | | | |
| { | 80 | −49 | 6 | −4 | 1 | −1 | [[ 1 | −1 ]] | −72 | 36 | 4 | 0 | 1 | 0 | [[ 0 | 0 ]] | } |
| ( | −72 | −6 | 17 | 0 | 3 | 0 | [[ 1 | 0 ]] | −23 | 58 | −21 | 2 | −3 | 1 | [[ −1 | 0 ]] | } |
| { | −50 | 19 | −15 | 4 | −1 | 1 | [[ −1 | 1 ]] | −58 | −2 | 30 | −3 | 4 | −1 | [[ 2 | 0 ]] | } |
| { | −33 | −43 | 28 | −7 | 4 | −2 | [[ 2 | −1 ]] | −38 | 11 | −8 | 4 | 1 | 1 | [[ 0 | 0 ]] | } |
| { | 10 | 66 | −21 | −3 | −3 | 0 | [[ −1 | 0 ]] | −53 | −41 | −2 | 16 | −1 | 4 | [[ −1 | 1 ]] | } |
| { | 18 | 14 | 13 | −9 | 2 | −2 | [[ 1 | −1 ]] | 34 | 32 | −31 | 12 | −5 | 2 | [[ −2 | 1 ]] | } |
| { | 21 | 66 | −1 | 9 | −4 | 2 | [[ −1 | 1 ]] | −21 | 41 | −30 | −10 | 0 | −2 | [[ 0 | −1 ]] | } |
| { | 1 | −6 | −24 | 17 | −5 | 3 | [[ −2 | 1 ]] | 24 | 10 | 39 | −21 | 5 | −4 | [[ 2 | −1 ]] | } |
| { | 9 | 33 | −24 | 1 | 4 | 0 | [[ 1 | 0 ]] | 6 | 50 | 26 | 1 | −10 | 0 | [[ −2 | 0 ]] | } |
| { | −7 | −9 | −32 | 14 | −3 | 3 | [[ −1 | 1 ]] | −23 | −28 | 0 | −5 | −1 | 0 | [[ 0 | 0 ]] | } |
| { | 6 | 30 | 69 | −18 | 5 | −4 | [[ 3 | −1 ]] | −3 | −11 | −34 | −16 | 9 | −4 | [[ 2 | −1 ]] | } |
| { | 1 | −8 | 24 | −3 | 7 | −2 | [[ 2 | −1 ]] | −6 | −51 | −6 | −4 | −5 | 0 | [[ −1 | 0 ]] | } |
| { | 4 | 10 | 4 | 17 | −9 | 4 | [[ −2 | 1 ]] | 5 | 14 | 32 | 1−5 | 9 | −3 | [[ 2 | −1 ]] | } |
| { | −3 | −9 | −23 | 10 | −10 | 3 | [[ −3 | 1 ]] | −5 | −14 | −16 | −27 | 13 | −5 | [[ 2 | −1 ]] | } |
| { | 2 | 11 | 22 | 2 | 9 | −2 | [[ 2 | 0 ]] | −6 | −7 | 20 | −32 | −3 | −4 | [[ 0 | −1 ]] | } |
| { | 2 | −3 | 8 | 14 | −5 | 3 | [[ −1 | 1 ]] | −2 | −11 | 5 | −18 | 8 | −3 | [[ 2 | −1 ]] | } |
| }, | | | | | | | | | | | | | | | | | |

lowFreqTransMatrix[m][n]= lowFreqTransMatrixCol16to31[m−[[16]]12][n] with m=[[16]]12 . . . [[31]]23, n=0 . . . 15 lowFreqTransMatrixCol16to31 =

| | | | | | | | | | | | | | | | | | | | | | |
|---|---|---|---|---|---|---|---|---|---|---|---|---|---|---|---|---|---|---|---|---|---|
| { | | | | | | | | | | | | | | | | | | | | | |
| { | 26 | 0 | −12 | 2 | −2 | 1 | [[ | −1 | 0 | ]] | −7 | −9 | 6 | 1 | 0 | 0 | [[ | 0 | 0 | ]] | } |
| { | 55 | −46 | −1 | 6 | −2 | 1 | [[ | −1 | 0 | ]] | −22 | 7 | 17 | −7 | 2 | −1 | [[ | 1 | 0 | ]] | } |
| { | 6 | 57 | −31 | 0 | −2 | 0 | [[ | −1 | 0 | ]] | 34 | −48 | −2 | 14 | −4 | 3 | [[ | −1 | 1 | ]] | } |
| { | −55 | 24 | 26 | −5 | 2 | −1 | [[ | 1 | 0 | ]] | 15 | 46 | −40 | −1 | −1 | 0 | [[ | −1 | 0 | ]] | } |
| { | 36 | −5 | 41 | −20 | 3 | −3 | [[ | 1 | −1 | ]] | −30 | 26 | −32 | −3 | 7 | −2 | [[ | 2 | −1 | ]] | } |
| { | 40 | 4 | −4 | −9 | −3 | −2 | [[ | −1 | −1 | ]] | 27 | −31 | −43 | 19 | −2 | 3 | [[ | −1 | 1 | ]] | } |
| { | −35 | −17 | −3 | 26 | −6 | 5 | [[ | −2 | 2 | ]] | 56 | 3 | 18 | −25 | −1 | −2 | [[ | −1 | −1 | ]] | } |
| { | 33 | 32 | −30 | 4 | −3 | −1 | [[ | −1 | 0 | ]] | −4 | 13 | −16 | −10 | 0 | −1 | [[ | 0 | 0 | ]] | } |
| { | −27 | 1 | −28 | −21 | 16 | −5 | [[ | 3 | −2 | ]] | −23 | 36 | −2 | 40 | −17 | 4 | [[ | −3 | 1 | ]] | } |
| { | −36 | −59 | −24 | 14 | 4 | 2 | [[ | 1 | 1 | ]] | −23 | −26 | 23 | 26 | −3 | 5 | [[ | 0 | 2 | ]] | } |
| { | −16 | 35 | −35 | 30 | −9 | 3 | [[ | −2 | 1 | ]] | −57 | −13 | 6 | 4 | −5 | 5 | [[ | −1 | 1 | ]] | } |
| { | 38 | −1 | 0 | 25 | 6 | 2 | [[ | 1 | 1 | ]] | 47 | 20 | 35 | 1 | −27 | 1 | [[ | −5 | 0 | ]] | } |
| { | 7 | 13 | 19 | 15 | −8 | 1 | [[ | −1 | 0 | ]] | 3 | 25 | 30 | −18 | 1 | −2 | [[ | 0 | −1 | ]] | } |
| { | −1 | −13 | −30 | 11 | −5 | 2 | [[ | −1 | 0 | ]] | −5 | −8 | −22 | −16 | 10 | 0 | [[ | 1 | 0 | ]] | } |
| { | 13 | −5 | −28 | 6 | 18 | −4 | [[ | 3 | −1 | ]] | −26 | 27 | −14 | 6 | −20 | 0 | [[ | −2 | 0 | ]] | } |
| { | 12 | −23 | −19 | 22 | 2 | 0 | [[ | 1 | 0 | ]] | 23 | 41 | −7 | 35 | −10 | 4 | [[ | −1 | 1 | ]] | } |
| {, | | | | | | | | | | | | | | | | | | | | | |

lowFreqTransMatrix[m][n]= lowFreqTransMatrixCol32to47[m−[[32]]24][n] with m=[[32]]24 . . . [[47]]35, n=0 . . . 15 lowFreqTransMatrixCol32to47 =

| | | | | | | | | | | | | | | | | | | | |
|---|---|---|---|---|---|---|---|---|---|---|---|---|---|---|---|---|---|---|---|
| { | | | | | | | | | | | | | | | | | | | |
| { | 3 | 5 | −1 | −2 | −2 | −2 | −1 | 1 | 1 | 1 | 0 | 0 | [[ | −1 | −1 | 0 | 0 | ]] | } |
| { | 9 | 5 | −12 | 1 | −3 | −4 | 4 | 2 | 4 | 1 | −2 | −1 | [[ | −1 | −1 | 1 | 0 | ]] | } |
| { | −10 | 7 | 21 | −10 | 6 | 1 | −11 | 0 | −1 | −1 | 4 | 2 | [[ | 3 | 0 | −2 | −1 | ]] | } |
| { | 17 | −38 | 1 | 17 | −3 | 11 | 15 | −11 | 3 | −1 | −10 | 1 | [[ | 0 | 1 | 3 | 2 | ]] | } |
| { | 15 | −8 | 1 | 17 | −1 | −2 | 4 | −8 | 2 | 0 | −1 | 3 | [[ | 0 | 0 | 0 | −1 | ]] | } |
| { | 7 | −49 | 52 | 10 | −11 | 22 | 7 | −26 | −1 | −6 | −9 | 6 | [[ | −2 | 2 | 4 | −2 | ]] | } |
| { | −15 | −13 | −27 | 9 | 9 | −6 | 20 | 5 | −3 | 2 | −6 | −9 | [[ | 3 | −3 | 1 | 5 | ]] | } |
| { | 24 | −26 | −37 | 33 | 5 | −32 | 55 | −5 | −7 | 22 | −14 | −22 | [[ | 1 | −9 | −3 | 13 | ]] | } |
| { | 43 | −13 | 4 | −41 | −19 | −2 | −24 | 17 | 11 | −4 | 8 | 4 | [[ | −3 | −3 | −3 | −3 | ]] | } |
| { | 10 | −26 | 38 | 7 | −12 | 11 | 42 | −22 | −5 | 20 | −14 | −15 | [[ | −1 | −2 | 1 | 6 | ]] | } |
| { | 28 | 10 | 4 | 7 | 0 | −15 | 7 | −10 | −1 | 7 | −2 | 2 | [[ | 1 | −3 | 0 | 0 | ]] | } |
| { | 37 | −37 | −9 | −47 | −28 | 5 | 0 | 18 | 8 | 6 | 0 | −8 | [[ | −4 | −3 | −2 | 1 | ]] | } |
| { | 11 | 24 | 22 | −11 | −3 | 37 | −13 | −58 | −5 | 12 | −63 | 26 | [[ | 9 | −15 | 11 | 8 | ]] | } |
| { | 0 | −29 | −27 | 6 | −27 | −10 | −30 | 9 | −3 | −10 | −7 | 77 | [[ | 9 | −13 | 45 | −8 | ]] | } |
| { | −76 | −26 | −4 | −7 | 12 | 51 | 5 | 24 | 7 | −17 | −16 | −12 | [[ | −5 | 4 | 2 | 13 | ]] | } |
| { | 5 | 7 | 23 | 55 | 69 | −38 | −8 | −32 | −15 | −31 | 24 | 11 | [[ | 2 | 18 | 11 | −15 | ]] | { |
| }, | | | | | | | | | | | | | | | | | | | |

Otherwise, if nTrS is equal to [[48]]36, lfnstTrSetIdx is equal to 2, and lfnstIdx is equal to 1 the following applies:

lowFreqTransMatrix[m][n]= lowFreqTransMatrixCol0to15[m][n] with m=0 . . . [[15]]11, n=0 . . . 15 lowF reqT ransMatrixCol0to15 =

| | | | | | | | | | | | | | | | | | | | | | |
|---|---|---|---|---|---|---|---|---|---|---|---|---|---|---|---|---|---|---|---|---|---|
| { | | | | | | | | | | | | | | | | | | | | | |
| { | −121 | 33 | 4 | 4 | 1 | 2 | [[ | 0 | 1 | ]] | −1 | −1 | 1 | 0 | 0 | 0 | [[ | 0 | 0 | ]] | } |
| { | 0 | −2 | 0 | 0 | 0 | 0 | [[ | 0 | 0 | ]] | 121 | −23 | −7 | −3 | −2 | −1 | [[ | −1 | 0 | ]] | } |
| { | −20 | 19 | −5 | 2 | 1 | 1 | [[ | 0 | 0 | ]] | 16 | 3 | −2 | 0 | 0 | 0 | [[ | 0 | 0 | ]] | } |
| { | 32 | 108 | −43 | 10 | −9 | 3 | [[ | −3 | 1 | ]] | 4 | 19 | −7 | 11 | −1 | 0 | [[ | 0 | 0 | ]] | } |
| { | −3 | 0 | −1 | 0 | 0 | 0 | [[ | 0 | 0 | ]] | −29 | 11 | −2 | 1 | 0 | 0 | [[ | 0 | 0 | ]] | } |
| { | −4 | −12 | −3 | 1 | −1 | 0 | [[ | 0 | 0 | ]] | 19 | 105 | −31 | 7 | −6 | 1 | [[ | −2 | 0 | ]] | } |
| { | 7 | 1 | 2 | 0 | 0 | 0 | [[ | 0 | 0 | ]] | 4 | 3 | −2 | 0 | 0 | 0 | [[ | 0 | 0 | ]] | } |
| { | −8 | −31 | 14 | −4 | 3 | −1 | [[ | 1 | 0 | ]] | 9 | 43 | 0 | 1 | −1 | 0 | [[ | 0 | 0 | ]] | } |
| { | −15 | −43 | −100 | 23 | −12 | 6 | [[ | −4 | 2 | ]] | −6 | −17 | −48 | 10 | −5 | 2 | [[ | −1 | 1 | ]] | } |
| { | −3 | 1 | 2 | 0 | 0 | 0 | [[ | 0 | 0 | ]] | −6 | 3 | 1 | 0 | 0 | 0 | [[ | 0 | 0 | ]] | } |
| { | −1 | −6 | −3 | 2 | −1 | 0 | [[ | 0 | 0 | ]] | −6 | −35 | 9 | 0 | 2 | 0 | [[ | 0 | 0 | ]] | } |
| { | −5 | −14 | −48 | 2 | −5 | 1 | [[ | −2 | 0 | ]] | 10 | 24 | 99 | −17 | 10 | −4 | [[ | 3 | −1 | ]] | } |
| { | −2 | 0 | 2 | 0 | 0 | 0 | [[ | 0 | 0 | ]] | −2 | 0 | 1 | 0 | 0 | 0 | [[ | 0 | 0 | ]] | } |
| { | −2 | −10 | −4 | 0 | 0 | 0 | [[ | 0 | 0 | ]] | 3 | 11 | −1 | −1 | 0 | 0 | [[ | 0 | 0 | ]] | } |
| { | −2 | −3 | −25 | −2 | −3 | 0 | [[ | −1 | 0 | ]] | −1 | −3 | −1 | 4 | −2 | 2 | [[ | 0 | 1 | ]] | } |
| { | 4 | −4 | 28 | 103 | −42 | 24 | [[ | −9 | 7 | ]] | 1 | 2 | 4 | 0 | 3 | −1 | [[ | 0 | 0 | ]] | } |
| }, | | | | | | | | | | | | | | | | | | | | | |

lowFreqTransMatrix[m][n]=lowFreqTransMatrixCol16to31[m−[[16]]12][n] with m=[[16]]12 . . . [[31]]23, n=0 . . . 15

| lowFreqTransMatrixCol16to31 = | | | | | | | | | | | | | | | | | | | | |
|---|---|---|---|---|---|---|---|---|---|---|---|---|---|---|---|---|---|---|---|---|
| { | | | | | | | | | | | | | | | | | | | | |
| { | 24 | −5 | −1 | −1 | 0 | 0 | [[ | 0 | 0 | ]] | 5 | −1 | 0 | 0 | 0 | 0 | [[ | 0 | 0 ]] | } |
| { | 17 | 1 | −2 | 0 | 0 | 0 | [[ | 0 | 0 | ]] | −27 | 4 | 2 | 0 | 0 | 0 | [[ | 0 | 0 ]] | } |
| { | −120 | 14 | 8 | 1 | 3 | 1 | [[ | 1 | 0 | ]] | −18 | −2 | 3 | 0 | 1 | 0 | [[ | 0 | 0 ]] | } |
| { | 11 | −30 | 9 | −2 | 1 | −1 | [[ | 0 | 0 | ]] | 0 | −8 | 2 | 0 | 0 | 0 | [[ | 0 | 0 ]] | } |
| { | 12 | 7 | −1 | 0 | 0 | 0 | [[ | 0 | 0 | ]] | −117 | 12 | 9 | 1 | 3 | 0 | [[ | 1 | 0 ]] | } |
| { | 9 | 46 | −6 | 0 | 0 | 0 | [[ | 0 | 0 | ]] | 8 | −29 | 9 | −3 | 1 | 0 | [[ | 0 | 0 ]] | } |
| { | 22 | −8 | 1 | −1 | 0 | 0 | [[ | 0 | 0 | ]] | −28 | −9 | 4 | 0 | 1 | 0 | [[ | 0 | 0 ]] | } |
| { | −13 | −105 | 17 | −2 | 2 | 0 | [[ | 0 | 0 | ]] | −8 | −25 | −3 | 0 | 0 | 0 | [[ | 0 | 0 ]] | } |
| { | 1 | −5 | 19 | −6 | 3 | −1 | [[ | 1 | 0 | ]] | 2 | 7 | 15 | −3 | 1 | −1 | [[ | 0 | 0 ]] | } |
| { | 0 | 3 | −2 | 0 | 0 | 0 | [[ | 0 | 0 | ]] | −20 | 8 | −2 | 0 | 0 | 0 | [[ | 0 | 0 ]] | } |
| { | 1 | −6 | 11 | −2 | 2 | 0 | [[ | 1 | 0 | ]] | −9 | −100 | 17 | −1 | 1 | 0 | [[ | 0 | 0 ]] | } |
| { | 4 | 14 | 32 | 0 | 2 | 0 | [[ | 1 | 0 | ]] | −4 | 0 | −39 | 6 | −4 | 1 | [[ | −1 | 0 ]] | } |
| { | −1 | −1 | 1 | −1 | 0 | 0 | [[ | 0 | 0 | ]] | −1 | −4 | 2 | 0 | 0 | 0 | [[ | 0 | 0 ]] | } |
| { | −6 | −40 | −15 | 6 | −2 | 1 | [[ | 0 | 0 | ]] | 5 | 57 | −6 | 2 | 0 | 0 | [[ | 0 | 0 ]] | } |
| { | −7 | −8 | −97 | 17 | −9 | 3 | [[ | −3 | 1 | ]] | −8 | −26 | −61 | −1 | −3 | −1 | [[ | −1 | −1 ]] | } |
| { | −1 | 0 | −9 | −42 | 17 | −9 | [[ | 3 | −2 | ]] | −1 | 1 | −14 | 6 | −4 | 2 | [[ | −1 | 0 ]] | } |
| }, | | | | | | | | | | | | | | | | | | | | |

lowFreqTransMatrix[m][n]=lowFreqTransMatrixCol32to47[m−[[32]]24][n] with m=[[32]]24 . . . [[47]]35, n=0 . . . 15

| lowFreqTransMatrixCol32to47 = | | | | | | | | | | | | | | | | | | | |
|---|---|---|---|---|---|---|---|---|---|---|---|---|---|---|---|---|---|---|---|
| { | | | | | | | | | | | | | | | | | | | |
| { | 3 | −1 | 0 | 0 | 2 | −1 | 0 | 0 | 2 | −1 | 0 | 0 | [[ | 1 | 0 | 0 | 0 | ]] | } |
| { | −12 | 2 | 1 | 0 | −5 | 1 | 0 | 0 | −1 | 0 | 0 | 0 | [[ | −2 | 0 | 0 | 0 | ]] | } |
| { | 17 | −3 | −1 | 0 | 6 | −1 | −1 | 0 | 2 | 0 | 0 | 0 | [[ | 2 | 0 | 0 | 0 | ]] | } |
| { | −7 | −1 | 2 | 0 | −3 | −1 | 1 | 0 | −2 | −2 | 1 | 0 | [[ | 0 | 0 | 0 | 0 | ]] | } |
| { | −32 | −3 | 3 | 0 | 12 | −2 | −1 | 0 | 7 | 0 | 0 | 0 | [[ | 1 | 0 | 0 | 0 | ]] | } |
| { | −3 | −19 | 3 | 0 | −4 | −6 | 1 | 0 | 0 | 0 | 0 | 0 | [[ | 0 | −1 | 0 | 0 | ]] | } |
| { | 117 | −10 | −8 | 0 | 32 | 1 | −4 | 0 | 3 | 1 | −1 | 0 | [[ | −3 | 1 | 0 | 0 | ]] | } |
| { | −7 | 32 | −5 | 1 | −1 | 4 | 0 | 0 | 2 | −1 | 0 | 0 | [[ | 1 | 0 | −1 | 0 | ]] | } |
| { | 4 | 10 | 5 | −1 | 0 | 3 | 1 | 0 | −2 | 1 | 2 | 0 | [[ | −1 | 11 | 1 | 0 | ]] | } |
| { | 30 | 13 | −3 | 0 | −116 | 6 | 10 | 0 | −35 | −5 | 4 | 0 | [[ | −3 | −1 | 0 | 0 | ]] | } |
| { | −10 | −63 | 1 | 2 | −17 | 3 | −4 | 0 | −1 | 9 | −1 | 0 | [[ | 3 | 4 | −1 | 0 | ]] | } |
| { | 2 | −3 | −4 | 0 | 2 | −2 | −2 | 0 | 0 | 0 | −1 | 0 | [[ | 0 | −1 | −1 | 0 | ]] | } |
| { | −8 | −2 | −1 | 1 | 30 | 4 | −4 | 1 | −102 | 4 | 8 | −1 | [[ | −69 | −2 | 6 | −1 | ]] | } |
| { | 1 | −95 | 18 | −6 | −10 | −34 | −2 | 0 | −4 | 17 | −2 | 0 | [[ | 0 | 2 | 1 | 0 | ]] | } |
| { | 2 | 10 | 24 | −7 | 5 | 9 | 19 | −1 | 0 | 1 | 4 | 0 | [[ | −2 | 0 | 1 | 0 | ]] | } |
| { | −1 | −2 | −4 | 4 | 0 | 3 | 1 | −1 | 0 | 2 | 0 | −2 | [[ | 2 | 0 | 0 | 0 | ]] | } |
| }, | | | | | | | | | | | | | | | | | | | |

Otherwise, if nTrS is equal to [[48]]36, lfnstTrSetIdx is equal to 2, and lfnstIdx is equal to 2 the following applies:

lowFreqTransMatrix[m][n]=lowFreqTransMatrixCol0to15[m][n] with m=0 . . . [[15]]11, n=0 . . . 15

| lowFreqTransMatrixCol0to15 = | | | | | | | | | | | | | | | | | | | | |
|---|---|---|---|---|---|---|---|---|---|---|---|---|---|---|---|---|---|---|---|---|
| { | | | | | | | | | | | | | | | | | | | | |
| { | 87 | −41 | 3 | −4 | 1 | −1 | [[ | 0 | −1 | ]] | −73 | 28 | 2 | 1 | 1 | 1 | [[ | 0 | 0 ]] | } |
| { | −75 | 4 | 7 | 0 | 2 | 0 | [[ | 1 | 0 | ]] | −41 | 36 | −7 | 3 | −1 | 1 | [[ | 0 | 0 ]] | } |
| { | 26 | −44 | 22 | −6 | 4 | −2 | [[ | 1 | −1 | ]] | 77 | 24 | −22 | 2 | −4 | 0 | [[ | −1 | 0 ]] | } |
| { | −39 | −68 | 37 | −7 | 6 | −2 | [[ | 2 | 0 | ]] | −9 | 56 | −21 | 1 | −2 | 0 | [[ | −1 | 0 ]] | } |
| { | 10 | −20 | 2 | 0 | 1 | 0 | [[ | 0 | 0 | ]] | 50 | −1 | 8 | −5 | 1 | −1 | [[ | 0 | 0 ]] | } |
| { | −21 | −45 | 8 | −2 | 3 | −1 | [[ | 1 | 0 | ]] | −7 | −30 | 26 | −8 | 3 | −1 | [[ | 1 | −1 ]] | } |
| { | −4 | −2 | −55 | 28 | −8 | 5 | [[ | −3 | 2 | ]] | −2 | 37 | 43 | −19 | 1 | −2 | [[ | 1 | −1 ]] | } |
| { | 2 | 19 | 47 | −23 | 6 | −4 | [[ | 2 | −1 | ]] | −23 | −22 | −44 | 17 | −2 | 2 | [[ | −1 | 0 ]] | } |
| { | −19 | −62 | −9 | 3 | 0 | 0 | [[ | 0 | 0 | ]] | −12 | −56 | 27 | −7 | 3 | −1 | [[ | 1 | 0 ]] | } |
| { | 1 | 9 | −5 | 0 | −1 | 0 | [[ | 0 | 0 | ]] | 0 | 22 | −1 | 2 | 0 | 1 | [[ | 0 | 0 ]] | } |
| { | 5 | 17 | −9 | 0 | −2 | 1 | [[ | 0 | 0 | ]] | 13 | 54 | −2 | 7 | −1 | 1 | [[ | 0 | 0 ]] | } |
| { | 7 | 27 | 56 | −2 | 10 | −3 | [[ | 3 | −1 | ]] | −2 | −6 | 8 | −28 | 3 | −4 | [[ | 1 | −1 ]] | } |
| { | 0 | 0 | 19 | −4 | 3 | −2 | [[ | 2 | −1 | ]] | −3 | −131 | 10 | −4 | 1 | 0 | [[ | 0 | 0 ]] | } |
| { | −3 | 0 | −27 | −80 | 40 | −16 | [[ | 6 | −4 | ]] | 4 | 3 | 31 | 61 | −22 | 7 | [[ | −1 | 1 ]] | } |
| { | 1 | 2 | −8 | 6 | −1 | 1 | [[ | 0 | 0 | ]] | 2 | 8 | −5 | −1 | 0 | 0 | [[ | 0 | 0 ]] | } |
| { | −4 | −18 | −57 | 8 | −8 | 1 | [[ | −3 | 0 | ]] | −5 | −20 | −69 | 7 | −6 | 2 | [[ | −2 | 1 ]] | } |
| }, | | | | | | | | | | | | | | | | | | | | |

lowFreqTransMatrix[m][n]=
lowFreqTransMatrixCol16to31[m−[[16]]12][n] with m=[[16]]12 . . . [[31]]23, n=0 . . . 15

| lowFreqTransMatrixCol16to31 = | | | | | | | | | | | | | | | | | |
|---|---|---|---|---|---|---|---|---|---|---|---|---|---|---|---|---|---|
| { | | | | | | | | | | | | | | | | | |
| { | 30 | −5 | −6 | 1 | −1 | 0 [[ | 0 | 0 ]] | −8 | −3 | 3 | 0 | 0 | 0 [[ | 0 | 0 ]] | } |
| { | 72 | −29 | −2 | 0 | −1 | 0 [[ | −1 | 0 ]] | −37 | 6 | 7 | −2 | 1 | 0 [[ | 0 | 0 ]] | } |
| { | 7 | −38 | 10 | 0 | 1 | 0 [[ | 0 | 0 ]] | −51 | 27 | 4 | −3 | 2 | −1 [[ | 1 | 0 ]] | } |
| { | −45 | 4 | −3 | 6 | −1 | 2 [[ | 0 | 1 ]] | 49 | −13 | 3 | −3 | −1 | 0 [[ | 0 | 0 ]] | } |
| { | 66 | 17 | −24 | 4 | −13 | 1 [[ | −1 | 0 ]] | 13 | −49 | 15 | 1 | 0 | 0 [[ | 0 | 0 ]] | } |
| { | −9 | 69 | −33 | 5 | −2 | 0 [[ | −1 | 0 ]] | −44 | −31 | 10 | 7 | −2 | 2 [[ | 0 | 1 ]] | } |
| { | −47 | −34 | −27 | 5 | 4 | −1 [[ | 1 | 0 ]] | −39 | −2 | 27 | 4 | −2 | 1 [[ | 0 | 0 ]] | } |
| { | −33 | 3 | 22 | −2 | −4 | 1 [[ | −1 | 0 ]] | −58 | −17 | 6 | −6 | 7 | −1 [[ | 1 | 0 ]] | } |
| { | 7 | −8 | 16 | −6 | 4 | −2 [[ | 1 | −1 ]] | −15 | 54 | −23 | 2 | −1 | 0 [[ | 0 | 0 ]] | } |
| { | −13 | 17 | 0 | −2 | 0 | −1 [[ | 0 | 0 ]] | −46 | −10 | −10 | 4 | −1 | 1 [[ | 0 | 0 ]] | } |
| { | 4 | 51 | −3 | −6 | −1 | −1 [[ | 0 | 0 ]] | −20 | 6 | −34 | 9 | −2 | 2 [[ | −1 | 0 ]] | } |
| { | −1 | −4 | −68 | 35 | −5 | 5 [[ | −2 | 1 ]] | 0 | 35 | 43 | −4 | −6 | 1 [[ | −1 | 0 ]] | } |
| { | −6 | −37 | −18 | −5 | 2 | −2 [[ | 1 | −1 ]] | 6 | −6 | −7 | 25 | −6 | 4 [[ | −1 | 1 ]] | } |
| { | −4 | −7 | −26 | −6 | −10 | 6 [[ | −4 | 1 ]] | 3 | 8 | 14 | −18 | 15 | −5 [[ | 2 | −1 ]] | } |
| { | 1 | 24 | 3 | 5 | −1 | 1 [[ | 0 | 0 ]] | −3 | 12 | 6 | −10 | 1 | −1 [[ | 0 | 0 ]] | } |
| { | 1 | 4 | 0 | 33 | −7 | 5 [[ | −2 | 1 ]] | 0 | −9 | 53 | −22 | 3 | −1 [[ | 0 | 0 ]] | } |
| }, | | | | | | | | | | | | | | | | | |

lowFreqTransMatrix[m][n]=
lowFreqTransMatrixCol32to47[m−[[32]]24][n] with m=[[32]]24 . . . [[47]]35, n=0 . . . 15

| lowFreqTransMatrixCol32to47 = | | | | | | | | | | | | | | | | | |
|---|---|---|---|---|---|---|---|---|---|---|---|---|---|---|---|---|---|
| { | | | | | | | | | | | | | | | | | |
| { | 3 | 2 | −1 | 0 | −2 | −1 | 0 | 0 | 1 | 1 | 0 | 0 [[ | −1 | 0 | 0 | 0 ]] | } |
| { | 12 | 3 | −4 | 0 | −3 | −2 | 1 | 0 | 4 | 0 | 0 | 0 [[ | −1 | 0 | 0 | 0 ]] | } |
| { | 31 | −5 | −8 | 3 | −14 | 0 | 5 | −1 | 6 | 1 | −3 | 0 [[ | −4 | −1 | 1 | 0 ]] | } |
| { | −19 | 2 | 0 | 0 | 5 | 1 | 1 | 0 | −2 | 0 | −1 | 0 [[ | 1 | 0 | 0 | 0 ]] | } |
| { | −53 | 34 | 6 | −5 | 30 | −7 | −11 | 3 | −11 | −2 | 5 | 11 [[ | 4 | 2 | −1 | −1 ]] | } |
| { | 49 | 7 | 2 | −6 | −23 | −3 | −2 | 2 | 9 | 4 | 0 | 0 [[ | −2 | −1 | −1 | 0 ]] | } |
| { | −11 | 32 | −8 | −7 | 27 | −12 | −6 | 6 | −13 | 0 | 4 | −3 [[ | 3 | −1 | −2 | 1 ]] | } |
| { | −23 | 40 | −2 | 5 | 43 | −11 | −8 | −1 | −18 | −4 | 5 | 2 [[ | 4 | 3 | 0 | −1 ]] | } |
| { | −42 | −25 | 4 | 6 | 34 | 8 | 2 | −2 | −15 | −1 | 0 | −1 [[ | 3 | 2 | 0 | 1 ]] | } |
| { | −80 | −27 | 20 | −4 | −66 | 23 | −2 | −2 | 20 | −3 | −2 | 3 [[ | −14 | 2 | 3 | −1 ]] | } |
| { | 16 | −52 | 28 | 1 | 59 | 15 | −8 | −5 | −28 | −7 | 2 | 2 [[ | 10 | 3 | 0 | −1 ]] | } |
| { | −14 | −38 | −12 | −10 | 9 | 5 | 7 | 6 | −9 | 7 | −4 | −3 [[ | 4 | −4 | 0 | 3 ]] | } |
| { | 16 | 10 | 55 | −24 | 15 | 46 | −52 | 1 | 35 | −43 | 10 | 12 [[ | −23 | 13 | 5 | −8 ]] | } |
| { | −2 | −4 | −1 | 13 | 0 | 2 | −4 | −3 | 3 | −1 | 2 | 1 [[ | −2 | 0 | −2 | −1 ]] | } |
| { | −9 | −1 | −25 | 10 | 45 | −11 | 18 | 2 | 86 | 1 | −13 | −4 [[ | −65 | −6 | 7 | 2 ]] | } |
| { | 4 | −27 | −2 | −9 | 5 | 36 | −13 | 5 | −7 | −17 | 1 | 2 [[ | 4 | 6 | 4 | −1 ]] | } |
| }, | | | | | | | | | | | | | | | | | |

Otherwise, if nTrS is equal to [[48]]36, lfnstTrSetIdx is equal to 3, and lfnstIdx is equal to 1 the following applies:

lowFreqTransMatrix[m][n]=
lowFreqTransMatrixCol0to15[m][n] with m=0 . . . [[15]]11, n=0 . . . 15

| lowFreqTransMatrixCol0to15 = | | | | | | | | | | | | | | | | | |
|---|---|---|---|---|---|---|---|---|---|---|---|---|---|---|---|---|---|
| { | | | | | | | | | | | | | | | | | |
| { | −115 | 37 | 9 | 2 | 2 | 1 [[ | 1 | 0 ]] | 10 | −29 | 8 | 0 | 1 | 0 [[ | 1 | 0 ]] | } |
| { | 15 | 51 | −18 | 0 | −3 | 0 [[ | −1 | 0 ]] | −95 | 7 | 34 | −3 | 5 | −1 [[ | 2 | 0 ]] | } |
| { | 29 | −22 | 16 | −6 | 3 | −2 [[ | 1 | −1 ]] | −4 | −80 | 12 | 15 | 0 | 3 [[ | 0 | 1 ]] | } |
| { | −36 | −98 | 25 | 5 | 4 | 1 [[ | 2 | 1 ]] | −59 | 11 | −17 | 1 | 1 | 1 [[ | 0 | 0 ]] | } |
| { | −6 | 18 | 3 | −3 | −1 | 0 [[ | 0 | 0 ]] | −50 | −5 | −38 | 12 | 0 | 2 [[ | 0 | 1 ]] | } |
| { | 4 | 15 | 52 | −13 | 5 | −3 [[ | 2 | −1 ]] | −17 | −45 | 16 | 24 | −2 | 4 [[ | −1 | 2 ]] | } |
| { | −20 | −7 | −43 | 4 | 0 | 1 [[ | −1 | 1 ]] | −7 | 35 | 0 | 12 | −4 | 1 [[ | −1 | 0 ]] | } |
| { | 4 | 29 | 1 | 26 | −5 | 4 [[ | −2 | 1 ]] | −17 | −7 | −73 | 6 | 6 | 2 [[ | 1 | 1 ]] | } |
| { | 12 | 13 | 10 | 2 | −1 | 3 [[ | −1 | 1 ]] | 17 | −2 | −46 | 12 | 7 | 0 [[ | 2 | 0 ]] | } |
| { | 5 | 20 | 90 | −17 | 4 | −3 [[ | 2 | −1 ]] | 6 | 66 | 8 | 28 | −7 | 3 [[ | −1 | 1 ]] | } |
| { | −3 | −4 | −34 | −12 | 2 | −1 [[ | −1 | 0 ]] | 5 | 25 | 11 | 43 | −10 | 4 [[ | −2 | 1 ]] | } |
| { | −1 | −3 | 2 | 19 | −2 | 4 [[ | −1 | 2 ]] | 9 | 3 | −35 | 22 | 11 | 1 [[ | 2 | 0 ]] | } |
| { | 10 | −4 | −6 | 12 | 5 | 1 [[ | 1 | 0 ]] | 11 | −9 | −12 | −2 | −7 | 0 [[ | −1 | 0 ]] | } |
| { | 4 | 6 | 14 | 53 | −4 | 4 [[ | 0 | 2 ]] | 0 | −1 | −20 | −13 | 3 | 2 [[ | −1 | 1 ]] | } |
| { | 2 | 9 | 13 | 37 | 19 | 6 [[ | 2 | 2 ]] | −9 | −3 | −9 | −28 | −20 | −4 [[ | −2 | −1 ]] | } |
| { | 3 | −3 | 12 | 84 | −12 | 8 [[ | −2 | 3 ]] | 6 | 13 | 50 | −1 | 45 | 1 [[ | 7 | 0 ]] | } |
| }, | | | | | | | | | | | | | | | | | |

lowFreqTransMatrix[m][n]= lowFreqTransMatrixCol16to31[m−[[16]]12][n] with m=[[16]]12 . . . [[31]]23, n=0 . . . 15 lowFreqTransMatrixCol16to31 =

```
{
{   23   -8   -8    1   -1    0 [[   0    0 ]]    3    3   -2   -1    0    0 [[   0    0 ]]  }
{   23  -47    1    6    0    1 [[   0    1 ]]    8    5  -12    0   -1    0 [[   0    0 ]]  }
{   45    7  -59    7   -2    1 [[  -1    0 ]]  -15   41   -3  -16    2   -3 [[   0   -1 ]]  }
{    6  -13    7   -3    0    0 [[   0    0 ]]   14   -4  -14    3   -1    0 [[   0    0 ]]  }
{    3   67   -7  -40    3   -6 [[   1   -3 ]]  -12  -13   65   -3  -10    0 [[  -1    0 ]]  }
{  -87   -8  -14    7    8    1 [[   2    0 ]]   23  -35   -6   -3    1    1 [[   0    0 ]]  }
{  -51   -2  -57    5   15    0 [[   4    0 ]]    7   39    5  -55    1   -7 [[   1   -3 ]]  }
{   -5   21   -3    5   -1   -3 ]]   0   -1 ]]  -11    2  -52   -3   27   -2 [[   5    0 ]]  }
{   16  -45   -9  -53    6    1 [[   1    0 ]]   70   16    8   -4  -37    1 [[  -7    0 ]]  }
{   29    5  -19   12    9   -1 [[   1    0 ]]  -10   14   -1  -13    7    0 [[   1    0 ]]  }
{   23   20  -40   12   21   -3 [[   4   -1 ]]   25  -28  -10    5    8    6 [[   0    2 ]]  }
{   -7  -65  -19  -22   11    4 [[   2    1 ]]  -75  -18    3   -1  -10    2 [[   0    1 ]]  }
{   33  -10   -4   18   18   -4 [[   4   -1 ]]   28  -72    1  -49   15    2 [[   2    1 ]]  }
{   -3    1   -5   35  -16   -6 [[  -1   -2 ]]   46   29   13   21   37   -5 [[   4   -1 ]]  }
{    1   18    9   28   24    6 [[   2    2 ]]  -20   -5  -25  -33  -36    9 [[  -2    2 ]]  }
{   -2   18  -22  -37 -131   14 [[   0    3 ]]    1  -12   -3    2  -15   -8 [[   1   -1 ]]  }
},
```

lowFreqTransMatrix[m][n]= lowFreqTransMatrixCol32to47[m−[[32]]24][n] with m=[[32]]24 . . . [[47]]35, n=0 . . . 15 lowFreqTransMatrixCol32to47 =

```
{
{    4    0    0   -1    1    1    0    0    2    0    0    0 [[   0    0    0    0 ]]  }
{    3   -3    1   -1    2    1   -2    0    1   -1    0    0 [[   1    1   -1    0 ]]  }
{    1    0    7   -2   -3    6    1   -2    0    0    1    0 [[  -1    2    0   -1 ]]  }
{    2    8   -3   -5    2    0    0    0    0    3    0   -1 [[   1    0    0    0 ]]  }
{    9  -20   -5   22   -2    0    0   -1    2   -3   -2    3 [[  -1    0    1    0 ]]  }
{    2    5  -17    0    3   -1   -1   -5    0    1   -4    0 [[   1    0    0   -2 ]]  }
{    1  -10   41    2    4   -3   -2    3   -1   -2    7    1 [[   1   -1   -1    0 ]]  }
{    0   27    8  -58    2   -5   25    3    0    3    0   -5 [[   0   -2    7    0 ]]  }
{  -12   29    3   21   14    0    5   -1   -3    4    1    4 [[   2    0    1    0 ]]  }
{    0   -6   13   -4    0   -4    1    5    0   -1   -1    1 [[   0   -1    0    0 ]]  }
{   -4   21  -64   -8   -5   19   10  -48    3   -1   10   -3 [[   0    4    3   -6 ]]  }
{    2  -35  -27    4    1    8  -17  -19    3    0    3   -6 [[   0    2   -1   -2 ]]  }
{   56  -23   22   -1    4   -1  -15   26    6    4  -10    0 [[   0    2   -3    2 ]]  }
{  -10  -53  -18    8    9   12  -41  -25   -2   -2   13  -16 [[   4    1   -5    1 ]]  }
{  -13   42    1   57  -22   -2  -25  -28    5    6   19  -12 [[  -5   -3   -2    4 ]]  }
{   19   14   -4  -12   -4    5   17    8    2   -4   -4    4 [[  -2    2    1    0 ]]  }
},
```

Otherwise, if nTrS is equal to [[48]]36, lfnstTrSetIdx is equal to 3, and lfnstIdx is equal to 2 the following applies:

lowFreqTransMatrix[m][n]= lowFreqTransMatrixCol0to15[m][n] with m=0 . . . [[15]]11, n=0 . . . 15 lowFreqTransMatrixCol0to15 =

```
{
{  109  -26   -8   -3   -2   -1 [[  -1    0 ]]  -50   28    2    1    0    0 [[   0    0 ]] }
{  -39   31   -5    2   -1    1 [[   0    0 ]]  -95    6   18    0    4    0 [[   1    0 ]] }
{   29   -3   -2   -2    0    0 [[   0    0 ]]    0  -41    9    0    2    0 [[   1    0 ]] }
{   18   96  -23    2   -5    1 [[  -2    0 ]]  -10    6   10   -2    1   -1 [[   1    0 ]] }
{  -29  -60   16   -2    3   -1 [[   1    0 ]]  -52    9  -17    5   -2    1 [[  -1    1 ]] }
{   23   -5  -15    5   -2    1 [[  -1    1 ]]    2   79  -13   -4   -2   -1 [[  -1    0 ]] }
{   -7   -3   12   -3    3   -1 [[   1    0 ]]  -31  -62    8    7    0    2 [[   0    1 ]] }
{    1  -26    5    0    1    0 [[   1    0 ]]   24   -3   43   -6    4   -2 [[   1   -1 ]] }
{   11   14    6   -3    1   -1 [[   1    0 ]]   10   -7   -9    3   -2    1 [[  -1    0 ]] }
{  -10  -11  -47    3   -4    1 [[  -1    0 ]]    5   28   11   -2   -1    0 [[   0    0 ]] }
{   -8  -24  -99   11  -10    3 [[  -4    1 ]]   -5  -36   19  -26    4   -5 [[   1   -2 ]] }
{   -5    1   -1    0    1    0 [[   0    0 ]]  -10  -14   -6    8    0    1 [[   0    0 ]] }
{    1   12  -20   21   -4    5 [[  -2    2 ]]   -5   -2  -75    9   -1    2 [[  -1    1 ]] }
{    2   -9  -18    8  -13    3 [[  -1    1 ]]    3  -25  -62   -6    0   -2 [[   0   -1 ]] }
{    4    9   39   18    0    2 [[   0    1 ]]   -6  -16  -22  -37    5   -5 [[   1   -2 ]] }
{   -7   -2   15   -6    1   -1 [[   1   -1 ]]  -11   -3   22  -14    0   -2 [[   1   -1 ]] }
},
```

lowFreqTransMatrix[m][n]= lowFreqTransMatrixCol16to31[m−[[16]]12][n] with m=[[16]]12 . . . [[31]]23, n=0 . . . 15

| lowFreqTransMatrixCol16to31 = | | | | | | | | | | | | | | | | | |
|---|---|---|---|---|---|---|---|---|---|---|---|---|---|---|---|---|---|
| { | | | | | | | | | | | | | | | | | |
| { | −18 | −8 | 6 | 0 | 1 | 0 [[ | 1 | 0 ]] | 6 | −2 | −3 | 0 | 0 | 0 [[ | 0 | 0 ]] | } |
| { | 32 | −49 | 5 | 1 | 1 | 0 [[ | 0 | 0 ]] | 27 | −1 | −141 | 2 | −2 | 1 [[ | −1 | 0 ]] | } |
| { | 86 | 4 | −33 | 2 | −6 | 1 [[ | −2 | 0 ]] | −32 | 58 | 1 | −7 | 0 | −2 [[ | 0 | −1 ]] | } |
| { | −14 | 26 | 2 | −4 | 1 | −1 [[ | 0 | 0 ]] | −43 | −9 | 35 | −2 | 4 | −1 [[ | 1 | 0 ]] | } |
| { | 13 | 56 | −2 | −9 | 0 | −2 [[ | 0 | −1 ]] | −34 | −18 | 41 | 0 | 3 | 0 [[ | 1 | 0 ]] | } |
| { | −9 | 1 | 5 | −1 | 1 | 0 [[ | 0 | 0 ]] | −4 | 49 | 2 | −14 | 1 | −3 [[ | 0 | −1 ]] | } |
| { | −75 | 9 | −45 | 5 | −1 | 1 [[ | −1 | 0 ]] | 14 | 35 | 0 | −23 | 2 | −5 [[ | 1 | 2 ]] | } |
| { | −7 | −64 | 9 | 14 | 0 | 3 [[ | 0 | 1 ]] | −12 | −4 | 5 | 3 | −1 | 1 [[ | 0 | 0 ]] | } |
| { | 22 | 21 | 1 | −21 | 2 | −4 [[ | 1 | −2 ]] | 92 | 1 | 53 | 0 | −9 | 1 [[ | −2 | 0 ]] | } |
| { | −12 | −2 | −38 | 2 | 0 | 1 [[ | 0 | 0 ]] | 16 | 38 | 11 | −16 | −1 | −3 [[ | 0 | −2 ]] | } |
| { | 0 | 25 | 41 | 5 | −3 | 1 [[ | 0 | 0 ]] | 10 | −5 | −7 | 12 | 2 | 1 [[ | 0 | 0 ]] | } |
| { | −17 | −2 | 7 | −5 | 3 | −1 [[ | 0 | 0 ]] | −16 | 13 | 3 | 61 | −1 | 6 [[ | 0 | 2 ]] | } |
| { | −1 | −2 | −16 | −4 | 0 | −1 [[ | 0 | 0 ]] | −7 | 7 | −31 | 0 | 3 | 0 [[ | 0 | 0 ]] | } |
| { | −6 | −61 | 14 | −51 | 2 | −6 [[ | 0 | −2 ]] | −19 | 0 | 40 | −7 | −17 | 0 [[ | −3 | 0 ]] | } |
| { | −5 | 15 | 63 | 9 | −16 | 0 [[ | −3 | 0 ]] | 18 | 42 | −18 | 27 | 15 | 1 [[ | 3 | 1 ]] | } |
| { | −18 | −7 | 30 | −9 | −4 | 0 [[ | −1 | 0 ]] | −35 | 23 | 23 | 10 | −17 | 1 [[ | −3 | 0 ]] | } |
| }, | | | | | | | | | | | | | | | | | |

lowFreqTransMatrix[m][n]= lowFreqTransMatrixCol32to47[m−[[32]]24][n] with m=[[32]]24 . . . [[47]]35, n=0 . . . 15

| lowFreqTransMatrixCol32to47 = | | | | | | | | | | | | | | | | | | | |
|---|---|---|---|---|---|---|---|---|---|---|---|---|---|---|---|---|---|---|---|
| { | | | | | | | | | | | | | | | | | | | |
| { | −3 | 2 | 1 | −1 | 0 | 0 | 0 | 0 | −2 | 0 | 0 | 0 | [[ | 0 | 0 | 0 | 0 | ]] | } |
| { | 3 | 5 | −3 | −2 | 4 | 1 | −1 | −1 | 2 | 0 | 0 | 0 | [[ | 2 | 0 | 0 | 0 | ]] | } |
| { | −14 | −8 | 20 | 0 | −2 | −3 | 0 | 4 | −1 | −1 | 0 | 0 | [[ | −1 | 1 | 0 | 0 | ]] | } |
| { | 14 | −40 | 1 | 10 | 2 | 1 | −10 | 1 | 2 | −4 | −1 | −1 | [[ | 0 | 0 | −1 | 0 | ]] | } |
| { | 19 | −36 | −10 | 13 | 3 | 6 | −14 | −1 | 3 | 1 | −1 | −3 | [[ | 1 | 1 | −1 | −1 | ]] | } |
| { | −31 | −14 | 56 | −1 | 13 | −37 | −4 | 20 | −2 | 2 | −10 | 0 | [[ | 2 | −4 | 0 | −1 | ]] | } |
| { | 1 | −8 | 32 | −1 | 7 | −12 | −4 | 10 | 0 | 2 | −6 | −1 | [[ | 2 | 0 | 0 | −2 | ]] | } |
| { | 8 | −59 | −3 | 26 | 14 | 6 | −58 | 6 | −5 | 17 | −7 | −18 | [[ | 3 | 3 | −1 | −5 | ]] | } |
| { | −21 | −11 | 1 | 40 | −5 | −4 | −24 | 5 | −4 | 5 | −6 | −5 | [[ | 0 | 0 | 0 | −3 | ]] | } |
| { | 12 | −9 | −22 | 7 | −8 | 60 | 4 | −36 | −6 | −15 | 54 | 7 | [[ | 3 | −7 | −8 | 14 | ]] | } |
| { | −1 | 1 | 9 | −3 | −3 | −14 | −3 | 12 | 2 | 4 | −13 | −2 | [[ | −1 | 3 | 2 | −4 | ]] | } |
| { | −93 | −15 | −46 | −3 | 23 | −19 | 0 | −47 | 8 | 4 | 8 | 3 | [[ | 2 | 3 | 0 | 0 | ]] | } |
| { | 4 | 11 | −12 | 4 | −12 | 14 | −50 | −1 | −8 | 32 | −4 | −54 | [[ | 2 | 0 | 30 | −15 | ]] | } |
| { | 13 | −4 | 11 | 9 | 17 | 0 | 24 | 5 | 1 | −12 | 4 | 28 | [[ | 0 | 0 | −15 | 8 | ]] | } |
| { | 12 | −34 | 9 | −24 | 4 | 28 | −2 | 4 | −11 | −4 | 30 | 2 | [[ | 5 | −13 | −4 | 18 | ]] | } |
| { | −19 | 53 | 6 | 48 | −65 | 12 | −12 | 11 | −8 | −16 | 10 | −21 | [[ | −2 | −12 | 6 | 2 | ]] | } |
| }, | | | | | | | | | | | | | | | | | | | |

Embodiment #15

This embodiment gives an example for 16×16 RST (a.k.a., LFNST) and 16×48 RST matrices.

The newly added parts are on top of JVET-P2001 and Deleted texts are marked with double brackets (e.g., [[a]] denotes the deletion of the character “a”).

Low frequency non-separable transformation matrix derivation process

Inputs to this Process are:

a variable nTrS specifying the transform output length, a variable predModeIntra specifying the intra prediction mode for LFNST set selection.

Output of this process is the transformation matrix lowFreqTransMatrix.

The variable lfnstTrSetIdx is specified in Table 39 depending on predModeIntra.

TABLE 39

| Specification of lfnstTrSetIdx | |
|---|---|
| predModeIntra | lfnstTrSetIdx |
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

The transformation matrix lowFreqTransMatrix is derived based on nTrS, lfnstTrSetIdx, and lfnst_idx as follows:

If nTrS is equal to 16, lfnstTrSetIdx is equal to 0, and lfnst_idx is equal to 1, the following applies:

| lowFreqTransMatrix[m][n] = | | | | | | | | | | | | | | | | | |
|---|---|---|---|---|---|---|---|---|---|---|---|---|---|---|---|---|---|
| [ [ { | | | | | | | | | | | | | | | | | |
| { | 108 | −44 | −15 | 1 | −44 | 19 | 7 | −1 | −11 | 6 | 2 | −1 | 0 | −1 | −1 | 0 | } |
| { | −40 | −97 | 56 | 12 | −11 | 29 | −12 | −3 | 18 | 18 | −15 | −3 | −1 | −3 | 2 | 1 | } |
| { | 25 | −31 | −1 | 7 | 100 | −16 | −29 | 1 | −54 | 21 | 14 | −4 | −7 | 2 | 4 | 0 | } |
| { | −32 | −39 | −92 | 51 | −6 | −16 | 36 | −8 | 3 | 22 | 18 | −15 | 4 | 1 | −5 | 2 | } |
| { | 8 | −9 | 33 | −8 | −16 | −102 | 36 | 23 | −4 | 38 | −27 | −5 | 5 | 16 | −8 | −6 | } |
| { | −25 | 5 | 16 | −3 | −38 | 14 | 11 | −3 | −97 | 7 | 26 | 1 | 55 | −10 | −19 | 3 | } |
| { | 8 | 9 | 8 | 9 | 16 | 1 | 37 | 36 | 94 | −38 | −7 | 3 | −47 | 11 | −6 | −13 | } |
| { | 2 | 34 | −5 | 1 | −7 | 24 | −25 | −3 | 8 | 99 | −28 | −29 | 6 | −43 | 21 | 11 | } |
| { | −16 | −27 | −39 | −109 | 6 | 10 | 16 | 24 | 3 | 19 | 10 | 24 | −4 | −7 | −2 | −3 | } |
| { | −9 | −10 | −34 | 4 | −9 | −5 | −29 | 5 | −33 | −26 | −96 | 33 | 14 | 4 | 39 | −14 | } |
| { | −13 | 1 | 4 | −9 | −30 | −17 | −3 | −64 | −35 | 11 | 17 | 19 | −86 | 6 | 36 | 14 | } |
| { | 8 | −7 | −5 | −15 | 7 | −30 | −28 | −87 | 31 | 4 | 4 | 33 | 61 | −5 | −17 | 22 | } |
| { | −2 | 13 | −6 | −4 | −2 | 28 | −13 | −14 | −3 | 37 | −15 | −3 | −2 | 107 | −36 | −24 | } |
| { | 4 | 9 | 11 | 31 | 4 | 9 | 16 | 19 | 12 | 33 | 32 | 94 | 12 | 0 | 34 | −45 | } |
| { | 2 | −2 | 8 | −16 | 8 | 5 | 28 | −17 | 6 | −7 | 18 | −45 | 40 | 36 | 97 | −8 | } |
| { | 0 | −2 | 0 | −10 | −1 | −7 | −3 | −35 | −1 | −7 | −2 | −32 | −6 | −33 | −16 | −112 | } |
| }, ] ] | | | | | | | | | | | | | | | | | |
| { | | | | | | | | | | | | | | | | | |
| { | **97** | **−54** | **−7** | **1** | **−54** | **32** | **6** | **−2** | **−4** | **5** | **−1** | **−1** | **0** | **−2** | **−1** | **1** | } |
| { | **−57** | **−65** | **65** | **0** | **−30** | **33** | **−11** | **−1** | **44** | **3** | **−26** | **2** | **−4** | **−1** | **4** | **0** | } |
| { | **−14** | **59** | **−19** | **−9** | **−83** | **1** | **41** | **−1** | **47** | **−36** | **−10** | **8** | **6** | **3** | **−7** | **0** | } |
| { | **−8** | **−32** | **−8** | **19** | **−18** | **−84** | **54** | **9** | **1** | **59** | **−26** | **−16** | **6** | **5** | **−9** | **1** | } |
| { | **27** | **31** | **86** | **−55** | **−10** | **−29** | **0** | **20** | **−40** | **−6** | **−21** | **20** | **19** | **5** | **−8** | **−5** | } |
| { | **−42** | **−16** | **−5** | **15** | **−35** | **23** | **19** | **−14** | **−79** | **−5** | **37** | **−1** | **57** | **−12** | **−27** | **6** | } |
| { | **3** | **35** | **5** | **−17** | **16** | **55** | **37** | **−36** | **−2** | **67** | **−36** | **−4** | **1** | **−50** | **8** | **22** | } |
| { | **−8** | **23** | **−12** | **−10** | **−45** | **−7** | **−77** | **39** | **6** | **57** | **20** | **−31** | **18** | **−23** | **21** | **−2** | } |
| { | **−16** | **−31** | **−30** | **−99** | **2** | **−6** | **15** | **−4** | **13** | **15** | **50** | **21** | **−22** | **−2** | **−15** | **8** | } |
| { | **−19** | **−18** | **−51** | **−24** | **−14** | **−5** | **−25** | **−5** | **−40** | **−15** | **−77** | **43** | **−1** | **−3** | **42** | **−18** | } |
| { | **−12** | **6** | **19** | **16** | **−30** | **−8** | **13** | **2** | **−45** | **−10** | **23** | **−14** | **−98** | **−29** | **33** | **8** | } |
| { | **−5** | **−7** | **−13** | **−6** | **20** | **36** | **40** | **107** | **−6** | **−9** | **−14** | **−15** | **−1** | **−17** | **−7** | **−22** | } |
| { | **9** | **−18** | **1** | **3** | **10** | **−36** | **−9** | **1** | **20** | **−43** | **−1** | **8** | **22** | **−103** | **−7** | **31** | } |
| { | **−4** | **−5** | **−12** | **−33** | **−1** | **0** | **−15** | **−14** | **−14** | **−29** | **−43** | **−95** | **−11** | **13** | **−39** | **32** | } |
| { | **2** | **−9** | **8** | **−21** | **10** | **−5** | **31** | **−13** | **5** | **−21** | **21** | **−47** | **40** | **6** | **98** | **−8** | } |
| { | **2** | **0** | **3** | **−7** | **0** | **−4** | **−1** | **−32** | **3** | **−2** | **1** | **−26** | **−6** | **−33** | **−24** | **−113** | } |
| }, | | | | | | | | | | | | | | | | | |

Otherwise, if nTrS is equal to 16, lfnstTrSetIdx is equal to 0, and lfnst_idx is equal to 2, the following applies:

| lowFreqTransMatrix[m][n] = | | | | | | | | | | | | | | | | | |
|---|---|---|---|---|---|---|---|---|---|---|---|---|---|---|---|---|---|
| [ [ { | | | | | | | | | | | | | | | | | |
| { | 119 | −30 | −22 | −3 | −23 | −2 | 3 | 2 | −16 | 3 | 6 | 0 | −3 | 2 | 1 | 0 | } |
| { | −27 | −101 | 31 | 17 | −47 | 2 | 22 | 3 | 19 | 30 | −7 | −9 | 5 | 3 | −5 | −1 | } |
| { | 0 | 58 | 22 | −15 | −102 | 2 | 38 | 2 | 10 | −13 | −5 | 4 | 14 | −1 | −9 | 0 | } |
| { | 23 | 4 | 66 | −11 | 22 | 89 | −2 | −26 | 13 | −8 | −38 | −1 | −9 | −20 | −2 | 8 | } |
| { | −19 | −5 | −89 | 2 | −26 | 76 | −11 | −17 | 20 | 13 | 18 | −4 | 1 | −15 | 3 | 5 | } |
| { | −10 | −1 | −1 | 6 | 23 | 25 | 87 | −7 | −74 | 4 | 39 | −5 | 0 | −1 | −20 | −1 | } |
| { | −17 | −28 | 12 | −8 | −32 | 14 | −53 | −6 | −68 | −67 | 17 | 29 | 2 | 6 | 25 | 4 | } |
| { | 1 | −24 | −23 | 1 | 17 | −7 | 52 | 9 | 50 | −92 | −15 | 27 | −15 | −10 | −6 | 3 | } |
| { | −6 | −17 | −2 | −111 | 7 | −17 | 8 | −42 | 9 | 18 | 16 | 25 | −4 | 2 | −1 | 11 | } |
| { | 9 | 5 | 35 | 0 | 6 | 21 | −9 | 34 | 44 | −3 | 102 | 11 | −7 | 13 | 11 | −20 | } |
| { | 4 | −5 | −5 | −10 | 15 | 19 | −2 | 6 | 6 | −12 | −13 | 6 | 95 | 69 | −29 | −24 | } |
| { | −6 | −4 | −9 | −39 | 1 | 22 | 0 | 102 | −19 | 19 | −32 | 30 | −16 | −14 | −8 | −23 | } |
| { | 4 | −4 | 7 | 8 | 4 | −13 | −18 | 5 | 0 | 0 | 21 | 22 | 58 | −88 | −54 | 28 | } |
| { | | −4 | −7 | 0 | −24 | −7 | 0 | −25 | 3 | −3 | −30 | 8 | −76 | −34 | 4 | −80 | } |
| { | 0 | 6 | 0 | 30 | −6 | 1 | −13 | −23 | 1 | 20 | −2 | 80 | −44 | 37 | −68 | 1 | } |
| { | 0 | 0 | −1 | 5 | −1 | −7 | 1 | −34 | −2 | 3 | −6 | 19 | 5 | −38 | 11 | −115 | } |
| }, ] ] | | | | | | | | | | | | | | | | | |
| { | | | | | | | | | | | | | | | | | |
| { | **110** | **−46** | **−14** | **−1** | **−41** | **5** | **9** | **2** | **−11** | **8** | **4** | **−1** | **−2** | **2** | **−1** | **0** | } |
| { | **−49** | **−73** | **41** | **11** | **−61** | **11** | **26** | **0** | **35** | **26** | **−16** | **−9** | **8** | **1** | **−8** | **−1** | } |
| { | **1** | **−79** | **6** | **15** | **91** | **−1** | **−29** | **0** | **−7** | **19** | **−3** | **−6** | **−13** | **2** | **8** | **0** | } |
| { | **−18** | **−16** | **−36** | **19** | **−16** | **−102** | **5** | **30** | **−20** | **11** | **33** | **−1** | **14** | **22** | **0** | **−11** | } |
| { | **16** | **7** | **98** | **−12** | **13** | **−33** | **32** | **2** | **−55** | **−24** | **−10** | **9** | **6** | **8** | **−8** | **−1** | } |
| { | **32** | **23** | **28** | **−2** | **11** | **−50** | **−28** | **15** | **86** | **8** | **−53** | **−4** | **−4** | **6** | **1** | **−2** | } |
| { | **12** | **27** | **−3** | **5** | **35** | **2** | **81** | **−3** | **18** | **71** | **19** | **−31** | **−4** | **−9** | **−29** | **−6** | } |
| { | **0** | **−20** | **−23** | **25** | **19** | **−3** | **67** | **19** | **32** | **−84** | **−7** | **18** | **−26** | **−18** | **−6** | **3** | } |
| { | **−9** | **−21** | **−16** | **−104** | **3** | **−30** | **15** | **−41** | **12** | **3** | **7** | **27** | **−24** | **−15** | **3** | **15** | } |
| { | **−6** | **9** | **7** | **22** | **−22** | **−16** | **−10** | **9** | **−25** | **20** | **−12** | **−17** | **−101** | **−50** | **23** | **10** | } |
| { | **−7** | **−4** | **−40** | **6** | **0** | **−15** | **14** | **−31** | **−42** | **3** | **−99** | **−21** | **22** | **−6** | **−27** | **11** | } |
| { | **−5** | **−3** | **−7** | **−30** | **3** | **18** | **−5** | **94** | **−15** | **24** | **−22** | **49** | **8** | **−33** | **−35** | **−11** | } |
| { | **6** | **−3** | **11** | **24** | **−1** | **−21** | **−25** | **−30** | **9** | **−7** | **30** | **5** | **38** | **−90** | **−47** | **29** | } |
| { | **3** | **7** | **−1** | **36** | **3** | **−3** | **23** | **−19** | **0** | **35** | **−14** | **84** | **19** | **−5** | **62** | **38** | } |

-continued

| lowFreqTransMatrix[m][n] = | | | | | | | | | | | | | | | | | |
|---|---|---|---|---|---|---|---|---|---|---|---|---|---|---|---|---|---|
| { | **0** | **−4** | **−1** | **−27** | **5** | **0** | **15** | **34** | **−2** | **−9** | **−4** | **−59** | **46** | **−45** | **80** | **12** | } |
| { | **−1** | **1** | **1** | **−5** | **1** | **4** | **−3** | **29** | **1** | **−2** | **8** | **−21** | **−8** | **35** | **−21** | **115** | } |
| }, | | | | | | | | | | | | | | | | | |

Otherwise, if nTrS is equal to 16, lfnstTrSetIdx is equal to 1, and lfnst_idx is equal to 1, the following applies:

| lowFreqTransMatrix[m][n] = | | | | | | | | | | | | | | | | | |
|---|---|---|---|---|---|---|---|---|---|---|---|---|---|---|---|---|---|
| [ [ { | | | | | | | | | | | | | | | | | |
| { | −111 | 39 | 4 | 3 | 44 | 11 | −12 | −1 | 7 | −16 | −5 | 2 | 3 | −1 | 4 | 2 | } |
| { | −47 | −27 | 15 | −1 | −92 | 43 | 20 | −2 | 20 | 39 | −16 | −5 | 10 | −5 | −13 | 2 | } |
| { | −35 | −23 | 4 | 4 | −17 | −72 | 32 | 6 | −59 | 18 | 50 | −6 | 0 | 40 | 0 | −13 | } |
| { | 13 | 93 | −27 | −4 | −48 | 13 | −34 | 4 | −52 | 11 | 1 | 10 | 3 | 16 | −3 | 1 | } |
| { | −11 | −27 | 1 | 2 | −47 | −4 | −36 | 10 | −2 | −85 | 14 | 29 | −20 | −2 | 57 | 4 | } |
| { | 0 | −35 | 32 | −2 | 26 | 60 | −3 | −17 | −82 | 1 | −30 | 0 | −37 | 21 | 3 | 12 | } |
| { | −17 | −46 | −92 | 14 | 7 | −10 | −39 | 29 | −17 | 27 | −28 | 17 | 1 | −15 | −13 | 17 | } |
| { | 4 | −10 | −23 | 4 | 16 | 58 | −17 | 26 | 30 | 21 | 67 | 2 | −13 | 59 | 13 | −40 | } |
| { | 5 | −20 | 32 | −5 | 8 | −3 | −46 | −7 | −4 | 2 | −15 | 24 | 100 | 44 | 0 | 5 | } |
| { | −4 | −1 | 38 | −18 | −7 | −42 | −63 | −6 | 33 | 34 | −23 | 15 | −65 | 33 | −20 | 2 | } |
| { | −2 | −10 | 35 | −19 | 5 | 8 | −44 | 14 | −25 | 25 | 58 | 17 | 7 | −84 | −16 | −18 | } |
| { | 5 | 13 | 18 | 34 | 11 | −4 | 18 | 18 | 5 | 58 | −3 | 42 | −2 | −10 | 85 | 38 | } |
| { | −5 | −7 | −34 | −83 | 2 | −1 | −4 | −73 | 4 | 20 | 15 | −12 | 4 | −3 | 44 | 12 | } |
| { | 0 | 4 | −2 | −60 | 5 | 9 | 42 | 34 | 5 | −14 | 9 | 80 | −5 | 13 | −38 | 37 | } |
| { | −1 | 2 | 7 | −57 | 3 | −7 | 9 | 68 | −9 | 6 | −49 | −20 | 6 | −4 | 36 | −64 | } |
| { | −1 | 0 | −12 | 23 | 1 | −4 | 17 | −53 | −3 | 4 | −21 | 72 | −4 | −8 | −3 | −83 | } |
| }, ] ] | | | | | | | | | | | | | | | | | |
| { | | | | | | | | | | | | | | | | | |
| { | **100** | **−47** | **−1** | **−4** | **−57** | **−2** | **16** | **1** | **1** | **21** | **3** | **−3** | **−4** | **−2** | **−7** | **−2** | } |
| { | **−52** | **−3** | **13** | **−1** | **−77** | **64** | **8** | **−32** | **8** | **32** | **−32** | **−3** | **7** | **−12** | **−15** | **8** | } |
| { | **45** | **23** | **−18** | **−2** | **29** | **57** | **−45** | **−2** | **37** | **−41** | **−48** | **13** | **6** | **−38** | **10** | **18** | } |
| { | **−24** | **−87** | **32** | **4** | **14** | **−7** | **20** | **−1** | **52** | **−48** | **6** | **0** | **−4** | **−16** | **34** | **−2** | } |
| { | **10** | **−6** | **13** | **−6** | **64** | **2** | **37** | **−15** | **43** | **58** | **−18** | **−33** | **12** | **−18** | **−56** | **−9** | } |
| { | **−3** | **37** | **−30** | **6** | **−33** | **−58** | **−11** | **22** | **74** | **−2** | **31** | **12** | **27** | **−39** | **−7** | **−11** | } |
| { | **−22** | **−37** | **−37** | **7** | **−4** | **−51** | **−8** | **5** | **−38** | **6** | **−60** | **9** | **−10** | **−50** | **−25** | **44** | } |
| { | **−10** | **−49** | **−58** | **23** | **22** | **22** | **−49** | **38** | **17** | **44** | **15** | **25** | **11** | **45** | **−2** | **−6** | } |
| { | **−11** | **−12** | **−12** | **−8** | **−11** | **7** | **−30** | **6** | **−3** | **−32** | **20** | **−31** | **−73** | **−12** | **−64** | **−54** | } |
| { | **−2** | **12** | **−43** | **22** | **11** | **29** | **62** | **30** | **−7** | **21** | **29** | **−4** | **−55** | **−43** | **44** | **7** | } |
| { | **5** | **7** | **67** | **16** | **8** | **−1** | **−16** | **33** | **7** | **17** | **30** | **60** | **−40** | **−8** | **−33** | **51** | } |
| { | **−1** | **13** | **−16** | **−24** | **−9** | **−28** | **−1** | **−22** | **46** | **8** | **−20** | **−30** | **−62** | **61** | **18** | **52** | } |
| { | **−5** | **−8** | **17** | **−30** | **4** | **−13** | **−49** | **−54** | **−3** | **58** | **7** | **19** | **−27** | **−39** | **50** | **−33** | } |
| { | **−7** | **−16** | **−26** | **−62** | **3** | **25** | **−10** | **−24** | **−11** | **−9** | **68** | **−19** | **26** | **−22** | **−19** | **60** | } |
| { | **3** | **1** | **34** | **33** | **−2** | **−4** | **−47** | **43** | **−9** | **16** | **8** | **−90** | **10** | **−19** | **26** | **21** | } |
| { | **−2** | **1** | **12** | **−92** | **5** | **−5** | **7** | **80** | **−3** | **6** | **−26** | **4** | **1** | **1** | **14** | **−19** | } |
| }, | | | | | | | | | | | | | | | | | |

Otherwise, if nTrS is equal to 16, lfnstTrSetIdx is equal to 1, and lfnst_idx is equal to 2, the following applies:

| lowFreqTransMatrix[m][n] = | | | | | | | | | | | | | | | | | |
|---|---|---|---|---|---|---|---|---|---|---|---|---|---|---|---|---|---|
| [ [ { | | | | | | | | | | | | | | | | | |
| { | 88 | −55 | 6 | −3 | −66 | 27 | 9 | −2 | 11 | 11 | −13 | 1 | −2 | −7 | 1 | 2 | } |
| { | −58 | −20 | 27 | −2 | −27 | 75 | −29 | 0 | 47 | −42 | −11 | 11 | −9 | −3 | 19 | −4 | } |
| { | −51 | 23 | −22 | 5 | −63 | 3 | 37 | −5 | 1 | 64 | −35 | −4 | 29 | −31 | −11 | 13 | } |
| { | −27 | −76 | 49 | −2 | 40 | 14 | 9 | −17 | −56 | 36 | −25 | 6 | 14 | 3 | −6 | 8 | } |
| { | 19 | −4 | −36 | 22 | 52 | 7 | 36 | −23 | 28 | −17 | −64 | 15 | −5 | −44 | 48 | 9 | } |
| { | 29 | 50 | 13 | −10 | 1 | 34 | −59 | 1 | −51 | 4 | −16 | 30 | 52 | −33 | 24 | −5 | } |
| { | −12 | −21 | −74 | 43 | −13 | 39 | 18 | −5 | −58 | −35 | 27 | −5 | 19 | 26 | 6 | −5 | } |
| { | 19 | 38 | −10 | −5 | 28 | 66 | 0 | −5 | −4 | 19 | −30 | −26 | −40 | 28 | −60 | 37 | } |
| { | −6 | 27 | 18 | −5 | −37 | −18 | 12 | −25 | −44 | −10 | −38 | 37 | −66 | 45 | 40 | −7 | } |
| { | −13 | −28 | −45 | −39 | 0 | −5 | −39 | 69 | −23 | 16 | −12 | −18 | −50 | −31 | 24 | 13 | } |
| { | −1 | 8 | 24 | −51 | −15 | −9 | 44 | 10 | −28 | −70 | −12 | −39 | 24 | −18 | −4 | 51 | } |
| { | −8 | −22 | −17 | 33 | −18 | −45 | −57 | −27 | 0 | −31 | −30 | 29 | −2 | −13 | −53 | 49 | } |
| { | 1 | 12 | 32 | 51 | −8 | 8 | −2 | −31 | −22 | 4 | 46 | −39 | −49 | −67 | 14 | 17 | } |
| { | 4 | 5 | 24 | 60 | −5 | −14 | −23 | 38 | 9 | 8 | −34 | −59 | 24 | 47 | 42 | 28 | } |
| { | −1 | −5 | −20 | −34 | 4 | 4 | −15 | −46 | 18 | 31 | 42 | 10 | 10 | 27 | 49 | 78 | } |
| { | −3 | −7 | −22 | −34 | −5 | −11 | −36 | −69 | −1 | −3 | −25 | −73 | 5 | 4 | 4 | −49 | } |
| }, ] ] | | | | | | | | | | | | | | | | | |
| { | | | | | | | | | | | | | | | | | |
| { | **80** | **−54** | **4** | **−3** | **−71** | **34** | **10** | **−1** | **17** | **11** | **−15** | **1** | **−3** | **−8** | **2** | **3** | } |

-continued

| lowFreqTransMatrix[m][n] = | | | | | | | | | | | | | | | | | |
|---|---|---|---|---|---|---|---|---|---|---|---|---|---|---|---|---|---|
| { | **45** | **12** | **−23** | **0** | **9** | **−74** | **40** | **−1** | **−41** | **62** | **4** | **−15** | **8** | **−5** | **−26** | **9** | } |
| { | **51** | **−25** | **18** | **−8** | **32** | **−25** | **−29** | **11** | **−8** | **−49** | **67** | **−8** | **−23** | **47** | **−11** | **−19** | } |
| { | **−5** | **−69** | **30** | **5** | **57** | **25** | **8** | **−25** | **−62** | **12** | **−36** | **16** | **13** | **12** | **12** | **7** | } |
| { | **43** | **13** | **−39** | **15** | **36** | **−24** | **12** | **−12** | **15** | **−43** | **−28** | **27** | **3** | **−35** | **74** | **−14** | } |
| { | **−22** | **−35** | **−23** | **7** | **16** | **−8** | **73** | **−8** | **46** | **−23** | **−15** | **−42** | **−46** | **30** | **−10** | **24** | } |
| ( | **43** | **34** | **−13** | **−17** | **48** | **38** | **−35** | **11** | **6** | **−6** | **−39** | **−24** | **−21** | **−16** | **−46** | **53** | } |
| { | **−3** | **−32** | **63** | **−17** | **31** | **−37** | **−14** | **0** | **64** | **27** | **3** | **−1** | **−5** | **−61** | **−8** | **−7** | } |
| { | **20** | **35** | **12** | **21** | **18** | **22** | **13** | **−56** | **29** | **28** | **−15** | **40** | **−25** | **34** | **−33** | **−61** | } |
| { | **10** | **−4** | **−24** | **7** | **36** | **54** | **30** | **14** | **15** | **13** | **42** | **−46** | **62** | **−22** | **−6** | **−40** | } |
| { | **−17** | **−43** | **−56** | **44** | **−6** | **−16** | **−26** | **−22** | **−2** | **−28** | **8** | **28** | **7** | **−40** | **−66** | **−5** | } |
| { | **−14** | **−19** | **−36** | **−15** | **5** | **11** | **−24** | **43** | **−22** | **33** | **−11** | **−18** | **−74** | **−20** | **16** | **−59** | } |
| { | **1** | **22** | **36** | **−25** | **−22** | **−4** | **26** | **−36** | **−44** | **−56** | **−17** | **−45** | **−11** | **−44** | **−24** | **−38** | } |
| { | **−3** | **−15** | **−14** | **−44** | **−2** | **−31** | **−17** | **30** | **21** | **−17** | **−66** | **−7** | **53** | **42** | **−23** | **−41** | } |
| { | **−1** | **−6** | **−11** | **28** | **−8** | **−16** | **−59** | **−64** | **10** | **21** | **−9** | **−74** | **8** | **18** | **31** | **0** | } |
| { | **9** | **11** | **41** | **97** | **−3** | **−8** | **2** | **57** | **−5** | **−10** | **−30** | **−21** | **1** | **4** | **−7** | **−12** | } |
| }, | | | | | | | | | | | | | | | | | |

Otherwise, if nTrS is equal to 16, lfnstTrSetIdx is equal to 2, and lfnst_idx is equal to 1, the following applies:

| lowFreqTransMatrix[m][n] = | | | | | | | | | | | | | | | | | |
|---|---|---|---|---|---|---|---|---|---|---|---|---|---|---|---|---|---|
| [ [ { | | | | | | | | | | | | | | | | | |
| { | −112 | 47 | −2 | 2 | −34 | 13 | 2 | 0 | 15 | −7 | 1 | 0 | 8 | −3 | −1 | 0 | } |
| { | 29 | −7 | 1 | −1 – | −108 | 40 | 2 | 0 | −45 | 13 | 4 | −1 | 8 | −5 | 1 | 0 | } |
| { | −36 | −87 | 69 | −10 | −17 | −33 | 26 | −2 | 7 | 14 | −11 | 2 | 6 | 8 | −7 | 0 | } |
| { | 28 | −5 | 2 | −2 | −29 | 13 | −2 | 0 | 103 | −36 | −4 | 1 | 48 | −16 | −4 | 1 | } |
| { | −12 | −24 | 15 | −3 | 26 | 80 | −61 | 9 | 15 | 54 | −36 | 2 | 0 | −4 | 6 | −2 | } |
| { | 18 | 53 | 69 | −74 | 14 | 24 | 28 | −30 | −6 | −7 | −11 | 12 | −5 | −7 | −6 | 8 | } |
| { | 5 | −1 | 2 | 0 | −26 | 6 | 0 | 1 | 45 | −9 | −1 | 0 | −113 | 28 | 8 | −1 | } |
| { | −13 | −32 | 18 | −2 | 15 | 34 | −27 | 7 | −25 | −80 | 47 | −1 | −16 | −50 | 28 | 2 | } |
| { | −4 | −13 | −10 | 19 | 18 | 46 | 60 | −48 | 16 | 33 | 60 | −48 | 1 | 0 | 5 | −2 | } |
| { | 15 | 33 | 63 | 89 | 8 | 15 | 25 | 40 | −4 | −8 | −15 | −8 | −2 | −6 | −9 | −7 | } |
| { | −8 | −24 | −27 | 15 | 12 | 41 | 26 | −29 | −17 | −50 | −39 | 27 | 0 | 35 | −67 | 26 | } |
| { | −2 | −6 | −24 | 13 | −1 | −8 | 37 | −22 | 3 | 18 | −51 | 22 | −23 | −95 | 17 | 17 | } |
| { | −3 | −7 | −16 | −21 | 10 | 24 | 46 | 75 | 8 | 20 | 38 | 72 | 1 | 2 | 1 | 7 | } |
| { | 2 | 6 | 10 | −3 | −5 | −16 | −31 | 12 | 7 | 24 | 41 | −16 | −16 | −41 | −89 | 49 | } |
| { | 4 | 8 | 21 | 40 | −4 | −11 | −28 | −57 | 5 | 14 | 31 | 70 | 7 | 18 | 32 | 52 | } |
| { | 0 | 1 | 4 | 11 | −2 | −4 | −13 | −34 | 3 | 7 | 20 | 47 | −6 | −19 | −42 | −101 | } |
| }, ] ] | | | | | | | | | | | | | | | | | |
| { | | | | | | | | | | | | | | | | | |
| { | **96** | **−58** | **8** | **−5** | **52** | **−30** | **2** | **−1** | **0** | **4** | **−5** | **1** | **−6** | **6** | **−2** | **0** | } |
| { | **52** | **2** | **−15** | **0** | **−63** | **54** | **−16** | **4** | **−68** | **35** | **2** | **−1** | **−17** | **0** | **7** | **−2** | } |
| { | **−24** | **−66** | **57** | **−10** | **−62** | **−38** | **47** | **−5** | **−20** | **−2** | **4** | **3** | **8** | **4** | **−7** | **3** | } |
| { | **44** | **−1** | **−9** | **−1** | **−54** | **25** | **−2** | **1** | **69** | **−40** | **3** | **−2** | **62** | **−26** | **−5** | **1** | } |
| { | **−19** | **−31** | **15** | **−1** | **3** | **29** | **−29** | **7** | **38** | **77** | **−58** | **5** | **28** | **32** | **−20** | **−3** | } |
| { | **−8** | **6** | **−4** | **1** | **32** | **−10** | **−3** | **−1** | **−63** | **9** | **7** | **0** | **102** | **−23** | **−11** | **0** | } |
| { | **−15** | **−37** | **−59** | **50** | **−26** | **−48** | **−50** | **48** | **−10** | **−21** | **−13** | **10** | **0** | **11** | **−1** | **−6** | } |
| { | **26** | **54** | **−24** | **−1** | **−22** | **−44** | **38** | **−11** | **1** | **11** | **−8** | **0** | **14** | **78** | **−43** | **1** | } |
| { | **−8** | **−21** | **−26** | **16** | **0** | **−2** | **12** | **−11** | **22** | **43** | **73** | **−53** | **16** | **26** | **48** | **−30** | } |
| { | **−12** | **−30** | **17** | **−6** | **18** | **55** | **−25** | **−1** | **−15** | **−62** | **27** | **−2** | **9** | **75** | **−22** | **−6** | } |
| { | **11** | **16** | **36** | **70** | **14** | **26** | **45** | **73** | **7** | **13** | **24** | **29** | **2** | **2** | **−5** | **4** | } |
| { | **−14** | **−35** | **−51** | **20** | **9** | **25** | **32** | **−27** | **4** | **12** | **24** | **−10** | **−16** | **−29** | **−77** | **40** | } |
| { | **−4** | **−5** | **−16** | **−48** | **−4** | **−8** | **−16** | **11** | **12** | **23** | **53** | **83** | **6** | **12** | **18** | **50** | } |
| { | **−9** | **−23** | **−49** | **7** | **11** | **29** | **65** | **−21** | **−7** | **−17** | **−48** | **38** | **10** | **16** | **57** | **−8** | } |
| { | **6** | **8** | **27** | **66** | **−5** | **−7** | **−24** | **−58** | **−1** | **−3** | **−6** | **−4** | **7** | **15** | **32** | **76** | } |
| { | **3** | **3** | **12** | **39** | **−4** | **−5** | **−18** | **−61** | **4** | **7** | **20** | **64** | **−5** | **−11** | **−21** | **−74** | } |
| }, | | | | | | | | | | | | | | | | | |

Otherwise, if nTrS is equal to 16, lfnstTrSetIdx is equal to 2, and lfnst_idx is equal to 2, the following applies:

| lowFreqTransMatrix[m][n] = | | | | | | | | | | | | | | | | | |
|---|---|---|---|---|---|---|---|---|---|---|---|---|---|---|---|---|---|
| [ [ { | | | | | | | | | | | | | | | | | |
| { | −99 | 39 | −1 | 2 | 65 | −20 | −5 | 0 | −15 | −2 | 5 | −1 | 0 | 3 | −1 | 0 | } |
| { | 58 | 42 | −33 | 3 | 33 | −63 | 23 | −1 | −55 | 32 | 3 | −5 | 21 | −2 | −8 | 3 | } |
| { | −15 | 71 | −44 | 5 | −58 | −29 | 25 | 3 | 62 | −7 | −4 | −4 | −19 | 4 | 0 | 1 | } |
| { | 46 | 5 | 4 | −6 | 71 | −12 | −15 | 5 | 52 | −38 | 13 | −2 | −63 | 23 | 3 | −3 | } |
| { | −14 | −54 | −29 | 29 | 25 | −9 | 61 | −29 | 27 | 44 | −48 | 5 | −27 | −21 | 12 | 7 | } |
| { | −3 | 3 | 69 | −42 | −11 | −50 | −26 | 26 | 24 | 63 | −19 | −5 | −18 | −22 | 12 | 0 | } |

-continued

| lowFreqTransMatrix[m][n] = | | | | | | | | | | | | | | | | | |
|---|---|---|---|---|---|---|---|---|---|---|---|---|---|---|---|---|---|
| { | 17 | 16 | −2 | 1 | 38 | 18 | −12 | 0 | 62 | 1 | −14 | 5 | 89 | −42 | 8 | −2 | } |
| { | 15 | 54 | −8 | 6 | 6 | 60 | −26 | −8 | −30 | 17 | −38 | 22 | −43 | −45 | 42 | −7 | } |
| { | −6 | −17 | −55 | −28 | 9 | 30 | −8 | 58 | 4 | 34 | 41 | −52 | −16 | −36 | −20 | 16 | } |
| { | −2 | −1 | −9 | −79 | 7 | 11 | 48 | 44 | −13 | −34 | −55 | 6 | 12 | 23 | 20 | −11 | } |
| { | 7 | 29 | 14 | −6 | 12 | 53 | 10 | −11 | 14 | 59 | −15 | −3 | 5 | 71 | −54 | 13 | } |
| { | −5 | −24 | −53 | 15 | −3 | −15 | −61 | 26 | 6 | 30 | −16 | 23 | 13 | 56 | 44 | −35 | } |
| { | 4 | 8 | 21 | 52 | −1 | −1 | −5 | 29 | −7 | −17 | −44 | −84 | 8 | 20 | 31 | 39 | } |
| { | −2 | −11 | −25 | −4 | −4 | −21 | −53 | 2 | −5 | −26 | −64 | 19 | −8 | −19 | −73 | 39 | } |
| { | −3 | −5 | −23 | −57 | −2 | −4 | −24 | −75 | 1 | 3 | 9 | −25 | 6 | 15 | 41 | 61 | } |
| { | 1 | 1 | 7 | 18 | 1 | 2 | 16 | 47 | 2 | 5 | 24 | 67 | 3 | 9 | 25 | 88 | } |
| }, ] ] | | | | | | | | | | | | | | | | | |
| { | | | | | | | | | | | | | | | | | |
| { | **−71** | **51** | **−8** | **3** | **72** | **−47** | **3** | **−1** | **−32** | **11** | **8** | **−2** | **9** | **2** | **−6** | **1** | } |
| { | **−62** | **−12** | **30** | **−3** | **16** | **51** | **−41** | **5** | **40** | **−61** | **18** | **3** | **−26** | **22** | **6** | **−7** | } |
| { | **−17** | **61** | **−38** | **6** | **−45** | **−30** | **32** | **0** | **73** | **−11** | **−10** | **−5** | **−34** | **4** | **5** | **2** | } |
| { | **−71** | **−18** | **16** | **4** | **−38** | **28** | **12** | **−8** | **5** | **52** | **−46** | **10** | **26** | **−49** | **18** | **3** | } |
| { | **19** | **−40** | **13** | **−1** | **64** | **−18** | **8** | **−7** | **40** | **32** | **−39** | **4** | **−68** | **−16** | **26** | **3** | } |
| { | **6** | **22** | **57** | **−39** | **−24** | **−37** | **−59** | **44** | **17** | **43** | **27** | **−20** | **−11** | **−15** | **−10** | **2** | } |
| { | **−29** | **−18** | **7** | **1** | **−44** | **−10** | **18** | **−3** | **−64** | **15** | **6** | **−2** | **−80** | **45** | **−2** | **1** | } |
| { | **−21** | **−56** | **12** | **3** | **1** | **−32** | **30** | **−7** | **43** | **21** | **10** | **−19** | **35** | **56** | **−59** | **13** | } |
| { | **8** | **13** | **41** | **−12** | **−10** | **−33** | **−8** | **−9** | **−1** | **−13** | **−54** | **47** | **30** | **60** | **43** | **−38** | } |
| { | **14** | **46** | **−16** | **−6** | **20** | **71** | **−15** | **5** | **7** | **60** | **−26** | **−5** | **−4** | **55** | **−26** | **2** | } |
| { | **−7** | **−10** | **−14** | **−65** | **8** | **8** | **38** | **74** | **−12** | **−28** | **−39** | **−42** | **10** | **7** | **16** | **14** | } |
| { | **12** | **32** | **61** | **−12** | **1** | **6** | **24** | **−28** | **−12** | **−35** | **−42** | **10** | **−13** | **−24** | **−63** | **44** | } |
| { | **0** | **−5** | **−9** | **57** | **−10** | **−20** | **−56** | **−2** | **−9** | **−14** | **−48** | **−58** | **7** | **16** | **17** | **54** | } |
| { | **10** | **23** | **58** | **17** | **7** | **20** | **52** | **−24** | **4** | **10** | **38** | **−57** | **11** | **13** | **57** | **8** | } |
| { | **5** | **5** | **25** | **71** | **3** | **3** | **18** | **59** | **−4** | **−6** | **−18** | **−17** | **−7** | **−13** | **−32** | **−70** | } |
| { | **−2** | **−2** | **−12** | **−40** | **−4** | **−5** | **−19** | **−63** | **−5** | **−8** | **−23** | **−67** | **−4** | **−11** | **−19** | **−69** | } |
| }, | | | | | | | | | | | | | | | | | |

Otherwise, if nTrS is equal to 16, lfnstTrSetIdx is equal to 3, and lfnst_idx is equal to 1, the following applies:

| lowFreqTransMatrix[m][n] = | | | | | | | | | | | | | | | | | |
|---|---|---|---|---|---|---|---|---|---|---|---|---|---|---|---|---|---|
| [ [ { | | | | | | | | | | | | | | | | | |
| { | −114 | 37 | 3 | 2 | −22 | −23 | 14 | 0 | 21 | −17 | −5 | 2 | 5 | 2 | −4 | −1 | } |
| { | −19 | −41 | 19 | −2 | 85 | −60 | −11 | 7 | 17 | 31 | −34 | 2 | −11 | 19 | 2 | −8 | } |
| { | 36 | −25 | 18 | −2 | −42 | −53 | 35 | 5 | 46 | −60 | −25 | 19 | 8 | 21 | −33 | 1 | } |
| { | −27 | −80 | 44 | −3 | −58 | 1 | −29 | 19 | −41 | 18 | −12 | −7 | 12 | −17 | 7 | −6 | } |
| { | −11 | −21 | 37 | −10 | 44 | −4 | 47 | −12 | −37 | −41 | 58 | 18 | 10 | −46 | −16 | 31 | } |
| { | 15 | 47 | 10 | −6 | −16 | −44 | 42 | 10 | −80 | 25 | −40 | 21 | −23 | −2 | 3 | −14 | } |
| { | 13 | 25 | 79 | −39 | −13 | 10 | 31 | −4 | 49 | 45 | 12 | −8 | 3 | −1 | 43 | 7 | } |
| { | 16 | 11 | −26 | 13 | −13 | −74 | −20 | −1 | 5 | −6 | 29 | −47 | 26 | −49 | 54 | 2 | } |
| { | −8 | −34 | −26 | 7 | −26 | −19 | 29 | −37 | 1 | 22 | 46 | −9 | −81 | 37 | 14 | 20 | } |
| { | −6 | −30 | −42 | −12 | −3 | 5 | 57 | −52 | −2 | 37 | −12 | 6 | 74 | 10 | 6 | −15 | } |
| { | 5 | 9 | −6 | 42 | −15 | −18 | −9 | 26 | 15 | 58 | 14 | 43 | 23 | −10 | −37 | 75 | } |
| { | −5 | −23 | −23 | 36 | 3 | 22 | 36 | 40 | 27 | −4 | −16 | 56 | −25 | −46 | 56 | −24 | } |
| { | 1 | 3 | 23 | 73 | 8 | 5 | 34 | 46 | −12 | 2 | 35 | −38 | 26 | 52 | 2 | −31 | } |
| { | −3 | −2 | −21 | −52 | 1 | −10 | −17 | 44 | −19 | −20 | 30 | 45 | 27 | 61 | 49 | 21 | } |
| { | −2 | −7 | −33 | −56 | −4 | −6 | 21 | 63 | 15 | 31 | 32 | −22 | −10 | −26 | −52 | −38 | } |
| { | −5 | −12 | −18 | −12 | 8 | 22 | 38 | 36 | −5 | −15 | −51 | −63 | −5 | 0 | 15 | 73 | } |
| }, ] ] | | | | | | | | | | | | | | | | | |
| { | | | | | | | | | | | | | | | | | |
| { | **−106** | **50** | **3** | **3** | **−19** | **−20** | **20** | **−2** | **24** | **−27** | **−1** | **4** | **4** | **−1** | **−7** | **1** | } |
| { | **14** | **29** | **−14** | **1** | **−71** | **73** | **3** | **−8** | **−20** | **−24** | **50** | **−9** | **12** | **−30** | **8** | **11** | } |
| { | **39** | **−25** | **8** | **2** | **−28** | **−30** | **43** | **−2** | **33** | **−76** | **−1** | **26** | **5** | **10** | **−51** | **14** | } |
| { | **20** | **39** | **−46** | **6** | **−49** | **10** | **−12** | **6** | **6** | **13** | **−70** | **5** | **−16** | **53** | **−12** | **−37** | } |
| { | **33** | **73** | **−41** | **−1** | **68** | **9** | **21** | **−23** | **33** | **−12** | **30** | **1** | **−12** | **13** | **3** | **15** | } |
| { | **−30** | **−20** | **−21** | **21** | **36** | **52** | **−44** | **0** | **−25** | **−14** | **2** | **28** | **−13** | **10** | **−79** | **11** | } |
| { | **7** | **33** | **19** | **−2** | **3** | **−13** | **60** | **6** | **−83** | **20** | **−10** | **50** | **−28** | **−15** | **−13** | **5** | } |
| { | **−4** | **−4** | **44** | **−4** | **−22** | **28** | **14** | **4** | **42** | **53** | **16** | **22** | **−31** | **53** | **−3** | **60** | } |
| { | **−17** | **−32** | **20** | **−17** | **20** | **50** | **51** | **−42** | **0** | **−13** | **6** | **−1** | **−1** | **41** | **15** | **−70** | } |
| { | **3** | **8** | **9** | **−23** | **−20** | **−39** | **−13** | **−44** | **−18** | **15** | **38** | **−63** | **−52** | **10** | **−50** | **−16** | } |
| { | **−17** | **−29** | **−48** | **−4** | **2** | **−8** | **20** | **−9** | **−49** | **−27** | **−7** | **−37** | **4** | **54** | **32** | **62** | } |
| { | **−11** | **−36** | **−58** | **53** | **−19** | **−27** | **7** | **−11** | **14** | **19** | **46** | **44** | **−42** | **−7** | **25** | **−22** | } |
| { | **7** | **17** | **35** | **30** | **9** | **−4** | **−21** | **75** | **−18** | **−43** | **34** | **−13** | **−34** | **43** | **23** | **−26** | } |
| { | **5** | **13** | **1** | **26** | **−6** | **−27** | **0** | **−2** | **−18** | **33** | **44** | **10** | **90** | **47** | **−26** | **−15** | } |
| { | **−4** | **−14** | **−23** | **33** | **8** | **19** | **64** | **57** | **17** | **32** | **−5** | **−60** | **1** | **−22** | **−36** | **−5** | } |
| { | **9** | **13** | **40** | **98** | **2** | **5** | **−1** | **−54** | **−5** | **−9** | **−31** | **−24** | **−2** | **−6** | **9** | **15** | } |
| }, | | | | | | | | | | | | | | | | | |

Otherwise, if nTrS is equal to 16, lfnstTrSetIdx is equal to 0, and lfnstIdx is equal to 2, the following applies:

Otherwise, if nTrS is equal to 16, lfnstTrSetIdx is equal to 3, and lfnst_idx is equal to 2, the following applies:

lowFreqTransMatrix[m][n] =

| | | | | | | | | | | | | | | | | | |
|---|---|---|---|---|---|---|---|---|---|---|---|---|---|---|---|---|---|
| [ [ { | | | | | | | | | | | | | | | | | |
| { | −102 | 22 | 7 | 2 | 66 | −25 | −6 | −1 | −15 | 14 | 1 | −1 | 2 | −2 | 1 | 0 | } |
| { | 12 | 93 | −27 | −6 | −27 | −64 | 36 | 6 | 13 | 5 | −23 | 0 | −2 | 6 | 5 | −3 | } |
| { | −59 | −24 | 17 | 1 | −62 | −2 | −3 | 2 | 83 | −12 | −17 | −2 | −24 | 14 | 7 | −2 | } |
| { | −33 | 23 | −36 | 11 | −21 | 50 | 35 | −16 | −23 | −78 | 16 | 19 | 22 | 15 | −30 | −5 | } |
| { | 0 | −38 | −81 | 30 | 27 | 5 | 51 | −32 | 24 | 36 | −16 | 12 | −24 | −8 | 9 | 1 | } |
| { | 28 | 38 | 8 | −9 | 62 | 32 | −13 | 2 | 51 | −32 | 15 | 5 | −66 | 28 | 0 | −1 | } |
| { | 11 | −35 | 21 | −17 | 30 | −18 | 31 | 18 | −11 | −36 | −80 | 12 | 16 | 49 | 13 | −32 | } |
| { | −13 | 23 | 22 | −36 | −12 | 64 | 39 | 25 | −19 | 23 | −36 | 9 | −30 | −58 | 33 | −7 | } |
| { | | −9 | −20 | −55 | −83 | 3 | −2 | 1 | 62 | 8 | 2 | 27 | −28 | 7 | 15 | −11 | } |
| { | −6 | 24 | −38 | 23 | −8 | 40 | −49 | 0 | −7 | 9 | −25 | −44 | 23 | 39 | 70 | −3 | } |
| { | 12 | 17 | 17 | 0 | 32 | 27 | 21 | 2 | 67 | 11 | −6 | −10 | 89 | −22 | −12 | 16 | } |
| { | 2 | −9 | 8 | 45 | 7 | −8 | 27 | 35 | −9 | −31 | −17 | −87 | −23 | −22 | −19 | 44 | } |
| { | −1 | −9 | 28 | −24 | −1 | −10 | 49 | −30 | −8 | −7 | 40 | 1 | 4 | 33 | 65 | 67 | } |
| { | 5 | −12 | −24 | −17 | 13 | −34 | −32 | −16 | 14 | −67 | −7 | 9 | 7 | −74 | 49 | 1 | } |
| { | 2 | −6 | 11 | 45 | 3 | −10 | 33 | 55 | 8 | −5 | 59 | 4 | 7 | −4 | 44 | −66 | } |
| { | −1 | 1 | −14 | 36 | −1 | 2 | −20 | 69 | 0 | 0 | −15 | 72 | 3 | 4 | 5 | 65 | } |
| }, ] ] | | | | | | | | | | | | | | | | | |
| { | | | | | | | | | | | | | | | | | |
| { | **−98** | **14** | **18** | **1** | **67** | **−29** | **−16** | **1** | **−6** | **23** | **−1** | **−4** | **0** | **−6** | **5** | **1** | } |
| { | **−16** | **56** | **−11** | **−6** | **−46** | **−63** | **33** | **9** | **49** | **−2** | **−46** | **−2** | **−10** | **23** | **16** | **−9** | } |
| { | **−66** | **−25** | **−2** | **12** | **−35** | **44** | **14** | **−15** | **29** | **−70** | **8** | **17** | **6** | **20** | **−32** | **−9** | } |
| { | **8** | **59** | **−34** | **−1** | **31** | **0** | **47** | **−7** | **−69** | **−43** | **−3** | **23** | **24** | **0** | **−22** | **−14** | } |
| { | **−13** | **62** | **24** | **−2** | **−49** | **−3** | **−23** | **2** | **−4** | **2** | **67** | **−9** | **3** | **−53** | **−23** | **31** | } |
| { | **0** | **15** | **−56** | **16** | **26** | **30** | **39** | **−37** | **45** | **34** | **32** | **28** | **−52** | **−20** | **8** | **11** | } |
| { | **31** | **−6** | **23** | **16** | **28** | **−55** | **−25** | **−17** | **26** | **−14** | **16** | **38** | **−22** | **15** | **−79** | **−19** | } |
| { | **−22** | **−52** | **−29** | **18** | **−44** | **−40** | **26** | **−17** | **−30** | **41** | **−8** | **23** | **27** | **−51** | **−22** | **−22** | } |
| { | **1** | **−9** | **−41** | **19** | **0** | **−34** | **−14** | **−37** | **4** | **2** | **42** | **−11** | **59** | **58** | **15** | **51** | } |
| { | **5** | **−36** | **−2** | **−29** | **24** | **−27** | **53** | **42** | **15** | **−31** | **2** | **−24** | **−7** | **−30** | **−22** | **72** | } |
| { | **−11** | **7** | **−74** | **−21** | **−4** | **13** | **−38** | **34** | **−1** | **19** | **−10** | **−54** | **−13** | **13** | **−59** | **−14** | } |
| { | **−1** | **−4** | **7** | **−64** | **5** | **5** | **29** | **42** | **25** | **28** | **55** | **30** | **40** | **24** | **1** | **−45** | } |
| { | **13** | **−5** | **−21** | **−4** | **26** | **−22** | **−13** | **−25** | **37** | **−49** | **16** | **−47** | **27** | **−54** | **30** | **−54** | } |
| { | **12** | **25** | **16** | **25** | **21** | **39** | **7** | **−2** | **47** | **29** | **−45** | **0** | **75** | **−22** | **−37** | **16** | } |
| { | **−1** | **1** | **−41** | **−24** | **2** | **−4** | **−61** | **29** | **12** | **−25** | **−22** | **78** | **11** | **−29** | **25** | **25** | } |
| { | **3** | **−1** | **−10** | **91** | **5** | **−5** | **6** | **81** | **5** | **−6** | **26** | **3** | **1** | **3** | **16** | **−16** | } |
| }, | | | | | | | | | | | | | | | | | |

Otherwise, if nTrS is equal to 48, lfnstTrSetIdx is equal to 0, and lfnst_idx is equal to 1 the following applies:

lowFreqTransMatrix[ m ][ n ] = lowFreqTransMatrixCol0to15[ m ][ n ] with m = 0 . . . 15, n = 0 . . . 15 lowFreqTransMatrixCol0to15 =

| | | | | | | | | | | | | | | | | | |
|---|---|---|---|---|---|---|---|---|---|---|---|---|---|---|---|---|---|
| [ [ { | | | | | | | | | | | | | | | | | |
| { | −108 | 48 | 9 | 1 | 1 | 1 | 0 | 0 | 44 | −6 | −9 | −1 | −1 | 0 | −1 | 0 | } |
| { | 55 | 66 | −37 | −5 | −6 | −1 | −2 | 0 | 67 | −30 | −20 | 4 | −2 | 0 | −1 | 0 | } |
| { | 2 | 86 | −21 | −13 | −4 | −2 | −1 | −1 | −88 | 5 | 6 | 4 | 5 | 1 | 1 | 0 | } |
| { | −24 | −21 | −38 | 19 | 0 | 4 | −1 | 2 | −23 | −89 | 31 | 20 | 2 | 3 | 1 | 1 | } |
| { | 9 | 20 | 98 | −26 | −3 | −5 | 0 | −2 | −9 | −26 | 15 | −16 | 2 | 0 | 1 | 0 | } |
| { | −21 | −7 | −37 | 10 | 2 | 2 | −1 | 1 | −10 | 69 | −5 | −7 | −2 | −2 | 0 | −1 | } |
| { | −10 | −25 | 4 | −17 | 8 | −2 | 2 | −1 | −27 | −17 | −71 | 25 | 8 | 2 | 1 | 1 | } |
| { | 2 | 5 | 10 | 64 | −9 | 4 | −3 | 1 | −4 | 8 | 62 | 3 | −17 | 1 | −2 | 0 | } |
| { | −11 | −15 | −28 | −97 | 6 | −1 | 4 | −1 | 7 | 3 | 57 | −15 | 10 | −2 | 0 | −1 | } |
| { | 9 | 13 | 24 | −6 | 7 | −2 | 1 | −1 | 16 | 39 | 20 | 47 | −2 | −2 | −2 | 0 | } |
| { | −7 | 11 | 12 | 7 | 2 | −1 | 0 | −1 | −14 | −1 | −24 | 11 | 2 | 0 | 0 | 0 | } |
| { | 0 | 0 | 7 | −6 | 23 | −3 | 3 | −1 | 5 | 1 | 18 | 96 | 13 | −9 | −1 | −1 | } |
| { | −2 | −6 | −1 | −10 | 0 | 1 | 1 | 0 | −7 | −2 | −28 | 20 | −15 | 4 | −3 | 1 | } |
| { | −1 | 6 | −16 | 0 | 24 | −3 | 1 | −1 | 2 | 6 | 6 | 16 | 18 | −7 | 1 | −1 | } |
| { | −5 | −6 | −3 | −19 | −104 | 18 | −4 | 3 | 0 | 6 | 0 | 35 | −41 | 20 | −2 | 2 | } |
| { | −1 | −2 | 0 | 23 | −9 | 0 | −2 | 0 | 1 | 1 | 8 | −1 | 29 | 1 | 1 | 0 | } |
| }, ] ] | | | | | | | | | | | | | | | | | |
| { | | | | | | | | | | | | | | | | | |
| { | **−102** | **54** | **7** | **1** | **1** | **1** | **0** | **0** | **51** | **−10** | **−12** | **−1** | **−1** | **0** | **−1** | **0** | } |
| { | **−60** | **−58** | **44** | **4** | **7** | **1** | **3** | **0** | **−55** | **43** | **15** | **−9** | **1** | **−1** | **1** | **−1** | } |
| { | **0** | **84** | **−25** | **−15** | **−4** | **−2** | **−1** | **−1** | **−86** | **7** | **5** | **6** | **6** | **1** | **2** | **1** | } |
| { | **−33** | **−24** | **−30** | **22** | **1** | **5** | **0** | **2** | **−31** | **−79** | **42** | **20** | **1** | **3** | **1** | **1** | } |
| { | **7** | **25** | **88** | **−34** | **−6** | **−6** | **0** | **−2** | **−16** | **−17** | **10** | **−19** | **5** | **1** | **2** | **0** | } |
| { | **23** | **28** | **17** | **1** | **−9** | **0** | **−2** | **0** | **33** | **−14** | **58** | **−22** | **−8** | **−1** | **−1** | **0** | } |
| { | **−14** | **8** | **−45** | **21** | **−1** | **3** | **−1** | **1** | **4** | **72** | **25** | **−20** | **−8** | **−4** | **−1** | **−2** | } |
| { | **−3** | **−10** | **−19** | **−58** | **15** | **−1** | **5** | **0** | **8** | **−2** | **−60** | **5** | **22** | **−1** | **2** | **1** | } |
| { | **9** | **13** | **22** | **−12** | **6** | **−3** | **1** | **−1** | **16** | **43** | **15** | **40** | **−10** | **−4** | **−4** | **−2** | } |
| { | **−15** | **−18** | **−30** | **−93** | **12** | **4** | **7** | **2** | **3** | **1** | **48** | **−18** | **11** | **−3** | **−2** | **−1** | } |

-continued

{ -6 11 17 15 9 -5 -1 -2 -18 -4 -33 27 1 -3 1 0 }
{ 2 -2 12 -8 24 -4 3 -2 10 2 31 83 5 -14 -5 -3 }
{ 3 14 6 9 1 -1 -2 0 9 13 36 -10 18 -6 0 -2 }
{ -2 -8 13 -5 -48 8 -2 2 -4 -6 -7 -27 -20 14 2 2 }
{ -7 -6 -8 -24 -95 19 3 4 1 9 0 47 -34 15 -2 -1 }
{ 2 2 0 -26 17 -4 4 -1 -1 -4 -13 -5 -38 -1 1 2 }
}, lowFreqTransMatrix[ m ][ n ] = lowFreqTransMatrixCol16to31[ m − 16 ][ n ]
with m = 16 . . . 31, n = 0 . . . 15 lowFreqTransMatrixCol16to31 =

[ [ {
{ 9 -9 -1 1 0 0 0 0 3 -1 1 0 0 0 0 0 }
{ -31 -19 14 4 1 1 1 0 -6 3 5 -2 0 0 0 0 }
{ 14 -5 0 3 0 0 0 0 10 -5 -2 0 -1 0 0 0 }
{ -30 26 36 -8 -2 -2 0 -1 14 18 -7 -9 -1 -1 0 0 }
{ -61 -3 -2 3 7 1 1 0 12 16 -6 -1 0 -1 0 0 }
{ -93 2 19 0 3 0 2 0 17 4 0 0 -1 0 0 0 }
{ -4 -66 28 36 -5 3 0 1 -10 20 33 -13 -8 0 0 -1 }
{ -3 -75 5 -14 1 4 0 1 -36 3 18 -4 4 0 1 0 }
{ -1 -27 13 6 1 -1 0 0 -34 -6 0 3 4 1 2 0 }
{ 28 23 76 -5 -25 -3 -3 -1 6 36 -7 -39 -4 -1 0 -1 }
{ -20 48 11 -13 -5 -2 0 -1 -105 -19 17 0 6 2 3 0 }
{ -21 -7 -42 14 -24 -3 0 0 11 -47 -7 3 -5 9 1 2 }
{ -2 -32 -2 -66 3 7 1 2 -11 13 -70 5 43 -2 3 0 }
{ -3 11 -63 9 4 -5 2 -1 -22 94 -4 -6 -4 -4 1 -2 }
{ -2 10 -18 16 21 3 -2 0 -2 11 6 -10 6 -3 -1 0 }
{ 3 -6 13 76 30 -11 -1 -2 -26 -8 -69 7 -9 -7 3 -1 }
}, ] ]
{
{ 7 -11 0 2 0 0 0 0 2 -1 2 0 0 0 0 0 }
{ 37 15 -22 -3 -1 -1 -1 0 5 -7 -4 4 0 0 0 0 }
{ 25 -6 -2 4 -1 -1 0 0 10 -9 -2 1 -1 0 0 0 }
{ -21 37 33 -15 -3 -3 0 -1 17 17 -14 -9 1 -1 0 0 }
{ -67 4 -1 4 9 1 1 0 21 18 -11 0 0 -2 0 0 }
{ 45 50 -40 -35 5 -1 0 -1 -6 -23 -32 15 11 1 1 1 }
{ -72 27 -1 -20 8 0 2 0 19 -11 -16 9 5 0 0 0 }
{ 7 74 -4 18 -5 -8 -2 -2 35 -8 -20 4 -7 1 -1 0 }
{ 25 14 72 -23 -28 -1 -3 -1 -3 30 -23 -42 8 3 1 0 }
{ -7 -25 12 4 3 -1 0 0 -47 -4 0 7 8 1 2 0 }
{ -29 39 -2 -23 -10 -1 2 0 -95 -25 6 4 14 5 3 1 }
{ -18 -21 -27 16 -29 0 2 1 29 -54 -6 3 -7 12 1 2 }
{ 3 48 12 55 -10 -14 -3 -3 -11 0 63 -12 -42 1 -1 0 }
{ 3 -4 62 3 0 4 -4 -1 12 -82 7 0 4 3 -2 2 }
{ -5 14 -31 13 15 2 -2 -1 -6 25 5 -9 6 -3 -1 0 }
{ 0 10 -5 -65 -22 22 4 3 32 0 64 -3 18 7 -8 -1 }
}, lowFreqTransMatrix[ m ][ n ] = lowFreqTransMatrixCol32to47[ m − 32 ][n] with
m = 32 . . . 47, n = 0 . . . 15 lowFreqTransMatrixCol32to47 =

[ [ {
{ }
{ }
{ }
{ }
{ }
{ }
{ }
{ }
{ }
{ }
{ }
{ }
{ }
{ }
{ }
{ }
}, ] ]
{ 1 -1 0 0 1 0 0 0 0 -1 0 0 0 0 0 0 }
{ 7 1 -1 0 1 -1 -1 0 3 0 -1 0 0 0 0 0 }
{ 6 -6 1 1 2 -2 0 0 1 -2 0 0 1 -1 0 0 }
{ 2 2 -3 0 4 2 -3 -1 0 1 0 0 2 1 -1 0 }
{ 3 -4 -10 4 5 0 -2 2 0 -1 -2 1 2 0 -1 0 }
{ -8 -4 5 9 -2 -2 -2 1 -2 0 1 1 -2 -1 -1 1 }
{ 4 -8 3 4 5 -5 0 1 0 -1 2 0 2 -2 0 1 }
{ -6 -16 6 10 2 -2 5 0 -3 -2 2 1 0 -1 2 0 }
{ 1 -11 -21 8 -3 -2 -2 0 0 -4 -3 2 -1 -1 -1 -1 }
{ 2 11 0 8 -1 1 -5 2 4 2 -1 3 0 0 -2 1 }

-continued

| | | | | | | | | | | | | | | | | | |
|---|---|---|---|---|---|---|---|---|---|---|---|---|---|---|---|---|---|
| { | **-4** | **9** | **13** | **7** | **5** | **3** | **0** | **-4** | **6** | **-1** | **-1** | **0** | **2** | **0** | **0** | **-1** | } |
| { | **-2** | **0** | **23** | **-5** | **1** | **2** | **-1** | **-11** | **-2** | **3** | **1** | **-1** | **1** | **1** | **-1** | **-3** | } |
| { | **-8** | **17** | **-7** | **-42** | **2** | **-4** | **-12** | **1** | **0** | **-1** | **-3** | **-2** | **0** | **-3** | **-3** | **1** | } |
| { | **-23** | **-12** | **20** | **1** | **4** | **12** | **1** | **-5** | **-4** | **4** | **-4** | **-1** | **1** | **2** | **-1** | **0** | } |
| { | **6** | **9** | **0** | **-6** | **-2** | **-5** | **-2** | **-4** | **1** | **-1** | **1** | **0** | **-1** | **-2** | **0** | **0** | } |
| { | **16** | **40** | **12** | **-22** | **-2** | **-5** | **-17** | **-2** | **-3** | **-1** | **-1** | **6** | **-1** | **-2** | **-3** | **1** | } |
| }, | | | | | | | | | | | | | | | | | |

Otherwise, if nTrS is equal to 48, lfnstTrSetIdx is equal to 0, and lfnst_idx is equal to 2 the following applies:

lowFreqTransMatrix[ m ][ n ] = lowFreqTransMatrixCol0to15[ m ][ n ] with m = 0 . . . 15, n = 0 . . . 15 lowFreqTransMatrixCol0to15 =

| | | | | | | | | | | | | | | | | | |
|---|---|---|---|---|---|---|---|---|---|---|---|---|---|---|---|---|---|
| [ [ { | | | | | | | | | | | | | | | | | |
| { | 110 | -49 | -3 | -4 | -1 | -1 | 0 | -1 | -38 | -1 | 10 | 0 | 2 | 0 | 1 | 0 | } |
| { | -43 | -19 | 17 | -1 | 3 | 0 | 1 | 0 | -98 | 46 | 14 | -1 | 2 | 0 | 1 | 0 | } |
| { | -19 | 17 | -7 | 3 | -2 | 1 | -1 | 0 | -32 | -59 | 29 | 3 | 4 | 0 | 2 | 0 | } |
| { | -35 | -103 | 39 | 1 | 7 | 0 | 2 | 0 | 38 | -13 | 25 | -6 | 1 | -1 | 0 | 0 | } |
| { | 9 | 5 | -6 | -1 | -1 | 0 | -1 | 0 | 42 | 4 | 21 | -11 | 1 | -3 | 1 | -1 | } |
| { | -5 | -5 | -28 | 9 | -3 | 2 | -1 | 1 | -20 | -78 | 22 | 16 | 1 | 3 | 0 | 1 | } |
| { | 14 | 17 | 27 | -12 | 1 | -3 | 1 | -1 | 8 | 19 | -13 | 4 | -2 | 1 | -1 | 0 | } |
| { | 7 | 35 | 17 | -4 | -1 | 0 | 0 | 0 | 3 | 8 | 54 | -17 | 1 | -2 | 1 | -1 | } |
| { | -13 | -27 | -101 | 24 | -8 | 6 | -3 | 2 | 11 | 43 | -6 | 28 | 6 | 3 | -1 | 1 | } |
| { | -11 | -13 | -3 | -10 | 3 | -1 | 1 | 0 | -19 | -19 | -37 | 8 | 4 | 2 | 0 | 1 | } |
| { | -4 | -10 | -24 | -11 | 3 | -2 | 0 | -1 | -6 | -37 | -45 | -17 | 8 | -2 | 2 | -1 | } |
| { | -2 | 1 | 13 | -17 | 3 | -5 | 1 | -2 | 3 | 0 | -55 | 22 | 6 | 1 | 1 | 0 | } |
| { | 3 | 1 | 5 | -15 | 1 | -2 | 1 | -1 | 7 | 4 | -7 | 29 | -1 | 2 | -1 | 1 | } |
| { | -4 | -8 | -1 | -50 | 6 | -4 | 2 | -2 | -1 | 5 | -22 | 20 | 6 | 1 | 0 | 0 | } |
| { | 5 | -1 | 26 | 102 | -13 | 12 | -4 | 4 | -4 | -2 | -40 | -7 | -23 | 3 | -5 | 1 | } |
| { | -5 | -6 | -27 | -22 | -12 | 0 | -3 | 0 | -5 | 8 | -20 | -83 | 0 | 0 | 0 | 0 | } |
| }, ] ] | | | | | | | | | | | | | | | | | |
| { | | | | | | | | | | | | | | | | | |
| { | **106** | **-50** | **-4** | **-4** | **-1** | **-1** | **0** | **0** | **-46** | **4** | **11** | **1** | **2** | **0** | **1** | **0** | } |
| { | **47** | **13** | **-19** | **1** | **-4** | **0** | **-2** | **0** | **88** | **-53** | **-10** | **2** | **-2** | **1** | **-1** | **0** | } |
| { | **25** | **-8** | **0** | **-2** | **0** | **-1** | **0** | **0** | **33** | **54** | **-37** | **-2** | **-5** | **-1** | **-2** | **0** | } |
| { | **34** | **99** | **-49** | **-4** | **-8** | **-1** | **-3** | **-1** | **-28** | **9** | **-13** | **3** | **1** | **1** | **0** | **0** | } |
| { | **6** | **-18** | **4** | **-1** | **1** | **0** | **0** | **0** | **56** | **9** | **13** | **-13** | **0** | **-3** | **0** | **-1** | } |
| { | **-4** | **-4** | **-22** | **10** | **-3** | **3** | **-1** | **1** | **-15** | **-77** | **35** | **14** | **2** | **4** | **1** | **1** | } |
| { | **-16** | **-16** | **-16** | **13** | **0** | **3** | **0** | **1** | **-11** | **-11** | **10** | **-2** | **2** | **-1** | **1** | **0** | } |
| { | **-8** | **-37** | **-12** | **12** | **3** | **2** | **1** | **1** | **-5** | **-18** | **-56** | **26** | **0** | **4** | **0** | **2** | } |
| { | **5** | **16** | **71** | **-33** | **6** | **-7** | **2** | **-3** | **-22** | **-40** | **-25** | **-1** | **7** | **2** | **2** | **1** | } |
| { | **-21** | **-27** | **-65** | **21** | **1** | **6** | **1** | **2** | **-10** | **13** | **-24** | **21** | **1** | **2** | **0** | **0** | } |
| { | **3** | **4** | **18** | **2** | **-6** | **1** | **-2** | **0** | **9** | **39** | **52** | **-5** | **-10** | **-2** | **-3** | **-1** | } |
| { | **-4** | **-14** | **-27** | **10** | **0** | **4** | **0** | **2** | **-4** | **-10** | **49** | **-32** | **2** | **-3** | **1** | **-1** | } |
| { | **5** | **-1** | **-8** | **-2** | **1** | **0** | **0** | **0** | **9** | **0** | **4** | **14** | **-4** | **1** | **-2** | **0** | } |
| { | **-6** | **-14** | **-10** | **-27** | **7** | **0** | **2** | **0** | **-7** | **-7** | **-38** | **-4** | **7** | **3** | **1** | **1** | } |
| { | **5** | **5** | **28** | **15** | **-6** | **-1** | **-2** | **-1** | **5** | **-1** | **10** | **64** | **-18** | **3** | **-5** | **0** | } |
| { | **10** | **10** | **25** | **87** | **-25** | **7** | **-7** | **1** | **-2** | **-3** | **-17** | **-3** | **-8** | **0** | **0** | **0** | } |
| }, | | | | | | | | | | | | | | | | | |

lowFreqTransMatrix[ m ][ n ] = lowFreqTransMatrixCol16to31[ m − 16 ][ n ] with m = 16 . . . 31, n = 0 . . . 15 lowFreqTransMatrixCol16to31 =

| | | | | | | | | | | | | | | | | | |
|---|---|---|---|---|---|---|---|---|---|---|---|---|---|---|---|---|---|
| [ [ { | | | | | | | | | | | | | | | | | |
| { | -9 | 13 | 1 | -2 | 0 | 0 | 0 | 0 | -4 | 2 | -3 | 0 | 0 | 0 | 0 | 0 | } |
| { | 26 | 26 | -15 | -3 | -2 | -1 | -1 | 0 | 11 | -7 | -9 | 2 | 0 | 0 | 0 | 0 | } |
| { | -72 | 43 | 34 | -9 | 3 | -2 | 1 | -1 | 13 | 36 | -18 | -10 | 0 | -2 | 0 | -1 | } |
| { | -1 | 7 | 6 | -7 | 1 | -1 | 0 | 0 | -13 | 14 | 2 | -4 | 2 | -1 | 0 | 0 | } |
| { | 21 | 70 | -32 | -21 | 0 | -4 | -1 | -1 | 34 | -26 | -57 | 11 | 4 | 2 | 0 | 1 | } |
| { | 80 | -6 | 25 | -5 | -4 | -1 | -1 | 0 | 6 | -24 | 7 | -9 | 0 | 0 | 0 | 0 | } |
| { | 48 | -1 | 48 | -15 | -4 | -2 | -1 | -1 | 1 | 60 | -28 | -42 | 5 | -6 | 1 | -2 | } |
| { | 10 | 14 | -11 | -34 | 4 | -4 | 1 | -1 | -80 | -7 | -6 | 2 | 15 | 0 | 3 | 0 | } |
| { | -3 | 14 | 21 | -12 | -7 | -2 | -1 | -1 | -23 | 10 | -4 | -12 | 3 | 0 | 1 | 0 | } |
| { | -12 | -30 | 3 | -9 | 5 | 0 | 1 | 0 | -56 | -9 | -47 | 8 | 21 | 1 | 4 | 1 | } |
| { | 17 | 14 | -58 | 14 | 15 | 0 | 2 | 0 | -10 | 34 | -7 | 28 | 4 | -1 | 1 | 0 | } |
| { | 8 | 74 | 21 | 40 | -14 | 0 | -2 | 0 | -36 | -8 | 11 | -13 | -23 | 1 | -3 | 0 | } |
| { | 8 | 3 | 12 | -14 | -9 | -1 | -1 | 0 | 4 | 29 | -15 | 31 | 10 | 4 | 1 | 1 | } |
| { | -16 | -15 | 18 | -29 | -11 | 2 | -2 | 1 | 40 | -45 | -19 | -22 | 31 | 2 | 4 | 1 | } |
| { | -1 | 5 | 8 | -23 | 7 | 2 | 1 | 1 | 10 | -11 | -13 | -3 | 12 | -3 | 2 | 0 | } |
| { | 9 | 7 | 24 | -20 | 41 | 3 | 6 | 1 | 15 | 20 | 12 | 11 | 17 | -9 | 1 | -2 | } |
| }, ] ] | | | | | | | | | | | | | | | | | |
| { | | | | | | | | | | | | | | | | | |
| { | **-8** | **15** | **0** | **-2** | **0** | **0** | **0** | **0** | **-4** | **1** | **-4** | **0** | **0** | **0** | **0** | **0** | } |
| { | **-37** | **21** | **21** | **3** | **2** | **1** | **1** | **0** | **-13** | **12** | **10** | **-4** | **0** | **-1** | **0** | **0** | } |
| { | **57** | **-54** | **-30** | **14** | **-2** | **3** | **-1** | **1** | **-19** | **-36** | **28** | **12** | **-1** | **2** | **0** | **1** | } |

-continued

| | | | | | | | | | | | | | | | | | |
|---|---|---|---|---|---|---|---|---|---|---|---|---|---|---|---|---|---|
| { | **−2** | **5** | **−9** | **4** | **0** | **0** | **0** | **0** | **20** | **−19** | **−15** | **7** | **−2** | **2** | **−1** | **1** | } |
| { | **17** | **63** | **−40** | **−21** | **0** | **−3** | **0** | **−1** | **20** | **−31** | **−52** | **16** | **6** | **3** | **1** | **1** | } |
| { | **76** | **−4** | **10** | **−9** | **−6** | **−2** | **−2** | **0** | **−1** | **−32** | **6** | **−3** | **2** | **1** | **1** | **0** | } |
| { | **−63** | **6** | **−40** | **19** | **5** | **3** | **1** | **1** | **2** | **−48** | **33** | **42** | **−7** | **5** | **−1** | **1** | } |
| { | **−1** | **−9** | **19** | **31** | **−6** | **2** | **−2** | **1** | **70** | **1** | **3** | **−5** | **−17** | **0** | **−3** | **0** | } |
| { | **−10** | **−31** | **−18** | **5** | **8** | **2** | **2** | **1** | **−29** | **−4** | **−27** | **16** | **13** | **1** | **2** | **0** | } |
| { | **−11** | **−5** | **23** | **−15** | **−1** | **−2** | **0** | **−1** | **−66** | **2** | **−30** | **5** | **18** | **2** | **4** | **0** | } |
| { | **−18** | **−34** | **60** | **−25** | **−9** | **1** | **−1** | **0** | **22** | **−28** | **−11** | **−17** | **7** | **3** | **1** | **1** | } |
| { | **−10** | **−68** | **−36** | **−6** | **18** | **4** | **4** | **1** | **22** | **8** | **−11** | **16** | **12** | **−2** | **1** | **0** | } |
| { | **15** | **−13** | **−8** | **−15** | **5** | **−1** | **1** | **0** | **12** | **51** | **−20** | **38** | **6** | **−1** | **0** | **−1** | } |
| { | **−13** | **−24** | **13** | **−38** | **6** | **3** | **1** | **1** | **29** | **−35** | **−30** | **−7** | **33** | **1** | **3** | **0** | } |
| { | **−14** | **−2** | **9** | **−14** | **−24** | **2** | **−2** | **0** | **−16** | **−44** | **−2** | **−4** | **1** | **10** | **1** | **2** | } |
| { | **0** | **−4** | **−19** | **−12** | **−2** | **5** | **0** | **1** | **24** | **0** | **2** | **−21** | **18** | **0** | **2** | **0** | } |

}, lowFreqTransMatrix[ m ][ n ] = lowFreqTransMatrixCol32to47[ m − 32 ][ n ] with m = 32 . . . 47, n = 0 . . . 15 lowFreqTransMatrixCol32to47 =

[ [ {

| | | | | | | | | | | | | | | | | | |
|---|---|---|---|---|---|---|---|---|---|---|---|---|---|---|---|---|---|
| { | −2 | 2 | 0 | 1 | −1 | 1 | 0 | 0 | −1 | 1 | 0 | 0 | −1 | 0 | 0 | 0 | } |
| { | 9 | −3 | −1 | 2 | 3 | −3 | 0 | 0 | 4 | −1 | 0 | 0 | 2 | −1 | 0 | 0 | } |
| { | 3 | 0 | −12 | 3 | 6 | 1 | −3 | 2 | 1 | −1 | −2 | 0 | 3 | 1 | −1 | 1 | } |
| { | −2 | 11 | −6 | −2 | −2 | 4 | −3 | 0 | 0 | 3 | −2 | 0 | −1 | 1 | −1 | 0 | } |
| { | −4 | −32 | 5 | 24 | 1 | −6 | 12 | 4 | −3 | −2 | 4 | −2 | 0 | −1 | 0 | 0 | } |
| { | −7 | 3 | 13 | −4 | −3 | 5 | 1 | −5 | −2 | 3 | 1 | −2 | −1 | 2 | −1 | −2 | } |
| { | 11 | −11 | −51 | 11 | −2 | −10 | −2 | 13 | 2 | −6 | −4 | 4 | −2 | −3 | 2 | 2 | } |
| { | −16 | 46 | 1 | 3 | 2 | 7 | −24 | 0 | 2 | −2 | −5 | 8 | 1 | −1 | −2 | 2 | } |
| { | 2 | 9 | −10 | 0 | 1 | −5 | −4 | 4 | 2 | −2 | 2 | 2 | 0 | −2 | 1 | 0 | } |
| { | −11 | −30 | 10 | 59 | −2 | 8 | 41 | 8 | 2 | 5 | 6 | −7 | −1 | 3 | 5 | −2 | } |
| { | 23 | 34 | −31 | 4 | 10 | −22 | −30 | 22 | 4 | −15 | 9 | 20 | 2 | −5 | 9 | 4 | } |
| { | −36 | 6 | 16 | −14 | 2 | 19 | −4 | −12 | −1 | 0 | −7 | −3 | 0 | 2 | −2 | −1 | } |
| { | 61 | 22 | 55 | 14 | 13 | 3 | −9 | −65 | 1 | −11 | −21 | −7 | 0 | 0 | −1 | 3 | } |
| { | −25 | 41 | 0 | 12 | 9 | 7 | −42 | 12 | −3 | −14 | 2 | 28 | 5 | 1 | 6 | 2 | } |
| { | −9 | 23 | 4 | 9 | 14 | 9 | −14 | −4 | 0 | −12 | −7 | 6 | 3 | 0 | 6 | 3 | } |
| { | −26 | −1 | 18 | −1 | −12 | 32 | 3 | −18 | −5 | 10 | −25 | −5 | −2 | 1 | −8 | 10 | } |

}, ] ]

{

| | | | | | | | | | | | | | | | | | |
|---|---|---|---|---|---|---|---|---|---|---|---|---|---|---|---|---|---|
| { | **−2** | **2** | **0** | **1** | **−1** | **0** | **0** | **0** | **−1** | **1** | **0** | **0** | **0** | **0** | **0** | **0** | } |
| { | **−10** | **6** | **0** | **−3** | **−4** | **4** | **−1** | **0** | **−4** | **1** | **0** | **0** | **−1** | **1** | **0** | **0** | } |
| { | **−5** | **3** | **16** | **−6** | **−7** | **1** | **3** | **−4** | **−2** | **1** | **1** | **−1** | **−3** | **0** | **1** | **−1** | } |
| { | **0** | **−20** | **8** | **8** | **2** | **−6** | **8** | **1** | **−1** | **−3** | **4** | **−1** | **1** | **−1** | **1** | **−1** | } |
| { | **−8** | **−29** | **7** | **26** | **−1** | **−6** | **14** | **5** | **−4** | **−1** | **6** | **−2** | **−2** | **−1** | **1** | **−1** | } |
| { | **−11** | **7** | **24** | **−3** | **−4** | **11** | **1** | **−10** | **−3** | **5** | **−1** | **−4** | **−1** | **4** | **−2** | **−1** | } |
| { | **−3** | **16** | **52** | **−14** | **6** | **12** | **1** | **−20** | **0** | **6** | **−1** | **−7** | **3** | **2** | **−2** | **−1** | } |
| { | **10** | **−48** | **3** | **1** | **−2** | **−7** | **33** | **0** | **−2** | **4** | **10** | **−12** | **−2** | **3** | **2** | **−6** | } |
| { | **−4** | **−18** | **17** | **40** | **3** | **13** | **30** | **0** | **3** | **5** | **3** | **−9** | **0** | **4** | **2** | **−4** | } |
| { | **−5** | **−4** | **8** | **43** | **4** | **8** | **24** | **5** | **6** | **3** | **6** | **−6** | **1** | **1** | **3** | **−4** | } |
| { | **−6** | **−23** | **29** | **6** | **−1** | **20** | **25** | **−26** | **−4** | **11** | **−14** | **−22** | **−2** | **4** | **−11** | **−2** | } |
| { | **12** | **−13** | **−32** | **11** | **−5** | **−24** | **11** | **37** | **3** | **5** | **24** | **6** | **0** | **1** | **5** | **−4** | } |
| { | **76** | **9** | **34** | **6** | **8** | **−10** | **−12** | **−51** | **−1** | **−16** | **−19** | **−6** | **−3** | **−3** | **0** | **7** | } |
| { | **−11** | **27** | **4** | **6** | **−3** | **9** | **−51** | **0** | **−8** | **−13** | **−12** | **44** | **5** | **1** | **11** | **18** | } |
| { | **41** | **−2** | **−7** | **−7** | **6** | **−45** | **−15** | **16** | **6** | **−14** | **43** | **17** | **3** | **3** | **15** | **−19** | } |
| { | **−7** | **43** | **−11** | **33** | **33** | **9** | **11** | **−2** | **−1** | **−9** | **−16** | **−17** | **3** | **−7** | **1** | **3** | } |

},

Otherwise, if nTrS is equal to 48, lfnstTrSetIdx is equal to 1, and lfnst_idx is equal to 1 the following applies:

lowFreqTransMatrix[ m ][ n ] = lowFreqTransMatrixCol0to15[ m ][ n ] with m = 0 . . . 15, n = 0 . . . 15 lowFreqTransMatrixCol0to15 =

[ [ {

| | | | | | | | | | | | | | | | | | |
|---|---|---|---|---|---|---|---|---|---|---|---|---|---|---|---|---|---|
| { | 80 | −49 | 6 | −4 | 1 | −1 | 1 | −1 | −72 | 36 | 4 | 0 | 1 | 0 | 0 | 0 | } |
| { | −72 | −6 | 17 | 0 | 3 | 0 | 1 | 0 | −23 | 58 | −21 | 2 | −3 | 1 | −1 | 0 | } |
| { | −50 | 19 | −15 | 4 | −1 | 1 | −1 | 1 | −58 | −2 | 30 | −3 | 4 | −1 | 2 | 0 | } |
| { | −33 | −43 | 28 | −7 | 4 | −2 | 2 | −1 | −38 | 11 | −8 | 4 | 1 | 1 | 0 | 0 | } |
| { | 10 | 66 | −21 | −3 | −3 | 0 | −1 | 0 | −53 | −41 | −2 | 16 | −1 | 4 | −1 | 1 | } |
| { | 18 | 14 | 13 | −9 | 2 | −2 | 1 | −1 | 34 | 32 | −31 | 12 | −5 | 2 | −2 | 1 | } |
| { | 21 | 66 | −1 | 9 | −4 | 2 | −1 | 1 | −21 | 41 | −30 | −10 | 0 | −2 | 0 | −1 | } |
| { | 1 | −6 | −24 | 17 | −5 | 3 | −2 | 1 | 24 | 10 | 39 | −21 | 5 | −4 | 2 | −1 | } |
| { | 9 | 33 | −24 | 1 | 4 | 0 | 1 | 0 | 6 | 50 | 26 | 1 | −10 | 0 | −2 | 0 | } |
| { | −7 | −9 | −32 | 14 | −3 | 3 | −1 | 1 | −23 | −28 | 0 | −5 | −1 | 0 | 0 | 0 | } |
| { | 6 | 30 | 69 | −18 | 5 | −4 | 3 | −1 | −3 | −11 | −34 | −16 | 9 | −4 | 2 | −1 | } |
| { | 1 | −8 | 24 | −3 | 7 | −2 | 2 | −1 | −6 | −51 | −6 | −4 | −5 | 0 | −1 | 0 | } |
| { | 4 | 10 | 4 | 17 | −9 | 4 | −2 | 1 | 5 | 14 | 32 | −15 | 9 | −3 | 2 | −1 | } |
| { | −3 | −9 | −23 | 10 | −10 | 3 | −3 | 1 | −5 | −14 | −16 | −27 | 13 | −5 | 2 | −1 | } |

-continued

| | | | | | | | | | | | | | | | | | |
|---|---|---|---|---|---|---|---|---|---|---|---|---|---|---|---|---|---|
| { | 2 | 11 | 22 | 2 | 9 | −2 | 2 | 0 | −6 | −7 | 20 | −32 | −3 | −4 | 0 | −1 | } |
| { | 2 | −3 | 8 | 14 | −5 | 3 | −1 | 1 | −2 | −11 | 5 | −18 | 8 | −3 | 2 | −1 | } |

}, ] ]

{

| | | | | | | | | | | | | | | | | | |
|---|---|---|---|---|---|---|---|---|---|---|---|---|---|---|---|---|---|
| { | **76** | **−49** | **4** | **−3** | **1** | **−1** | **0** | **0** | **−74** | **38** | **5** | **0** | **1** | **0** | **0** | **0** | } |
| { | **−55** | **−4** | **19** | **1** | **3** | **0** | **1** | **0** | **−6** | **56** | **−28** | **1** | **−4** | **0** | **−2** | **0** | } |
| { | **−60** | **28** | **−9** | **4** | **0** | **1** | **0** | **0** | **−44** | **10** | **22** | **−2** | **2** | **−1** | **1** | **0** | } |
| { | **−35** | **−14** | **25** | **−5** | **3** | **−1** | **2** | **0** | **−46** | **17** | **−11** | **7** | **1** | **1** | **0** | **0** | } |
| { | **26** | **69** | **−29** | **−8** | **−5** | **−2** | **−2** | **−1** | **−26** | **−34** | **−9** | **22** | **−1** | **5** | **−1** | **1** | } |
| { | **−22** | **12** | **−17** | **8** | **−2** | **2** | **−1** | **1** | **−56** | **−32** | **37** | **−5** | **5** | **0** | **2** | **0** | } |
| { | **24** | **39** | **−27** | **11** | **−7** | **1** | **−2** | **0** | **16** | **26** | **0** | **−19** | **2** | **−3** | **0** | **−1** | } |
| { | **−14** | **−52** | **−3** | **7** | **3** | **2** | **1** | **1** | **34** | **−24** | **45** | **−5** | **−1** | **−2** | **0** | **−1** | } |
| { | **13** | **31** | **−10** | **−15** | **5** | **−3** | **1** | **−1** | **16** | **50** | **−2** | **4** | **−10** | **−1** | **−2** | **0** | } |
| { | **−7** | **7** | **−36** | **11** | **2** | **2** | **0** | **1** | **−21** | **−1** | **22** | **2** | **−8** | **1** | **−1** | **0** | } |
| { | **−7** | **−29** | **−5** | **−5** | **9** | **0** | **2** | **0** | **−8** | **−34** | **−15** | **33** | **−12** | **6** | **−3** | **2** | } |
| { | **−5** | **9** | **25** | **−18** | **1** | **−3** | **1** | **−1** | **−14** | **−1** | **−38** | **7** | **9** | **0** | **1** | **0** | } |
| { | **15** | **29** | **80** | **−27** | **2** | **−7** | **0** | **−3** | **−4** | **−37** | **−14** | **−9** | **4** | **1** | **2** | **0** | } |
| { | **7** | **20** | **21** | **−11** | **3** | **−3** | **1** | **−1** | **12** | **44** | **31** | **11** | **−16** | **0** | **−4** | **0** | } |
| { | **2** | **16** | **29** | **−7** | **5** | **−3** | **0** | **−1** | **−12** | **−10** | **29** | **−41** | **−1** | **−2** | **1** | **0** | } |
| { | **7** | **9** | **41** | **−3** | **−9** | **1** | **−2** | **0** | **1** | **−2** | **56** | **−15** | **2** | **−3** | **0** | **−1** | } |

}, lowFreqTransMatrix[ m ][ n ] = lowFreqTransMatrixCol16to31[ m − 16 ][ n ]
with m = 16 . . . 31, n = 0 . . . 15 lowFreqTransMatrixCol16to31 =

[ [ {

| | | | | | | | | | | | | | | | | | |
|---|---|---|---|---|---|---|---|---|---|---|---|---|---|---|---|---|---|
| { | 26 | 0 | −12 | 2 | −2 | 1 | −1 | 0 | −7 | −9 | 6 | 1 | 0 | 0 | 0 | 0 | } |
| { | 55 | −46 | −1 | 6 | −2 | 1 | −1 | 0 | −22 | 7 | 17 | −7 | 2 | −1 | 1 | 0 | } |
| { | 6 | 57 | −34 | 0 | −2 | 0 | −1 | 0 | 34 | −48 | −2 | 14 | −4 | 3 | −1 | 1 | } |
| { | −55 | 24 | 26 | −5 | 2 | −1 | 1 | 0 | 15 | 46 | −40 | −1 | −1 | 0 | −1 | 0 | } |
| { | 36 | −5 | 41 | −20 | 3 | −3 | 1 | −1 | −30 | 26 | −32 | −3 | 7 | −2 | 2 | −1 | } |
| { | 40 | 4 | −4 | −9 | −3 | −2 | −1 | −1 | 27 | −31 | −43 | 19 | −2 | 3 | −1 | 1 | } |
| { | −35 | −17 | −3 | 26 | −6 | 5 | −2 | 2 | 56 | 3 | 18 | −25 | −1 | −2 | −1 | −1 | } |
| { | 33 | 32 | −30 | 4 | −3 | −1 | −1 | 0 | −4 | 13 | −16 | −10 | 0 | −1 | 0 | 0 | } |
| { | −27 | 1 | −28 | −21 | 16 | −5 | 3 | −2 | −23 | 36 | −2 | 40 | −17 | 4 | −3 | 1 | } |
| { | −36 | −59 | −24 | 14 | 4 | 2 | 1 | 1 | −23 | −26 | 23 | 26 | −3 | 5 | 0 | 2 | } |
| { | −16 | 35 | −35 | 30 | −9 | 3 | −2 | 1 | −57 | −13 | 6 | 4 | −5 | 5 | −1 | 1 | } |
| { | 38 | −1 | 0 | 25 | 6 | 2 | 1 | 1 | 47 | 20 | 35 | 1 | −27 | 1 | −5 | 0 | } |
| { | 7 | 13 | 19 | 15 | −8 | 1 | −1 | 0 | 3 | 25 | 30 | −18 | 1 | −2 | 0 | −1 | } |
| { | −1 | −13 | −30 | 11 | −5 | 2 | −1 | 0 | −5 | −8 | −22 | −16 | 10 | 0 | 1 | 0 | } |
| { | 13 | −5 | −28 | 6 | 18 | −4 | 3 | −1 | −26 | 27 | −14 | 6 | −20 | 0 | −2 | 0 | } |
| { | 12 | −23 | −19 | 22 | 2 | 0 | 1 | 0 | 23 | 41 | −7 | 35 | −10 | 4 | −1 | 1 | } |

}, ] ]

{

| | | | | | | | | | | | | | | | | | |
|---|---|---|---|---|---|---|---|---|---|---|---|---|---|---|---|---|---|
| { | **27** | **2** | **−14** | **2** | **−2** | **1** | **−1** | **0** | **−6** | **−12** | **8** | **1** | **0** | **0** | **0** | **0** | } |
| { | **53** | **−61** | **5** | **8** | **−1** | **2** | **0** | **0** | **−27** | **17** | **21** | **−12** | **3** | **−2** | **1** | **−1** | } |
| { | **30** | **38** | **−39** | **1** | **−3** | **0** | **−1** | **0** | **28** | **−57** | **8** | **15** | **−3** | **3** | **−1** | **1** | } |
| { | **−17** | **28** | **23** | **−10** | **0** | **−2** | **1** | **−1** | **18** | **33** | **−57** | **3** | **0** | **0** | **−1** | **0** | } |
| { | **55** | **−19** | **32** | **−21** | **0** | **−3** | **0** | **−1** | **−30** | **1** | **−27** | **5** | **8** | **−1** | **2** | **0** | } |
| { | **−19** | **13** | **13** | **0** | **2** | **−1** | **1** | **0** | **−14** | **44** | **14** | **−22** | **3** | **−4** | **1** | **−1** | } |
| { | **15** | **6** | **−31** | **18** | **−5** | **2** | **−2** | **1** | **24** | **−13** | **−6** | **−13** | **0** | **0** | **0** | **0** | } |
| { | **52** | **27** | **−23** | **−23** | **3** | **−4** | **0** | **−1** | **−51** | **4** | **−24** | **21** | **2** | **2** | **1** | **0** | } |
| { | **−9** | **20** | **−25** | **−24** | **12** | **−4** | **3** | **−1** | **−9** | **27** | **−26** | **30** | **−11** | **1** | **−2** | **0** | } |
| { | **−42** | **−41** | **−19** | **7** | **14** | **1** | **3** | **1** | **−25** | **9** | **33** | **39** | **−18** | **4** | **−3** | **1** | } |
| { | **17** | **−23** | **17** | **−8** | **8** | **0** | **1** | **0** | **35** | **−15** | **−1** | **13** | **−10** | **0** | **−2** | **0** | } |
| { | **−45** | **−2** | **−21** | **6** | **−4** | **2** | **0** | **1** | **−59** | **−35** | **−14** | **22** | **17** | **4** | **3** | **1** | } |
| { | **21** | **21** | **−18** | **28** | **−2** | **0** | **−1** | **0** | **0** | **12** | **27** | **−2** | **−22** | **3** | **−4** | **1** | } |
| { | **−3** | **18** | **33** | **−32** | **3** | **−3** | **0** | **−1** | **−2** | **9** | **3** | **1** | **−2** | **−3** | **0** | **0** | } |
| { | **−3** | **−25** | **−31** | **−6** | **23** | **−3** | **4** | **0** | **−26** | **5** | **−22** | **3** | **−5** | **−1** | **1** | **0** | } |
| { | **−5** | **−59** | **−3** | **−25** | **2** | **4** | **1** | **1** | **46** | **−3** | **−12** | **18** | **21** | **−3** | **2** | **−1** | } |

}, lowFreqTransMatrix[ m ][ n ] = lowFreqTransMatrixCol32to47[ m − 32 ][ n ]
with m = 32 . . . 47, n = 0 . . . 15 lowFreqTransMatrixCol32to47 =

[ [ {

| | | | | | | | | | | | | | | | | | |
|---|---|---|---|---|---|---|---|---|---|---|---|---|---|---|---|---|---|
| { | 3 | 5 | −1 | −2 | −2 | −2 | −1 | 1 | 1 | 1 | 0 | 0 | −1 | −1 | 0 | 0 | } |
| { | 9 | 5 | −12 | 1 | −3 | −4 | 4 | 2 | 4 | 1 | −2 | −1 | −1 | −1 | 1 | 0 | } |
| { | −10 | 7 | 21 | −10 | 6 | 1 | −11 | 0 | −1 | −1 | 4 | 2 | 3 | 0 | −2 | −1 | } |
| { | 17 | −38 | 1 | 17 | −3 | 11 | 15 | −11 | 3 | −1 | −10 | 1 | 0 | 1 | 3 | 2 | } |
| { | 15 | −8 | 1 | 17 | −1 | −2 | 4 | −8 | 2 | 0 | −1 | 3 | 0 | 0 | 0 | −1 | } |
| { | 7 | −49 | 52 | 10 | −11 | 22 | 7 | −26 | −1 | −6 | −9 | 6 | −2 | 2 | 4 | −2 | } |
| { | −15 | −13 | −27 | 9 | 9 | −6 | 20 | 5 | −3 | 2 | −6 | −9 | 3 | −3 | 1 | 5 | } |
| { | 24 | −26 | −37 | 33 | 5 | −32 | 55 | −5 | −7 | 22 | −14 | −22 | 1 | −9 | −3 | 13 | } |
| { | 43 | −13 | 4 | −41 | −19 | −2 | −24 | 17 | 11 | −4 | 8 | 4 | −3 | −3 | −3 | −3 | } |
| { | 10 | −26 | 38 | 7 | −12 | 11 | 42 | −22 | −5 | 20 | −14 | −15 | −1 | −2 | 1 | 6 | } |
| { | 28 | 10 | 4 | 7 | 0 | −15 | 7 | −10 | −1 | 7 | −2 | 2 | 1 | −3 | 0 | 0 | } |
| { | 37 | −37 | −9 | −47 | −28 | 5 | 0 | 18 | 8 | 6 | 0 | −8 | −4 | −3 | −3 | 1 | } |
| { | 11 | 24 | 22 | −11 | −3 | 37 | −13 | −58 | −5 | 12 | −63 | 26 | 9 | −15 | 11 | 8 | } |

-continued

{ 0 −29 −27 6 −27 −10 −30 9 −3 −10 −7 77 9 −13 45 −8 }
{ −76 −26 −4 −7 12 51 5 24 7 −17 −16 −12 −5 4 2 13 }
{ 5 7 23 5 69 −38 −8 −32 −15 −31 24 11 2 18 11 −15 }
}, ] ]
{
{ 2 7 0 −3 −2 −3 −2 1 1 1 1 0 −1 −1 0 0 }
{ 9 5 −20 3 −3 −6 7 4 3 1 −2 −3 −1 −1 1 1 }
{ −8 12 22 −15 4 1 −15 1 0 −2 5 3 2 −1 −2 −2 }
{ 21 −52 16 24 −2 13 20 −22 2 −1 −14 3 1 1 4 2 }
{ 6 −4 21 10 −4 5 −6 −14 1 −3 0 9 −1 1 2 −4 }
{ 6 29 −58 7 14 −30 8 23 3 6 9 −12 2 −3 −5 3 }
{ −1 −35 −27 36 9 −25 63 −5 −10 16 −11 −29 −1 −5 −4 14 }
{ 22 −3 4 11 −3 −15 17 −8 −2 11 −1 −9 −3 −1 −5 4 }
{ 27 −17 −20 −27 −13 −23 −29 44 13 −16 38 4 −4 1 −3 −12 }
{ 37 −22 36 −28 −14 16 22 −14 4 18 −16 −19 −3 −1 −8 9 }
{ −19 −26 2 −7 2 1 26 46 10 −3 47 −51 −11 15 −23 −8 }
{ −5 26 16 40 23 −25 20 −1 0 2 30 −11 1 9 −6 −11 }
{ 36 −12 −2 −28 −10 −6 6 −3 −1 10 −6 −17 −4 −1 −13 5 }
{ −18 38 16 −8 29 17 5 −19 −3 −4 −16 −59 −9 7 −38 20 }
{ −60 −21 −10 10 −5 52 1 35 10 −15 −13 0 0 0 12 13 }
{ 14 5 8 11 11 −37 0 −20 −6 6 22 17 4 2 5 −27 }
},

Otherwise, if nTrS is equal to 48, lfnstTrSetIdx is equal to 1, and lfnst_idx is equal to 2 the following applies:

lowFreqTransMatrix[ m ][ n ]= lowFreqTransMatrixCol0to15[ m ][ n ]with m = 0 . . . 15, n = 0 . . . 15
lowFreqTransMatrixCol0to15 =

[ [ {
{ 80 −49 6 −4 1 −1 1 −1 −72 36 4 0 1 0 0 0 }
{ −72 −6 17 0 3 0 1 0 −23 58 −21 2 −3 1 −1 0 }
{ −50 19 −15 4 −1 1 −1 1 −58 −2 30 −3 4 −1 2 0 }
{ −33 −43 28 −7 4 −2 2 −1 −38 11 −8 4 1 1 0 0 }
{ 10 66 −21 −3 −3 0 −1 0 −53 −41 −2 16 −1 4 −1 1 }
{ 18 14 13 −9 2 −2 1 −1 34 32 −31 12 −5 2 −2 1 }
{ 21 66 −1 9 −4 2 −1 1 −21 41 −30 −10 0 −2 0 −1 }
{ 1 −6 −24 17 −5 3 −2 1 24 10 39 −21 5 −4 2 −1 }
{ 9 33 −24 1 4 0 1 0 6 50 26 1 −10 0 −2 0 }
{ −7 −9 −32 14 −3 3 −1 1 −23 −28 0 −5 −1 0 0 0 }
{ 6 30 69 −18 5 −4 3 −1 −3 −11 −34 −16 9 −4 2 −1 }
{ 1 −8 24 −3 7 −2 2 −1 −6 −51 −6 −4 −5 0 −1 0 }
{ 4 10 4 17 −9 4 −2 1 5 14 32 −15 9 −3 2 −1 }
{ −3 −9 −23 10 −10 3 −3 1 −5 −14 −16 −27 13 −5 2 −1 }
{ 2 11 22 2 9 −2 2 0 −6 −7 20 −32 −3 −4 0 −1 }
{ 2 −3 8 14 −5 3 −1 1 −2 −11 5 −18 8 −3 2 −1 }
}, ] ]
{
{ 76 −49 4 −3 1 −1 0 0 −74 38 5 0 1 0 0 0 }
{ −55 −4 19 1 3 0 1 0 −6 56 −28 1 −4 0 −2 0 }
{ −60 28 −9 4 0 1 0 0 −44 10 22 −2 2 −1 1 0 }
{ −35 −14 25 −5 3 −1 2 0 −46 17 −11 7 1 1 0 0 }
{ 26 69 −29 −8 −5 −2 −2 −1 −26 −34 −9 22 −1 5 −1 1 }
{ −22 12 −17 8 −2 2 −1 1 −56 −32 37 −5 5 0 2 0 }
{ 24 39 −27 11 −7 1 −2 0 16 26 0 −19 2 −3 0 −1 }
{ −14 −52 −3 7 3 2 1 1 34 −24 45 −5 −1 −2 0 −1 }
{ 13 31 −10 −15 5 −3 1 −1 16 50 −2 4 −10 −1 −2 0 }
{ −7 7 −36 11 2 2 0 1 −21 −1 22 2 −8 1 −1 0 }
{ −7 −29 −5 −5 9 0 2 0 −8 −34 −15 33 −12 6 −3 2 }
{ −5 9 25 −18 1 −3 1 −1 −14 −1 −38 7 9 0 1 0 }
{ 15 29 80 −27 2 −7 0 −3 −4 −37 −14 −9 4 1 2 0 }
{ 7 20 21 −11 3 −3 1 −1 12 44 31 11 −16 0 −4 0 }
{ 2 16 29 −7 5 −3 0 −1 −12 −10 29 −41 −1 −2 1 0 }
{ 7 9 41 −3 −9 1 −2 0 1 −2 56 −15 2 −3 0 −1 }
}, lowFreqTransMatrix[ m ][ n ]= lowFreqTransMatrixCol16to31[ m − 16 ][ n ]with m = 16 . . . 31, n = 0 . . . 15
lowFreqTransMatrixCol16to31 =

[ [ {
{ 26 0 −12 2 −2 1 −1 0 −7 −9 6 1 0 0 0 0 }
{ 55 −46 −1 6 −2 1 −1 0 −22 7 17 −7 2 −1 1 0 }
{ 6 57 −34 0 −2 0 −1 0 34 −48 −2 14 −4 3 −1 1 }
{ −55 24 26 −5 2 −1 1 0 15 46 −40 −1 −1 0 −1 0 }
{ 36 −5 41 −20 3 −3 1 −1 −30 26 −32 −3 7 −2 2 −1 }
{ 40 4 −4 −9 −3 −2 −1 −1 27 −31 −43 19 −2 3 −1 1 }

-continued

```
{ -35 -17 -3 26 -6 5 -2 2 56 3 18 -25 -1 -2 -1 -1 }
{ 33 32 -30 4 -3 -1 -1 0 -4 13 -16 -10 0 -1 0 0 }
{ -27 1 -28 -21 16 -5 3 -2 -23 36 -2 40 -17 4 -3 1 }
{ -36 -59 -24 14 4 2 1 1 -23 -26 23 26 -3 5 0 2 }
{ -16 35 -35 30 -9 3 -2 1 -57 -13 6 4 -5 5 -1 1 }
{ 38 -1 0 25 6 2 1 1 47 20 35 1 -27 1 -5 0 }
{ 7 13 19 15 -8 1 -1 0 3 25 30 -18 1 -2 0 -1 }
{ -1 -13 -30 11 -5 2 -1 0 -5 -8 -22 -16 10 0 1 0 }
{ 13 -5 -28 6 18 -4 3 -1 -26 27 -14 6 -20 0 -2 0 }
{ 12 -23 -19 22 2 0 1 0 23 41 -7 35 -10 4 -1 1 }
},]]
{
{ 27 2 -14 2 -2 1 -1 0 -6 -12 8 1 0 0 0 0 }
{ 53 -61 5 8 -1 2 0 0 -27 17 21 -12 3 -2 1 -1 }
{ 30 38 -39 1 -3 0 -1 0 28 -57 8 15 -3 3 -1 1 }
{ -17 28 23 -10 0 -2 1 -1 18 33 -57 3 0 0 -1 0 }
{ 55 -19 32 -21 0 -3 0 -1 -30 1 -27 5 8 -1 2 0 }
{ -19 13 13 0 2 -1 1 0 -14 44 14 -22 3 -4 1 -1 }
{ 15 6 -31 18 -5 2 -2 1 24 -13 -6 -13 0 0 0 0 }
{ 52 27 -23 -23 3 -4 0 -1 -51 4 -24 21 2 2 1 0 }
{ -9 20 -25 -24 12 -4 3 -1 -9 27 -26 30 -11 1 -2 0 }
{ -42 -41 -19 7 14 1 3 1 -25 9 33 39 -18 4 -3 1 }
{ 17 -23 17 -8 8 0 1 0 35 -15 -1 13 -10 0 -2 0 }
{ -45 -2 -21 6 -4 2 0 1 -59 -35 -14 22 17 4 3 1 }
{ 21 21 -18 28 -2 0 -1 0 0 12 27 -2 -22 3 -4 1 }
{ -3 18 33 -32 3 -3 0 -1 -2 9 3 1 -2 -3 0 0 }
{ -3 -25 -31 -6 23 -3 4 0 -26 5 -22 3 -5 -1 1 0 }
{ -5 -59 -3 -25 2 4 1 1 46 -3 -12 18 21 -3 2 -1
},
```

lowFreqTransMatrix[ m ][ n ]= lowFreqTransMatrixCol32to47[ m − 32 ][ n ]with m = 32 . . . 47, n = 0 . . . 15
lowFreqTransMatrixCol32to47 =

```
{ 3 5 -1 -2 -2 -2 -1 1 1 1 0 0 -1 -1 0 0 }
{ 9 5 -12 1 -3 -4 4 2 4 1 -2 -1 -1 -1 1 0 }
{ -10 7 21 -10 6 1 -11 0 -1 -1 4 2 3 0 -2 -1 }
{ 17 -38 1 17 -3 11 15 -11 3 -1 -10 1 0 1 3 2 }
{ 15 -8 1 17 -1 -2 4 -8 2 0 -1 3 0 0 0 -1 }
{ 7 -49 52 10 -11 22 7 -26 -1 -6 -9 6 -2 2 4 -2 }
{ -15 -13 -27 9 9 -6 20 5 -3 2 -6 -9 3 -3 1 5 }
{ 24 -26 -37 33 5 -32 55 -5 -7 22 -14 -22 1 -9 -3 13 }
{ 43 -13 4 -41 -19 -2 -24 17 11 -4 8 4 -3 -3 -3 -3 }
{ 10 -26 38 7 -12 11 42 -22 -5 20 -14 -15 -1 -2 1 6 }
{ 28 10 4 7 0 -15 7 -10 -1 7 -2 2 1 -3 0 0 }
{ 37 -37 -9 -47 -28 5 0 18 8 6 0 -8 -4 -3 -3 1 }
{ 11 24 22 -11 -3 37 -13 -58 -5 12 -63 26 9 -15 11 8 }
{ 0 -29 -27 6 -27 -10 -30 9 -3 -10 -7 77 9 -13 45 -8 }
{ -76 -26 -4 -7 12 51 5 24 7 -17 -16 -12 -5 4 2 13 }
{ 5 7 23 5 69 -38 -8 -32 -15 -31 24 11 2 18 11 -15 }
},]]
{
{ 2 7 0 -3 -2 -3 -2 1 1 1 1 0 -1 -1 0 0 }
{ 9 5 -20 3 -3 -6 7 4 3 1 -2 -3 -1 -1 1 1 }
{ -8 12 22 -15 4 1 -15 1 0 -2 5 3 2 -1 -2 -2 }
{ 21 -52 16 2 4 -2 13 20 -22 2 -1 -14 3 1 1 4 2 }
{ 6 -4 21 10 -4 5 -6 -14 1 -3 0 9 -1 1 2 -4 }
{ 6 29 -58 7 14 -30 8 23 3 6 9 -12 2 -3 -5 3 }
{ -1 -35 -27 36 9 -25 63 -5 -10 16 -11 -29 -1 -5 -4 14 }
{ 22 -3 4 11 -3 -15 17 -8 -2 11 -1 -9 -3 -1 -5 4 }
{ 27 -17 -20 -27 -13 -23 -29 44 13 -16 38 4 -4 1 -3 -12 }
{ 37 -22 36 -28 -14 16 22 -14 4 18 -16 -19 -3 -1 -8 9 }
{ -19 -26 2 -7 2 1 26 46 10 -3 47 -51 -11 15 -23 -8 }
{ -5 26 16 40 23 -25 20 -1 0 2 30 -11 1 9 -6 -11 }
{ 36 -12 -2 -28 -10 -6 6 -3 -1 10 -6 -17 -4 -1 -13 5 }
{ -18 38 16 -8 29 17 5 -19 -3 -4 -16 -59 -9 7 -38 20 }
{ -60 -21 -10 10 -5 52 1 35 10 -15 -13 0 0 0 12 13 }
{ 14 5 8 11 11 -37 0 -20 -6 6 22 17 4 2 5 -27 }
},
```

Otherwise, if nTrS is equal to 48, lfnstTrSetIdx is equal to 2, and lfnst_idx is equal to 1 the following applies:

lowFreqTransMatrix[ m ][ n ] = lowFreqTransMatrixCol0to15[ m ][ n ] with m = 0 . . . 15, n = 0 . . . 15 lowFreqTransMatrixCol0to15 =

| | | | | | | | | | | | | | | | | | |
|---|---|---|---|---|---|---|---|---|---|---|---|---|---|---|---|---|---|
| [ [{ | | | | | | | | | | | | | | | | | |
| { | −121 | 33 | 4 | 4 | 1 | 2 | 0 | 1 | −1 | 1 | 1 | 0 | 0 | 0 | 0 | 0 | } |
| { | 0 | −2 | 0 | 0 | 0 | 0 | 0 | 0 | 121 | −23 | −7 | −3 | −2 | −1 | −1 | 0 | } |
| { | −20 | 19 | −5 | 2 | −1 | 1 | 0 | 0 | 16 | 3 | −2 | 0 | 0 | 0 | 0 | 0 | } |
| { | 32 | 108 | −43 | 10 | −9 | 3 | −3 | 1 | 4 | 19 | −7 | 1 | −1 | 0 | 0 | 0 | } |
| { | −3 | 0 | −1 | 0 | 0 | 0 | 0 | 0 | −29 | 11 | −2 | 1 | 0 | 0 | 0 | 0 | } |
| { | −4 | −12 | −3 | 1 | −1 | 0 | 0 | 0 | 19 | 105 | −31 | 7 | −6 | 1 | −2 | 0 | } |
| { | 7 | 1 | 2 | 0 | 0 | 0 | 0 | 0 | 4 | 3 | −2 | 0 | 0 | 0 | 0 | 0 | } |
| { | −8 | −31 | 14 | −4 | 3 | −1 | 1 | 0 | 9 | 43 | 0 | 1 | −1 | 0 | 0 | 0 | } |
| { | −15 | −43 | −100 | 23 | −12 | 6 | −4 | 2 | −6 | −17 | −48 | 10 | −5 | 2 | −1 | 1 | } |
| { | −3 | 1 | 2 | 0 | 0 | 0 | 0 | 0 | −6 | 3 | 1 | 0 | 0 | 0 | 0 | 0 | } |
| { | −1 | −6 | −3 | 2 | −1 | 0 | 0 | 0 | −6 | −35 | 9 | 0 | 2 | 0 | 0 | 0 | } |
| { | −5 | −14 | −48 | 2 | −5 | 1 | −2 | 0 | 10 | 24 | 99 | −17 | 10 | −4 | 3 | −1 | } |
| { | −2 | 0 | 2 | 0 | 0 | 0 | 0 | 0 | −2 | 0 | 1 | 0 | 0 | 0 | 0 | 0 | } |
| { | −2 | −10 | −4 | 0 | 0 | 0 | 0 | 0 | 3 | 11 | −1 | −1 | 0 | 0 | 0 | 0 | } |
| { | −2 | −3 | −25 | −2 | −3 | 0 | −1 | 0 | −1 | −3 | −1 | 4 | −2 | 2 | 0 | 1 | } |
| { | 4 | −4 | 28 | 103 | −42 | 24 | −9 | 7 | 1 | 2 | 4 | 0 | 3 | −1 | 0 | 0 | } |
| }, ] ] | | | | | | | | | | | | | | | | | |
| { | | | | | | | | | | | | | | | | | |
| { | 120 | −37 | −5 | −5 | −2 | −2 | −1 | −1 | 4 | 0 | −1 | 0 | 0 | 0 | 0 | 0 | } |
| { | −2 | −2 | 1 | 0 | 0 | 0 | 0 | 0 | 118 | −26 | −8 | −3 | −3 | −1 | −1 | 0 | } |
| { | 18 | −22 | 6 | −2 | 2 | −1 | 0 | 0 | −22 | −2 | 4 | 1 | 1 | 0 | 0 | 0 | } |
| { | 32 | 101 | −46 | 8 | −11 | 1 | −4 | 0 | 0 | 28 | −10 | 1 | −2 | 0 | −1 | 0 | } |
| { | −8 | −15 | 7 | −1 | 2 | 0 | 1 | 0 | −32 | 9 | 0 | 1 | 0 | 0 | 0 | 0 | } |
| { | −5 | −13 | −1 | 2 | 0 | 1 | 0 | 0 | 19 | 94 | −36 | 5 | −8 | 0 | −3 | −1 | } |
| { | −7 | −2 | −1 | 1 | 0 | 0 | 0 | 0 | −5 | −7 | 4 | 0 | 1 | 0 | 0 | 0 | } |
| { | 10 | 37 | −17 | 4 | −4 | 0 | −2 | 0 | −11 | −45 | 6 | 0 | 2 | 1 | 1 | 0 | } |
| { | 5 | 4 | 6 | −2 | 0 | −1 | 0 | 0 | 6 | −14 | 7 | −2 | 1 | 0 | 0 | 0 | } |
| { | −1 | −3 | −11 | 4 | −2 | 1 | 0 | 0 | −10 | −44 | 9 | 2 | 2 | 1 | 1 | 0 | } |
| { | −16 | −44 | −93 | 33 | −10 | 10 | −2 | 4 | −6 | −17 | −47 | 14 | −4 | 4 | −1 | 2 | } |
| { | −5 | −8 | −18 | 4 | −1 | 1 | 0 | 1 | 7 | 19 | 55 | −18 | 5 | −5 | 1 | −2 | } |
| { | −3 | −12 | −31 | 6 | −3 | 3 | 0 | 0 | 10 | 23 | 71 | −20 | 5 | −5 | 1 | −2 | } |
| { | −2 | −11 | 3 | 0 | 2 | 0 | 1 | 0 | 3 | 10 | −9 | 2 | −1 | 1 | 0 | 0 | } |
| { | −5 | −10 | −38 | 9 | −3 | 3 | −1 | 1 | 2 | 7 | 17 | 1 | −1 | 0 | −1 | 0 | } |
| { | 0 | −1 | −5 | −1 | 1 | 0 | 0 | 0 | −2 | −13 | 5 | −1 | 2 | −1 | 1 | 0 | } |
| }, | | | | | | | | | | | | | | | | | |

lowFreqTransMatrix[ m ][ n ] = lowFreqTransMatrixCol16to31[ m − 16 ][ n ] with m = 16 . . . 31, n = 0 . . . 15 lowFreqTransMatrixCol16to31 =

| | | | | | | | | | | | | | | | | | |
|---|---|---|---|---|---|---|---|---|---|---|---|---|---|---|---|---|---|
| [ [ { | | | | | | | | | | | | | | | | | |
| { | 24 | −5 | −1 | −1 | 0 | 0 | 0 | 0 | 5 | −1 | 0 | 0 | 0 | 0 | 0 | 0 | } |
| { | 17 | 1 | −2 | 0 | 0 | 0 | 0 | 0 | −27 | 4 | 2 | 0 | 0 | 0 | 0 | 0 | } |
| { | −120 | 14 | 8 | 1 | 3 | 1 | 1 | 0 | −18 | −2 | 3 | 0 | 1 | 0 | 0 | 0 | } |
| { | 11 | −30 | 9 | −2 | 1 | −1 | 0 | 0 | 0 | −8 | 2 | 0 | 0 | 0 | 0 | 0 | } |
| { | 12 | 7 | −1 | 0 | 0 | 0 | 0 | 0 | −117 | 12 | 9 | 1 | 3 | 0 | 1 | 0 | } |
| { | 9 | 46 | −6 | 0 | 0 | 0 | 0 | 0 | 8 | −29 | 9 | −3 | 1 | 0 | 0 | 0 | } |
| { | 22 | −8 | 1 | −1 | 0 | 0 | 0 | 0 | −28 | −9 | 4 | 0 | 1 | 0 | 0 | 0 | } |
| { | −13 | −105 | 17 | −2 | 2 | 0 | 0 | 0 | −8 | −25 | −3 | 0 | 0 | 0 | 0 | 0 | } |
| { | 1 | −5 | 19 | −6 | 3 | −1 | 1 | 0 | 2 | 7 | 15 | −3 | 1 | −1 | 0 | 0 | } |
| { | 0 | 3 | −2 | 0 | 0 | 0 | 0 | 0 | −20 | 8 | −2 | 0 | 0 | 0 | 0 | 0 | } |
| { | 1 | −6 | 11 | −2 | 2 | 0 | 1 | 0 | −9 | −100 | 17 | −1 | 1 | 0 | 0 | 0 | } |
| { | 4 | 14 | 32 | 0 | 2 | 0 | 1 | 0 | −4 | 0 | −39 | 6 | −4 | 1 | −1 | 0 | } |
| { | −1 | −1 | 1 | −1 | 0 | 0 | 0 | 0 | −1 | −4 | 2 | 0 | 0 | 0 | 0 | 0 | } |
| { | −6 | −40 | −15 | 6 | −2 | 1 | 0 | 0 | 5 | 57 | −6 | 2 | 0 | 0 | 0 | 0 | } |
| { | −7 | −8 | −97 | 17 | −9 | 3 | −3 | 1 | −8 | −26 | −61 | −1 | −3 | −1 | −1 | −1 | } |
| { | −1 | 0 | −9 | −42 | 17 | −9 | 3 | −2 | −1 | 1 | −14 | 6 | −4 | 2 | −1 | 0 | } |
| }, ] ] | | | | | | | | | | | | | | | | | |
| { | | | | | | | | | | | | | | | | | |
| { | −23 | 5 | 1 | 1 | 0 | 0 | 0 | 0 | −6 | 2 | 0 | 0 | 0 | 0 | 0 | 0 | } |
| { | 25 | 0 | 4 | 0 | 1 | 0 | 0 | 0 | 28 | 6 | 2 | 0 | 0 | 0 | 0 | 0 | } |
| { | 117 | −16 | −10 | −2 | −4 | −1 | −2 | 0 | 24 | 2 | −5 | 0 | −1 | 0 | 0 | 0 | } |
| { | 15 | −31 | 10 | −3 | 2 | −1 | 1 | 0 | −15 | −9 | 5 | 0 | 1 | 0 | 1 | 0 | } |
| { | 13 | 14 | −4 | 0 | −1 | 0 | −1 | 0 | −111 | 16 | 11 | 2 | 4 | 1 | 2 | 0 | } |
| { | 10 | 60 | −12 | −1 | −2 | −1 | −1 | −1 | 14 | −26 | 10 | −4 | 2 | −1 | 0 | 0 | } |
| { | −25 | 5 | 1 | 1 | 0 | 0 | 0 | 0 | 34 | 12 | −7 | −1 | −2 | −1 | −1 | 0 | } |
| { | 13 | 92 | −22 | −1 | −4 | −1 | −2 | −1 | 10 | 50 | −5 | −2 | −2 | −2 | −1 | −1 | } |
| { | −1 | −1 | 0 | 0 | 0 | 0 | 0 | 0 | 24 | −26 | 3 | 0 | 0 | 0 | 0 | 0 | } |
| { | 2 | 10 | 8 | −2 | 1 | −1 | 0 | 0 | −12 | −82 | 21 | 1 | 3 | 2 | 1 | 1 | } |
| { | 1 | −3 | 23 | −7 | 4 | −2 | 1 | −1 | 4 | 11 | 15 | −4 | 2 | −2 | 0 | −1 | } |
| { | 2 | 12 | 35 | −8 | 2 | −2 | 0 | −1 | −1 | 1 | −11 | 5 | −2 | 1 | −1 | 0 | } |
| { | 8 | 12 | 46 | −9 | 3 | −3 | 1 | −1 | −2 | 8 | −19 | 4 | −2 | 1 | −1 | 0 | } |
| { | −6 | −45 | 1 | 3 | 0 | 2 | 0 | 1 | 5 | 55 | −1 | −3 | −1 | −2 | −1 | −1 | } |
| { | −8 | −12 | −77 | 26 | −8 | 7 | −2 | 2 | −11 | −18 | −79 | 16 | −4 | 4 | 0 | 1 | } |

-continued

| | | | | | | | | | | | | | | | | | |
|---|---|---|---|---|---|---|---|---|---|---|---|---|---|---|---|---|---|
| { | **2** | **11** | **−6** | **1** | **−1** | **0** | **0** | **0** | **−3** | **−37** | **3** | **0** | **1** | **0** | **1** | **0** | } |
| }, | | | | | | | | | | | | | | | | | |

lowFreqTransMatrix[ m ][ n ] = lowFreqTransMatrixCol32to47[ m − 32 ][ n ] with m = 32 . . . 47, n = 0 . . . 15 lowFreqTransMatrixCol32to47 =

| | | | | | | | | | | | | | | | | | |
|---|---|---|---|---|---|---|---|---|---|---|---|---|---|---|---|---|---|
| [ [ { | | | | | | | | | | | | | | | | | |
| { | 3 | −1 | 0 | 0 | 2 | −1 | 0 | 0 | 2 | −1 | 0 | 0 | 1 | 0 | 0 | 0 | } |
| { | −12 | 2 | 1 | 0 | −5 | 1 | 0 | 0 | −1 | 0 | 0 | 0 | −2 | 0 | 0 | 0 | } |
| { | 17 | −3 | −1 | 0 | 6 | −1 | −1 | 0 | 2 | 0 | 0 | 0 | 2 | 0 | 0 | 0 | } |
| { | −7 | −1 | 2 | 0 | −3 | −1 | 1 | 0 | −2 | −2 | 1 | 0 | 0 | 0 | 0 | 0 | } |
| { | −32 | −3 | 3 | 0 | 12 | −2 | −1 | 0 | 7 | 0 | 0 | 0 | 1 | 0 | 0 | 0 | } |
| { | −3 | −19 | 3 | 0 | −4 | −6 | 1 | 0 | 0 | 0 | 0 | 0 | 0 | −1 | 0 | 0 | } |
| { | 117 | −10 | −8 | 0 | 32 | 1 | −4 | 0 | 3 | 1 | −1 | 0 | −3 | 1 | 0 | 0 | } |
| { | −7 | 32 | −5 | 1 | −1 | 4 | 0 | 0 | 2 | −1 | 0 | 0 | 1 | 0 | −1 | 0 | } |
| { | 4 | 10 | 5 | 1 | 0 | 3 | 1 | 0 | 2 | 1 | 2 | 0 | 1 | 1 | 1 | 0 | } |
| { | 30 | 13 | −3 | 0 | −116 | 6 | 10 | 0 | −35 | −5 | 4 | 0 | −3 | −1 | 0 | 0 | } |
| { | −10 | −63 | 1 | 2 | −17 | 3 | −4 | 0 | −1 | 9 | −1 | 0 | 3 | 4 | −1 | 0 | } |
| { | 2 | 3 | 4 | 0 | 2 | 2 | 2 | 0 | 0 | 0 | 1 | 0 | 0 | 1 | 1 | 0 | } |
| { | −8 | −2 | −1 | 1 | 30 | 4 | −4 | 1 | −102 | 4 | 8 | −1 | −69 | −2 | 6 | −1 | } |
| { | 1 | −95 | 18 | −6 | −10 | −34 | −2 | 0 | −4 | 17 | −2 | 0 | 0 | 2 | 1 | 0 | } |
| { | 2 | 10 | 24 | −7 | 5 | 9 | 19 | −1 | 0 | 1 | 4 | 0 | −2 | 0 | 1 | 0 | } |
| { | −1 | −2 | −4 | 4 | 0 | 3 | 1 | −1 | 0 | 2 | 0 | −2 | 2 | 0 | 0 | 0 | } |
| }, ] ] | | | | | | | | | | | | | | | | | |
| { | | | | | | | | | | | | | | | | | |
| { | **−3** | **1** | **0** | **0** | **−2** | **1** | **0** | **0** | **−2** | **1** | **0** | **0** | **−1** | **0** | **0** | **0** | } |
| { | **−15** | **2** | **1** | **0** | **−5** | **1** | **0** | **0** | **−1** | **0** | **0** | **0** | **−1** | **1** | **0** | **0** | } |
| { | **−16** | **4** | **1** | **0** | **−7** | **2** | **1** | **0** | **−2** | **1** | **0** | **0** | **−2** | **0** | **0** | **0** | } |
| { | **−15** | **−1** | **3** | **0** | **−2** | **−1** | **1** | **0** | **−1** | **−3** | **1** | **0** | **0** | **0** | **0** | **0** | } |
| { | **−38** | **−3** | **6** | **1** | **14** | **−3** | **−1** | **0** | **11** | **0** | **−1** | **0** | **3** | **0** | **0** | **0** | } |
| { | **−7** | **−24** | **6** | **0** | **−5** | **−8** | **2** | **0** | **0** | **0** | **0** | **−1** | **0** | **−2** | **0** | **0** | } |
| { | **−111** | **16** | **11** | **1** | **−38** | **0** | **7** | **0** | **2** | **−1** | **1** | **0** | **4** | **−1** | **−1** | **0** | } |
| { | **9** | **−22** | **6** | **−2** | **1** | **−8** | **1** | **0** | **−4** | **−1** | **1** | **−1** | **−1** | **0** | **0** | **0** | } |
| { | **−33** | **−32** | **7** | **2** | **100** | **−10** | **−16** | **0** | **46** | **8** | **−10** | **−1** | **4** | **3** | **−1** | **0** | } |
| { | **−5** | **−66** | **7** | **4** | **−42** | **6** | **1** | **2** | **−13** | **13** | **0** | **−1** | **1** | **4** | **−1** | **0** | } |
| { | **1** | **11** | **5** | **−1** | **14** | **4** | **−1** | **−1** | **2** | **2** | **2** | **−1** | **1** | **0** | **1** | **0** | } |
| { | **−16** | **−5** | **−8** | **3** | **34** | **7** | **−11** | **0** | **−81** | **8** | **14** | **0** | **−44** | **−1** | **9** | **0** | } |
| { | **11** | **−8** | **−11** | **2** | **−27** | **−16** | **0** | **2** | **60** | **−6** | **−10** | **0** | **33** | **2** | **−8** | **−1** | } |
| { | **1** | **−78** | **23** | **1** | **−10** | **−62** | **7** | **6** | **−16** | **2** | **1** | **1** | **−4** | **3** | **0** | **0** | } |
| { | **0** | **−9** | **−3** | **−3** | **3** | **5** | **13** | **−4** | **0** | **7** | **5** | **−2** | **0** | **3** | **0** | **−1** | } |
| { | **1** | **35** | **4** | **−5** | **8** | **−85** | **20** | **4** | **−11** | **−72** | **11** | **8** | **−6** | **−10** | **1** | **1** | } |
| }, | | | | | | | | | | | | | | | | | |

Otherwise, if nTrS is equal to 48, lfnstTrSetIdx is equal to 2, and lfnst_idx is equal to 2 the following applies:

lowFreqTransMatrix[ m ][ n ] = lowFreqTransMatrixCol0to15[ m ][ n ] with m = 0 . . . 15, n = 0 . . . 15 lowFreqTransMatrixCol0to15 =

| | | | | | | | | | | | | | | | | | |
|---|---|---|---|---|---|---|---|---|---|---|---|---|---|---|---|---|---|
| [ [ { | | | | | | | | | | | | | | | | | |
| { | 87 | −41 | 3 | −4 | 1 | −1 | 0 | −1 | −73 | 28 | 2 | 1 | 1 | 1 | 0 | 0 | } |
| { | −75 | 4 | 7 | 0 | 2 | 0 | 1 | 0 | −41 | 36 | −7 | 3 | −1 | 1 | 0 | 0 | } |
| { | 26 | −44 | 22 | −6 | 4 | −2 | 1 | −1 | 77 | 24 | −22 | 2 | −4 | 0 | −1 | 0 | } |
| { | −39 | −68 | 37 | −7 | 6 | −2 | 2 | 0 | −9 | 56 | −21 | 1 | −2 | 0 | −1 | 0 | } |
| { | 10 | −20 | 2 | 0 | 1 | 0 | 0 | 0 | 50 | −1 | 8 | −5 | 1 | −1 | 0 | 0 | } |
| { | −21 | −45 | 8 | −2 | 3 | −1 | 1 | 0 | −7 | −30 | 26 | −8 | 3 | −1 | 1 | −1 | } |
| { | −4 | −2 | −55 | 28 | −8 | 5 | −3 | 2 | −2 | 37 | 43 | −19 | 1 | −2 | 1 | −1 | } |
| { | 2 | 19 | 47 | −23 | 6 | −4 | 2 | −1 | −23 | −22 | −44 | 17 | 2 | 2 | −1 | 0 | } |
| { | −19 | −62 | −9 | 3 | 0 | 0 | 0 | 0 | −12 | −56 | 27 | −7 | 3 | −1 | 1 | 0 | } |
| { | 1 | 9 | −5 | 0 | −1 | 0 | 0 | 0 | 0 | 22 | −1 | 2 | 0 | 1 | 0 | 0 | } |
| { | 5 | 17 | −9 | 0 | −2 | 1 | 0 | 0 | 13 | 54 | −2 | 7 | −1 | 1 | 0 | 0 | } |
| { | 7 | 27 | 56 | −2 | 10 | −3 | 3 | −1 | −2 | −6 | 8 | −28 | 3 | −4 | 1 | −1 | } |
| { | 0 | 0 | 19 | −4 | 3 | −2 | 2 | −1 | −3 | −13 | 10 | −4 | 1 | 0 | 0 | 0 | } |
| { | −3 | 0 | −27 | −80 | 40 | −16 | 6 | −4 | 4 | 3 | 31 | 61 | −22 | 7 | −1 | 1 | } |
| { | 1 | 2 | −8 | 6 | −1 | 1 | 0 | 0 | 2 | 8 | −5 | −1 | 0 | 0 | 0 | 0 | } |
| { | −4 | −18 | −57 | 8 | −8 | 1 | −3 | 0 | −5 | −20 | −69 | 7 | −6 | 2 | −2 | 1 | } |
| }, ] ] | | | | | | | | | | | | | | | | | |
| { | | | | | | | | | | | | | | | | | |
| { | **80** | **−43** | **3** | **−4** | **1** | **−1** | **0** | **−1** | **−75** | **34** | **2** | **1** | **1** | **1** | **0** | **0** | } |
| { | **73** | **−8** | **−11** | **−1** | **−3** | **0** | **−1** | **0** | **26** | **−35** | **11** | **−3** | **2** | **−1** | **1** | **0** | } |
| { | **37** | **−40** | **19** | **−6** | **3** | **−1** | **1** | **−1** | **73** | **17** | **−25** | **1** | **−5** | **0** | **−2** | **0** | } |
| { | **43** | **62** | **−41** | **6** | **−8** | **1** | **−3** | **0** | **5** | **−60** | **25** | **0** | **3** | **1** | **1** | **0** | } |
| { | **−10** | **26** | **−5** | **0** | **−1** | **0** | **−1** | **0** | **−55** | **1** | **−5** | **6** | **0** | **2** | **0** | **1** | } |
| { | **−23** | **−40** | **10** | **1** | **4** | **0** | **2** | **0** | **−9** | **−19** | **27** | **−8** | **3** | **−2** | **1** | **−1** | } |
| { | **−4** | **14** | **−12** | **7** | **−3** | **2** | **−1** | **1** | **−23** | **15** | **5** | **−5** | **0** | **−1** | **1** | **0** | } |
| { | **1** | **5** | **63** | **−36** | **10** | **−8** | **3** | **−3** | **−21** | **−45** | **−52** | **31** | **−1** | **5** | **0** | **2** | } |

-continued

```
{       22   61   11  −13   −1   −3   −1   −1   10   38  −42   14   −5    2   −1    1 }
{        2   14  −17    5   −2    2   −1    0    3   39    0    1   −4    1   −1    0 }
{        5   19   35   −8    5   −4    1   −1   −8  −20    1  −14    4   −1    1   −1 }
{      −13  −38  −19    5   −1    2    1    1  −11  −42    4   13   −1    3   −1    1 }
{       −3   −2  −31   11   −6    5   −2    2    6   31  −11   10   −2    0   −1    0 }
{       −2    0   14  −23   10   −4    2   −1   −3  −10   18   14   −5    1   −1    0 }
{        0   −7    8   65  −31   12   −8    4   −9  −21  −39  −52   24   −4    6    0 }
{        8   20   55   26  −15    3   −4    0    2   14   11  −45   14   −4    3   −2 }
},
```

lowFreqTransMatrix[ m ][ n ] = lowFreqTransMatrixCol16to31[ m − 16 ][ n ]
with m = 16 . . . 31, n = 0 . . . 15 lowFreqTransMatrixCol16to31 =

```
[ [ {
{       30   −5   −6    1   −1    0    0    0   −8   −3    3    0    0    0    0    0 }
{       72  −29   −2    0   −1    0   −1    0  −37    6    7   −2    1    0    0    0 }
{        7  −38   10    0    1    0    0    0  −51   27    4   −3    2   −1    1    0 }
{      −45    4   −3    6   −1    2    0    1   49  −13    3   −3   −1    0    0    0 }
{       66   17  −24    4   −3    1   −1    0   13  −49   15    1    0    0    0    0 }
{       −9   69  −33    5   −2    0   −1    0  −44  −31   10    7   −2    2    0    1 }
{      −47  −34  −27    5    4   −1    1    0  −39   −2   27    4   −2    1    0    0 }
{      −33    3   22   −2   −4    1   −1    0  −58  −17    6   −6    7   −1    1    0 }
{        7   −8   16   −6    4   −2    1   −1  −15   54  −23    2   −1    0    0    0 }
{      −13   17    0   −2    0   −1    0    0  −46  −10  −10    4   −1    1    0    0 }
{        4   51   −3   −6   −1   −1    0    0  −20    6  −34    9   −2    2   −1    0 }
{       −1   −4  −68   35   −5    5   −2    1    0   35   43   −4   −6    1   −1    0 }
{       −6  −37  −18   −5    2   −2    1   −1    6   −6   −7   25   −6    4   −1    1 }
{       −4   −7  −26   −6  −10    6   −4    1    3    8   14  −18   15   −5    2   −1 }
{        1   24    3    5   −1    1    0    0   −3   12    6  −10    1   −1    0    0 }
{        1    4    0   33   −7    5   −2    1    0   −9   53  −22    3   −1    0    0 }
}, ] ]
{
{       33   −7   −7    1   −1    0   −1    0   −9   −4    5    0    0    0    0    0 }
{      −70   37   −1    0    1    0    0    0   43  −12   −8    3   −2    1   −1    0 }
{      −11  −38   16    1    2    1    1    0  −45   35    1   −4    2   −1    1    0 }
{       41   −3    3   −8    2   −3    0   −1  −50   13   −3    4    1    1    0    0 }
{      −55  −13   29   −5    4   −1    2    0   10   52  −23   −2   −2   −1   −1   −1 }
{      −18   63  −36    6   −3    0   −1    0  −45  −22   12    8   −2    3    0    1 }
{      −67  −27    1    6    3    1    1    1  −54   −3   30   −4    4   −1    1    0 }
{        0   29   33   −8   −6    0   −2    0  −33   −7  −16   −4    8   −1    2    0 }
{       −3    5   −4    3   −5    2   −1    1   21  −53   21   −4    5   −1    1    0 }
{      −22    1   −1   −9    4   −2    1   −1  −46  −24  −15   19   −3    4    0    1 }
{       −7   −9  −40   32   −7    5   −2    2  −11   15   45  −19    0   −2   −1   −1 }
{       −3  −35   44  −19    6   −3    2   −1   12  −24   −2    3    4   −1    1    0 }
{        3   48   31  −17    1   −3    0   −1  −27  −11  −24   −5    6   −1    2    0 }
{       −7  −37  −16   −6    3    2    1    1   −1  −13   −2   16   −2    1    0    0 }
{        1  −11   23   27   −2   −2    0   −1   −4  −35    9   −8   −4    4    0    1 }
{        5   15    4   −6    8   −7    3   −2    2   35  −41   27  −15    6   −3    1 }
},
```

lowFreqTransMatrix[ m ][ n ] = lowFreqTransMatrixCol32to47[ m − 32 ][ n ]
with m = 32 . . . 47, n = 0 . . . 15 lowFreqTransMatrixCol32to47 =

```
[ [ {
{        3    2   −1    0   −2   −1    0    0    1    1    0    0   −1    0    0    0 }
{       12    3    4    0   −3   −2    1    0    4    0    0    0   −1    0    0    0 }
{       31   −5   −8    3  −14    0    5   −1    6    1   −3    0   −4   −1    1    0 }
{      −19    2    0    0    5    1    1    0   −2    0   −1    0    1    0    0    0 }
{      −53   34    6   −5   30   −7  −11    3  −11   −2    5    1    4    2   −1   −1 }
{       49    7    2   −6  −23   −3   −2    2    9    4    0    0   −2   −1   −1    0 }
{      −11   32   −8   −7   27  −12   −6    6  −13    0    4   −3    3   −1   −2    1 }
{      −23   40   −2    5   43  −11   −8   −1   18   −4    5    2    4    3    0   −1 }
{      −42  −25    4    6   34    8    2   −2  −15   −1    0   −1    3    2    0    1 }
{      −80  −27   20   −4  −66   23   −2   −2   20   −3   −2    3  −14    2    3   −1 }
{       16  −52   28    1   59   15   −8   −5  −28   −7    2    2   10    3    0   −1 }
{      −14  −38  −12  −10    9    5    7    6   −9    7   −4   −3    4   −4    0    3 }
{       16   10   55  −24   15   46  −52    1   35  −43   10   12  −23   13    5   −8 }
{       −2   −4   −1   13    0    2   −4   −3    3   −1    2    1   −2    0   −2   −1 }
{       −9   −1  −25   10   45  −11   18    2   86    1  −13   −4  −65   −6    7    2 }
{        4  −27   −2   −9    5   36  −13    5   −7  −17    1    2    4    6    4   −1 }
}, ] ]
{
{        3    3   −1    0   −2   −2    0    0    1    1    0    0   −1    0    0    0 }
{      −17   −2    7   −1    5    3   −3    0   −5    0    1    0    1    1   −1    0 }
{       31  −11  −10    4  −16    0    8   −2    5    2   −4    0   −3   −1    2    0 }
{       18    0    0    0   −4   −2   −1    0    0    0    1    0    0    0   −1    0 }
{       43  −43   −3    7  −27   10   14   −5   11    3   −8    0   −2   −3    3    1 }
{       59    1    1   −9  −29   −3    0    3    9    6   −1   −1   −1   −2   −1    0 }
{      −11   53  −19   −2   40  −26   −4    6  −17    2    8   −4    6    1   −4    1 }
```

-continued

| | | | | | | | | | | | | | | | | | |
|---|---|---|---|---|---|---|---|---|---|---|---|---|---|---|---|---|---|
| { | **−15** | **7** | **11** | **9** | **21** | **8** | **−7** | **−7** | **−6** | **−9** | **2** | **4** | **2** | **6** | **1** | **−2** | } |
| { | **45** | **24** | **−10** | **−5** | **−38** | **−14** | **1** | **3** | **11** | **2** | **2** | **0** | **−1** | **−3** | **−1** | **0** | } |
| { | **−39** | **−15** | **51** | **−13** | **−26** | **51** | **−29** | **−4** | **26** | **−27** | **−2** | **11** | **−12** | **6** | **8** | **−6** | } |
| { | **−58** | **−18** | **−23** | **4** | **−44** | **9** | **28** | **6** | **26** | **17** | **−15** | **−7** | **−8** | **−11** | **3** | **6** | } |
| { | **−11** | **52** | **−5** | **−1** | **−59** | **−6** | **0** | **4** | **37** | **4** | **1** | **0** | **−11** | **0** | **1** | **−2** | } |
| { | **−38** | **−15** | **−14** | **23** | **−23** | **−35** | **43** | **−8** | **−19** | **42** | **−10** | **−7** | **15** | **−11** | **−5** | **5** | } |
| { | **−5** | **−18** | **29** | **−13** | **−44** | **−11** | **−11** | **4** | **−76** | **20** | **27** | **2** | **43** | **8** | **−16** | **−3** | } |
| { | **10** | **−14** | **2** | **5** | **−5** | **27** | **8** | **−7** | **−33** | **−7** | **−6** | **5** | **18** | **4** | **6** | **0** | } |
| { | **−11** | **34** | **13** | **−20** | **−21** | **−44** | **−13** | **12** | **9** | **2** | **15** | **−1** | **−8** | **5** | **−6** | **−3** | } |
| }, | | | | | | | | | | | | | | | | | |

Otherwise, if nTrS is equal to 48, lfnstTrSetIdx is equal to 3, and lfnst_idx is equal to 1 the following applies:

lowFreqTransMatrix[ m ][ n ] = lowFreqTransMatrixCol0to15[ m ][ n ] with m = 0 . . . 15, n = 0 . . . 15 lowFreqTransMatrixCol0to15 =

| | | | | | | | | | | | | | | | | | |
|---|---|---|---|---|---|---|---|---|---|---|---|---|---|---|---|---|---|
| [ [ { | | | | | | | | | | | | | | | | | |
| { | −115 | 37 | 9 | 2 | 2 | 1 | 1 | 0 | 10 | −29 | 8 | 0 | 1 | 0 | 1 | 0 | } |
| { | 15 | 51 | −18 | 0 | −3 | 0 | −1 | 0 | −95 | 7 | 34 | −3 | 5 | −1 | 2 | 0 | } |
| { | 29 | −22 | 16 | −6 | 3 | −2 | 1 | −1 | −4 | −80 | 12 | 15 | 0 | 3 | 0 | 1 | } |
| { | −36 | −98 | 25 | 5 | 4 | 1 | 2 | 1 | −59 | 11 | −17 | 1 | 1 | 1 | 0 | 0 | } |
| { | −6 | 18 | 3 | −3 | −1 | 0 | 0 | 0 | −50 | −5 | −38 | 12 | 0 | 2 | 0 | 1 | } |
| { | 4 | 15 | 52 | −13 | 5 | −3 | 2 | −1 | −17 | −45 | 16 | 24 | −2 | 4 | −1 | 2 | } |
| { | −20 | −7 | −43 | 4 | 0 | −1 | 1 | 1 | −7 | 35 | 0 | 12 | −4 | 1 | −1 | 0 | } |
| { | 4 | 29 | 1 | 26 | −5 | 4 | −2 | 1 | −17 | −7 | −73 | 6 | 6 | 2 | 1 | 1 | } |
| { | 12 | 13 | 10 | 2 | −1 | 3 | −1 | 1 | 17 | −2 | −46 | 12 | 7 | 0 | 2 | 0 | } |
| { | 5 | 20 | 90 | −17 | 4 | −3 | 2 | −1 | 6 | 66 | 8 | 28 | −7 | 3 | −1 | 1 | } |
| { | −3 | −4 | −34 | −12 | 2 | −1 | −1 | 0 | 5 | 25 | 11 | 43 | −10 | 4 | −2 | 1 | } |
| { | −1 | −3 | 2 | 19 | −2 | 4 | −1 | 2 | 9 | 3 | −35 | 22 | 11 | 1 | 2 | 0 | } |
| { | 10 | −4 | −6 | 12 | 5 | 1 | 1 | 0 | 11 | −9 | −12 | −2 | −7 | 0 | −1 | 0 | } |
| { | 4 | 6 | 14 | 53 | −4 | 4 | 0 | 2 | 0 | −1 | −20 | −13 | 3 | 2 | −1 | 1 | } |
| { | 2 | 9 | 13 | 37 | 19 | 6 | 2 | 2 | 9 | 3 | 9 | 28 | 20 | 4 | 3 | 1 | } |
| { | 3 | −3 | 12 | 84 | −12 | 8 | −2 | 3 | 6 | 13 | 50 | −1 | 45 | 1 | 7 | 0 | } |
| }, ] ] | | | | | | | | | | | | | | | | | |
| { | | | | | | | | | | | | | | | | | |
| { | **112** | **−38** | **−11** | **−2** | **−3** | **−1** | **−1** | **0** | **−17** | **33** | **−7** | **−1** | **−1** | **0** | **−1** | **0** | } |
| { | **7** | **48** | **−20** | **0** | **−3** | **0** | **−1** | **0** | **−86** | **15** | **39** | **−6** | **5** | **−1** | **2** | **0** | } |
| { | **−34** | **14** | **−7** | **5** | **−2** | **2** | **0** | **1** | **7** | **74** | **−19** | **−16** | **0** | **−4** | **0** | **−1** | } |
| { | **−17** | **−69** | **19** | **11** | **3** | **2** | **1** | **1** | **14** | **7** | **5** | **−8** | **1** | **−1** | **0** | **0** | } |
| { | **31** | **66** | **−29** | **−3** | **−4** | **−2** | **−2** | **−1** | **78** | **−1** | **30** | **−13** | **−3** | **−3** | **−1** | **−1** | } |
| { | **−24** | **−12** | **−48** | **15** | **1** | **4** | **0** | **2** | **−2** | **57** | **−19** | **−8** | **−2** | **−2** | **−1** | **−1** | } |
| { | **−8** | **0** | **29** | **−14** | **6** | **−3** | **2** | **−1** | **−13** | **−15** | **29** | **27** | **−8** | **4** | **−2** | **1** | } |
| { | **5** | **39** | **5** | **11** | **−6** | **0** | **−2** | **0** | **−30** | **−14** | **−58** | **19** | **10** | **4** | **2** | **2** | } |
| { | **−13** | **−16** | **7** | **2** | **3** | **−3** | **2** | **−1** | **−18** | **13** | **46** | **−14** | **−8** | **1** | **−3** | **0** | } |
| { | **−12** | **−15** | **−67** | **16** | **5** | **4** | **0** | **2** | **0** | **5** | **0** | **22** | **−3** | **0** | **−1** | **0** | } |
| { | **−5** | **−22** | **−68** | **21** | **1** | **4** | **1** | **2** | **−13** | **−67** | **3** | **−44** | **11** | **1** | **4** | **1** | } |
| { | **−11** | **0** | **5** | **−12** | **−8** | **0** | **0** | **0** | **−14** | **−1** | **13** | **−7** | **7** | **−2** | **0** | **0** | } |
| { | **−5** | **−10** | **−17** | **−51** | **10** | **−4** | **3** | **−1** | **1** | **14** | **50** | **−8** | **−18** | **−1** | **−4** | **−1** | } |
| { | **−2** | **−16** | **−6** | **−19** | **2** | **2** | **1** | **1** | **13** | **−4** | **11** | **11** | **25** | **−4** | **3** | **−1** | } |
| { | **−7** | **2** | **2** | **−5** | **7** | **5** | **0** | **1** | **−14** | **0** | **2** | **−7** | **−13** | **0** | **1** | **0** | } |
| { | **6** | **7** | **31** | **−8** | **29** | **−7** | **3** | **−2** | **−3** | **−10** | **−6** | **−71** | **14** | **0** | **4** | **0** | } |
| }, | | | | | | | | | | | | | | | | | |

lowFreqTransMatrix[ m ][ n ] = lowFreqTransMatrixCol16to31[ m − 16 ][ n ] with m = 16 . . . 31, n = 0 . . . 15 lowFreqTransMatrixCol16to31 =

| | | | | | | | | | | | | | | | | | |
|---|---|---|---|---|---|---|---|---|---|---|---|---|---|---|---|---|---|
| [ [ { | | | | | | | | | | | | | | | | | |
| { | 23 | −8 | −8 | 1 | −1 | 0 | 0 | 0 | 3 | 3 | −2 | −1 | 0 | 0 | 0 | 0 | } |
| { | 23 | −47 | 1 | 6 | 0 | 1 | 0 | 1 | 8 | 5 | −12 | 0 | −1 | 0 | 0 | 0 | } |
| { | 45 | 7 | −59 | 7 | −2 | 1 | −1 | 0 | −15 | 41 | −3 | −16 | 2 | −3 | 0 | −1 | } |
| { | 6 | −13 | 7 | −3 | 0 | 0 | 0 | 0 | 14 | −4 | −14 | 3 | −1 | 0 | 0 | 0 | } |
| { | 3 | 67 | −7 | −40 | 3 | −6 | 1 | −3 | −12 | −13 | 65 | −3 | −10 | 0 | −1 | 0 | } |
| { | −87 | −8 | −14 | 7 | 8 | 1 | 2 | 0 | 23 | −35 | −6 | −3 | 1 | 1 | 0 | 0 | } |
| { | −51 | −2 | −57 | 5 | 15 | 0 | 4 | 0 | 7 | 39 | 5 | −55 | 1 | −7 | 1 | −3 | } |
| { | −5 | 21 | −3 | 5 | −1 | −3 | 0 | −1 | −11 | 2 | −52 | −3 | 27 | −2 | 5 | 0 | } |
| { | 16 | −45 | −9 | −53 | 6 | 1 | 1 | 0 | 70 | 16 | 8 | −4 | −37 | 1 | −7 | 0 | } |
| { | 29 | 5 | −19 | 12 | 9 | −1 | 1 | 0 | −10 | 14 | −1 | −13 | 7 | 0 | 1 | 0 | } |
| { | 23 | 20 | −40 | 12 | 21 | −3 | 4 | −1 | 25 | −28 | −10 | 5 | 8 | 6 | 0 | 2 | } |
| { | −7 | −65 | −19 | −22 | 11 | 4 | 2 | 1 | −75 | −18 | 3 | −1 | −10 | 2 | 0 | 1 | } |
| { | 33 | −10 | −4 | 18 | 18 | −4 | 4 | −1 | 28 | −72 | 1 | −49 | 15 | 2 | 2 | 1 | } |
| { | −3 | 1 | −5 | 35 | −16 | −6 | −1 | −2 | 46 | 29 | 13 | 21 | 37 | −5 | 4 | −1 | } |
| { | 1 | 18 | 9 | 28 | 24 | 6 | 2 | 2 | 20 | −5 | −25 | −33 | −36 | 9 | −2 | 2 | } |
| { | −2 | 18 | −22 | −37 | −13 | 14 | 0 | 3 | 1 | −12 | −3 | 2 | −15 | −8 | 1 | −1 | } |
| }, ] ] | | | | | | | | | | | | | | | | | |

-continued

{
{ −23 7 10 −1 1 0 0 0 −2 −4 2 2 0 0 0 0 }
{ 22 −56 8 11 0 2 0 1 11 3 −19 2 0 0 0 0 }
{ −38 −2 65 −11 0 −2 1 −1 14 −47 7 22 −3 3 −1 1 }
{ 0 −49 12 33 −4 5 −1 1 9 6 −69 8 13 0 2 0 }
{ −19 −21 5 29 −2 3 −1 1 −12 8 −26 −1 10 −1 2 0 }
{ −11 2 −36 1 11 −1 3 0 0 44 2 −54 4 −6 2 −2 }
{ −93 −13 −32 15 20 2 5 1 29 −23 2 −30 −2 0 0 0 }
{ −23 34 −7 0 1 −5 1 −2 −14 −13 −37 −2 31 −1 5 0 }
{ −3 46 6 54 −11 −5 −2 −2 −57 −13 6 4 42 −3 7 −1 }
{ −4 2 −29 7 16 −1 3 0 −6 −8 −3 17 4 3 0 0 }
{ −31 8 31 −6 −17 1 −2 0 13 −16 1 −4 −2 −2 0 0 }
{ −47 10 6 −15 −37 7 −3 2 −4 75 5 56 −10 −20 −1 −5 }
{ 17 42 −2 −6 3 −3 −1 −1 32 −12 1 −8 −7 4 −2 1 }
{ −9 −48 −1 −50 13 12 2 3 −50 −16 20 −7 −6 3 1 1 }
{ −16 6 7 −6 14 14 −2 3 −82 1 −26 −10 −54 12 2 3 }
{ 0 0 15 −9 17 −4 −2 0 5 6 4 −36 10 13 −1 3 }
}, lowFreqTransMatrix[ m ][ n ] = lowFreqTransMatrixCol32to47[ m − 32 ][ n ] with m = 32 . . . 47, n = 0 . . . 15 lowFreqTransMatrixCol32to47 =

[ [ {
{ 4 0 0 −1 1 1 0 0 2 0 0 0 0 0 0 0 }
{ 3 −3 1 −1 2 1 −2 0 1 −1 0 0 1 1 −1 0 }
{ 1 0 7 −2 −3 6 1 −2 0 0 1 0 −1 2 0 −1 }
{ 2 8 3 5 2 0 0 0 0 3 0 1 1 0 0 0 }
{ 9 −20 −5 22 −2 0 0 −1 2 −3 −2 3 −1 0 1 0 }
{ 2 5 −17 0 3 −1 −1 −5 0 1 −4 0 1 0 0 −2 }
{ 1 −10 41 2 4 −3 −2 3 −1 −2 7 1 1 −1 −1 0 }
{ 0 27 8 −58 2 −5 25 3 0 3 0 −5 0 −2 7 0 }
{ −12 29 3 21 4 0 5 −1 −3 4 1 4 2 0 1 0 }
{ 0 6 13 4 0 4 1 5 0 1 1 1 0 1 0 0 }
{ −4 21 −64 −8 −5 19 10 −48 3 −1 10 −3 0 4 3 −6 }
{ 2 −35 −27 4 1 8 −17 −19 3 0 3 −6 0 2 −1 −2 }
{ 56 −23 22 −1 4 −1 −15 26 6 4 −10 0 0 2 −3 2 }
{ −10 −53 −18 8 9 12 −41 −25 −2 2 13 −16 4 1 −5 1 }
{ 13 42 1 57 −22 −2 −25 −28 5 6 19 −12 −5 −3 −2 4 }
{ 19 14 −4 −12 −4 5 17 8 2 −4 −4 4 −2 2 1 0 }
}, ] ]
{
{ −4 0 0 1 −1 −1 0 0 −2 0 0 0 0 0 0 0 }
{ 3 −1 1 −3 3 1 −2 0 1 −1 0 0 1 0 −1 0 }
{ 0 0 −11 4 3 −6 −1 2 0 0 −2 0 1 −2 0 0 }
{ −5 25 2 −32 3 0 5 1 −1 5 1 −3 1 0 1 1 }
{ −7 3 8 −11 −2 −2 1 1 −2 0 2 0 −1 0 0 1 }
{ 4 −10 53 −4 3 −6 0 9 0 −2 7 1 1 −2 0 2 }
{ 6 −1 −1 13 4 −1 −8 −5 1 1 0 0 2 0 −2 −1 }
{ 6 17 2 −62 6 −6 31 2 2 0 −2 −2 1 −1 6 0 }
{ 15 −43 0 −12 −2 1 −15 4 4 −4 −2 −6 0 1 −2 0 }
{ −14 0 −65 −2 0 17 4 −64 5 −1 18 −2 0 2 2 −3 }
{ 19 5 15 4 −1 4 −5 23 1 3 −4 −2 0 1 −1 2 }
{ −35 −9 2 −9 12 −11 14 −12 −2 −5 3 10 2 −3 −1 −1 }
{ 5 41 0 −27 3 −2 56 6 −2 −6 −5 32 −2 0 −1 0 }
{ 18 −43 −3 −44 20 8 25 10 0 0 −9 26 1 3 −3 −3 }
{ 2 52 5 33 −14 −11 8 −6 7 −2 3 −4 −1 −2 3 1 }
{ −15 −12 1 −11 8 −10 4 −63 13 1 39 6 0 −1 −2 18 }
},

Otherwise, if nTrS is equal to 48, lfnstTrSetIdx is equal to 3, and lfnst_idx is equal to 2 the following applies:

lowFreqTransMatrix[ m ][ n ] = lowFreqTransMatrixCol0to15[ m ][ n ] with m = 0 . . . 15, n = 0 . . . 15 lowFreqTransMatrixCol0to15 =

[ [ {
{ 109 −26 −8 −3 −2 −1 −1 0 −50 28 2 1 0 0 0 0 }
{ −39 31 −5 2 −1 1 0 0 −95 6 18 0 4 0 1 0 }
{ 29 −3 −2 −2 0 0 0 0 0 −41 9 0 2 0 1 0 }
{ 18 96 −23 2 −5 1 −2 0 −10 6 10 −2 1 −1 1 0 }
{ −29 −60 16 −2 3 −1 1 0 −52 9 −17 5 −2 1 −1 1 }
{ −23 −5 −15 5 −2 1 −1 1 2 79 −13 −4 −2 −1 −1 0 }
{ −7 −3 12 −3 3 −1 1 0 −31 −62 8 7 0 2 0 1 }
{ 1 −26 5 0 1 0 1 0 24 −3 43 −6 4 −2 1 −1 }
{ 11 14 6 −3 1 −1 1 0 10 −7 −9 3 −2 1 −1 0 }
{ −10 −11 −47 3 −4 1 −1 0 5 28 11 −2 −1 0 0 0 }

-continued

{ −8 −24 −99 11 −10 3 −4 1 −5 −36 19 −26 4 −5 1 −2 }
{ −5 1 −1 0 1 0 0 0 −10 −14 −6 8 0 1 0 0 }
{ 1 12 −20 21 −4 5 −2 2 −5 −2 −75 9 −1 2 −1 1 }
{ 2 −9 −18 8 −3 3 −1 1 3 −25 −62 −6 0 −2 0 −1 }
{ 4 9 39 18 0 2 0 1 −6 −16 −22 −37 5 −5 1 −2 }
{ −7 −2 15 −6 1 −1 1 −1 −11 −3 22 −14 0 −2 1 −1 }
}, ] ]
{
{ −111 32 9 3 2 1 1 0 39 −30 1 −1 0 0 0 0 }
{ 25 −26 6 −2 1 −1 0 0 94 −12 −20 0 −4 0 −2 0 }
{ 29 −2 −5 −1 −1 0 0 0 −1 −35 10 0 2 0 1 0 }
{ 3 54 −15 −1 −4 −1 −1 0 −36 9 10 0 2 0 1 0 }
{ −9 38 −20 4 −4 1 −1 0 18 59 −5 −10 −2 −3 −1 −1 }
{ −42 −87 26 4 7 2 3 1 −34 37 −22 3 −2 1 −1 0 }
{ 7 −20 3 3 1 1 0 0 33 −12 34 −7 2 −2 1 −1 }
{ 5 3 −12 4 −3 1 −1 0 32 66 −14 −11 −2 −4 −1 −1 }
{ −15 −11 −32 6 1 2 0 1 1 35 6 −6 −1 −1 −1 −1 }
{ 9 16 −9 −3 −1 −1 0 0 13 4 −8 2 −4 1 −1 0 }
{ −3 11 20 −3 3 −1 1 0 −16 −15 −12 19 0 4 0 1 }
{ 2 18 −17 13 −4 2 −2 1 −9 4 −58 7 2 2 0 1 }
{ 14 32 101 −22 3 −7 0 −2 9 33 −13 22 −5 3 −2 1 }
{ −8 −2 7 −4 2 −2 1 0 −4 28 72 0 −7 −1 −2 −1 }
{ 3 4 35 −1 −2 −2 0 −1 −11 −26 10 −38 8 −3 3 0 }
{ −6 −7 −5 10 −1 2 0 1 −9 −12 −28 6 3 1 1 1 }
}, lowFreqTransMatrix[ m ][ n ] = lowFreqTransMatrixCol16to31[ m − 16 ][ n ]
with m = 16 . . . 31, n = 0 . . . 15 lowFreqTransMatrixCol16to31 =

[ [ {
{ −18 −8 6 0 1 0 1 0 6 −2 −3 0 0 0 0 0 }
{ 32 −49 5 1 1 0 0 0 27 −1 −14 2 −2 1 −1 0 }
{ 86 4 −33 2 −6 1 −2 0 −32 58 1 −7 0 −2 0 −1 }
{ −14 26 2 −4 1 −1 0 0 −43 −9 35 −2 4 −1 1 0 }
{ 13 56 2 9 0 2 0 1 34 18 41 0 3 0 1 0 }
{ 9 1 5 1 1 0 0 0 4 49 2 14 1 3 0 1 }
{ −75 9 −45 5 −1 1 −1 0 14 35 0 −23 2 −5 1 −2 }
{ −7 −64 9 14 0 3 0 1 −12 −4 5 3 −1 1 0 0 }
{ 22 21 1 −21 2 −4 1 −2 92 1 53 0 −9 1 −2 0 }
{ −12 −2 −38 2 0 1 0 0 16 38 11 −16 −1 −3 0 −2 }
{ 0 25 41 5 −3 1 0 0 10 −5 −7 12 2 1 0 0 }
{ −17 −2 7 −5 3 −1 0 0 −16 13 3 31 −1 6 0 2 }
{ −1 −2 −16 −4 0 −1 0 0 −7 7 −31 0 3 0 0 0 }
{ −6 −61 14 −51 2 −6 0 −2 −19 0 40 −7 −17 0 −3 0 }
{ −5 15 63 9 −16 0 −3 0 18 42 −18 27 15 1 3 1 }
{ −18 −7 30 −9 −4 0 −1 0 −35 23 23 10 −17 1 −3 0 }
}, ] ]
{
{ 23 2 −7 0 −1 0 −1 0 −4 3 1 0 0 0 0 0 }
{ −31 56 −7 −2 −1 −1 0 0 −30 3 19 −3 2 −1 1 0 }
{ 77 −1 −36 3 −6 1 −2 0 −29 67 −3 −11 0 −3 0 −1 }
{ −4 37 −1 −7 0 −2 0 −1 −46 −12 52 −3 5 −1 2 0 }
{ −34 −15 13 4 2 1 1 0 5 40 −11 −15 1 −3 0 −1 }
{ 11 24 −2 −6 0 −2 0 −1 0 11 18 −8 0 −2 0 −1 }
{ −11 −65 8 20 0 5 0 2 3 1 −9 3 −1 1 0 0 }
{ 70 −12 45 −7 −1 −2 −1 −1 −25 – 3 28 −2 5 −1 1 }
{ −23 −10 −37 9 3 3 1 1 −11 39 −5 −21 1 −4 1 −1 }
{ 18 15 −13 −21 3 −4 1 −1 90 10 49 −12 −14 −2 −4 −1 }
{ −25 4 −4 −3 4 0 1 0 −12 17 −4 29 −2 4 −1 1 }
{ 6 23 −13 4 −1 −1 0 0 1 1 −38 −6 11 −1 2 −1 }
{ 6 −21 −34 3 6 2 2 0 −8 −6 2 −18 1 0 0 0 }
{ −1 41 −16 48 −5 3 −2 1 −5 −1 −16 9 8 1 1 0 }
{ −4 21 65 −1 −17 −1 −4 0 4 16 −7 10 2 −1 0 0 }
{ −21 −42 8 −24 7 2 2 0 −49 14 29 −5 −25 3 −4 1 }
}, lowFreqTransMatrix[ m ][ n ] = lowFreqTransMatrixCol32to47[ m − 32 ][ n ]
with m = 32 . . . 47, n = 0 . . . 15 lowFreqTransMatrixCol32to47 =

[ [ {
{ −3 2 1 −1 0 0 0 0 −2 0 0 0 0 0 0 0 }
{ 3 5 3 2 4 1 1 1 2 0 0 0 2 0 0 0 }
{ −14 −8 20 0 −2 −3 0 4 −1 −1 0 0 −1 1 0 0 }
{ 14 −40 1 10 2 1 −10 1 2 −4 −1 −1 0 0 −1 0 }
{ 19 −36 −10 13 3 6 −14 −1 3 1 −1 −3 1 1 −1 −1 }
{ −31 −14 56 −1 13 −37 −4 20 −2 2 −10 0 2 −4 0 −1 }
{ 1 −8 32 −1 7 −12 −4 10 0 2 −6 −1 2 0 0 −2 }
{ 8 −59 −3 26 14 6 −58 6 −5 17 −7 −18 3 3 −1 −5 }
{ −21 −11 1 40 −5 −4 −24 5 −4 5 −6 −5 0 0 0 −3 }

-continued

| | | | | | | | | | | | | | | | | | |
|---|---|---|---|---|---|---|---|---|---|---|---|---|---|---|---|---|---|
| { | 12 | −9 | −22 | 7 | −8 | 60 | 4 | −36 | −6 | −15 | 54 | 7 | 3 | −7 | −8 | 14 | } |
| { | −1 | 1 | 9 | −3 | −3 | −14 | −3 | 12 | 2 | 4 | −13 | −2 | −1 | 3 | 2 | −4 | } |
| { | −93 | −15 | −46 | −3 | 23 | −19 | 0 | −47 | 8 | 4 | 8 | 3 | 2 | 3 | 0 | 0 | } |
| { | 4 | 11 | −12 | 4 | −12 | 14 | −50 | −1 | −8 | 32 | −4 | −54 | 2 | 0 | 30 | −15 | } |
| { | 13 | −4 | 11 | 9 | 17 | 0 | 24 | 5 | 1 | −12 | 4 | 28 | 0 | 0 | −15 | 8 | } |
| { | 12 | 34 | 9 | 24 | 4 | 28 | 2 | 4 | 11 | 4 | 30 | 2 | 5 | 13 | 4 | 18 | } |
| { | −19 | 53 | 6 | 48 | −65 | 12 | −12 | 11 | −8 | −16 | 10 | −21 | −2 | −12 | 6 | 2 | } |
| }, ] ] | | | | | | | | | | | | | | | | | |
| { | | | | | | | | | | | | | | | | | |
| { | **3** | **2** | **1** | **0** | **0** | **1** | **1** | **1** | **2** | **0** | **0** | **0** | **0** | **0** | **0** | **0** | } |
| { | **−2** | **−9** | **4** | **3** | **−4** | **−1** | **0** | **1** | **−1** | **0** | **0** | **0** | **−1** | **0** | **0** | **0** | } |
| { | **−17** | **−7** | **29** | **−2** | **−1** | **−8** | **1** | **8** | **−2** | **−1** | **−2** | **1** | **−1** | **0** | **0** | **0** | } |
| { | **19** | **−62** | **1** | **20** | **5** | **3** | **−25** | **3** | **2** | **0** | **−2** | **−6** | **2** | **1** | **0** | **−1** | } |
| { | **−23** | **−2** | **61** | **−7** | **9** | **−41** | **3** | **25** | **−3** | **0** | **−14** | **3** | **1** | **−4** | **−1** | **−2** | } |
| { | **−3** | **−23** | **21** | **10** | **8** | **−13** | **−18** | **11** | **−1** | **7** | **−7** | **−5** | **2** | **−1** | **1** | **−3** | } |
| { | **2** | **−45** | **−1** | **27** | **7** | **9** | **−65** | **6** | **−6** | **24** | **−5** | **−26** | **3** | **2** | **5** | **−6** | } |
| { | **−20** | **0** | **−28** | **4** | **−3** | **4** | **0** | **−14** | **−1** | **−1** | **7** | **−1** | **−2** | **−1** | **0** | **3** | } |
| { | **3** | **−11** | **−17** | **−4** | **5** | **47** | **6** | **−48** | **2** | **−11** | **61** | **5** | **2** | **−9** | **−6** | **21** | } |
| { | **−24** | **3** | **0** | **45** | **−16** | **8** | **−18** | **−6** | **−4** | **−3** | **11** | **−4** | **−2** | **−3** | **−2** | **3** | } |
| { | **−86** | **−8** | **−33** | **1** | **23** | **−35** | **−11** | **−44** | **11** | **12** | **0** | **−11** | **4** | **3** | **8** | **−4** | } |
| { | **14** | **22** | **1** | **−10** | **−19** | **13** | **−41** | **2** | **−3** | **30** | **5** | **−62** | **6** | **−5** | **41** | **−6** | } |
| { | **11** | **2** | **4** | **1** | **−2** | **11** | **1** | **1** | **−3** | **−1** | **13** | **−1** | **0** | **−6** | **2** | **8** | } |
| { | **−15** | **30** | **−9** | **22** | **−48** | **−8** | **−11** | **2** | **1** | **−23** | **−11** | **−24** | **1** | **−1** | **1** | **−13** | } |
| { | **−2** | **1** | **30** | **1** | **−12** | **−1** | **−10** | **−5** | **9** | **−5** | **53** | **−14** | **2** | **−21** | **2** | **50** | } |
| { | **2** | **46** | **1** | **51** | **−43** | **−5** | **−4** | **5** | **9** | **−33** | **−1** | **−16** | **1** | **−1** | **−11** | **−2** | } |
| }, | | | | | | | | | | | | | | | | | |

Figure 23A:
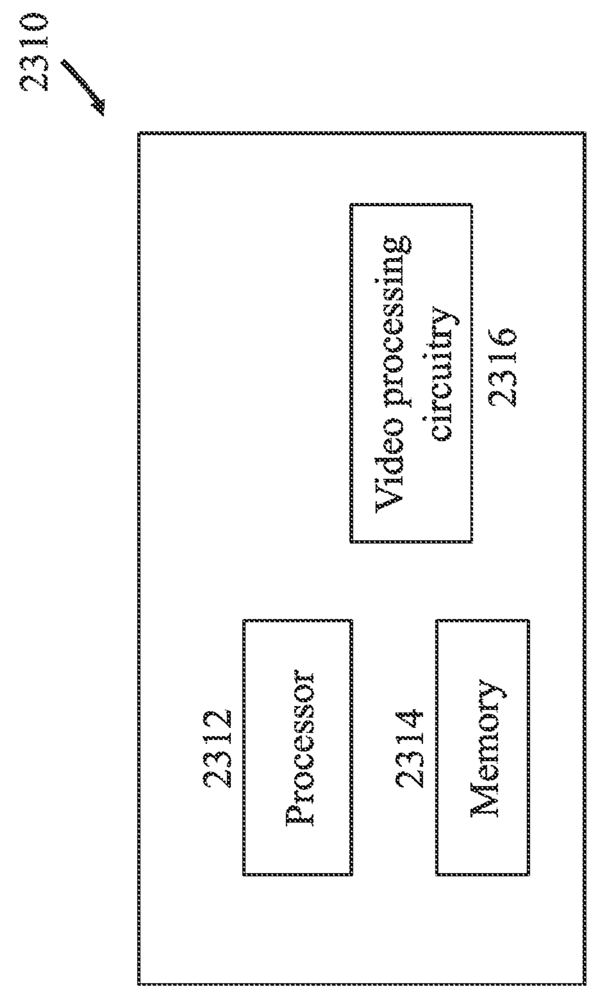
FIGS. 23A and 23B are block diagrams of examples of a hardware platform for implementing a visual media decoding or a visual media encoding technique described in the present disclosure.

FIG. 23A is a block diagram of a video processing apparatus 2300. The apparatus 2310 may be used to implement one or more of the methods described herein. The apparatus 2310 may be embodied in a smartphone, tablet, computer, Internet of Things (IoT) receiver, and so on. The apparatus 2310 may include one or more processors 2312, one or more memories 2304 and video processing hardware 2316. The processor(s) 2312 may be configured to implement one or more methods (including, but not limited to, methods 2200, 2210, 2220, 2230, 2240 and 2250) described in the present disclosure. The memory (memories) 2304 may be used for storing data and code used for implementing the methods and techniques described herein. The video processing hardware 2306 may be used to implement, in hardware circuitry, some techniques described in the present disclosure. In some embodiments, the hardware 2306 may be at least partly internal to the processor 2312, e.g., a graphics co-processor.

Figure 23B:
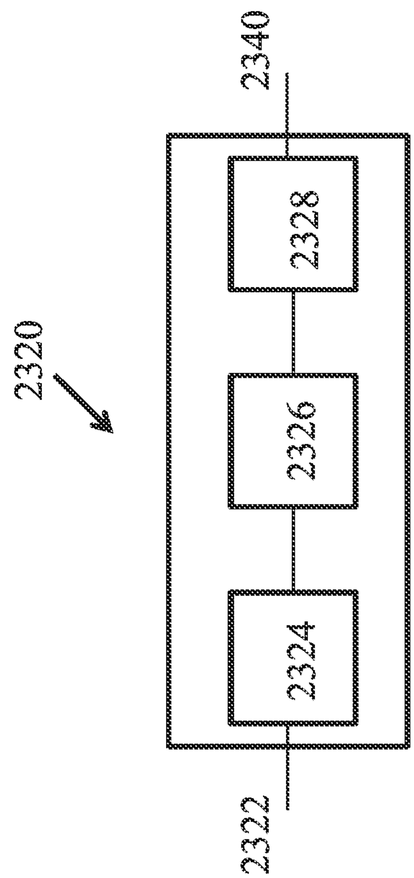

FIG. 23B is another example of a block diagram of a video processing system in which disclosed techniques may be implemented. FIG. 23B is a block diagram showing an example video processing system 2320 in which various techniques disclosed herein may be implemented. Various implementations may include some or all of the components of the system 2320. The system 2320 may include input 2322 for receiving video content. The video content may be received in a raw or uncompressed format, e.g., 8 or 10 bit multi-component pixel values, or may be in a compressed or encoded format. The input 2322 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 2320 may include a coding component 2324 that may implement the various coding or encoding methods described in the present disclosure. The coding component 2324 may reduce the average bitrate of video from the input 2322 to the output of the coding component 2324 to produce a coded representation of the video. The coding techniques are therefore sometimes called video compression or video transcoding techniques. The output of the coding component 2324 may be either stored, or transmitted via a communication connected, as represented by the component 2326. The stored or communicated bitstream (or coded) representation of the video received at the input 2322 may be used by the component 2328 for generating pixel values or displayable video that is sent to a display interface 2340. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was disabled based on the decision or determination.

In the present disclosure, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

In some embodiments, the video coding methods may be implemented using an apparatus that is implemented on a hardware platform as described with respect to FIG. 23A or 23B.

Various techniques and embodiments may be described using the following clause-based format. The first set of clauses describe certain features and aspects of the disclosed techniques in the previous section.

1. A method for video processing, comprising: selecting, based on a characteristic of a current video block, a transform set or a transform matrix for an application of a reduced secondary transform to the current video block; and applying, as part of a conversion between the current video block and a bitstream representation of a video comprising the current video block, the selected transform set or transform matrix to a portion of the current video block.
2. The method of clause 1, wherein the portion of the current video block is a top-right sub-region, bottom-right sub-region, bottom-left sub-region or center sub-region of the current video block.
3. The method of clause 1 or 2, wherein the characteristic of the current video block is an intra prediction mode or a primary transform matrix of the current video block.
4. The method of clause 1, wherein the characteristic is a color component of the current video block.
5. The method of clause 4, wherein a first transform set is selected for a luma component of the current video block, and wherein a second transform set different from the first transform set is selected for one or more chroma components of the current video block.
6. The method of clause 1, wherein the characteristic is an intra prediction mode or an intra coding method of the current video block.
7. The method of clause 6, wherein the intra prediction method comprises a multiple reference line (MRL)-based prediction method or a matrix-based intra prediction method.
8. The method of clause 6, wherein a first transform set is selected when the current video block is a cross-component linear model (CCLM) coded block, and wherein a second transform set different from the first transform set is selected when the current video block is a non-CCLM coded block.
9. The method of clause 6, wherein a first transform set is selected when the current video block is coded with a joint chroma residual coding method, and wherein a second transform set different from the first transform set is selected when the current video block is not coded with the joint chroma residual coding method.
10. The method of clause 1, wherein the characteristic is a primary transform of the current video block.
11. A method for video processing, comprising: making a decision, based on one or more coefficients associated with a current video block, regarding a selective inclusion of signaling of side information for an application of a reduced secondary transform (RST) in a bitstream representation of the current video block; and performing, based on the decision, a conversion between the current video block and a video comprising the bitstream representation of the current video block.
12. The method of clause 11, wherein the one or more coefficients comprises a last non-zero coefficient in a scanning order of the current video block.
13. The method of clause 11, wherein the one or more coefficients comprises a plurality of coefficients within a partial region of the current video block.
14. The method of clause 13, wherein the partial region comprises one or more coding groups that the RST could be applied to.
15. The method of clause 13, wherein the partial region comprises a first M coding groups or a last M coding groups in a scanning order of the current video block.
16. The method of clause 13, wherein the partial region comprises a first M coding groups or a last M coding groups in a reverse scanning order of the current video block.
17. The method of clause 13, wherein making the decision is further based on an energy of one or more non-zero coefficients of the plurality of coefficients.
18. A method for video processing, comprising: configuring, for an application of a reduced secondary transform (RST) to a current video block, a bitstream representation of the current video block, wherein a syntax element related to the RST is signaled in the bitstream representation before coding residual information; and performing, based on the configuring, a conversion between the current video block and the bitstream representation of the current video block.
19. The method of clause 18, wherein signaling the syntax element related to the RST is based on at least one coded block flag or a usage of a transform selection mode.
20. The method of clause 18, wherein the bitstream representation excludes the coding residual information corresponding to coding groups with all zero coefficients.
21. The method of clause 18, wherein the coding residual information is based on the application of the RST.
22. A method for video processing, comprising: configuring, for an application of a reduced secondary transform (RST) to a current video block, a bitstream representation of the current video block, wherein a syntax element related to the RST is signaled in the bitstream representation before either a transform skip indication or a multiple transform set (MTS) index; and performing, based on the configuring, a conversion between the current video block and the bitstream representation of the current video block.

23. The method of clause 22, wherein the transform skip indication or the MTS index is based on the syntax element related to the RST.

24. A method for video processing, comprising: configuring, based on a characteristic of a current video block, a context model for coding an index of a reduced secondary transform (RST); and performing, based on the configuring, a conversion between the current video block and a bitstream representation of a video comprising the current video block.

25. The method of clause 24, wherein the characteristic is an explicit or implicit enablement of a multiple transform selection (MTS) process.

26. The method of clause 24, wherein the characteristic is an enablement of a cross-component linear model (CCLM) coding mode in the current video block.

27. The method of clause 24, wherein the characteristic is a size of the current video block.

28. The method of clause 24, wherein the characteristic is a splitting depth of a partitioning process applied to the current video block.

29. The method of clause 28, wherein the partitioning process is a quadtree (QT) partitioning process, a binary tree (BT) partitioning process or a ternary tree (TT) partitioning process.

30. The method of clause 24, wherein the characteristic is a color format or a color component of the current video block.

31. The method of clause 24, wherein the characteristic excludes an intra prediction mode of the current video block and an index of a multiple transform selection (MTS) process.

32. A method for video processing, comprising: making a decision, based on a characteristic of a current video block, regarding a selective application of an inverse reduced secondary transform (RST) process on the current video block; and performing, based on the decision, a conversion between the current video block and a bitstream representation of a video comprising the current video block.

33. The method of clause 32, wherein the characteristic is a coded block flag of a coding group of the current video block.

34. The method of clause 33, wherein the inverse RST process is not applied, and wherein the coded block flag of a top-left coding group is zero.

35. The method of clause 33, wherein the inverse RST process is not applied, and wherein coded block flags for a first and a second coding group in a scanning order of the current video block are zero.

36. The method of clause 32, wherein the characteristic is a height (M) or a width (N) of the current video block.

37. The method of clause 36, wherein the inverse RST process is not applied, and wherein (i) M=8 and N=4, or (ii) M=4 and N=8.

38. A method for video processing, comprising: making a decision, based on a characteristic of a current video block, regarding a selective application of an inverse reduced secondary transform (RST) process on the current video block; and performing, based on the decision, a conversion between the current video block and a bitstream representation of a video comprising the current video block; wherein the bitstream representation includes side information about RST, wherein the side information is included based on coefficients of a single color or luma component of the current video block.

39. The method of clause 38, wherein the side information is included further based on dimensions of the current video block.

40. The method of any of clauses 38 or 39, wherein the side information is included without considering block information for the current video block.

41. A method of video processing, comprising: determining, for a conversion between a coded representation of a current video block comprising sub-blocks and the current video block, a zero-out region applied for the conversion of the sub-blocks based on a coding condition; and performing the conversion based on the determining.

42. The method of clause 41, wherein the coding condition comprises a size of the sub-blocks.

43. The method of any of clauses 41-42, wherein the coding condition includes a size of a secondary transform used during the conversion.

44. The method of any of clauses 1 to 43, wherein the conversion includes generating the bitstream representation from the current video block.

45. The method of any of clauses 1 to 43, wherein the conversion includes generating the current video block from the bitstream representation.

46. An apparatus in a video system comprising a processor and a non-transitory memory with instructions thereon, wherein the instructions upon execution by the processor, cause the processor to implement the method in any one of clauses 1 to 45.

47. A computer program product stored on a non-transitory computer readable media, the computer program product including program code for carrying out the method in any one of clauses 1 to 45.

48. A method, apparatus or system described herein.

The second set of clauses describe certain features and aspects of the disclosed techniques in the previous section (e.g., example items 7-9, 22, and 29-34).

Figure 27A:
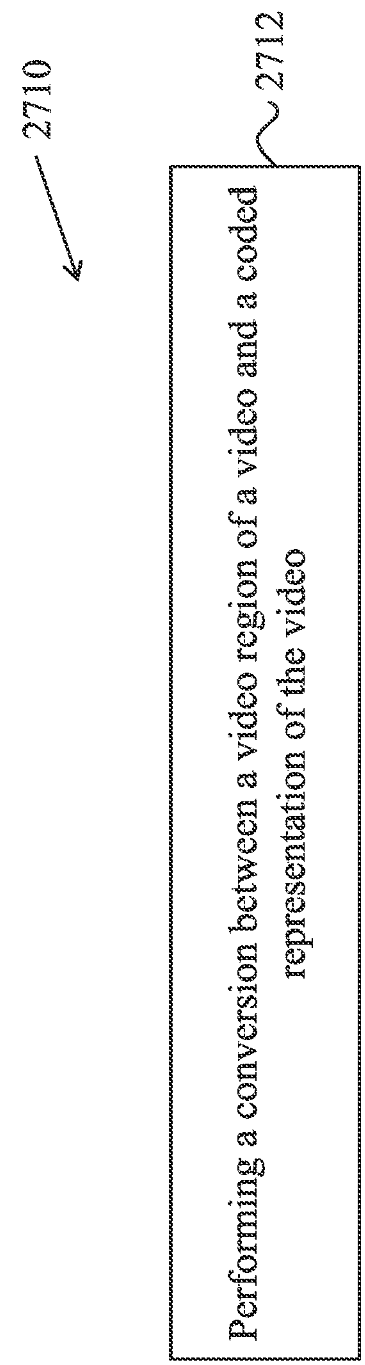
FIGS. 27A to 27H show flowcharts of example methods for video processing.

1. A method for video processing (e.g., method 2710 shown in FIG. 27A), comprising: performing (2712) a conversion between a video region of a video and a coded representation of the video, wherein the performing of the conversion includes configuring, based on a partition type of the video region, a context model for coding a first bin, the first bin and a second bin included in a bin string corresponding to an index of a secondary transform tool applied to the video region, wherein the index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

2. The method of clause 1, wherein the partition type is a single tree type or a dual tree type.

3. The method of clause 1, wherein the conversion is performed for a given slice type such that the context model used for the given slice type is different from one used for another slice type.

Figure 27B:
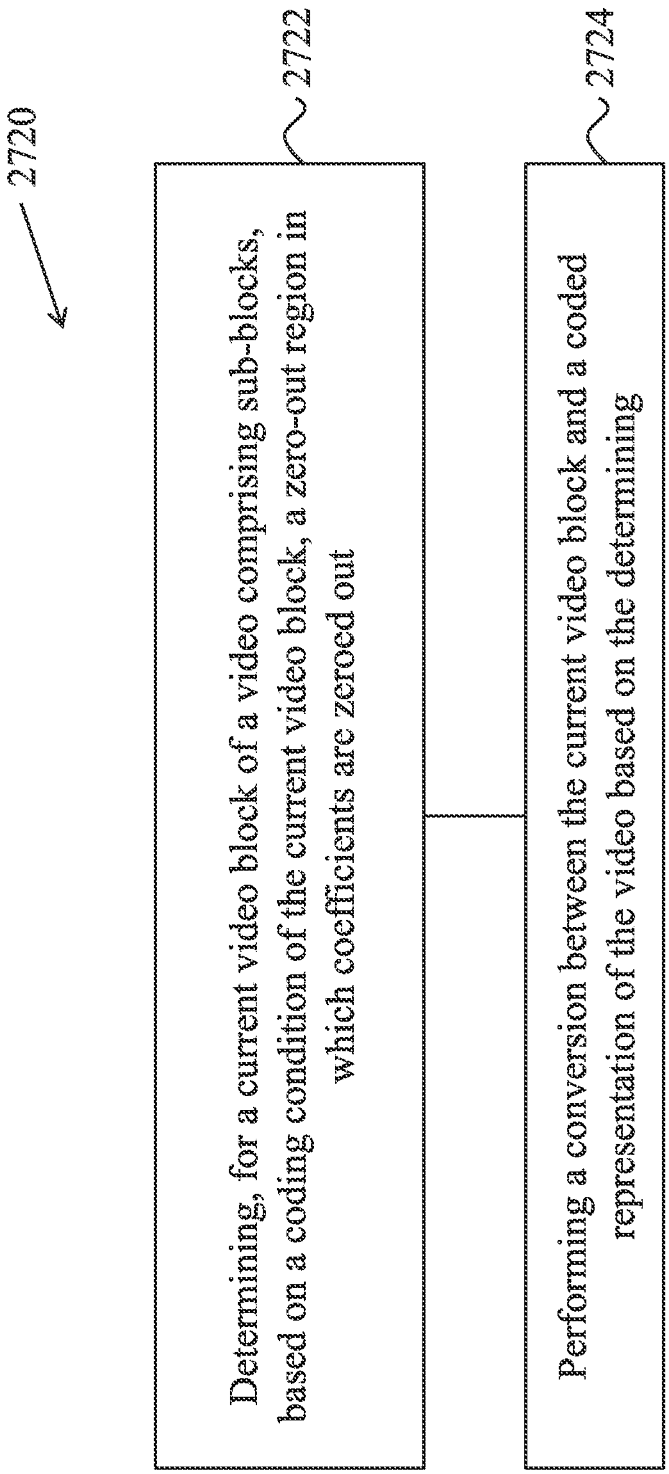
Figure 27C:
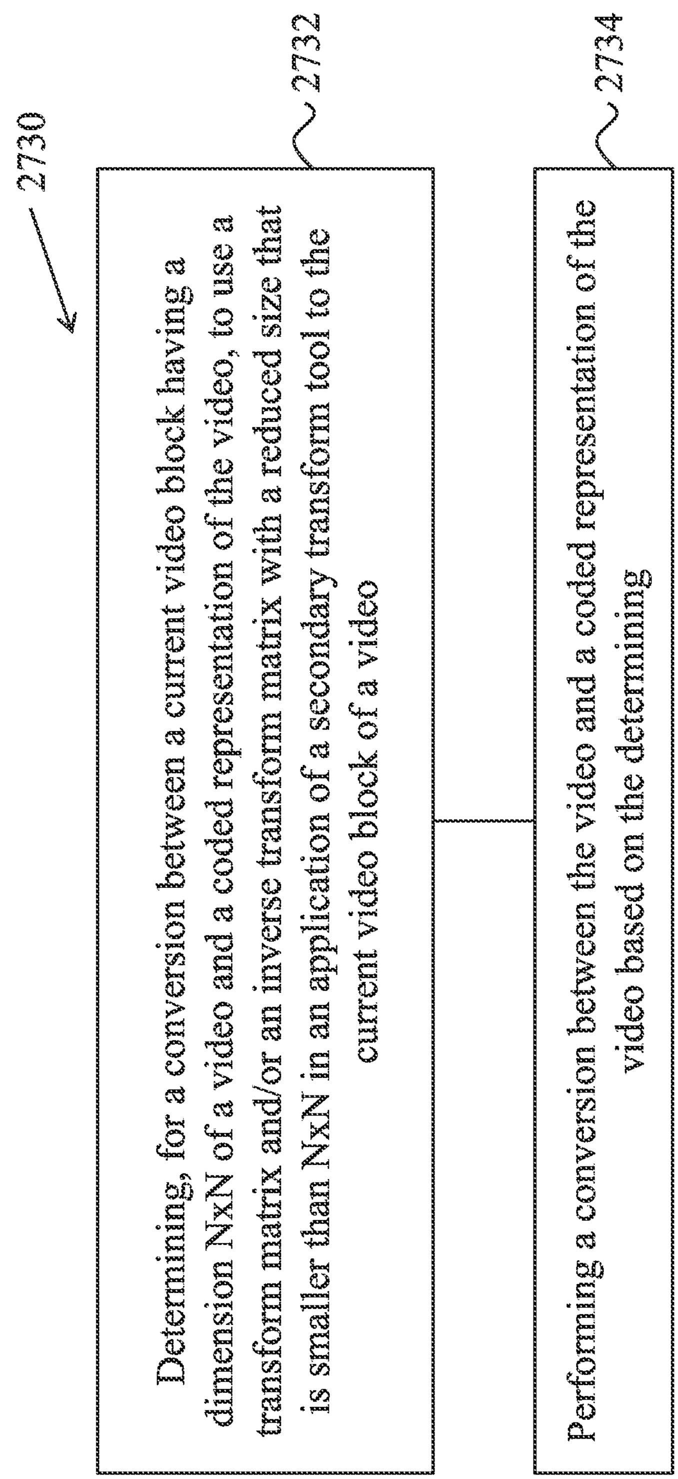
Figure 27D:
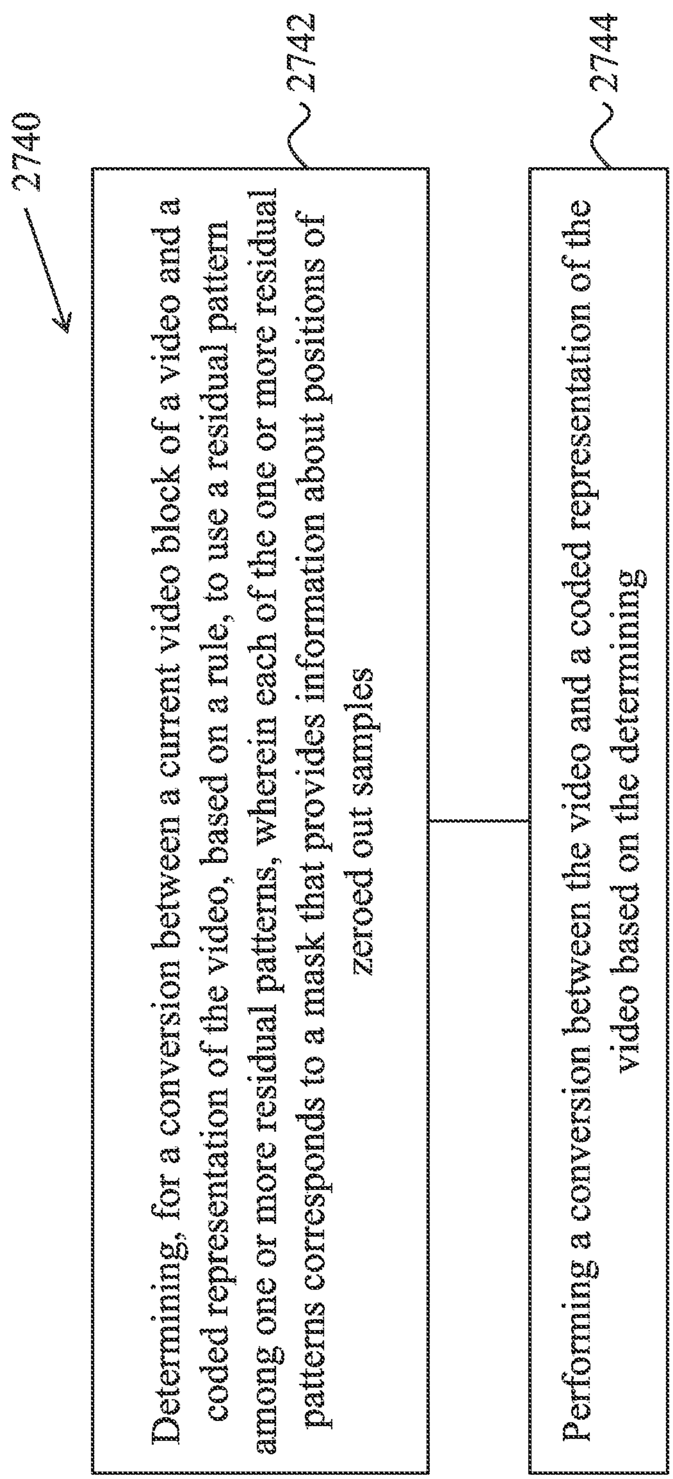

4. A method for video processing (e.g., method 2720 shown in FIG. 27B), comprising: determining (2722), for a current video block of a video comprising sub-blocks, based on a coding condition of the current video block, a zero-out region in which coefficients are zeroed out; and performing (2724) a conversion between the current video block and a coded representation of the video based on the determining, wherein the conversion includes applying a secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.
5. The method of clause 4, wherein the coding condition comprises a size of the sub-blocks.
6. The method of clause 4, wherein nonZeroSizeA indicates a number of samples in the zero-out region in case that the size of a current sub-block is M×N and nonZeroSizeB indicates a number of samples in the zero-out region in case that the size of a current sub-block is K×L, and wherein in case that Min (M, N) is no smaller than Min (K, L), nonZeroSizeA is no smaller than nonZeroSizeB.
7. The method of clause 4, wherein in case that a width or a height of a sub-block is equal to 4 or 8, a number of samples in the zero-out region is set to a fixed value.
8. The method of clause 4, wherein a number of samples in the zero-out region is set to a fixed value regardless of a size of a sub-block.
9. The method of clause 4, wherein the coding condition includes a size of the secondary transform tool.
10. The method of clause 9, wherein coding condition includes whether a 16×64 transform or 16×16 transform is used during the conversion.
11. The method of clause 10, wherein nonZeroSizeA indicates a number of samples in the zero-out region in case that the 16×64 transform is used and nonZeroSizeB indicates a number of samples in the zero-out region in case that the 16×16 transform is used, and wherein NonZeroSizeA is no smaller than NonZeroSizeB.
12. A method for video processing (e.g., method 2730 shown in FIG. 27C), comprising: determining (2732), for a conversion between a current video block having a dimension N×N of a video and a coded representation of the video, to use a transform matrix and/or an inverse transform matrix with a reduced size that is smaller than N×N in an application of a secondary transform tool to the current video block of a video; and performing (2734) a conversion between the video and a coded representation of the video, wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.
13. The method of clause 12, wherein the reduced size corresponds to ½, ¼, or ⅛ of the original size of the transform matrix and/or the inverse transform matrix.
14. The method of clause 12, wherein a zero-out region with coefficients zeroed out in the current video block is based on the reduced size of the transform matrix and/or the inverse transform matrix.
15. A method for video processing (e.g., method 2740 shown in FIG. 27D), comprising: determining (2742), for a conversion between a current video block of a video and a coded representation of the video, based on a rule, to use a residual pattern among one or more residual patterns, wherein each of the one or more residual patterns corresponds to a mask that provides information about positions of zeroed out samples; and performing (2744) a conversion between the video and a coded representation of the video based on the determining.
16. The method of clause 15, wherein each of the one or more residual patterns includes a portion associated with non-zero transform coefficients and another portion associated with zero coefficients.
17. The method of clause 15, wherein the rule determines to use the residual pattern for the current video block having a size of M×N regardless of a signaled transform index, wherein M and N are equal to or greater than 8.
18. The method of clause 15, wherein the rule specifies whether and/or how to apply the residual pattern based on a type of a transform tool used in the current video block.
19. The method of clause 18, wherein the determining determines to use the residual pattern due to a second transform tool used in the current video block, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.
20. The method of clause 15, wherein the one or more residual patterns are derived from a larger residual pattern with more coefficients.
21. The method of clause 20, wherein, for each of the one or more residual patterns, multiple transform matrices are defined.
22. The method of clause 20, wherein an indication of the residual pattern and a transform matrix associated with residual pattern is signaled.
23. The method of clause 20, wherein the one or more residual patterns are derived by excluding positions that are associated with relatively small transform coefficients in a K×L transform matrix, and wherein K and L are integers.
24. The method of clause 23, wherein the one or more residual patterns include a first residual pattern that is derived by excluding positions associated with first K0 smallest transform coefficients and wherein (K*L−K0) positions are assigned with residuals, wherein K0 is an integer.
25. The method of clause 24, wherein the one or more residual patterns include a second residual pattern that is derived by excluding positions associated with first K1 smallest transform coefficients and wherein (K*L−K1) positions are assigned with residuals, wherein K1 is an integer that is different from K0.

Figure 27E:
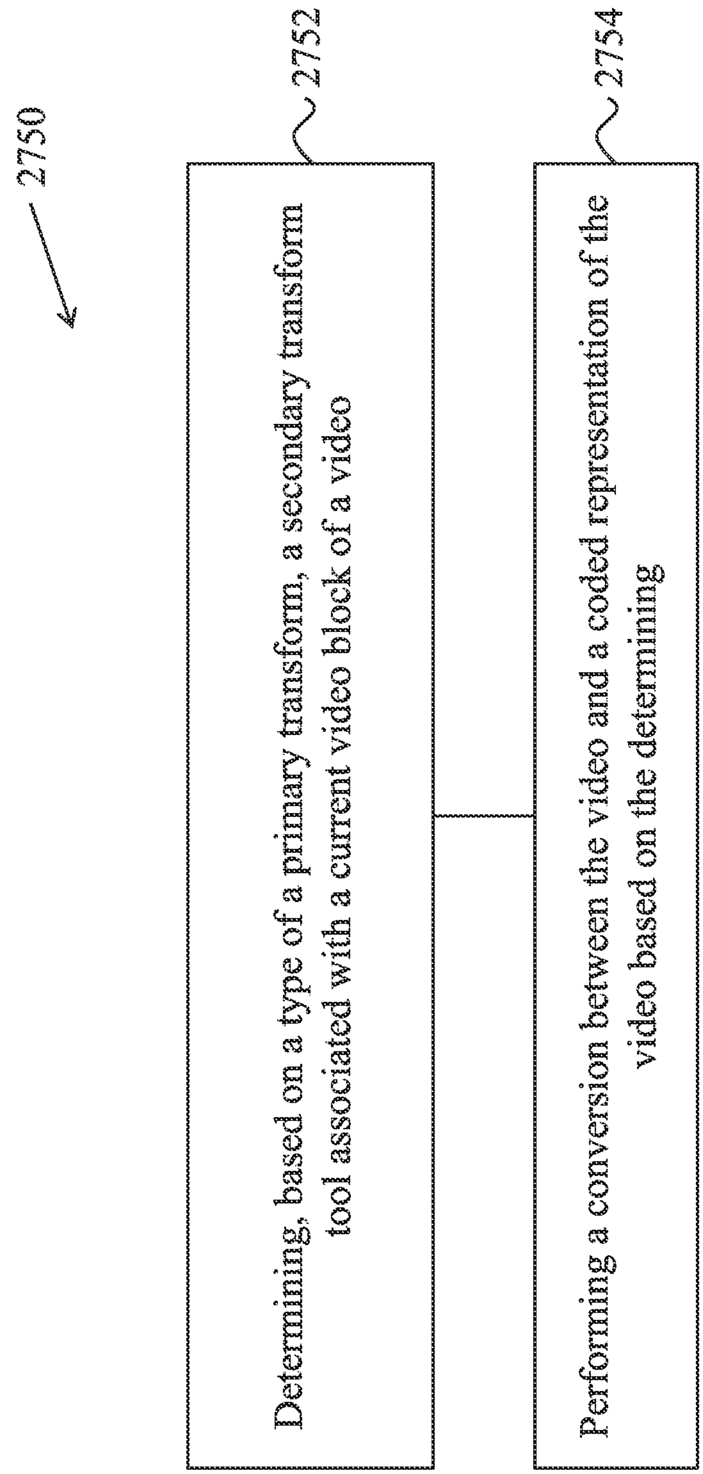
Figure 27F:
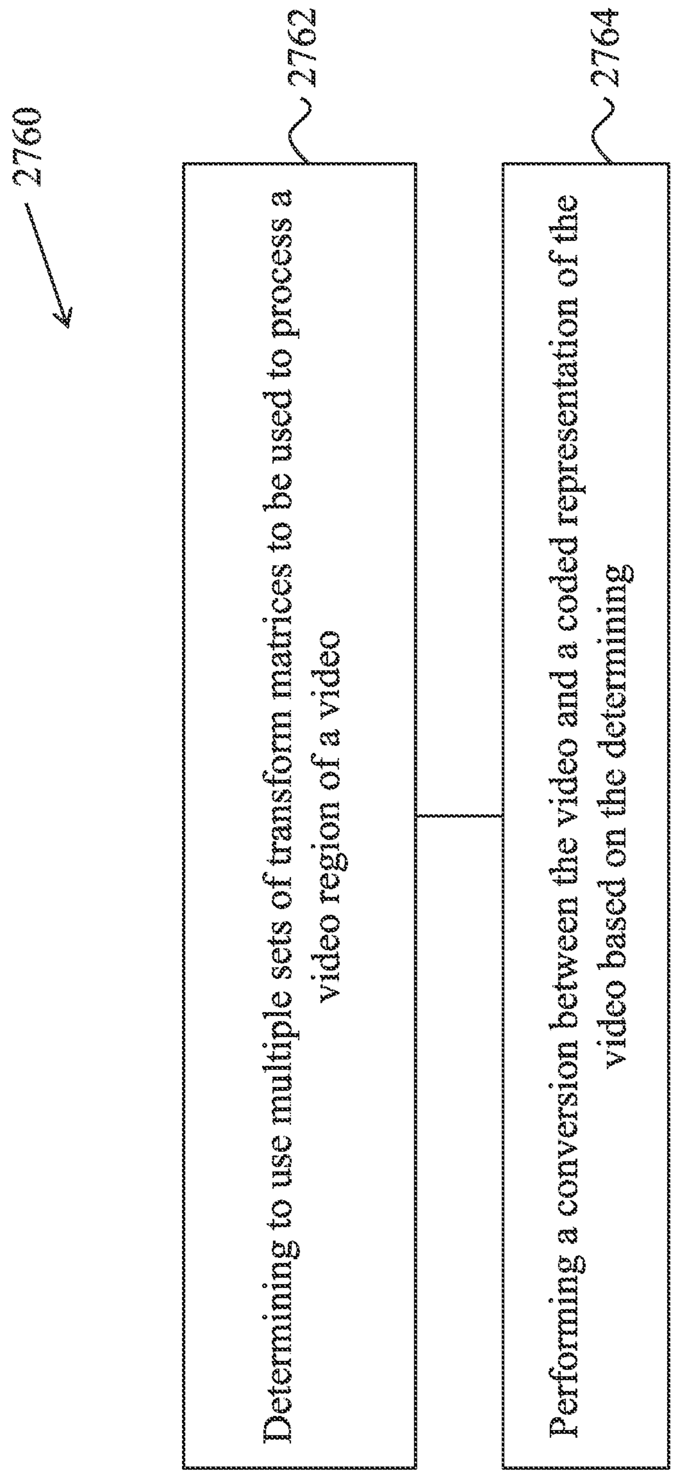
Figure 27G:
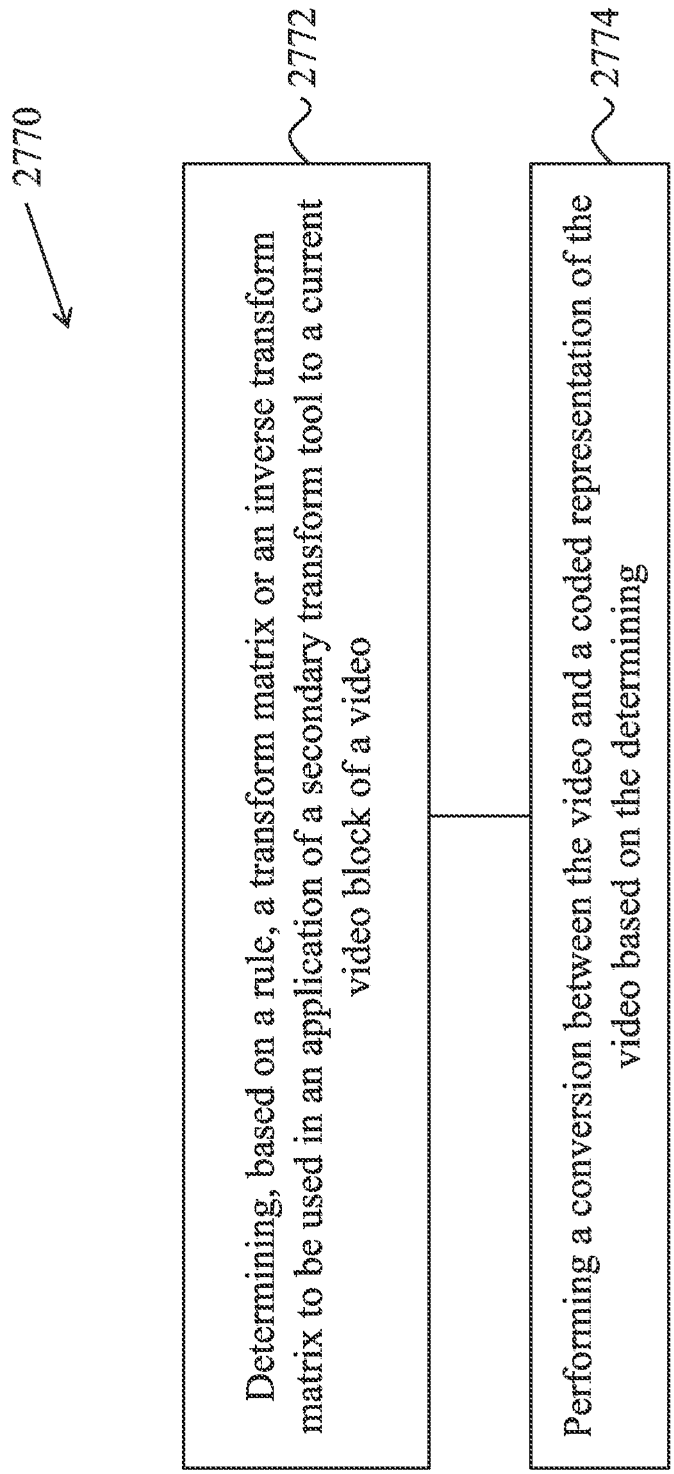
Figure 27H:
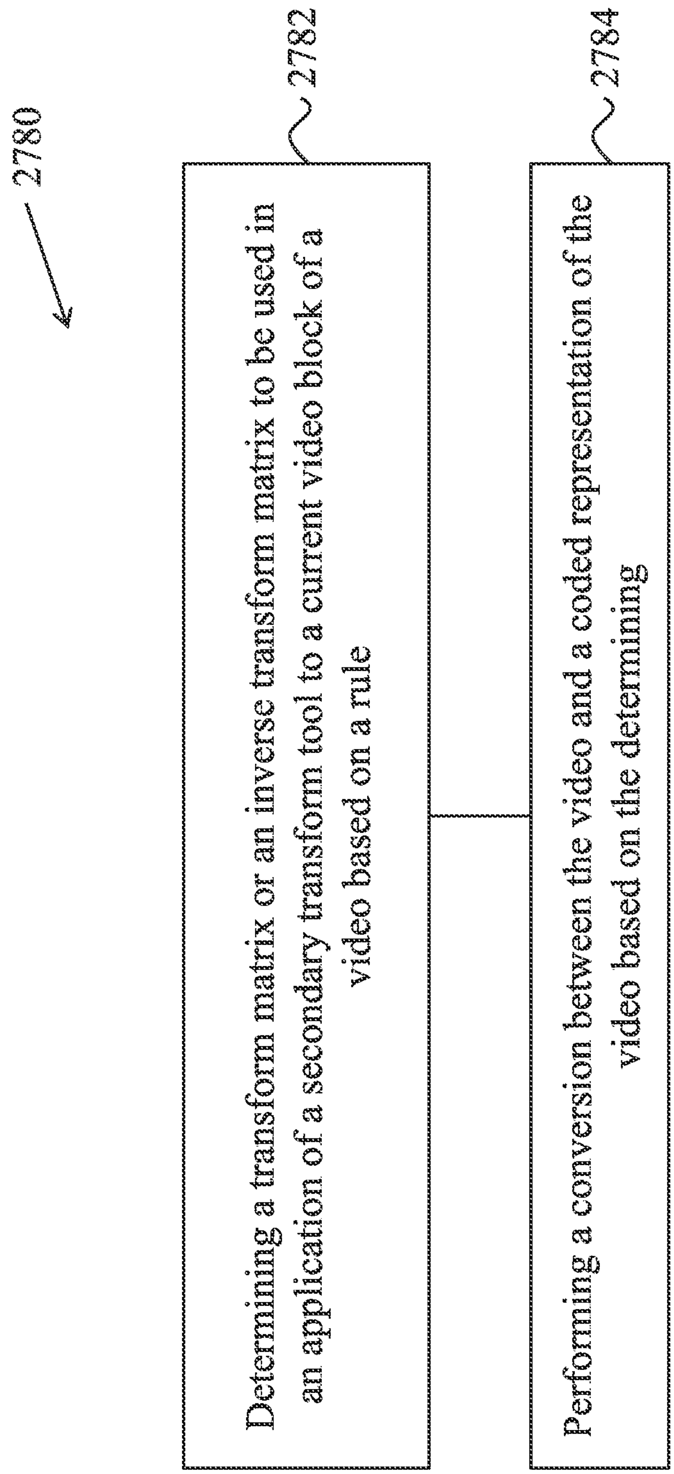

26. The method of clause 15, wherein the current video block has a size that is smaller than a maximum transform block.
27. The method of clause 15, wherein the rule specifies to use the residual pattern based on at least one of a color component or coded information of the current video block and/or a neighboring block of the current video block.
28. A method of video processing (e.g., method 2750 shown in FIG. 27E), comprising: determining (2752), based on a type of a primary transform, a secondary transform tool associated with a current video block of a video; and performing (2754) a conversion between the video and a coded representation of the video, wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.
29. The method of clause 28, wherein the determining includes selecting, for the current video block of a video, a transform set or transform matrices to be used in an application of the secondary transform tool to the current video block based on a rule, wherein the rule specifies to select the transform set or the transform matrices based on i) a type of the forward primary transform or a type of the inverse primary transform of the current video block, ii) a size of the current video block, or iii) a shape of the current video block.
30. The method of clause 28 or 29, wherein the forward primary transform or the inverse primary transform includes variances of DCT-II, DST-VII, DCT-VIII, transform skip mode, identity transform, or transform from training.
31. The method of clause 29, wherein the rule specifies that a set of transform matrices is used in a transform skip mode in which a transform is bypassed or an identify transform is applied.
32. The method of clause 29, wherein the coded representation includes a syntax element to indicate whether the second transform tool is used or not for a transform skip mode or which matrix among the set is used for the current video block.
33. The method of clause 29, wherein the rule specifies that a set of transform matrices is used for DCT-II or a first forward or inverse primary transform and another set of transform matrices is used for another forward or inverse primary transform.
34. The method of clause 29, wherein the rule specifies that a set of transform matrices corresponds to a corresponding primary transform mode used in the forward primary transform or the inverse primary transform.
35. The method of clause 29, wherein the rule specifies that a set of transform matrices used for a primary transform mode includes at least one matrix that is different from any one in two or more sets of transform matrices used for different primary transform modes.
36. The method of clause 29, wherein a set of transform matrices used for the current video block corresponds to a category that is determined based on the size or the shape of the current video block, the category being different from a category of another video block having a different size or a different shape from that of the current video block.
37. A method of video processing (e.g., method 2760 shown in FIG. 27F), comprising: determining (2762) to use multiple sets of transform matrices to be used to process a video region of a video; and performing (2764) a conversion between the video and a coded representation of the video, and wherein the coded representation includes an indication of which set among the multiple sets is used for the video region.
38. The method of clause 37, wherein the video region corresponds to a sequence, a picture, a slice, a tile, a brick, a subpicture, or the video.
39. A method for video processing (e.g., method 2770 shown in FIG. 27G), comprising: determining (2772), based on a rule, a transform matrix or an inverse transform matrix to be used in an application of a secondary transform tool to a current video block of a video; and performing (2774) a conversion between the video and a coded representation of the video, wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform, wherein the rule specifies to determine coefficients of the transform matrix or the inverse transform matrix based on a variable specifying a transform output length.
40. The method of clause 39, wherein the coefficients of the transform matrix or the inverse transform matrix have lower frequencies as those of a transform matrix or an inverse transform matrix that is not based on the variable.
41. The method of clause 39 or 40, wherein the variable is 16 or 48.
42. A method for video processing (e.g., method 2780 shown in FIG. 27H), comprising: determining (2782) a transform matrix or an inverse transform matrix to be used in an application of a secondary transform tool to a current video block of a video based on a rule; and performing (2784) a conversion between the video and a coded representation of the video, wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform, wherein the rule specifies to determine the transform matrix or the inverse transform matrix by using a retraining process.
43. The method of clause 42, wherein the retraining process includes retraining a reconstructed transform coefficient block and applying an eigen decomposition to calculate eigenvalues and eigenvectors.
44. The method of clause 42, wherein the rule specifies that the transform matrix or the inverse transform matrix is determined only after encoding or decoding an intra slice or an intra picture of the video.
45. The method of clause 42, wherein the transform matrix or the inverse transform matrix is used to replace at least a part of an original transform matrix or an original inverse transform matrix that is obtained without using the retraining process.

46. The method of clause 42, wherein the transform matrix or the inverse transform matrix is used as an additional set of original transform matrices that are obtained without using the retraining process.

47. The method of clause 42, wherein the coded representation includes information that corresponds to i) at least a part of a retrained transform matrix, ii) first difference values between a retrained transform matrix and the transform matrix, or iii) second difference values between a retrained transform matrix and a previously signaled transform matrix.

48. The method of clause 47, wherein the information is included in a slice header, a picture header, or a picture parameter set (PPS), or an adaption parameter set (APS).

49. The method of any of clauses 1 to 48, wherein the secondary transform tool corresponds to a low frequency non-separable transform (LFNST) tool, and wherein, using the secondary transform tool: during encoding, a forward secondary transform is applied to an output of a forward primary transform applied to a residual of the chroma block prior to quantization, or during decoding, an inverse secondary transform is applied to an output of dequantization of the chroma block before applying an inverse primary transform.

50. The method of any of clauses 1 to 49, wherein the performing of the conversion includes generating the coded representation from the current video block.

51. The method of any of clauses 1 to 49, wherein the performing of the conversion includes generating the current video block from the coded representation.

52. An apparatus in a video system comprising a processor and a non-transitory memory with instructions thereon, wherein the instructions upon execution by the processor, cause the processor to implement the method in any one of clauses 1 to 51.

53. A computer program product stored on a non-transitory computer readable media, the computer program product including program code for carrying out the method in any one of clauses 1 to 51.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in the present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While the present disclosure contains many specifics, these should not be construed as limitations on the scope of any invention or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method for processing video data, comprising:

performing a conversion between a current video region of a video and a bitstream of the video, wherein the performing of the conversion includes configuring a context model for coding a first bin, the first bin and a second bin included in a bin string corresponding to a first index of a secondary transform tool applied to the current video region, wherein the context model is configured only based on a partition type of the current video region and without considering a multiple transform selection index, wherein the first index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

2. The method of claim 1, wherein the partition type is a single tree type or a dual tree type.

3. The method of claim 1, wherein in case that the partition type is a single tree type, a variable ctxInc which is used to determine the context model is set equal to 0.

4. The method of claim 1, wherein in case that the partition type is not a single tree type, a variable ctxInc which is used to determine the context model is set equal to 1.

5. The method of claim 1, wherein the current video region is a current video block, and whether the first index is included in the bitstream is based on a relationship between at least one of a width (W) and a height (H) of the current video block and an allowed maximum transform size (T).

6. The method of claim 5, wherein a location of a last non-zero coefficient in a residual of the current video block is determined based on at least one syntax element in the bitstream, and whether or how to include the first index present in the bitstream is based on a location of the last non-zero coefficient.

7. The method of claim 6, wherein the first index is not included in the bitstream in a case that the last non-zero coefficient is not located in a region of the current video block to which that the secondary transform tool is applied.

8. The method of claim 1, wherein in response to the first index indicating the secondary transform tool being enabled, a second index indicating an applicability of the forward primary transform or the inverse primary transform and a kernel information of the forward primary transform or the inverse primary transform is not present in the bitstream and inferred to be not applied to the current video region.

9. The method of claim 1, wherein the secondary transform tool corresponds to a low frequency non-separable transform (LFNST) tool.

10. The method of claim 1, wherein the conversion includes encoding the current video region into the bitstream.

11. The method of claim 1, wherein the conversion includes decoding the current video region from the bitstream.

12. An apparatus for processing video data comprising a processor and a non-transitory memory with instructions thereon, wherein the instructions upon execution by the processor, cause the processor to:

perform a conversion between a current video region of a video and a bitstream of the video, wherein the performing of the conversion includes configuring a context model for coding a first bin, the first bin and a second bin included in a bin string corresponding to a first index of a secondary transform tool applied to the current video region, wherein the context model is configured only based on a partition type of the current video region and without considering a multiple transform selection index, wherein the first index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

13. The apparatus of claim 12, wherein the partition type is a single tree type or a dual tree type;

wherein in case that the partition type is a single tree type, a variable ctxInc which is used to determine the context model is set equal to 0; and wherein in case that the partition type is not a single tree type, a variable ctxInc which is used to determine the context model is set equal to 1.

14. The apparatus of claim 12, wherein the current video region is a current video block, and whether the first index is included in the bitstream is based on a relationship between at least one of a width (W) and a height (H) of the current video block and an allowed maximum transform size (T);

wherein a location of a last non-zero coefficient in a residual of the current video block is determined based on at least one syntax element in the bitstream, and whether or how to include the first index in the bitstream is based on a location of the last non-zero coefficient;

wherein the first index is not included in the bitstream in a case that the last non-zero coefficient is not located in a region of the current video block to which that the secondary transform tool is applied;

wherein in response to the first index indicating the secondary transform tool being enabled, a second index indicating an applicability of the forward primary transform or the inverse primary transform and a kernel information of the forward primary transform or the inverse primary transform is not present in the bitstream and inferred to be not applied to the current video region; and wherein the secondary transform tool corresponds to a low frequency non-separable transform (LFNST) tool.

15. A non-transitory computer-readable storage medium storing instructions that cause a processor to:

perform a conversion between a current video region of a video and a bitstream of the video, wherein the performing of the conversion includes configuring a context model for coding a first bin, the first bin and a second bin included in a bin string corresponding to a first index of a secondary transform tool applied to the current video region, wherein the context model is configured only based on a partition type of the current video region and without considering a multiple transform selection index, wherein the first index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

16. The non-transitory computer-readable storage medium of claim 15, wherein the partition type is a single tree type or a dual tree type;

wherein in case that the partition type is a single tree type, a variable ctxInc which is used to determine the context model is set equal to 0; and wherein in case that the partition type is not a single tree type, a variable ctxInc which is used to determine the context model is set equal to 1.

17. The non-transitory computer-readable storage medium of claim 15, wherein the current video region is a current video block, and whether the first index is included in the bitstream is based on a relationship between at least one of a width (W) and a height (H) of the current video block and an allowed maximum transform size (T);

wherein a location of a last non-zero coefficient in a residual of the current video block is determined based on at least one syntax element in the bitstream, and whether or how to include the first index present in the bitstream is based on a location of the last non-zero coefficient;

wherein the first index is not included in the bitstream in a case that the last non-zero coefficient is not located in a region of the current video block to which that the secondary transform tool is applied;

wherein in response to the first index indicating the secondary transform tool being enabled, a second index indicating an applicability of the forward primary transform or the inverse primary transform and a kernel information of the forward primary transform or the inverse primary transform is not present in the bitstream and inferred to be not applied to the current video region; and wherein the secondary transform tool corresponds to a low frequency non-separable transform (LFNST) tool.

18. A method for storing a bitstream of a video, comprising:

generating the bitstream of the video for a current video region of the video; and storing the bitstream in a non-transitory computer-readable recording medium, wherein the generating the bitstream includes configuring a context model for coding a first bin, the first bin and a second bin included in a bin string corresponding to a first index of a secondary transform tool applied to the current video region, wherein the context model is configured only based on a partition type of the current video region and without considering a multiple transform selection index, wherein the first index indicates an applicability of the secondary transform tool and/or a kernel information of the secondary transform tool, and wherein the secondary transform tool includes applying, during encoding, a forward secondary transform to an output of a forward primary transform applied to a residual of a video block prior to quantization, or wherein the secondary transform tool includes applying, during decoding, an inverse secondary transform to an output of dequantization to the video block before applying an inverse primary transform.

19. The method claim 18, wherein the partition type is a single tree type or a dual tree type;

wherein in case that the partition type is a single tree type, a variable ctxInc which is used to determine the context model is set equal to 0; and wherein in case that the partition type is not a single tree type, a variable ctxInc which is used to determine the context model is set equal to 1.

20. The method of claim 18, wherein the current video region is a current video block, and whether the first index is included in the bitstream is based on a relationship between at least one of a width (W) and a height (H) of the current video block and an allowed maximum transform size (T);

wherein a location of a last non-zero coefficient in a residual of the current video block is determined based on at least one syntax element in the bitstream, and whether or how to include the first index present in the bitstream is based on a location of the last non-zero coefficient;

wherein the first index is not included in the bitstream in a case that the last non-zero coefficient is not located in a region of the current video block to which that the secondary transform tool is applied;

wherein in response to the first index indicating the secondary transform tool being enabled, a second index indicating an applicability of the forward primary transform or the inverse primary transform and a kernel information of the forward primary transform or the inverse primary transform is not present in the bitstream and inferred to be not applied to the current video region; and wherein the secondary transform tool corresponds to a low frequency non-separable transform (LFNST) tool.

* * * * *